US012740638B2

(12) United States Patent
Dong et al.

(10) Patent No.: US 12,740,638 B2
(45) Date of Patent: Sep. 22, 2026

(54) SURFACE CLEANING SYSTEM, SURFACE CLEANING DEVICE AND CONTROL METHOD THEREOF

(71) Applicant: TINECO INTELLIGENT TECHNOLOGY CO., LTD., Suzhou City (CN)

(72) Inventors: Xiaokang Dong, Suzhou City (CN); Jian Sun, Suzhou City (CN); Hao Lv, Suzhou City (CN); Yang Ding, Suzhou City (CN); Jing Wang, Suzhou City (CN); Huiguo Wu, Suzhou City (CN); Zhibo Gao, Suzhou City (CN); Sihao Ban, Suzhou City (CN); Jianfeng Wang, Suzhou City (CN); Dehua Zhou, Suzhou City (CN); Yonghai Liu, Suzhou City (CN); Chunfeng Zhou, Suzhou City (CN); Zhiyong Liang, Suzhou City (CN); Xisheng Xu, Suzhou City (CN)

(73) Assignee: TINECO INTELLIGENT TECHNOLOGY CO., LTD., Suzhou City (CN)

( * ) Notice: Subject to any disclaimer, the term of this patent is extended or adjusted under 35 U.S.C. 154(b) by 69 days.

(21) Appl. No.: 18/397,723

(22) Filed: Dec. 27, 2023

(65) Prior Publication Data

US 2024/0216956 A1 Jul. 4, 2024

(30) Foreign Application Priority Data

Dec. 29, 2022 (CN) ......................... 202211717469.8
Apr. 19, 2023 (CN) ......................... 202310423924.1
(Continued)

(51) Int. Cl.
*A46B 13/02* (2006.01)
*A47L 11/18* (2006.01)
(Continued)

(52) U.S. Cl.
CPC ............ *A46B 13/02* (2013.01); *A47L 11/185* (2013.01); *A47L 11/282* (2013.01);
(Continued)

(58) Field of Classification Search
CPC ....... A46B 13/02; A46B 13/04; A47L 11/282; A47L 11/30; A47L 11/4088; A47L 5/30;
(Continued)

(56) References Cited

FOREIGN PATENT DOCUMENTS

CN 211911482 U 11/2020
CN 112790682 A 5/2021
(Continued)

OTHER PUBLICATIONS

English translation of CN Rejection Decision dated Mar. 17, 2026 in application No. 202211717469.8 (Year: 2026).*
(Continued)

*Primary Examiner* — Laura C Guidotti
(74) *Attorney, Agent, or Firm* — Maschoff Brennan

(57) ABSTRACT

A cleaning system, a cleaning device and a control method therefor, are associated with a floor brush assembly that includes a roller brush housing, a roller brush, a roller brush cover. The roller brush cover and the floor brush housing enclose a roller brush cavity for fitting with the roller brush. The roller brush cover is configured to be operable in a first or second position relative to the floor brush housing. In the first position, there is a first contact area between the roller brush cover and the roller brush. In the second position, there is a second contact area between the roller brush cover and the roller brush. The first contact area is greater than or
(Continued)

equal to zero, but less than the second contact area. The inner wall of the roller brush cover can be cleaned by the roller brush.

20 Claims, 36 Drawing Sheets

(30) Foreign Application Priority Data

| | | |
|---|---|---|
| Apr. 19, 2023 | (CN) | 202310423968.4 |
| Apr. 19, 2023 | (CN) | 202310425621.3 |
| May 18, 2023 | (CN) | 202310565391.0 |
| May 18, 2023 | (CN) | 202310565521.0 |
| May 18, 2023 | (CN) | 202310565635.5 |
| May 18, 2023 | (CN) | 202310565680.0 |

(51) Int. Cl.
*A47L 11/282* (2006.01)
*A47L 11/40* (2006.01)
*B08B 1/34* (2024.01)

(52) U.S. Cl.
CPC ....... *A47L 11/4041* (2013.01); *A47L 11/4088* (2013.01); *B08B 1/34* (2024.01)

(58) Field of Classification Search
CPC ........ A47L 9/04; A47L 9/0477; A47L 11/408; A47L 11/185; E01H 1/056; B08B 1/34
USPC ...................................................... 15/355, 82
See application file for complete search history.

(56) References Cited

FOREIGN PATENT DOCUMENTS

| | | | | |
|---|---|---|---|---|
| CN | 213640748 U | | 7/2021 | |
| CN | 216652196 U | | 6/2022 | |
| CN | 115399672 A | | 11/2022 | |
| CN | 115462704 A | | 12/2022 | |
| CN | 116369805 A | | 7/2023 | |
| CN | 116392050 A | | 7/2023 | |
| CN | 116509253 A | | 8/2023 | |
| CN | 219720589 U | | 9/2023 | |
| DE | 112018000082 T5 | * | 4/2019 | A47L 11/40 |
| EP | 3 884 834 A1 | | 9/2021 | |
| WO | WO 2012/137648 A1 | * | 10/2012 | A47L 9/04 |
| WO | WO 2017/153450 A1 | * | 9/2017 | A47L 11/292 |
| WO | 2022121304 A1 | | 6/2022 | |

OTHER PUBLICATIONS

Extended European Search Report dated Jul. 8, 2024 as received in Application No. 23220419.8.

CN Office Action dated Jul. 20, 2025 in application No. 202211717469.8.

CN Office Action dated Nov. 22, 2025 in application No. 202211717469.8.

CN Rejection Decision dated Mar. 17, 2026 in application No. 202211717469.8.

* cited by examiner

SURFACE CLEANING SYSTEM, SURFACE CLEANING DEVICE AND CONTROL METHOD THEREOF

FIELD

The present disclosure relates to the field of cleaning technology, in particular to a cleaning system, a cleaning device and a control method therefor.

BACKGROUND

With the development of social productivity, people's living standards are also improved. On the premise that the material foundation is guaranteed, people start to reduce labor and improve the quality of life by means of various tools, and household cleaning devices are born. A common cleaning device is for example a vacuum cleaner, a hand-held scrubber and the like. Generally, after using a cleaning device, there will be some dirt left on the roller brush, and therefore the cleaning device has a self-cleaning mode for the convenience of cleaning by the user.

SUMMARY

For a floor scrubber, self-cleaning can be performed after the floor scrubber completes a cleaning work, so as to ensure the cleanness of the device. At present, in the self-cleaning process of floor scrubber products on the market, the purpose of cleaning the roller brush can be achieved by soaking the roller brush, washing the roller brush, scraping the surface dirt of the roller brush by using a scraper plate and the like.

In the cleaning method for the cleaning device in the prior art, the problem caused by the dirt left on the inner surface of the roller brush cover is generally ignored. When the floor scrubber operates, the roller brush rotates at a high speed, and water droplets and dirt particles attached to the fluff of the roller brush will be thrown onto the inner surface of the roller brush cover in the rotating process. The existing floor scrubber cannot clean the inner surface of the roller brush cover during the self-cleaning process, so that the user has to clean the roller brush cover manually, and the user experience is poor.

In order to solve the problems existing in the prior art, the present disclosure provides a cleaning system, a cleaning device and a control method thereof.

According to the first aspect of the present disclosure, a cleaning device having a floor brush assembly is provided, the floor brush assembly comprises:

a floor brush housing;

a roller brush rotatably connected to the floor brush housing and configured to clean a working surface; and a roller brush cover, wherein the roller brush cover and the floor brush housing enclose a roller brush cavity for fitting with the roller brush, and the roller brush cover is configured to be operable in a first position or a second position relative to the floor brush housing;

in the first position, there is a first contact area between the roller brush cover and the roller brush; in the second position, there is a second contact area between the roller brush cover and the roller brush; wherein, the first contact area is greater than or equal to zero, but less than the second contact area. In an embodiment of the present disclosure, the roller brush cover is disposed on the floor brush housing by means of a guide mechanism formed in an arc-shape, so that the roller brush cover is configured to move between the first position and the second position along an arc-shaped movement trajectory.

In an embodiment of the present disclosure, a liquid outlet assembly is provided on the floor brush housing; the liquid outlet assembly comprises a liquid outlet portion and a flow guide portion extending in a direction of the roller brush; an extension portion is provided on the roller brush cover, the extension portion is configured to extend downward to a position adjacent to the flow guide portion and enclose a liquid outlet with the flow guide portion; and the liquid flows to the roller brush through the liquid outlet.

In an embodiment of the present disclosure, the position where the extension portion and the flow guide portion enclose a liquid outlet is configured to be in a circle center position of the arc-shaped movement trajectory, and is configured to maintain a distance from the flow guide portion within a predetermined range during movement of the roller brush cover.

In an embodiment of the present disclosure, a side of the extension portion facing the flow guide portion is formed in an arc-shape, and a size of a liquid outlet enclosed between the extension portion and the flow guide portion is configured to remain substantially unchanged during movement of the roller brush cover.

In an embodiment of the present disclosure, the roller brush cover comprises a roller brush surface corresponding to the roller brush; and the extension portion is configured to extend in a traveling direction of the cleaning device to a rear end of the roller brush and enclose a rear end portion of the roller brush surface.

In an embodiment of the present disclosure, the roller brush surface is configured to have an inner arc surface adopted to the shape of the roller brush; in a first position, the roller brush surface is not concentric with the roller brush; and in a second position, the roller brush surface is concentric with the roller brush.

In an embodiment of the present disclosure, the liquid outlet is configured to extend along an axial direction of the roller brush, at least one flow dividing rib is provided on the flow guide portion, and the at least one flow dividing rib is configured to be distributed at a distance in the axial direction of the roller brush.

In an embodiment of the present disclosure, the flow guide portion is configured to extend obliquely downward, and liquid exiting the liquid outlet portion flows obliquely downward to the roller brush through the flow guide portion.

In an embodiment of the present disclosure, the floor brush housing is provided with bearing brackets on two opposite sides; the guide mechanism comprises guide grooves provided on the bearing brackets and guide blocks disposed at the corresponding positions of the roller brush cover and matched with the guide grooves; and the guide blocks and the guide grooves are formed in an arc-shape.

In an embodiment of the present disclosure, the roller brush cover is configured to be detachably mounted on the floor brush housing, and the guide blocks are lock catches disposed on two opposite sides of the roller brush cover; the lock catches are configured to extend out of the roller brush cover through elastic members, and are configured to retract into the roller brush cover under an external force.

In an embodiment of the present disclosure, an outer side wall of each lock catch is configured as an inclined surface inclined outwardly from bottom to top; an end surface of the bearing bracket is provided with a guide surface corresponding to the first position of the roller brush cover, and the guide surface is configured to fit with the inclined surface of the outer side wall of the lock catch when the roller brush cover is in the first position, so as to push the lock catch to move into the guide groove of the roller brush cover when the roller brush cover is pressed down.

In an embodiment of the present disclosure, two opposite sides of the roller brush cover are configured to be supported on the first end surfaces of the top of the bearing brackets; each first end surface has a horizontal portion and a first arc-shaped portion, and two sides of the roller brush cover are formed in a shape matching the horizontal portion and the first arc-shaped portion; and the first arc-shaped portion is configured to always support a corresponding part of the roller brush cover during movement of the roller brush cover.

In an embodiment of the present disclosure, a second end surface is provided on the top of each bearing bracket, a second arc-shaped portion is provided on the second end surface at a position corresponding to the horizontal portion, an arc-shaped flange matching the second arc-shaped portion is formed downward at the position corresponding to the roller brush cover, and the arc-shaped flange is configured to support the second arc-shaped portion during movement of the roller brush cover.

In an embodiment of the present disclosure, a movement assembly is further provided, the movement assembly comprises a pushing part controlled by a driving mechanism; the roller brush cover is provided with a cooperation part in transmission connection with the pushing part; and the pushing part is configured to be controlled by the driving mechanism to drive the roller brush cover to move between the first position and the second position.

In an embodiment of the present disclosure, the pushing part is provided with an engaging groove, and the cooperation part is an engaging wall having a downward opening; the engaging wall is configured to be fitted into the engaging groove after the roller brush cover is mounted on the floor brush housing.

In an embodiment of the present disclosure, the roller brush cover comprises a fixed part and a movable part, and the movable part is configured to move between a first position and a second position; in the first position, there is a first contact area between the movable part and the roller brush; in the second position, there is a second contact area between the movable part and the roller brush; wherein, the first contact area is greater than or equal to zero, but less than the second contact area.

In an embodiment of the present disclosure, when the roller brush cover is in the second position, the cleaning device is in a self-cleaning operation.

According to a second aspect of the present disclosure, there is further provided a control method for a cleaning device, the cleaning device corresponds to the above cleaning device, the method comprises the following steps:

- controlling the roller brush cover to move from the first position to the second position in a self-cleaning mode, so that the inner wall of the roller brush cover is in contact fit with the roller brush;
- controlling the roller brush to rotate during the self-cleaning to clean the inner wall of the roller brush cover; and
- controlling the roller brush cover to move from the second position to the first position after a predetermined time, so as to separate the inner wall of the roller brush cover from the roller brush;
- wherein, the self-cleaning mode comprises a step of controlling a reverse rotation self-cleaning of the roller brush and a step of controlling a forward rotation self-cleaning of the roller brush;
- before or during the step of controlling the forward rotation self-cleaning of the roller brush, the roller brush cover is controlled to move from the first position to the second position; and when the roller brush is controlled to rotate forwardly for the self-cleaning, the roller brush cover is held in the second position within a predetermined time.

In an embodiment of the present disclosure, in the first position, an inner wall of the roller brush cover is at least partially separated from the roller brush, and the cleaning device comprises a main motor which provides a suction force for the dirt suction port. The step of controlling the reverse rotation self-cleaning of the roller brush comprises controlling the roller brush to rotate reversely by a certain angle, which is greater than 90° and less than 180°, and increasing the power of the main motor in the process of controlling the roller brush to rotate reversely.

According to a third aspect of the present disclosure, a cleaning system is further provided, the cleaning system comprises:

- the cleaning device according to the first aspect of the present disclosure, which comprises a scraper plate in contact fit with a roller brush, a dirt suction port located below the scraper plate, and a main motor for generating a suction force at the dirt suction port; and
- a tray configured for accommodating the cleaning device, the tray has a roller brush groove for receiving a roller brush, the roller brush is configured to be free to rotate relative to the roller brush groove during a self-cleaning operation.

In an embodiment of the present disclosure, a plurality of tray ribs are provided on a front side of the roller brush groove, and the tray ribs extend from a side wall of the roller brush groove toward a bottom of the roller brush groove; and the plurality of tray ribs are configured to be distributed at a distance in an axial direction of the roller brush groove.

In an embodiment of the present disclosure, the tray ribs located on two opposite sides of the roller brush groove are configured to be inclined toward a middle region in an axial direction of the roller brush groove.

In an embodiment of the present disclosure, the roller brush groove comprises a first arc surface located at a bottom of the roller brush groove and a second arc surface located at a front side of the roller brush groove; the second arc surface is formed to deviate from the first arc surface in a direction away from the roller brush, and to form an inflection point at a position where the first arc surface joins the second arc surface; and a front-end side wall of the roller brush groove is formed to be higher than a rotation tangent line of the roller brush at the inflection point.

In an embodiment of the present disclosure, when the cleaning device is placed on the tray, an included angle between a line connecting the scraper plate to the circle center of the roller brush and a line connecting the inflection point to the circle center of the roller brush is greater than 90° and less than 180°.

A beneficial effect of the present disclosure is that the roller brush cover can operate in the first position or the second position relative to the floor brush housing, and when the roller brush cover is in the second position, the inner wall of the roller brush cover can be in contact fit with the roller brush, so as to clean the inner wall of the roller brush cover through the roller brush. This improves the level of automation of the cleaning device, eliminates the need for a user to manually clean the inner wall of the roller brush cover, and optimizes the user experience.

BRIEF DESCRIPTION OF THE DRAWINGS

The accompanying drawings described herein are used to provide a further understanding of the present disclosure and form a part of the present disclosure, and the schematic embodiments and descriptions of the present disclosure are used to explain the technical solution of the present disclosure, and do not constitute an improper limitation of the present disclosure. In the drawings.

REFERENCE SIGNS

Figure 1:
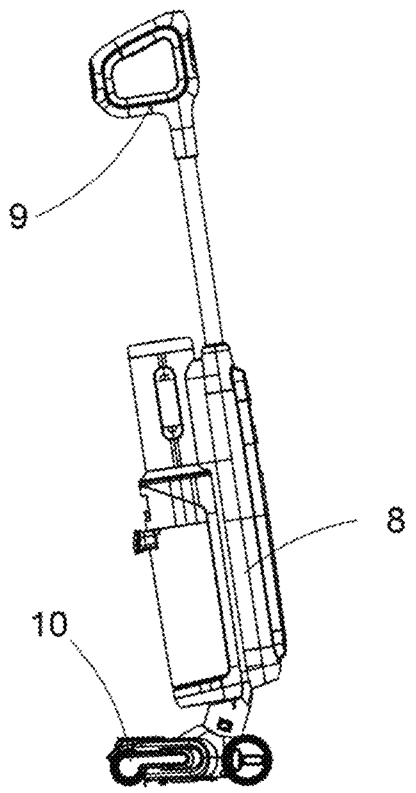
FIG. 1 is a schematic structural diagram of the cleaning device according to the present disclosure.

1. floor brush housing; 111. liquid outlet assembly; 1111. liquid outlet portion; 111*a*. liquid outlet opening; 1112. flow guide part; 111*b*. flow dividing rib; 1113. spring; 112. bearing bracket; 121. guide groove; 1211. stop surface; 122. guide surface; 123. horizontal portion; 124. first arc-shaped portion; 1125. second arc-shaped portion; 113. scraper plate; 2. roller brush; 3. roller brush cover; 131. roller brush surface; 32. extension portion; 33. lock catch; 331. inclined surface; 332. stop mating surface; 34. elastic member; 35. hand buckle; 36. horizontal mating surface; 37. arc-shaped mating surface; 38. arc-shaped flange; 139. engaging wall; 1391. front mating surface; 1301. base body; 1302. movable cover plate; 1303. fixed cover plate; 1304. gap; 1305. hanging lug; 4. liquid outlet; 15. movement assembly; 51. driving mechanism; 52. pushing part; 1521. engaging groove; 53. connecting member; 6. dirt suction port; 7. tray; 71. roller brush groove; 711. first arc surface; 712. second arc surface; 713. third arc surface; 1714. inflection point; 715. front side wall; 172. wheel groove; 73. tray rib; 8. body; 9. hand-held part; 10. floor brush assembly; 21. cleaning device; 22. cleaning assembly; 221. recycling bucket; 222. pipe; 222*a*. first end; 222*b*. second end; 223. roller brush; 23. floor brush; 231. roller brush cover; 24. suction port; 26. water bucket; 27. base station; 28. scraper plate; S101, S102, S201, S202, S401, S402, S501, S502, S503, S504. step; 310. housing; 320. roller brush; 330. roller brush cover assembly; 3301. base body; 3302. movable cover plate; 3303. fixed cover plate; 3304. gap; 3305. flexible member; 3306. hinge shaft; 3307. hinge groove; 3308. first through hole; 3309. hanging lug; 3310. second through hole; 3311. third through hole; 3312. cleaning member; 3313. fixed column; 340. scraper plate; 350. liquid spraying assembly; 3501. liquid outlet; 3502. flow channel; 3503. front cover; 3504. rear cover; 3505. sealing ring; 3506. sealing bowl; 3507. flow guiding inclined surface; 3508. extension portion; 3509. flow dividing rib; 360. dirt suction port; 370. driver assembly; 3701. first elastic member; 3702. pressing member; 3703. third elastic member; 3704. servo; 3705. pushing member; 3706. cam; 3707. sliding block; 3708. pushing rod; 3709. reset member; 3710. initial section; 3711. spiral section; 3712. buffer member; 380. second elastic member; 390. pipe; 41. base; 42. cleaning device; 43. drying assembly; 431. heating plate; 44. cleaning execution member; 45. protruding structure; 451. protruding rib; 46. sterilizing light source; S611, S612, S613, S614, S6131, S16132, S621, S622, S623, S624. step; S711, S712, S713, S721, S722, S723. step; 520. charging protection system; 521. battery control unit; 522. host control unit; 540. charging protection circuit; 542. battery management circuit; 5422. battery control unit; 544. host control circuit; 5442. host control unit; 546. target battery; 550. computing equipment; 551. memory; 552. processor; 553. bus; 554. access device; 555. database; 556. network; S802, S804, S806, S808. step.

DETAILED DESCRIPTION OF EXAMPLE EMBODIMENTS

In order to make the objectives, technical solutions, and advantages of the present disclosure clearer, the technical solutions of the present disclosure are clearly and completely described below with reference to specific embodiments and corresponding accompanying drawings. Obviously, the embodiments described only refer to some, but not to all, embodiments of the present disclosure. Based on the embodiments in the present disclosure, all other embodiments obtained by those skilled in the art without paying any creative labors will fall within the protection scope of the present disclosure.

It should also be noted that the terms “comprise”, “include” or any other variant thereof are intended to cover a non-exclusive inclusion, so that a process, method, article or device including a series of elements comprises not only those elements, but also other elements not explicitly listed, or elements inherent to such process, method, article or device. Without other specific limitation, an element defined by the statement “including a/an . . . ” does not preclude the presence of one or more identical elements in the process, method, article, or device that comprises said element.

The first aspect of the present disclosure provides a cleaning device, which may be a hand-held cleaning device, such as a hand-held cleaning machine, a hand-held dust collector, a hand-held scrubber and other hand-held cleaning devices known to those skilled in the art. It may also be a self-moving cleaning device, such as a sweeping robot, a mopping robot, a robot integrated with sweeping and mopping, and the like, for cleaning a working surface to be cleaned, such as a floor, a sofa, a carpet and the like. In an embodiment in which the cleaning device of the present disclosure is a hand-held scrubber, when a user uses the floor scrubber to carry out a cleaning work, the user can push the floor scrubber to move on the floor, and clean the working surface by using the floor brush assembly of the floor scrubber.

The cleaning device comprises a floor brush assembly, the floor brush assembly comprises a floor brush housing, a roller brush and a roller brush cover. The floor brush housing is provided with a dirt suction port, the roller brush is configured to be rotatably connected to the floor brush housing, and in the cleaning work process of the cleaning device, the roller brush is in contact with the working surface to clean the working surface, and the dirt suction port can suck the cleaned dirt into the wastewater bucket.

Here, the roller brush cover and the floor brush housing enclose a roller brush cavity fitted with the roller brush. When the roller brush rotates in the roller brush cavity, the dirt adhering to the surface of the roller brush may be thrown onto the inner wall of the roller brush cover by the action of the centrifugal force, so that the inner wall of the roller brush cover becomes dirty. In order to clean the inner wall of the roller brush cover, the roller brush cover in the present disclosure is configured to be operable in the first position or the second position relative to the brush housing. Specifically, when the roller brush cover is in the first position, there is a first contact area between the roller brush cover and the roller brush; and when the roller brush cover is in the second position, there is a second contact area between the roller brush cover and the roller brush.

For example, in one embodiment of the present disclosure, in the first position, a portion of the inner wall of the brush roller cover may be in contact fit with the brush roller, so that the first contact area between the two is greater than zero; alternatively, in the first position, the inner wall of the brush roller cover is completely separated from the brush roller, so that the first contact area between the two is zero. The second contact area is much larger than the first contact area, that is, when the roller brush cover is in the second position, the entire inner wall or most of the inner wall of the roller brush cover can be in contact with the roller brush, thereby achieving the purpose of cleaning the inner wall of the roller brush cover through the roller brush.

The roller brush cover of the present disclosure can be set in the first position or the second position relative to the floor brush housing, and when the roller brush cover is in the second position, the inner wall of the roller brush cover can be in contact with the roller brush, so as to clean the inner wall of the roller brush cover through the roller brush, thereby preventing dirt from remaining on the inner wall of the roller brush cover, also avoiding manual cleaning by a user, and improving the automation level of the cleaning device and the user experience.

For case of understanding, the cleaning device of the present disclosure will be described in detail below with reference to FIG. 1 to FIG. 23 in combination with specific embodiments.

Embodiment A

Referring to FIG. 1, this embodiment provides a cleaning device, which may be a hand-held cleaning device, such as a hand-held cleaning machine, a hand-held dust collector, a hand-held scrubber, a hand-held cloth cleaning machine and the like, which are well known to those skilled in the art. The cleaning device comprises a machine body 8, a hand-held part 9 and a floor brush assembly 10 connected below the body. Specifically, the floor brush assembly 10 is rotatably connected to the machine body 8, so that when the cleaning device cleans the working surface, the floor brush assembly 10 can keep in contact with the working surface, thereby achieving the purpose of cleaning dirt on the working surface.

Figure 2:
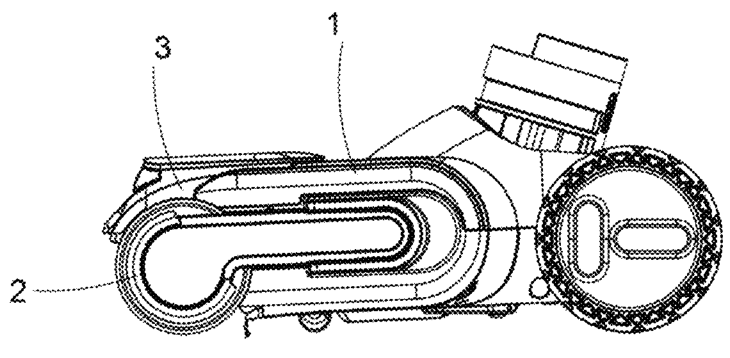
FIG. 2 is a schematic structural diagram of the cleaning device according to the present disclosure, wherein the roller brush cover is in the first position.
Figure 4:
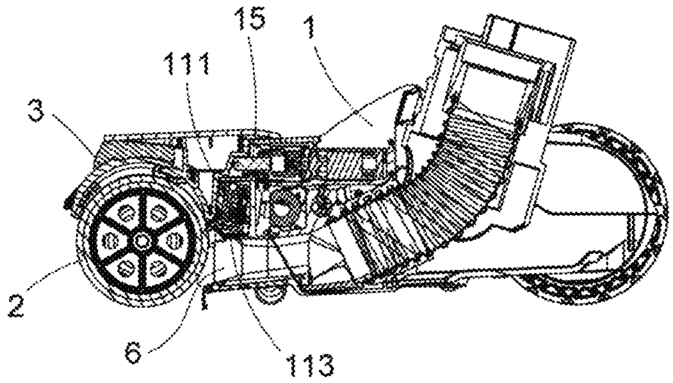
FIG. 4 is a cross-sectional view of the roller brush cover of the present disclosure in the first position.

As shown in FIG. 2 and FIG. 4, the floor brush assembly comprises a floor brush housing 1, roller brush 2 and roller brush cover 3. The floor brush housing 1 is provided with a dirt suction port 6, and the dirt suction port 6 can be connected with the wastewater bucket on the machine body through a dirt suction channel, so that the cleaning device can suck the dirt at the dirt suction port 6 into the wastewater bucket. The roller brush 2 is rotatably connected to the floor brush housing 1 and configured to clean the working surface. In operation, the roller brush 2 rotates relative to the working surface, thereby cleans the working surface.

Figure 5:
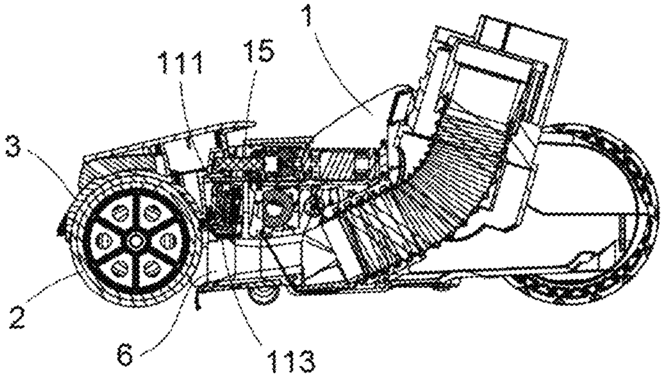
FIG. 5 is a cross-sectional view of the roller brush cover of the present disclosure in the second position.

Referring to FIGS. 4 and 5, a scraper plate 13 is provided on the floor brush housing 1 at a position above the dirt suction port 6, and the scraper plate 13 is configured to be in an interference fit with the roller brush 2. Referring to the view direction of FIG. 4, the roller brush 2 can rotate in the counterclockwise direction during normal operation, so that the scraper plate 13 can scrape off the dirt on the roller brush 2 during rotation of the roller brush 2, and the scraped dirt is sucked by the negative pressure generated by the dirt suction port 6. When the roller brush 2 rotates forwardly, for example rotates in the counterclockwise direction, the working surface can be cleaned, in other application scenarios, the roller brush 2 can also rotate reversely, i.e. the roller brush 2 rotates in the clockwise direction. For example, in the self-cleaning process of the cleaning device, the roller brush 2 may achieve self-cleaning of the roller brush by forward rotation and reverse rotation.

It should be noted that “counterclockwise” is determined with reference to the view direction of FIG. 4, and whether the roller brush rotates in the counterclockwise or clockwise direction depends on the position between the observer and the cleaning device. The clockwise and counterclockwise directions described in the present disclosure are not intended to limit the rotation direction of the roller brush, but merely intended to describe the operation principle of the cleaning device of the present disclosure.

Referring to FIG. 2 and FIG. 4, a roller brush cover 3 is disposed on the floor brush housing 1, the roller brush cover 3 and the floor brush housing 1 enclose a roller brush cavity fitted with the roller brush 2. The roller brush cavity may have a shape matching the roller brush 2, and the roller brush 2 protrudes from the lower end opening of the roller brush cavity to contact the working surface. The roller brush 2 can be protected by the roller brush cavity, and meanwhile, the dirt can be prevented from being thrown out when the roller brush 2 rotates. When the roller brush 2 rotates in the roller brush cavity, the dirt adhering to the surface of the roller brush 2 may be thrown onto the inner wall of the roller brush cover 3 by the action of centrifugal force, so that the dirt will adhere to the inner wall of the roller brush cover 3, which is prone to bacterial growth and odor. In order to clean the inner wall of the roller brush cover 3, the roller brush cover 3 in the present disclosure is configured to be operable in the first position or the second position relative to the brush housing 1.

Specifically, as shown in FIG. 2 and FIG. 4, when the roller brush cover 3 is in the first position, there is a first contact area between the roller brush cover 3 and the roller brush 2, the first contact area is greater than or equal to zero. When the first contact area is equal to zero, the inner wall of the roller brush cover 3 is configured to be separated from the roller brush 2, which prevents the roller brush cover 3 from affecting the rotation and cleaning work of the roller brush 2 during normal cleaning work or during self-cleaning. In another embodiment of the present disclosure, the inner wall of the roller brush cover 3 is partially in contact fit with the roller brush 2, so that the first contact area between the two is greater than zero. For example, the rear end edge of the roller brush cover 3 may be in line contact with the roller brush 2, or a small portion of the rear end of the roller brush cover 3 may be in contact with the roller brush 2. The specific size of the first contact area depends on the specific shape of the roller brush cover 3, and also depends on the fluffiness of the roller brush 2. The brand new roller brush 2 will have more fluffy bristles, and the first contact area will be relatively large at this time; the bristles of the roller brush 2 are no longer fluffy after having been used for a period of time, the diameter of the roller brush 2 is reduced, and the first contact area is also reduced accordingly. In order to make the resistance to the roller brush 2 when cleaning the floor as low as possible, the first contact area does not exceed 20% of the area of the inner wall of the roller brush cover 3.

Figure 3:
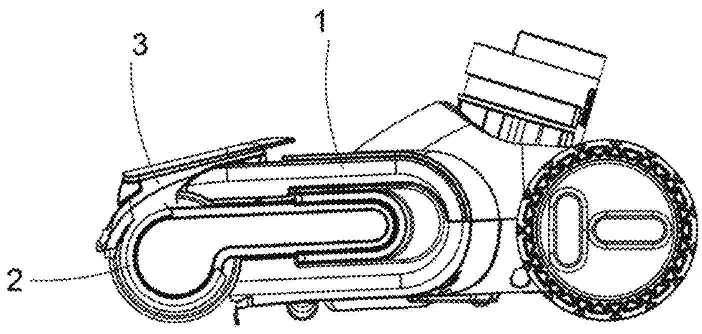
FIG. 3 is a schematic structural diagram of the cleaning device according to the present disclosure, wherein the roller brush cover is in the second position.

As shown in FIG. 3 and FIG. 5, when the roller brush cover 3 is in the second position, there is a second contact area between the roller brush cover 3 and the roller brush 2, the second contact area is greater than the first contact area. Specifically, the size of the second contact area depends on the area size of the inner wall of the roller brush cover 3, and when the roller brush cover 3 is in the second position, the inner wall of the roller brush cover 3 is almost completely in contact fit with the roller brush 2. When the roller brush 2 rotates, friction can be generated with the inner wall of the roller brush cover 3 in the second position, so that the dirt on the inner wall of the roller brush cover 3 will be cleaned off, the inner wall of the roller brush cover 3 is cleaned through the roller brush 2, and thus a user does not need to clean the roller brush cover 3 manually, and the dirt is prevented from remaining on the inner wall of the roller brush cover 3. In order to enable the inner wall of the roller brush cover 3 to be completely cleaned, in the second position, the second contact area between the roller brush cover 3 and the roller brush 2 is not less than 90% of the area of the inner wall of the roller brush cover 3, and optimally, the inner wall of the roller brush cover 3 is in complete contact with the roller brush 2, and the second contact area is equal to 100% of the area of the inner wall of the roller brush cover 3.

In the present disclosure, the roller brush cover 3 can operate in the first position or the second position relative to the floor brush housing 1, and when the roller brush cover 3 is in the second position, the inner wall of the roller brush cover can be in contact fit with the roller brush 2, so as to clean the inner wall of the roller brush cover 3 through the roller brush 2. This improves the level of automation of the cleaning device, eliminates the need for a user to manually clean the inner wall of the roller brush cover, and optimize the user experience.

Figure 8:
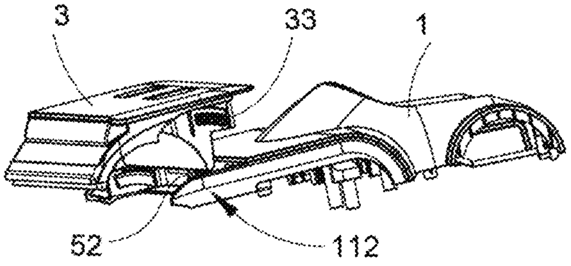
FIG. 8 is a schematic exploded diagram of the roller brush cover and the floor brush housing of the present disclosure.

The roller brush cover 3 of the present disclosure may be configured to move in a linear direction, such as in a horizontal direction, a vertical direction, or other directions. In an embodiment of the present disclosure, as shown in FIG. 8, the roller brush cover 3 is configured to be disposed on the floor brush housing 1 by a guide mechanism and move between a first position and a second position along an arc-shaped movement trajectory. The roller brush cover 3 can be mounted with the floor brush housing 1 through a guide mechanism, and the guide mechanism is guided by the movement of the roller brush cover 3, so that the roller brush cover 3 can move along the extension direction of the guide mechanism. In this embodiment, the guide mechanism is formed in an arc-shape, so that the roller cover 3 moves along an arc-shaped movement trajectory between the first position and the second position.

The use of the arc-shaped movement trajectory is beneficial to fitting the inner wall of the roller brush cover 3 and the roller brush 2 together, because the roller brush 2 is a rolling body having a cylindrical or barrel-shaped peripheral surface. By adopting the movement mode of the arc-shaped movement trajectory, it can be ensured that the inner wall of the roller brush cover 3 is fitted with the outer peripheral surface of the roller brush 2 as much as possible, so that the inner wall of the entire roller brush cover 3 is cleaned as much as possible, and especially the inner wall which is easy to stick to dirt is cleaned.

In an embodiment of the present disclosure, referring to FIG. 4 and FIG. 5, the floor brush housing 1 is provided with a liquid outlet assembly 11, and the liquid outlet assembly 11 is configured to provide a cleaning medium to the roller brush 2, so that the cleaning device can wet mop the working surface when performing the cleaning work, for example, provide the cleaning medium to the roller brush 2 when performing the self-cleaning work, so as to perform self-cleaning on the roller brush 2. The cleaning medium may be clear water, or may be a disinfecting liquid with a proper concentration and the like, which is not limited in the present disclosure.

Figure 6:
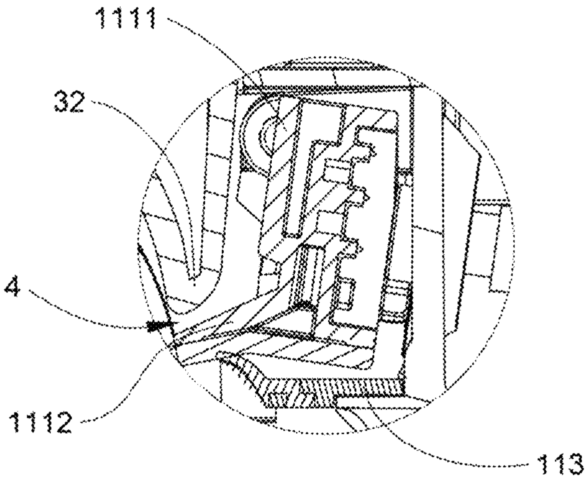
FIG. 6 is a partially enlarged view of FIG. 5.
Figure 7:
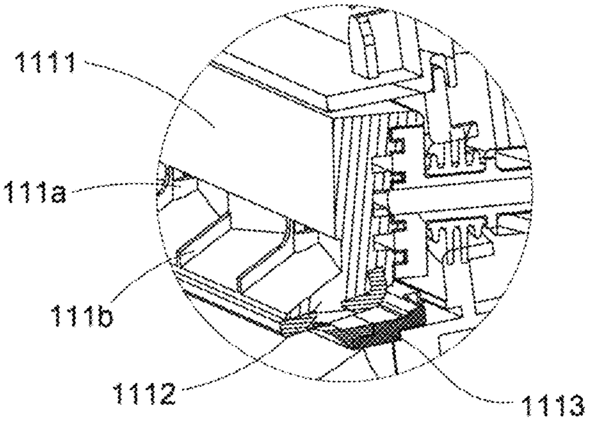
FIG. 7 is a schematic structural diagram of the liquid outlet assembly according to the present disclosure.

Referring to FIG. 5 to FIG. 7, the liquid outlet assembly 11 is disposed on the floor brush housing 1 at a position above the dirt suction port 6, and comprises a liquid outlet portion 111 and a flow guide portion 112 extending toward the roller brush 2. The liquid outlet portion 111 is provided on the floor brush housing 1 and is configured to communicate with a clean water bucket through a pipe, so that the liquid in the clean water bucket can flow out from the liquid outlet opening 1111 provided on the liquid outlet portion 111. The flow guide portion 112 may be integrally formed with the liquid outlet portion 111, or may be connected with the liquid outlet portion 111 in a post-assembly process, and the flow guide portion 112 is configured to extend from a position of the liquid outlet portion 111 toward the roller brush 2, so that liquid flowing out of the liquid outlet portion 111 may flow to the roller brush 2 through the flow guide portion 112, to wet the roller brush 2. In another embodiment, the liquid outlet assembly 11 may be disposed on the roller brush cover 3.

With further reference to FIG. 5 to FIG. 7, the roller brush cover 3 is provided with an extension portion 32, and the extension portion 32 is configured to extend from top to bottom to a position adjacent to the flow guide portion 112, and to enclose the liquid outlet 4 with the flow guide portion 112. After the liquid flows out from the liquid outlet portion 111, the liquid is guided through the flow guide portion 112 to the liquid outlet 4, and flows out from the liquid outlet 4 to the roller brush 2. Specifically, the roller brush cover 3 is provided with an extension portion 32 extending toward the flow guide portion 112 at a position corresponding to the flow guide portion 112, the extension portion 32 is located above the flow guide portion 112 and has a predetermined distance with the flow guide portion 112, and the extension portion 32 and the flow guide portion 112 enclose the liquid outlet 4, so that the liquid flowing out through the liquid outlet portion 111 can flow along the flow guide portion 112 and finally flows out to the surface of the roller brush 2 through the liquid outlet 4.

According to the present disclosure, the liquid outlet 4 is formed between the extension portion 32 and the flow guide portion 112, and by controlling the size and position of the liquid outlet 4, the problems such as blockage and the like caused by throwing dirt onto the liquid outlet portion 111 and the flow guide portion 112 during rotation of the roller brush 2 can be avoided.

In an embodiment of the present disclosure, referring to FIG. 5, the flow guide portion 112 is configured to extend downward obliquely, that is, the flow guide portion 112 extends downward obliquely from a position connected to the liquid outlet portion 111 to a position adjacent to the roller brush 2, which not only facilitates the flow of the liquid on the flow guide portion 112, but also makes the opening direction of the liquid outlet 4 enclosed by the flow guide portion 112 and the extension portion 32 inclined downward, so as to prevent the dirt from being thrown into the liquid outlet 4. In addition, even if a small amount of the dirt is thrown into or splashed into the liquid outlet 4, the small amount of the dirt can be taken out during the flow of the liquid.

In an embodiment of the present disclosure, as shown in FIG. 7, the liquid outlet portion 111 may be a liquid outlet plate, the liquid outlet plate is configured to extend along an axial direction of the roller brush 2, a plurality of liquid outlet openings 1111 are provided on the liquid outlet plate at a distance along the axial direction of the roller brush 2, and the flow guide portion 112 may also have a plate-shaped structure, and a shape of the flow guide portion 112 is adapted to the liquid outlet plate. In the horizontal direction, the extension portion 32 extends in the axial direction of the roller brush 2; in the height direction, the extension portion 32 inclines downward or extends vertically downward from the position of the roller brush cover 3 to a position adjacent to the liquid outlet plate, and there is a gap between the extension portion 32 and the liquid outlet plate, the extension portion 32 and the liquid outlet plate enclose the liquid outlet 4, and the liquid outlet 4 extends in the axial direction of the roller brush 2, so that the liquid flowing out from the plurality of liquid outlet openings can flow uniformly to the roller brush 2 through the liquid outlet 4, thereby wetting the entire surface of the roller brush 2.

In an embodiment of the present disclosure, with further reference to FIG. 7, the flow dividing ribs 1121 are provided on the flow guide portion 112, and the flow dividing ribs 1121 are disposed at a distance in the axial direction of the roller brush 2. The flow dividing ribs 1121 are provided at each liquid outlet opening 1111, and at the position between each two adjacent liquid outlet openings 1111. Through distributing the plurality of flow dividing ribs 1121 at a distance, the liquid can flow downward along at least one flow dividing groove formed by two adjacent flow dividing ribs 1121, thereby ensuring that the liquid can flow downward uniformly, so that the roller brush 2 contacts the liquid sufficiently to achieve a better cleaning effect. The flow dividing ribs 1121 enable the liquid to reach the entire axial surface of the roller brush 2 substantially uniformly, rather than being concentrated only at several points of the liquid outlet opening 1111, that is, the original "point wetting" is advanced to the current "line/surface wetting" by providing these flow dividing ribs 1121, and the structural strength of the flow guide portion 112 can also be improved by the flow dividing ribs, which is not specifically described herein.

In an embodiment of the present disclosure, the scraper plate 13 is disposed at the bottom of the flow guide portion 112 and is configured to be in contact fit with the roller brush 2, an upper surface of the scraper plate 13 is fitted with a lower surface of the flow guide portion 112, and the scraper plate 13 and the liquid outlet assembly 11 may form an integral element of the liquid outlet assembly 11. The integral element of the outlet assembly 11 is constructed to be hingedly attached to the floor brush housing 1, with reference to FIG. 19, the upper end portion of the liquid outlet portion 111 is configured to be hingedly attached to the floor brush housing 1, so that the liquid outlet portion 111, the flow guide portion 112 and the scraper plate 13 are configured to deflect relative to the floor brush housing 1 as a whole at the hinge point. Another elastic member is provided between the position of the liquid outlet portion 111 deviating from the hinge point and the floor brush housing 1, the elastic member may be a spring 113, and the scraper plate 13 on the whole component of the liquid outlet assembly 11 is configured to be pre-pressed on the roller brush 2 under the action of the spring 113. That is, the spring 113 enables the entire component of the liquid outlet assembly 11 to always have a tendency of moving in the direction of the roller brush 2, so that the scraper plate 13 can always maintain an interference contact with the roller brush 2, which enables the scraper plate 13 to always contact and fit with the outer surface of the roller brush 2 under the action of the spring 113 when the roller brush 2 operates for a long time or is worn or the outer diameter is reduced due to other reasons, thereby ensuring the function of the scraper plate 13.

In another embodiment of the present disclosure, the integral element of the liquid outlet assembly 11 may also be configured to translate relative to the floor brush housing 1. Referring to the view direction of FIG. 4, the liquid outlet assembly 11 may be configured to translate relative to the floor brush housing 1, so that the scraper plate 13 is always in contact fit with the outer surface of the roller brush 2. In an embodiment of the present disclosure, as shown in FIG. 6, the position where the extension portion 32 and the flow guide portion 112 enclose a liquid outlet 4 is configured to be substantially located at the circle center position of the arc-shaped movement trajectory, and is configured to maintain a distance from the flow guide portion 112 within a predetermined range during movement of the roller brush cover 3. Under the influence of factors such as process, the position of the circle center position may be a position within the coverage range of the liquid outlet 4, and optimally, the position of the liquid outlet 4 enclosed by the extension portion 32 and the flow guide portion 112 is configured to be located at the position of the circle center of the arc-shaped movement trajectory.

Since the roller brush cover 3 moves on the floor brush housing 1 along the arc-shaped movement trajectory under the action of the guide mechanism, and the position of the extension portion 32 for enclosing the liquid outlet 4 is basically located at the circle center of the arc-shaped movement trajectory, in the movement process of the roller brush cover 3, the position of the extension portion 32 for enclosing the liquid outlet 4 can be almost kept unchanged, or can only move within a range as small as possible, so that the distance between the extension portion 32 and the flow guide portion 112 can be kept within a predetermined range, that is, the opening size of the liquid outlet 4 can be kept within a predetermined range during the movement process of the roller brush cover 3, thereby avoiding the problem that the opening size of the liquid outlet 4 is too large or too small due to the large displacement of the extension portion 32 with the roller brush cover 3, so that the dirt left on the roller brush 2 or the dirt at other positions enters the liquid outlet 4 to cause the water outlet to be blocked completely or partially. From another perspective, it can also be understood that other portions of the roller brush cover 3 substantially use the position of the extension portion 32 corresponding to the liquid outlet 4 as the circle center, and swing along an arc between the first position and the second position.

It should be noted that, the "predetermined range" herein refers to an acceptable range, that is, if the opening size of the liquid outlet 4 is too large, or it is understood that the distance between the extension portion 32 and the flow guide portion 112 is too large, so that dirt is likely to be thrown into or splashed into the liquid outlet assembly 11; and if the opening size of the liquid outlet 4 is too small, so that the smooth flow of water from the water outlet may be obstructed. The acceptable range of the liquid outlet 4 may be selected by those skilled in the art according to actual needs. When the roller brush cover 3 swings along an arc trajectory, here the position of the liquid outlet 4 is took as the circle center of this trajectory, the extension portion 32 close to the liquid outlet 4 will only generate a small displacement but not a large displacement.

In order to further reduce the influence of the roller brush cover 3 on the liquid outlet 4 during movement, in one embodiment of the present disclosure, the side of the extension portion 32 facing the flow guide portion 112 is formed to be arc-shaped, and the size of the liquid outlet 4 enclosed between the extension portion 32 and the flow guide portion 112 is configured to be substantially unchanged or only slightly changed during movement of the roller brush cover 3. The change of the size of the liquid outlet 4 before and after the roller brush cover 3 moves does not exceed ½ of the original size of the liquid outlet 4 (that is, the size of the liquid outlet 4 when the roller brush cover 3 is in the first position).

With specific reference to FIG. 5 and FIG. 6, the surface of the extension portion 32 facing the flow guide portion 112 is formed in an arc-shape, and a bending direction of the arc-shaped surface is opposite to a bending direction of the guide mechanism, so that when the extension portion 32 swings together with the roller brush cover 3, an arc-shaped surface with an opposite direction can counteract such displacement, that is, a distance between the roller brush cover 3 and the flow guide portion 112 can still remain unchanged, thereby making the size of the liquid outlet 4 almost unchanged. This prevents the roller brush 2 from throwing dirt into the liquid outlet 4 to block the liquid outlet assembly 11, and also prevents the roller brush cover 3 from interfering with the liquid outlet assembly 11 and the roller brush 2 during movement. In addition, the size of the liquid outlet 4 remains unchanged, so that the liquid can uniformly and quantitatively flow to the roller brush 2, thereby avoiding the cleaning effect on the working surface due to different influence of the liquid outlet amount.

Figure 10:
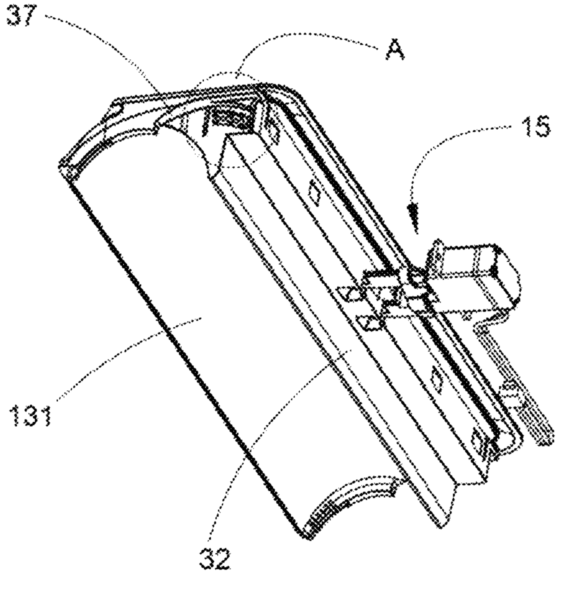
FIG. 10 is a schematic structural diagram of the roller brush cover and the movement assembly according to the present disclosure.

In an embodiment of the present disclosure, as shown in FIG. 10, the roller brush cover 3 comprises a roller brush surface 31 corresponding to the roller brush 2, and the roller brush surface 31 is an inner wall of the roller brush cover 3. When the roller brush cover 3 moves to the second position, the roller brush 2 is in contact fit with the roller brush surface 31 to clean the roller brush surface 31. In this second position, the roller brush 2 can fit at least a partial area of the roller brush surface 31. In the traveling direction of the cleaning device, the roller brush surface 31 has a front-end portion extending toward the front side of the roller brush 2 and a rear end portion extending toward the rear side of the roller brush 2, so that the roller brush surface 31 can extend from the front side of the roller brush 2 to the rear side of the roller brush. The extension portion 32 is configured to extend to a rear end of the roller brush 2 and enclose a rear end portion of the roller brush surface 31. That is, a side surface of the extension portion 32 facing the roller brush 2 is a part of the roller brush surface 31. The extending portion 32 separates the roller brush 2 from the liquid outlet assembly 11, which prevents the roller brush 2 from throwing dirt to the liquid outlet assembly 11 when rotating.

In addition, due to the development of the miniaturization of the device, the distance between the roller brush surface 31 and the roller brush 2 is controlled within a predetermined range, too large distance affects the compactness of the structure, and too small distance affects the assembly or performance of the components. Therefore, a part of the roller brush surface 31 is formed by the extension portion 32, and meanwhile, the liquid outlet 4 is enclosed by the extension portion 32 and the flow guide portion 112, so that the structure is compact, the gap caused by assembly is reduced as much as possible in the area facing the roller brush 2, and in addition, the extension area of the roller brush surface 31 can be ensured.

In an embodiment of the present disclosure, as shown in FIG. 4, the roller brush surface 31 is formed to have an inner arc-shaped surface matching the shape of the roller brush 2, that is, the arc of the roller brush surface 31 and the roller brush 2 are the same or approximately the same. When the roller brush cover 3 is in the first position, the roller brush surface 31 is configured to be not concentric with the roller brush 2; when in the second position, the roller brush surface 31 is configured to be concentric with the roller brush 2. Since the extension portion 32 of the roller brush cover 3 is located substantially at the circle center position of the arc-shaped movement trajectory, so that the roller brush cover 3 swings substantially around the circle center when in motion, and the roller brush cover 3 can swing to a position where the roller brush surface 31 is concentric with the roller brush 2, or to a position that is not concentric with the roller brush 2. Such an arrangement ensures that, in the second position, the roller brush 2 can be in contact with the roller brush surface 31 of the roller brush cover 3, so as to clean the inner wall of the roller brush cover 3, preferably, substantially all areas of the roller brush surface 31 are in contact with the roller brush 2. In the first position, in order not to interfere with the normal operation of the roller brush 2, the roller brush cover 3 is configured to be completely separated from the roller brush 2, thereby ensuring zero friction between the roller brush surface 31 and the roller brush 2, and avoiding the rotation resistance caused by the friction.

In an embodiment of the present disclosure, in the first position, a position where the extension portion 32 encloses the liquid outlet 4 is configured to be in contact fit with the roller brush 2. That is, regardless of whether the roller brush cover 3 is in the first position or the second position, the corresponding part of the extension portion 32 is always in contact fit with the roller brush 2, and at this time, the first contact area between the roller brush cover 3 and the roller brush 2 is greater than zero.

Figure 13:
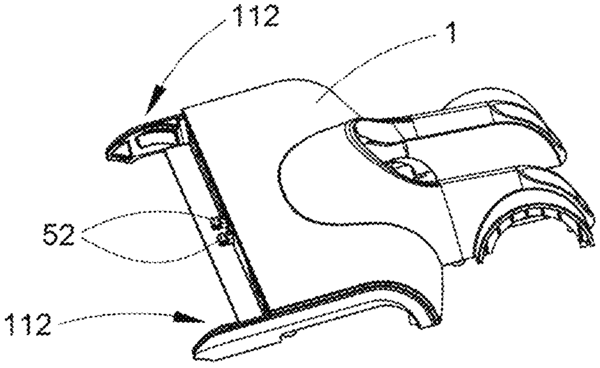
FIG. 13 is a schematic structural diagram of the floor brush housing of the present disclosure.

In an embodiment of the present disclosure, two opposite sides of the floor brush housing 1 are provided with bearing brackets 12. As shown in FIG. 8 and FIG. 13, two bearing brackets 12 are provided, the two bearing brackets 12 are disposed on two opposite sides of the floor brush housing 1, and the bearing bracket 12 extends forwardly from the front side position of the floor brush housing 1 for mounting the roller brush cover 3. Two opposite ends of the roller brush cover 3 can be mounted on the bearing bracket 12 on the corresponding side through a guide mechanism, and form a roller brush cavity with the floor brush housing 1.

Figure 12:
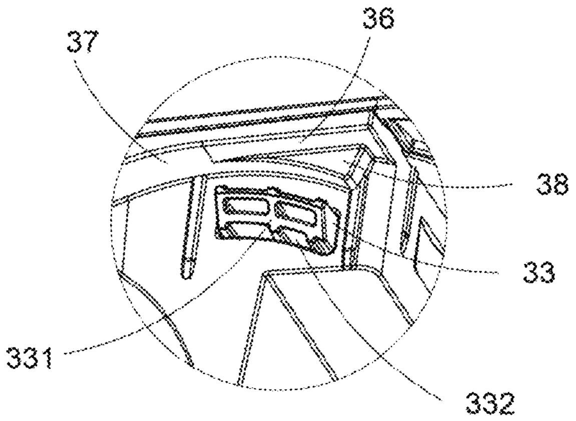
FIG. 12 is a enlarged view of the position A in FIG. 10.
Figure 14:
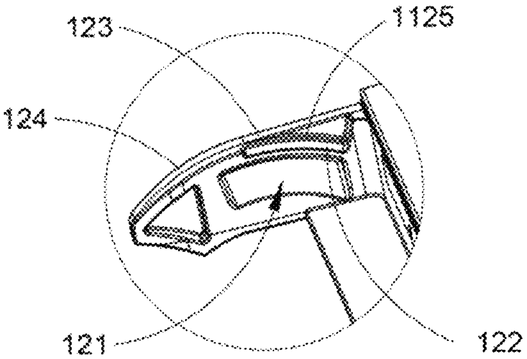
FIG. 14 is a enlarged view of the bearing bracket in FIG. 13.

Referring to FIG. 12 and FIG. 14, the guide mechanism comprises a guide groove 121 provided on the bearing bracket 12, and a guide block provided at a corresponding position of the roller brush cover 3 and fitted with the guide groove 121, and both the guide block and the guide groove 121 are formed in an arc-shape. The guide block may be disposed at two opposite ends of the upper end region of the roller brush cover 3 and fit with the guide groove 121, thereby implementing the assembly between the roller brush cover 3 and the floor brush housing 1. In addition, under the guiding action of the guide block and the guide groove 121, the roller brush cover 3 can move relative to the floor brush housing 1 between the first position and the second position along the arc-shaped movement trajectory. That is, the guide block having the arc-shaped structure is guided and fitted with the guide groove 121 having the arc-shaped structure, which limits the movement direction and the movement range of the roller brush cover 3.

In an embodiment of the present disclosure, the roller brush cover 3 is configured to be detachably mounted on the floor brush housing 1, at this time, the guide block is a lock catch 33 disposed on each of two opposite sides of the roller brush cover 3, and the lock catch 33 is configured to fit and slide in the guide groove 121. Referring to the view direction of FIG. 11, when the roller brush cover 3 is in the first position, the lock catch 33 is located on the rightmost side of the guide groove 121; and when the roller brush cover 3 is in the second position, the lock catch 33 is located on the leftmost side of the guide groove 121. The guide groove 121 and the lock catch 33 are formed in an arc-shape, the radians of the guide groove 121 and the lock catch 33 are the same, and the position of the liquid outlet 4 is used as the circle center.

Figure 15:
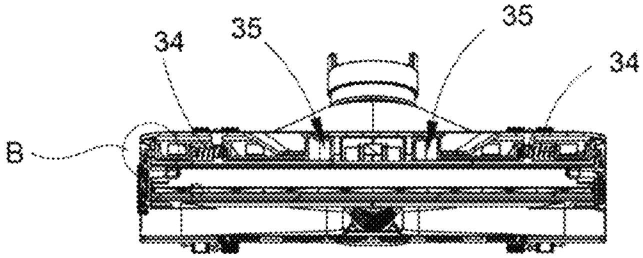
FIG. 15 is a cross-sectional view of the floor brush assembly of the present disclosure in another view.

Of course, for those skilled in the art, on the basis of the above disclosure, other guide blocks other than the lock catch 33 may also be used as the guide mechanism, for example, the guide mechanism may also be other flange structures separately disposed on the roller brush cover 3, in this case, the lock catch 33 is no longer fitted and slid in the guide groove 121, and is used only for disassembly. In order to realize the detachable connection of the roller brush cover 3, as shown in FIG. 15, a lock catch 33 is disposed on the roller brush cover 3 by means of an elastic member 34, so that the lock catch 33 is kept at a position protruding from the end of the roller brush cover 3 under the action of the elastic member 34; and when the lock catch 33 is subjected to an external force, the lock catch 33 is retracted into the roller brush cover 3 by overcoming the elastic force of the elastic member 34. Both sides of the roller brush cover 3 are respectively provided with a lock catch 33, two lock catches 33 are respectively provided with an elastic member 34, the present disclosure does not specifically limit the elastic member 34, any elastic member capable of achieving the above functions can be used, and the elastic member 34 can be a torsion spring, a compression spring, a tension spring, a leaf spring and the like. Under the condition of no external force, a lock catch 33 is always kept in the guide groove 121 under the clastic force of the clastic member 34; and only under the condition that the compression spring is further compressed under the action of the external force, the lock catch 33 can retract into the roller brush cover 3 so as to be separated out of the guide groove 121. In order to facilitate disassembly and assembly of the roller brush cover 3, the roller brush cover 3 may be provided with a clamp, and a user drives the lock catch 33 to move through the clamp, to implement disassembly and assembly of the roller brush cover 3.

Referring specifically to FIG. 15, two clamps 35 are provided on the roller brush cover 3, and the two clamps 35 are configured to move toward or away from the roller brush cover 3. The two clamps 35 compress the corresponding elastic members 34 when receiving an external force. When the roller brush cover 3 needs to be detached from the floor brush housing 1, the user can pinch the two clamps 35 and force the two clamps 35 in the direction close to each other, and the two clamps 35 respectively compress the respective corresponding elastic members 34, so that the respective corresponding lock catches 33 move to be detached from the guide grooves 121.

Figure 16:
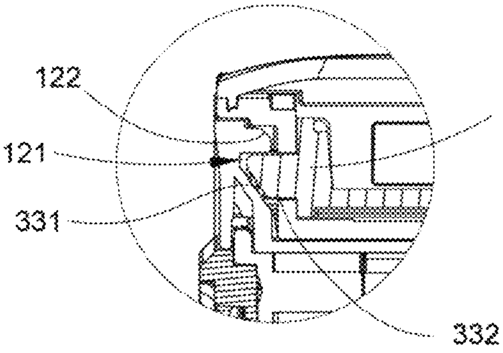
FIG. 16 is a enlarged view of the position B in FIG. 15.

In an embodiment of the present disclosure, according to FIG. 12 and FIG. 16, an outer side wall of each lock catch 33 is configured as an inclined surface 331 inclined outward from bottom to top; an end surface of a bearing bracket 12 is provided with a guide surface 122 corresponding to the first position of the roller brush cover 3, and the guide surface 122 is configured to fit with the inclined surface 331 of the outer side wall of the lock catch 33 when the roller brush cover 3 is in the first position, so as to push the lock catch 33 to move into the guide groove 121 of the roller brush cover when the roller brush cover 3 is pressed down.

Figure 9:
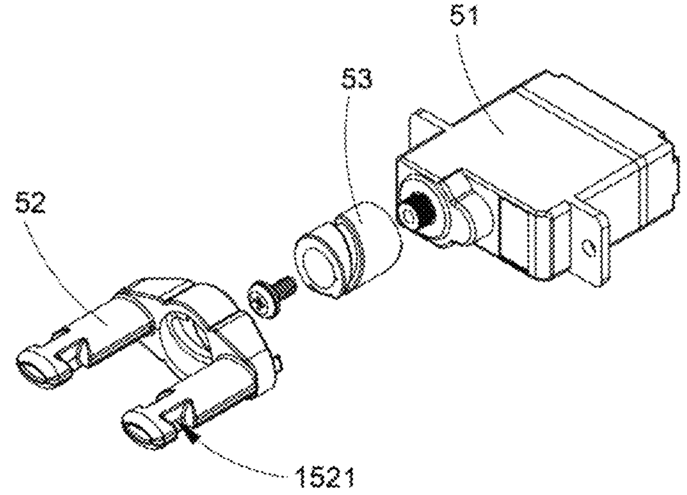
FIG. 9 is an exploded view of the movement assembly according to the present disclosure.
Figure 11:
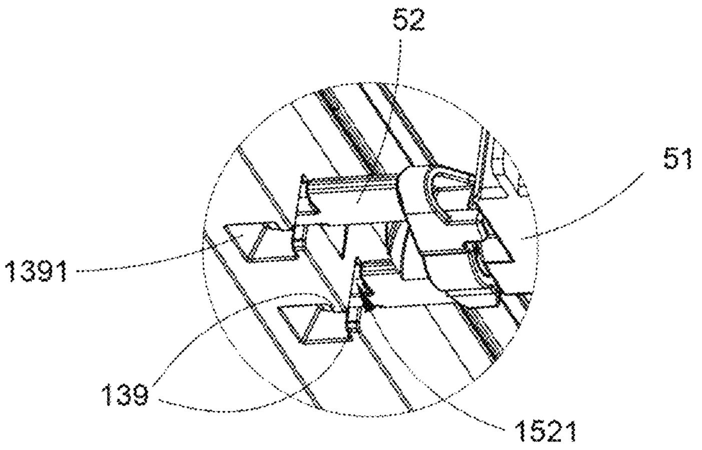
FIG. 11 is a enlarged view of the movement assembly in FIG. 10.

Specifically, as shown in FIG. 9 and FIG. 11, an outer side wall of the lock catch 33 is an inclined surface 331, and the inclined surface is configured to gradually incline to the outer side from bottom to top, the bearing bracket 12 has a guide surface 122 disposed in fit with the inclined surface 331, and the guide surface 122 is disposed on an upper edge of an inner wall of the bearing bracket 12. The slope of the guide surface 122 may or may not be consistent with the slope of the inclined surface 331. With further reference to FIG. 11, the guide surface 122 is located above the guide groove 121, and its length is shorter than that of the guide groove 121, corresponding to the first position of the roller brush cover 3.

Referring to FIG. 16, when the roller brush cover 3 is assembled, the user can hold the roller brush cover 3 to assembly downward, and the user only needs to align the lock catch 33 with the position of the guide surface 122, so that the inclined surface 331 of the lock catch 33 is located right above the guide surface 122. When pressed downwardly, the inclined surface 331, under the action of the guide surface 122, can overcome the elastic force of the elastic device 34 to retract into the roller brush cover 3, and at this time, because the lock catch 33 is pressed into the roller brush cover 3, the roller brush cover 3 can continue to move downward relative to the floor brush housing 1 until the lock catch 33 moves to the corresponding position of the guide groove 121, and the lock catch 33 springs back to the initial position under the elastic force and is engaged in the guide groove 121.

In the embodiment of the present disclosure, the guide surface 122 is only disposed at the first position corresponding to the roller brush cover 3, so that under the stop action of the guide surface 122, the roller brush cover 3 is in the first position when mounted to the floor brush housing 1. During assembly, when the roller brush cover 3 is in a different position, the inclined surface 331 cannot be aligned with the guide surface 122, and when the roller brush cover 3 is pressed downward, the inclined surface 331 cannot be pushed to move into the roller brush cover 3.

In an embodiment of the present disclosure, referring to FIGS. 12, 13 and 16, the bearing bracket 12 is provided with a stop surface 1211, and the stop surface 1211 may be a plane; correspondingly, the bottom of the lock catch is provided with a stop mating surface 332, and the stop mating surface 332 may also be a plane. During assembly, if the roller brush cover 3 is located at a position other than the first position, the stop matching surface 332 on the lock catch 33 may be fit with the stop surface 1211 on the bearing bracket 12, and thus assembly cannot be achieved, which ensures that the user can only set the roller brush cover 3 at the first position, and avoids the press on the roller brush 2 caused by applying a transitional force during assembly at other positions.

Figure 17:
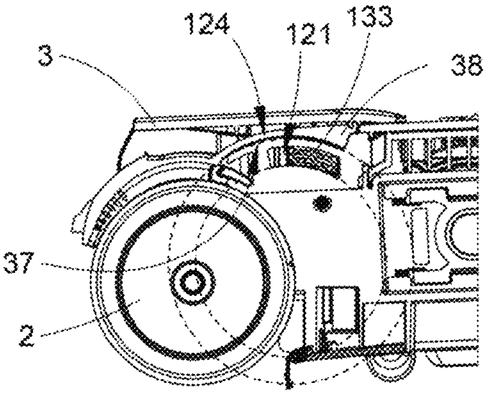
FIG. 17 is a cross-sectional view of the guide mechanism of the present disclosure.

In an embodiment of the present disclosure, referring to FIGS. 12, 14 and 17, opposite sides of the roller brush cover 3 are configured to be carried on the first end face of the top of the bearing bracket 12. In this way, the roller brush cover 3 is connected to the inner wall of the bearing support 12 through the guide mechanism, and the upper end surface of the bearing support 12 can also support the roller brush cover 3 to ensure the uniformity of stress.

Referring to FIG. 14, the first end surface of the bearing bracket 12 has a horizontal portion 123 adjacent to the floor brush housing 1, and a first arc-shaped portion 124 extending toward the front side of the floor brush housing 1, and the horizontal portion 123 is in transition connection with the first arc-shaped portion 124. As shown in FIG. 9, both sides of the roller brush cover 3 are configured to match the horizontal portion 123 and the first arc-shaped portion 124, and the roller brush cover 3 has a horizontal mating surface 36 that matching the horizontal portion 123 and an arc-shaped mating surface 37 that matching the first arc-shaped portion 124. In this way, when in the first position, the horizontal mating surface 36 of the roller brush cover 3 is fitted with the horizontal portion 123 of the bearing bracket 12, and the arc-shaped mating surface 37 is fitted with the first arc-shaped portion 124, thereby supporting the roller brush cover 3 by the bearing bracket. The roller brush cover 3 and the bearing bracket 12 adopt such a matching structure, which can ensure the compactness and consistency between the structures and improve the overall aesthetics of the floor brush assembly. It should be noted that, as shown in FIG. 10, the roller brush cover 3 further comprises two arc-shaped segments having the same radian as the roller brush, which are located on two opposite sides of the roller brush cover 3 respectively; the two arc-shaped segments are located at the end of the roller brush cover 3 away from the floor brush housing 1, the two arc-shaped segments are connected to the arc-shaped matching surface 37, and when the roller brush cover 3 is in the second position, the two arc-shaped segments are matched to the radian of the roller brush.

The first arc-shaped portion 124 is configured to always support a corresponding part of the roller cover 3 during movement of the roller cover 3. As shown in FIG. 17, the radian of the first arc-shaped portion 124 may be configured to be matched to the movement trajectory of the roller brush cover 3, and in the process that the roller brush cover 3 moves from the first position to the second position, because the movement trajectory of the roller brush cover 3 is arc-shaped, the horizontal mating surface 36 of the roller brush cover 3 may be gradually or directly separated from the horizontal portion 123 of the bearing bracket 12, but the arc-shaped mating surface 37 of the roller brush cover 3 is always fitted with the first arc-shaped portion 124, so that when the roller brush cover 3 is in the second position, the arc-shaped mating surface 37 may also be supported by the first arc-shaped portion 124, thereby ensuring the stability and reliability of the structure.

Specifically, when the roller brush cover 3 is in the first position, the horizontal mating surface 36 is supported on the horizontal portion 123, and the arc-shaped mating surface 37 is supported on the first arc-shaped portion 124. When the roller brush cover 3 swings around the circle center defined by the position of the extension portion 32, the arc-shaped mating surface 37 and the first arc-shaped portion 124 are fitted and slid, and the horizontal mating surface 36 gradually disengages from the horizontal portion 123 during sliding with the roller brush cover 3. When the roller brush cover 3 is in the second position, the arc-shaped mating surface 37 is still supported on the first arc-shaped portion 124, as shown in FIG. 3 and FIG. 5, and at this time, the horizontal mating surface 36 is in a suspended and unsupported state. As shown in FIG. 14, radians of the arc-shaped mating surface 37 and the lock catch 33 are consistent and both take the position of the extension portion 32 as the circle center, and the arc-shaped mating surface 37 always slides with the first arc-shaped portion 124 during movement of the roller brush cover 3 to provide support for the roller brush cover 3; the lock catch 33 also always slides in the guide groove 121 during movement of the roller brush cover 3 to provide support for the roller brush cover 3.

As shown in FIG. 12 and FIG. 14, a second end surface is provided on the top of the bearing bracket 12, a second arc-shaped portion 125 is provided on the second end surface at a position corresponding to the horizontal portion 123, an arc-shaped flange 38 matched with the second arc-shaped portion 125 is formed downward at a position corresponding to the roller brush cover 3, and the arc-shaped flange 38 is configured to be always supported by the second arc-shaped portion 125 during movement of the roller brush cover.

As shown in FIG. 17, both the second arc-shaped portion 125 and the arc-shaped flange 38 have a radian consistent with the radian of the first arc-shaped portion 124, so that the arc-shaped flange 38 can be supported on the carrier bracket 12 in the whole movement process. Specifically, when the roller brush cover 3 is in the first position, the arc-shaped flange 38 is supported on the second arc-shaped portion 125; during the movement of the roller brush cover 3, the arc-shaped flange 38 and the second arc-shaped portion 125 are fitted and slid, and since the radians of the first arc-shaped portion 124 and the second arc-shaped portion 125 are consistent and partially connected to each other, the arc-shaped flange 38 is always fitted with the second arc-shaped portion 125 during the sliding process. In addition, since the horizontal mating surface 36 is suspended and unsupported at the second position, the second arc-shaped portion 125 is provided at the position of the horizontal portion 123, and the arc-shaped flange 38 is provided at the position of the horizontal mating surface 36, so that the position of the horizontal mating surface 36 can be supported all the time.

In an embodiment of the present disclosure, the second arc-shaped portion 125 is disposed on the bearing bracket 12 at a position on the inner side of the horizontal portion 123, which not only improves the aesthetic level of the entire floor brush. When the roller brush cover 3 is in the second position, the tilted horizontal matching surface 36 is also beneficial for the user to observe the current state of the roller brush cover 3, thereby improving the user experience.

In an embodiment of the present disclosure, the cleaning device further comprises a movement assembly 5, through which the roller brush cover 3 may be driven to move between the first position and the second position. The movement assembly 5 of the present disclosure may be in a manner well known to those skilled in the art. In an embodiment of the present disclosure, as shown in FIG. 9, the movement assembly 5 comprises a driving mechanism 51, a pushing part 52 and a connecting member 53. The pushing part 52 is configured to be controlled by the driving mechanism 51 to move in a linear line to drive the roller brush cover 3 to move between the first position and the second position. The driving mechanism 51 of the present disclosure may be a servo disposed in the floor brush housing 1, and the servo converts the rotational motion into the linear motion of the pushing part 52 through the connecting member 53 during rotation. For example, the pushing part 52 is configured to extend forwardly when the servo rotates in a first direction, and the pushing part 52 is further configured to retract reversely when the servo rotates in a second direction.

On the basis of the above disclosure, the driving mechanism 51 may also be other driving structures having a driving function, such as an electric or mechanical driving structure, and may also apply an external force to the pushing part 52 in a manual driving manner such as hand pushing or foot stepping, so that the pushing part 52 moves in a linear line. The driving mechanism 51 may be fixed to the floor brush housing 1 in addition to the brush roller cover 3, and the present disclosure does not limit either the specific structure or the fixed position of the driving mechanism 51.

Referring to FIG. 11, the roller brush cover 3 is provided with a cooperation part in transmission connection with the pushing part 52. When the pushing part 52 is pushed forwardly in the axial direction, the cooperation part is pushed forwardly, and the roller brush cover 3 is pushed to the second position; when the pushing part 52 moves reversely in the axial direction, the cooperation part is pulled reversely, and the roller brush cover 3 is pulled back to the first position.

Specifically, the pushing part 52 is provided with an engaging groove 521. The pushing part 52 may be a single-head cylindrical structure or a multi-head fork structure, the pushing part 52 in this embodiment is a double-head fork structure, and the side walls of the ends of the double-head fork of the pushing part 52 are each provided with an engaging groove 521. The cooperation part of the roller brush cover 3 is a downward opening engaging wall 39, that is, an opening is provided on the engaging wall 39, and the opening direction of the opening is configured to be downward. The cooperation between the pushing part 52 and the roller brush cover 3 is an inserting structure, and in order to respectively fit with the ends of the double-head fork of the pushing part 52, two openings are formed in the engaging wall 39. This allows the opening in the engaging wall 39 to cooperate with the engagement slot 521 when the roller cover 3 is assembled.

The front-end portion of the engaging wall 39 is provided with an open slot, the two sidewalls of the open slot in the forward and reverse directions are noted as a front mating surface 391, and a back mating surface, respectively. When the pushing part 52 is pushed forwardly, the front-end of the pushing part 52 will be in contact fit with the front mating surface 391, the front mating surface 391 will be subjected to a forward pushing force and the brush roller cover 3 will be pushed to the second position; when the push portion 52 is retracted reversely, the inner wall of the engaging wall 39 on the rear mating surface of the open grooves will be in contact fit with the engaging slots 521 and will be subjected to a reverse pulling force and the brush roller cover 3 will be pulled back to the first position.

Since the pushing part 52 needs to drive the roller brush cover 3 to move along the arc-shaped movement trajectory, for combination of the linear motion and arc motion, the size of the engaging groove 521 is selected to be larger than the thickness of the engaging wall 39, which provides a decoupling space for the linear motion to the arc motion, and avoids the jamming between the components due to different motion trajectories. Meanwhile, when the pushing part 52 moves forwardly, the relatively large size of the engaging groove 521 can enable the end of the pushing part 52 to move forwardly to push the front mating surface 391, and can move reversely to enable the groove wall of the engaging groove 521 to push the rear mating surface of the open groove, thereby driving the roller brush cover 3 to reset.

In addition, in the above embodiment, it is described that the roller brush cover 3 needs to be assembled on the floor brush housing 1 in the first position, which is also to facilitate the engagement of the engaging wall 39 and the engaging groove 521 on the pushing part when the roller brush cover 3 is assembled. Of course, the pushing part 52 in the movement assembly 5 must be kept in the first position to ensure that the engaging wall 39 can be accurately inserted into the engaging groove 521.

In a specific embodiment of the present disclosure, as the roller brush 2 is used, the fluffy degree of the bristles thereof is reduced, and the diameter of the roller brush 2 is reduced accordingly. In order to ensure the cleaning effect of the roller brush 2 on the roller brush cover 3, the degree to which the movement assembly 5 pushes the roller brush cover 3 can be changed. Specifically, when the roller brush 2 of the present disclosure is brand-new, the diameter of the roller brush 2 is about φ56 mm, and at this time, there is a gap of 2.5 mm between the roller brush 2 and the roller brush cover 3 (at the location where the gap between the roller brush cover 3 and the roller brush 2 is the largest); when the roller brush 2 is used to its maximum service life, the diameter of this roller brush 2 is about φ51 mm, there is a gap of 5 mm between the roller brush 2 and the roller brush cover 3 (at the location where the gap between the roller brush cover 3 and the roller brush 2 is the largest). In an example, the diameter of the inner wall of the roller brush cover 3 is selected to be equal to the diameter of the roller brush 2 which has been used to its maximum service life, so that when the roller brush 2 is used to its maximum service life, the inner wall of the roller brush cover 3 can still be in contact with the roller brush 2, thereby effectively cleaning the roller brush cover 3. Of course, in other examples, the diameter of the inner wall of the roller brush cover 3 may also be selected as the diameter of the brand-new roller brush 2, or the diameter of the inner wall of the roller brush cover 3 is between the diameter of the brand-new roller brush 2 and the diameter of the roller brush 2 used to its maximum service life.

The brand-new roller brush 2 has a larger diameter, and when the roller brush cover 3 is in the first position, it is important to ensure that there is a sufficient gap between the roller brush cover 3 and the roller brush 2 to allow air flow, otherwise, it will affect the normal drying of the roller brush, which is prone to bacterial growth and odor. The gap between the roller brush 2 and the roller brush cover 3 should not be too large, the too large gap will cause the stroke of the pushing part 52 to be too long, and the precision of the pushing process is difficult to control; if the pushing part 52 is lengthened, the strength of the movement assembly 5 will be reduced; and the rotation angle of the roller brush cover 3 will also be increased, so that the size change of the liquid outlet 4 is too large, and dirt can easily fall into the liquid outlet 4 to cause blockage. Preferably, in the present disclosure, the rotation angle of the front roller brush cover 3 is set to 11°, and at this time, the roller brush 2 and the roller brush cover 3 have a proper gap; when the roller brush cover 3 moves to the second position, the roller brush cover 3 can be just in contact with the roller brush 2 with the diameter φ 51 mm, which can ensure that the roller brush cover 3 can be cleaned before the roller brush 2 fails.

In an embodiment of the present disclosure, the roller brush covers 3 may have a plurality of the second positions, for example, when a new roller brush 2 has a relatively large diameter, the movement assembly 5 may push the roller brush cover 3 to move forwardly by a small displacement, so that the roller brush cover 3 is in contact fit with the new roller brush 2. When the roller brush 2 is used for a period of time and its diameter becomes smaller, the movement assembly 5 can push the roller brush cover 3 to move forwardly by a relatively large displacement, so that the roller brush cover 3 is still in contact fit with the used roller brush 2.

In an embodiment of the present disclosure, when the roller brush cover 3 is in the second position, the cleaning device is in a self-cleaning operation. The cleaning device usually has a self-cleaning mode, and when the cleaning work is completed, the cleaning device can be placed on a corresponding base station, and the roller brush 2 can rotate on the base station according to a predetermined program, thereby realizing the cleaning of the roller brush 2 itself. When the roller brush cover 3 is in the second position, the inner wall of the roller brush cover 3 can be in contact with the roller brush 2, and at this time, the cleaning device is in the self-cleaning operation, that is, the roller brush 2 can rotate in the interference fit state of the inner wall of the roller brush cover 3, and clean the dirt on the inner wall of the roller brush cover 3. In this way, when the roller brush 2 is in the self-cleaning process, the inner wall of the roller brush cover 3 is cleaned by the roller brush 2, so that the automation level of the cleaning device is improved, and the user experience is optimized. This embodiment further provides a floor brush assembly 10 including a floor brush housing 1, a roller brush 2 and a roller brush cover 3. The roller brush 2 is configured to be rotatably connected to the floor brush housing 1, the roller brush 2 can adsorb dirt on the working surface during operation, and the roller brush cover 3 and the floor brush housing 1 enclose a roller brush cavity fitted with the roller brush 2. When the roller brush 2 rotates in the roller brush cavity, dirt adhering to the surface of the roller brush may be thrown to the inner wall of the roller brush cover by the action of centrifugal force, so that the inner wall of the roller brush cover becomes dirty. In order to clean the inner wall of the roller brush cover 3, the roller brush cover 3 in the present disclosure is configured to be operable in the first position and the second position relative to the brush housing 1. Specifically, when the roller brush cover 3 is in the first position, as shown in FIG. 2, there is a first contact area between the roller brush cover 3 and the roller brush 2; when the roller brush cover 3 is in the second position, as shown in FIG. 3, there is a second contact area between the roller brush cover 3 and the roller brush 2; wherein the first contact area is greater than or equal to zero, and the first contact area is less than the second contact area. In this way, the inner wall of the roller brush cover 3 can be cleaned by the roller brush 2.

The specific structure and movement manner of the floor brush assembly are completely the same as those of the floor brush assembly described above, and details are not described herein again.

Embodiment B

The embodiment B provides a cleaning device. For this cleaning device, if the position corresponding to the roller brush 2 can move relative to the floor brush housing 1 between a first position and a second position, and the inner wall of the floor brush housing 1 can be in a contact fit with the roller brush 2 when the roller brush is in the second position, it is possible to realize cleaning of the inner wall at the above position by means of the roller brush 2.

Compared with embodiment A, the overall structure and movement manner of the roller brush cover 3 in embodiment B are different. For the sake of conciseness, the differences are described in detail below with reference to the accompanying drawings. Other structures of the cleaning device are completely the same as those in embodiment A, and are not described herein again.

In the present disclosure, the roller brush cover 3 comprises a fixed part and a movable part, and the movable part is configured to move between a first position and a second position; in the first position, there is a first contact area between the movable part and the roller brush 2; in the second position, there is a second contact area between the movable part and the roller brush 2; wherein, the first contact area is greater than or equal to zero, but less than the second contact area. Specifically, referring to FIGS. 18 and 19, the roller brush cover 3 comprises a base body 301 disposed on the floor brush housing 1 and a movable cover plate 302 disposed on the base body 301. The base body 301 may correspond to the extension portion 32 in the above embodiment, the base body 301 may enclose a liquid outlet 4 with the liquid outlet assembly 11. The connection between the movable cover plate 302 and the base body 301 includes, but is not limited to, an integral connection, a hinge connection or a connection through a flexible member. The movable cover plate 302 is configured to move between a first position in which there is a first contact area between the movable cover plate 302 and the roller brush 2, wherein the first contact area is greater than or equal to zero. When the first contact area is equal to zero, the movable cover plate 302 is separated from the roller brush 2; when the first contact area is greater than zero, the inner wall of the roller brush cover 3 is partially in contact fit with the roller brush 2. When the roller brush cover 3 is in the second position, there is a second contact area between the movable cover plate 302 and the roller brush 2, wherein, the second contact area is greater than the first contact area. Specifically, the size of the second contact area depends on the area size of the inner wall of the roller brush cover 3, and when the roller brush cover 3 is in the second position, the inner wall of the roller brush cover 3 is almost completely in contact fit with the roller brush 2, that is, the movable cover plate 302 is pressed against the roller brush 2 under the pushing action of the movement assembly 5.

The roller brush cover 3 further comprises a fixed cover plate 303 connected to the base body 301, the fixed cover plate 303 is disposed on a side of the movable cover plate 302 away from the roller brush 2, and a gap 304 is formed between the fixed cover plate 303 and the movable cover plate 302.

A hanging lug 305 is formed on a side of the movable cover plate 302 facing the fixed cover plate 303, and the hanging lug 305 is located at the gap 304. The hanging lug 305 is provided with a through hole, and a tension spring (not shown) through the through hole may connect the movable cover plate 302 and the floor brush housing 1 together.

In detail, one end of the tension spring is connected to the movable cover plate 302, and the other end is connected to the floor brush housing 1. The tension spring is used to provide an acting force that enables the movable cover plate 302 to move in a direction away from the roller brush 2, so that the movable cover plate 302 can always have a tendency of moving away from the roller brush 2, and the roller brush 2 does not in contact with the movable cover plate 302 during the operation of the cleaning device. That is, when the movable cover plate 302 is not subjected to the pushing force from the movement assembly 5, the movable cover plate 302 can be always kept in the first position under the pulling force of the tension spring.

The tension spring may also connect the movable cover plate 302 with the fixed cover plate 303, one end of the tension spring is connected with the hanging lug 305 on the movable cover plate 302, and the other end of the tension spring may be fixed on the fixed cover plate 303. In this way, the movable cover plate 302 may always have a tendency of moving away from the roller brush 2. That is, one end of the tension spring is fixed on the hanging lug 305, and the other end of the tension spring only needs to be connected to any other fixed structure. The arrangement of the tension spring need not be limited to the size of the gap 304, which provides more optional space for selection and assembly of the tension spring.

The fixed cover plate 303 may be used to protect the movable cover plate 302 that is movably disposed or may be used as a carrier to which a tension spring is attached. In addition, the gap 304 formed between the fixed cover plate 303 and the movable cover plate 302 provides space for movement of the movable cover plate 302 between the first position and the second position.

Figure 20:
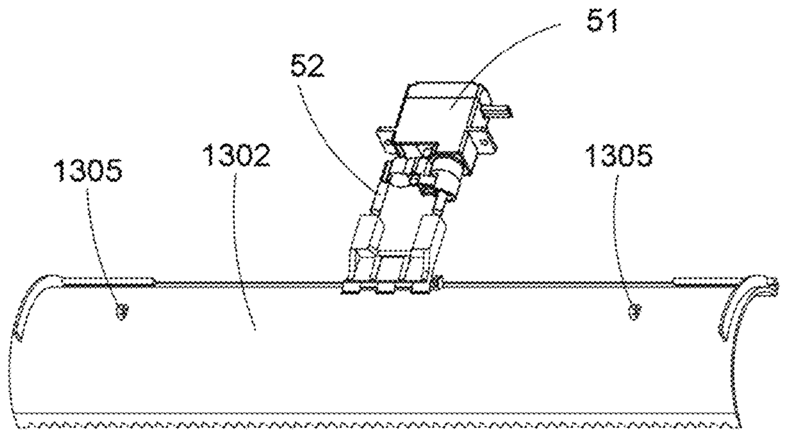
FIG. 20 is a schematic structural diagram of the roller brush cover and the movement assembly in the embodiment B of the present disclosure.

Two hanging lugs 305 and two tension springs are respectively provided, as shown in FIG. 20, on each side of the movable cover plate 302 is provided with a hanging lug 305, so that the movable cover plate 302 can be more uniformly subjected to the pulling force from the tension spring, and the whole movable cover plate 302 can reliably move between the first position and the second position.

Figure 18:
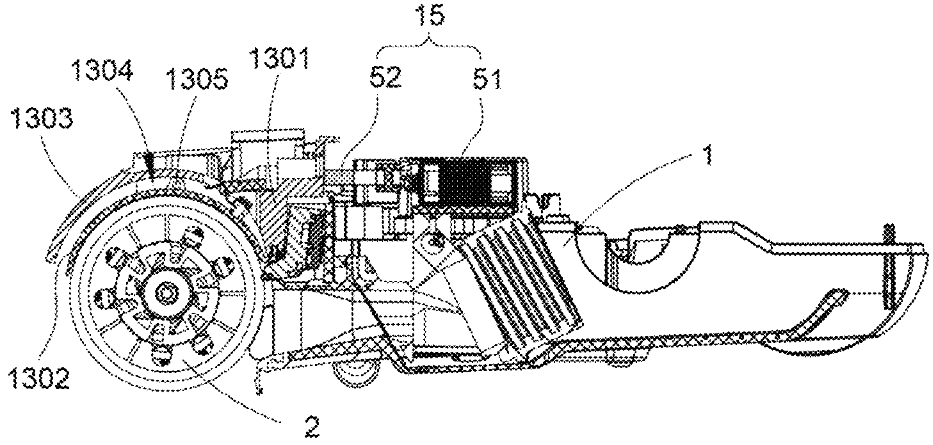
FIG. 18 is a cross-sectional view of another embodiment of the cleaning device of the present disclosure.
Figure 19:
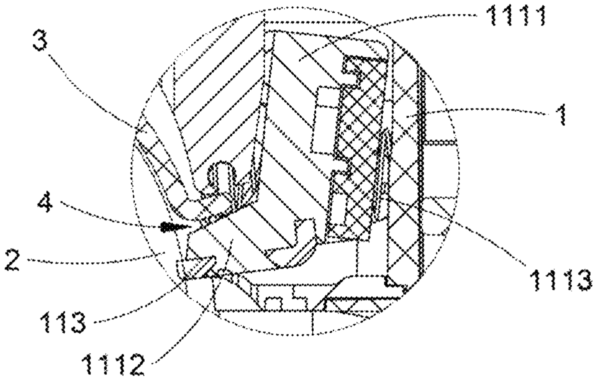
FIG. 19 is a partially enlarged view of the liquid outlet portion in FIG. 18.

In one embodiment of the present disclosure, with further reference to FIG. 18 and FIG. 20, the movement assembly 5 is configured to apply a force to the movable cover plate 302 to move the movable cover plate 302 toward the roller brush 2, so that the movable cover plate 302 is driven to rotate relative to the base body 301. Specifically, the movement assembly 5 is configured to drive the movable cover plate 302 to overcome the elastic return force from the tension spring and move from the first position to the second position. Specifically, the movement assembly 5 comprises a driving mechanism 51 and a pushing part 52, as shown in FIG. 15, the pushing part 52 is configured to push the movable cover plate 302 in the linear direction to overcome the pulling force from the tension spring under the driving action of the driving mechanism 51, so as to move from the first position to the second position; when the pushing part 52 is withdrawn in the linear direction under the driving action of the driving mechanism 51, the movable cover plate 302 moves back to the first position from the second position under the pulling force of the tension spring.

In this way, under the cooperation of the movable cover plate 302, the tension spring and the movement assembly 5, the movable cover plate 302 moves between the first position and the second position relative to the floor brush housing 1. When the movable cover plate 302 is in the second position, the inner wall of the movable cover plate 302 can be in contact fit with the roller brush 2, so that the inner wall of the movable cover plate 302 is cleaned by the roller brush 2 when the roller brush 2 is self-cleaning. This improves the level of automation of the cleaning device, eliminates the need for a user to manually clean the inner wall of the roller brush cover, and improves the user experience.

Embodiment C

Embodiment C provides a base station (e.g. a tray) used in the cleaning device in the two foregoing embodiments, and for the sake of conciseness, the tray is described in detail below with reference to the accompanying drawings. The cleaning device is the cleaning device described in embodiment A or embodiment B, and details are not described herein again.

Figure 21:
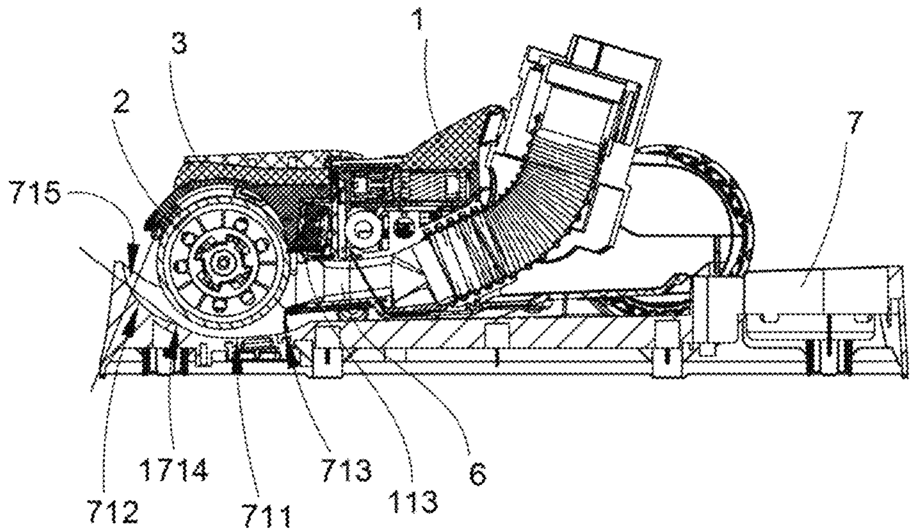
FIG. 21 is a cross-sectional view of the cleaning device in the embodiment C of the present disclosure.
Figure 23:
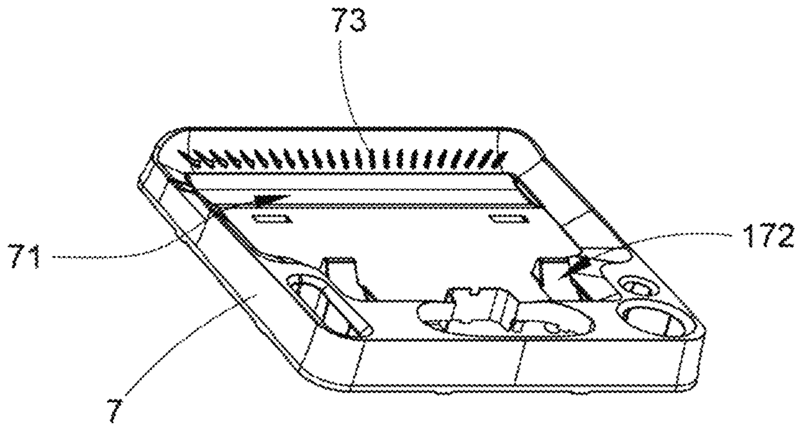
FIG. 23 is a schematic structural diagram of the tray of the present disclosure.

Referring to FIGS. 21 and 23, after the cleaning work is completed, the cleaning device may be placed on the tray 7 for charging, self-cleaning and the like. The floor brush assembly 10 on the cleaning device can be completely placed on the tray 7, and the cleaning device can carry out self-cleaning operation on the tray 7. Specifically, the tray 7 has a roller brush groove 71 and a wheel groove 72. The roller brush groove 71 is a groove structure located at the front-end of the tray 7 and is configured to receive the roller brush 2. The wheel groove 72 is located at the rear end of the tray 7 and has two left-right symmetrical wheels, which are respectively used for placing two floor brush wheels at the rear end of the floor brush assembly 10.

When the floor brush assembly 10 is placed on the tray 7, the roller brush 2 is not in contact with the inner wall of the roller brush groove 71, but has a certain gap, so that the roller brush 2 can freely rotate during self-cleaning operation. When the roller brush 2 rotates, dirt adhering to the surface of the roller brush 2 may be thrown out, and in order to prevent the dirt from being thrown out of the tray 7, the height of the front-end of the tray 7 needs to be designed. When self-cleaning is carried out, the roller brush 2 performs forward rotation and reverse rotation, and referring to the view direction of FIG. 21, the forward rotation is counterclockwise rotation, and the reverse rotation is clockwise rotation. When the roller brush 2 rotates forwardly, the dirt will be thrown out in the direction of the forward rotation tangent line in FIG. 21, and when the roller brush 2 rotates reversely, the dirt will be thrown out in the direction of the reverse rotation tangent line as shown in FIG. 21, and the height of the front-end of the tray 7 should be higher than the throwing path of the dirt when rotating forwardly and reversely, so as to prevent the dirt from being thrown out of the tray 7.

Specifically, in an embodiment of the present disclosure, the bottom of the roller brush groove 71 is provided with a first arc surface 711, and two sides of the roller brush groove 71 are respectively formed with a second arc surface 712 and a third are surface 713; wherein the second arc surface 712 is located at the front-end of the first arc surface 711 and is transitionally connected to the first arc surface 711. The third arc surface 713 is located at the rear end of the first curved surface 711 and is transitionally connected to the first arc surface 711.

The first arc surface 711 is located at the bottom of the roller brush groove 71 and is formed to have a shape matching the roller brush 2, for example, an arc-shape or an approximately arc-shape. The second arc surface 712 and the first are surface 711 are connected together, and are configured to deviate from the first arc surface 711 in directions away from the roller brush 2, that is, the extending directions of the first arc surface 711 and the second arc surface 712 are different, which may also be understood as that the first arc surface 711 and the second arc surface 712 have different curvatures, as shown in FIG. 21, so that an inflection point 714 is formed at a position where the first arc surface 711 and the second arc surface 712 are connected. Since the second arc surface 712 extends away from the roller brush 2 relative to the first arc surface 711, the distance between the second arc surface 712 and the roller brush 2 is greater than the distance between the first arc surface 711 and the roller brush 2. When the roller brush 2 rotates (for example, rotates reversely), the dirt will move in the channel enclosed by the roller brush 2 and the first arc surface 711 along with the rotation of the roller brush 2; however, when the dirt moves to the critical point of the inflection point 714, since the distance between the roller brush 2 and the second arc surface 712 becomes larger, the dirt suddenly loses the support of the first arc surface 711, and will move parabolically from the inflection point 714 in the direction of the rotation tangent line of the roller brush 2 and will be thrown out.

In the cleaning system of the present disclosure, when the roller brush 2 is in the roller brush groove 71, the distance between the second arc surface 712 and the roller brush 2 is greater than the distance between the first arc surface 711 and the roller brush 2, which may be understood as forming a larger first opening between the connection position and the roller brush 2. The distance between the third arc surface 713 and the roller brush 2 is greater than the distance between the first arc surface 711 and the roller brush 2, and it can be understood that a larger second opening is formed between the connection position and the roller brush 2.

In this way, when the roller brush 2 rotates reversely, dirt such as particles may be thrown out from a position where the second arc surface 712 is connected to the first arc surface 711 during rotation of the roller brush 2. Therefore, the reverse rotation tangent line in the above description is a tangent line at the connection position between the second arc surface 712 and the first arc surface 711, for example, the position of the inflection point 714, so that the dirt thrown can be blocked by the second arc surface 712 without exceeding the height of the side wall 715 at the front-end of the tray 7, and then the roller brush 2 can rotate forwardly to recover the dirt. The normal rotation tangent line is an opening position between the front-end portion of the roller brush cover 3 and the roller brush 2.

In an embodiment of the present disclosure, in order to prevent dirt from being thrown out of the tray 7 from the position of the first opening or inflection point 714 when the roller brush 2 rotates reversely. Based on this, the front-end side wall 715 of the roller groove 71 is formed to be higher than the rotation tangent line of the roller 2 at the inflection point 714. It can also be understood that the front-end side wall 715 of the brush rolling groove 71 is configured to be higher than the throwing path of dirt from the first opening, that is, higher than the reverse rotation tangent line of the first opening, and it can also be understood that the extension line of the reverse rotation tangent line or the rotation tangent line is lower than the front-end side wall 715 of the brush rolling groove 71. Thus, dirt thrown out from the first opening or inflection point 714 can be blocked by the front-end side wall 715 of the brush slot 71 when moving along the reverse rotation tangent line.

The above-mentioned forward rotation tangent line refers to the opening position between the front-end portion of the roller brush cover 3 and the roller brush 2. A third opening is formed between the front-end of the roller brush cover 3 and the roller brush 2, and the front-end side wall 715 of the roller brush groove 71 is formed to be higher than a throwing path of dirt from the third opening, that is, higher than a forward rotation tangent line of the third opening, and it can also be understood that the extension line of the rotation tangent line is lower than the front-end side wall 715 of the roller brush groove 71. Thus, dirt thrown out from the second opening can be blocked by the front-end side wall 715 of the roller brush groove 71 when moving along the reverse rotation tangent line.

In an embodiment of the present disclosure, when the roller brush cover 3 is in the second position, the roller brush cover 3 is combined with or has an overlapping area with the highest point of the front-end side wall 715 of the roller brush groove 71. When the roller brush cover 3 moves forwardly to the second position, the inner wall of the roller brush cover 3 has a contact area with the roller brush 2, and the roller brush 2 can rotate at this time to clean the inner wall of the roller brush cover 3. In the self-cleaning mode, when the roller brush 2 rotates to clean the roller brush cover 3, there is a risk that the dirt cleaned off from the inner wall of the brush cover 3 may be thrown out at the time when the rotating roller brush begins to move away from the roller brush cover 3. Based on this, when the roller brush cover 3 is in the second position, because the front-end position of the roller brush cover 3 is combined with the top end surface of the front-end side wall 715, the roller brush cover 3 and the front-end side wall 715 of the roller brush groove 71 can enclose an approximately closed space, so that dirt can be prevented from being thrown out; or the front-end position of the roller brush cover 3 and the front-end side wall 715 have an overlapping area, that is, the front-end position of the roller brush cover 3 and the orthographic projection of the front-end side wall 715 in the height direction are at least partially overlapped, so that the tangent line at the front-end position of the roller brush cover 3 does not exceed the front-end side wall 715 of the roller brush groove 71, and the dirt is blocked by the front-end side wall 715 of the roller brush groove 71 after being thrown out from the front-end position of the roller brush cover 3, thereby preventing the dirt from being thrown out of the tray 740.

Figure 22:
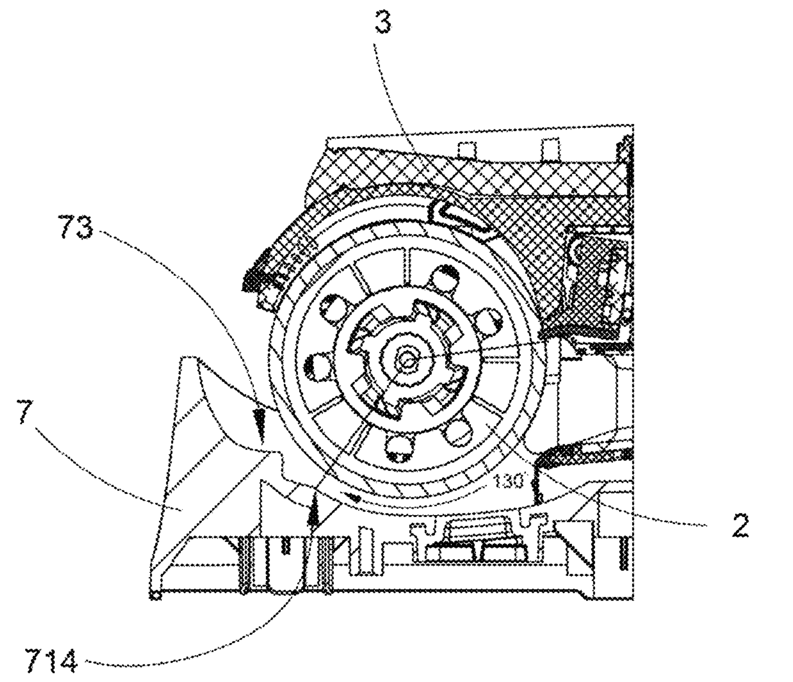
FIG. 22 is a partial cross-sectional view of another variant of the cleaning device in the embodiment C of the present disclosure.

In an embodiment of the present disclosure, one or more tray ribs 73 are provided on the tray 7 at positions on the front side of the roller brush groove 71, as shown in FIG. 22 and FIG. 23, each tray rib 73 may be configured as a flange structure extending upward from the side wall of the roller brush groove 71, a plurality of tray ribs 73 are provided, and the plurality of tray ribs 73 are distributed at distance in the axial direction of the roller brush groove 71. Each tray rib 73 extends on the side wall of the roller brush groove 71 toward the bottom of the roller brush groove 71 to form a comb-like structure. When the roller brush 2 throws out large dirt particles, the tray ribs 73 can directly block the dirt from flying out of the tray 7, because the gap between each two adjacent tray ribs 73 is small, and the large dirt particles cannot pass through the gap.

In one embodiment of the present disclosure, the plurality of tray ribs 73 form a shape that is gathered toward the middle. Referring to FIG. 23, the tray ribs located on two opposite sides of the roller brush groove are configured to be inclined toward a middle region in an axial direction of the roller brush groove. When the wastewater is thrown to the tray ribs 73, the wastewater will be gathered to the middle of the tray under the flow guide action of the tray ribs 73. Since the dirt suction port 6 at the bottom of the cleaning device has a large suction force at the middle position, gathering the wastewater to the middle of the tray facilitates the dirt suction port 6 to clean the wastewater and keep the tray 7 clean.

On the basis of the above disclosure, tray ribs 73 are provided on the tray 7 at positions on the rear side of the brush rolling groove 71, and the tray rib 73 located on the rear side of the brush rolling groove 71 have the same structure as the tray ribs 73 located on the front side thereof, which will not be specifically described herein.

In this embodiment, the inner surface of the roller brush groove 71 may be an arc surface matching the shape of the roller brush 2, and the tray ribs 73 are disposed on the arc surface at positions on the front side of the roller brush 2. Of course, on the basis of the above disclosure, the roller brush groove 71 may also be disposed on the second arc surface 712, so that the dirt thrown may also be blocked by the tray ribs 73. After the cleaning device is placed on the tray 7, the roller brush 2 can rotate on the tray 7 to perform self-cleaning of the roller brush 2. The self-cleaning process comprises forward rotation steps and reverse rotation steps, and in some steps, the roller brush 2 may alternately rotate forwardly and rotate reversely. During rotation, most of the dirt on the surface of the roller brush 2 is scraped off by the scraper plate 13 and sucked through the dirt suction port 6. In an actual application scenario, after the roller brush 2 completes the cleaning work, dirt, such as large volume dirt or hair, is easily stuck at the position between the scraper plate 13 and the dirt suction port 6, and when the roller brush 2 is in the self-cleaning process, the roller brush 2 can loosen the dirt stuck at the scraper plate 13 and the dirt suction port 6. Experiments have shown that when the roller brush 2 rotates reversely by an obtuse angle, which is greater than 90° and less than 180°, the effect of loosening dirt can be achieved. Preferably, an optimal loosening effect can be achieved when the roller brush 2 rotates reversely by an angle of 130°. When the reverse rotation angle of the roller brush 2 is less than 90°, the friction force generated by the roller brush 2 is insufficient to loosen the dirt stuck between the scraper plate 13 and the dirt suction port 6, or the loosening effect is poor. Only after the roller brush 2 rotates reversely by a predetermined angle, the dirt at this position is gradually removed under a long-time action of a friction force, and the dirt is driven to move in the reverse rotation direction.

In a specific application scenario of the present disclosure, when dirt is loosened and moves along with the roller brush 2, the dirt is sucked by the negative pressure generated by the dirt suction port 6, thereby improving the self-cleaning effect.

In an embodiment of the present disclosure, when the roller brush 2 rotates reversely, the power of the main motor providing the suction force to the dirt suction port 6 can be increased, thereby increasing the suction force of the dirt suction port 6, which enables the dirt stuck at the dirt suction port 6 to be directly sucked by the dirt suction port 6 with large suction force after being loosened. For example, in a specific embodiment of the present disclosure, when the roller brush 2 rotates reversely, the main motor operates in a state of maximum power. It should be noted that, in this case, the maximum power of the main motor may be the maximum power of the cleaning device in the self-cleaning process, or may be the maximum power of the cleaning device when the cleaning device sucks the wastewater on the floor to be cleaned, so that the dirt suction port 6 provides a maximum suction force to suck in the loosened dirt when the roller brush 2 rotates reversely. Some dirt is not directly sucked by the dirt suction port 6 during reverse rotation, but moves along with the roller brush 2, and the dirt will move towards the dirt suction port 6 during the forward rotation self-cleaning step of the roller brush 2 or be scraped off by the scraper plate 13 again and sucked in by the dirt suction port 6.

In the above embodiment of controlling the roller brush 2 to rotate reversely by at least 130°, the roller brush groove 71 may have an arc surface structure matching the shape of the roller brush 2, that is, the inner surface of the roller brush groove 71 is an arc surface, and since the roller brush 2 rotates reversely to cause the dirt driven to be sucked directly by the dirt suction port 6, no dirt is thrown out of the tray together with the roller brush 2.

In another embodiment of the present disclosure, controlling the roller brush to rotate reversely by at least 130° may be applied to the above embodiments including the first arc surface 711, the second arc surface 712 and the inflection point 714, because some dirt may not be sucked by the dirt suction port 6 after being loosened by the roller brush 2, but may move along with the roller brush 2. When the dirt moves to the position of the inflection point 714 along with the roller brush 2, since the distance between the roller brush 2 and the second arc surface 712 becomes larger, the dirt suddenly loses the support of the first arc surface 711, and thus is thrown out from the position of the inflection point 714 along the rotation tangent line direction of the roller brush 2 and is thrown on the second arc surface 712, so that the dirt can be prevented from being thrown out of the tray 7.

In the subsequent forward rotation of the roller brush 2, the dirt on the second arc surface 712 may move along with the forward rotation of the roller brush 2 toward the dirt suction port 6, and be sucked by the dirt suction port 6 during the movement.

In an embodiment of the present disclosure, referring to FIG. 22, when the cleaning device is placed on the tray 7, an included angle between a line connecting the scraper plate 13 to the circle center of the roller brush 2 and a line connecting the inflection point 714 to the circle center of the roller brush 2 is greater than 90° and less than 180°. Specifically, the included angle is the same as the angle at which the roller brush 2 rotates reversely in the self-cleaning mode. When the roller brush 2 performs the above reverse rotation self-cleaning in the roller brush groove 71, a small part of dirt may be not sucked in by the dirt suction port 6 in time, and this dirt may rotate together with the roller brush 2. Taking the roller brush 2 as an example, at this time, the included angle between the connecting line from the scraper plate 13 to the circle center of the roller brush 2 and the connecting line from the inflection point 714 to the circle center of the roller brush 2 is 130°; since the roller brush 2 rotates reversely by 130° when performing the reverse self-cleaning, and the included angle is also 130°, the dirt stuck at the position of the scraper plate 13 is loosened, and is not easily thrown out of the tray 7 even if the dirt is not sucked in time by the dirt suction port 6. According to the design structure, loosening dirt can be guaranteed to the maximum extent, and the dirt loosened is not thrown out of the tray.

Embodiment D

This embodiment provides a control method for a cleaning device, wherein the cleaning device is the cleaning device provided in embodiment A or embodiment B. The method comprises one or more of the following steps:

Step I: controlling the roller brush cover 3 to move from the first position to the second position in the self-cleaning mode, so that the inner wall of the roller brush cover 3 is in contact fit with the roller brush 2.

During operation of the cleaning device, the roller brush cover 3 is maintained at the first position by default, so as to facilitate flexible rotation of the roller brush 2 on the working surface. After the operation is completed, the cleaning device enters the self-cleaning mode, at this time, the roller brush cover 3 can move from the first position to the second position under the driving action of the movement assembly 5, and the inner wall of the roller brush cover 3 is in contact fit with the roller brush 2.

Step II: controlling the roller brush 2 to rotate during self-cleaning to clean the inner wall of the roller brush cover 3.

When the roller brush cover 3 moves to the second position, the inner wall of the roller brush cover 3 and the roller brush 2 remain in a contact fit state. At this time, the roller brush 2 is controlled to rotate, so that the roller brush 2 can directly clean the inner wall of the roller brush cover 3, and under the condition that the bristles of the roller brush 2 are in interference fit with the inner wall of the roller brush cover 3, dirt on the inner wall of the roller brush cover 3 can be adsorbed on the roller brush 2, thereby cleaning the inner wall of the roller brush cover 3.

Step III: controlling the roller brush cover 3 to move from the second position to the first position after a predetermined time, so that the inner wall of the roller brush cover 3 is completely or at least partially separated from the roller brush 2.

After the roller brush cover 3 is cleaned, the movement assembly 5 drives the roller brush cover 3 to move from the second position back to the first position, so that the roller brush cover 3 is completely or at least partially separated from the roller brush 2. The time required for cleaning the roller brush cover 3 may be determined according to factors such as the rotation speed of the roller brush 2 and the water supply speed of the cleaning device, which is not specifically limited herein.

The self-cleaning mode comprises a step of controlling the reverse rotation self-cleaning of the roller brush 2 and a step of controlling the forward rotation self-cleaning of the roller brush 2. The forward rotation is the rotation direction of the roller brush 2 during normal operation, referring to the view directions of FIG. 2 to FIG. 5, the forward rotation is counterclockwise rotation, and the reverse rotation is clockwise rotation. Before or during the step of controlling the forward rotation self-cleaning of the roller brush 2, the roller brush cover 3 is controlled to move from the first position to the second position; and when the roller brush 2 is controlled to rotate forwardly for self-cleaning, the roller brush cover 3 is kept in the second position within a predetermined time.

When the roller brush 2 rotates forwardly, the dirt on the surface of the roller brush 2 can be scraped off by the scraper plate 13 and sucked in by the dirt suction port 6. When the roller brush 2 rotates reversely, the dirt may stay above the scraper plate 13 and enter the space between the roller brush 2 and the inner wall of the roller brush cover 3 during the rotation of the roller brush 2, so that the roller brush cover 3 cannot be cleaned.

When the inner wall of the roller brush cover 3 is cleaned by the roller brush 2, the dirt adhering to the surface of the roller brush 2 needs to be scraped off by the scraper plate 13 at any time to ensure that the dirt is not brought into the next rotation cycle, so that the dirt passes through the inner wall of the roller brush cover 3 again. Before the step of controlling the roller brush 2 to rotate forwardly to carry out self-cleaning, or during the self-cleaning step of the roller brush 2, it is necessary to control the roller brush cover 3 to move from the first position to the second position; and during the step of controlling the roller brush 2 to rotate forwardly to carry out self-cleaning, the roller brush cover 3 is held at the second position within a predetermined time, so that the inner wall of the roller brush cover 3 can be cleaned. It should be noted that “within a predetermined time” may be the whole time of the self-cleaning step carried out by the roller brush 2, or may be only the time of the self-cleaning step carried out by the roller brush 2, as long as it is ensured that the roller brush cover 3 is cleaned by the roller brush 2 within this time.

In order to realize self-cleaning of the roller brush 2, it is necessary to control the roller brush 2 to alternately rotate forwardly and rotate reversely in a given cleaning step. In the step of controlling the roller brush 2 to rotate reversely to carry out the self-cleaning, the roller brush cover 3 is held in the first position, so that the dirt can be prevented from being brought between the roller brush 2 and the inner wall of the roller brush cover 3 in the step of the roller brush 2 rotates reversely to carry out the self-cleaning.

In an embodiment of the present disclosure, the cleaning device comprises a main motor that provides a suction force for the dirt suction port 6, and the step of controlling the reverse rotation self-cleaning of the roller brush 2 comprises: controlling the roller brush 2 to rotate reversely by an angle, which is greater than 90° and less than 180°, and increasing the power of the main motor in the process of controlling the roller brush 2 to rotate reversely. In an actual application scenario, after the roller brush 2 completes the cleaning work, the dirt, such as large volume dirt or hair, is easily stuck at the position between the scraper plate 13 and the dirt suction port 6, and when the roller brush 2 is in the self-cleaning process, the roller brush 2 can loosen the dirt stuck at the scraper plate 13 and the dirt suction port 6. It can be seen from experiments that when the roller brush 2 rotates in reverse by an obtuse angle, which is greater than 90° and less than 180°, the effect of loosening the dirt can be achieved. Preferably, an optimal loosening effect can be achieved when the roller brush 2 rotates reversely by an angle of 130°. When the reverse rotation angle of the roller brush 2 is less than 90°, the friction force generated by the roller brush 2 is insufficient to loosen the dirt stuck between the scraper plate 13 and the dirt suction port 6, or the loosening effect is poor. Only after the roller brush 2 rotated in reverse by a predetermined angle, the dirt at this position is gradually removed under a long-time action of a friction force, and the dirt is driven to move in the reverse rotation direction.

When the roller brush 2 rotates reversely, the power of the main motor providing the suction force to the dirt suction port 6 can be increased to the maximum power, thereby increasing the suction force of the dirt suction port 6, which enables the dirt stuck at the dirt suction port 6 to be directly sucked in by the dirt suction port 6 with a large suction force after being loosened. Some dirt is not directly sucked in by the dirt suction port 6 during the reverse rotation, but moves along with the roller brush 2, and during the forward rotation self-cleaning step of the roller brush 2, the dirt will be scraped off by the scraper plate 13 again and sucked in by the dirt suction port 6. In this way, the cleaning device can loosen the dirt stuck at the position of the scraper plate 13 and the dirt suction port 6 during the self-cleaning, thereby achieving more thorough the self-cleaning.

Application Scenario I

In a home cleaning scenario, the cleaning device of the present disclosure may be a hand-held scrubber. The hand-held scrubber comprises a floor brush assembly, and the floor brush assembly comprises a floor brush housing 1, a roller brush 2 and a roller brush cover 3. The cleaning device can clean the dirt on the floor through the roller brush 2, specifically, the roller brush 2 is configured to be rotatably connected to the floor brush housing 1, and the roller brush 2 can adsorb the dirt on the working surface during operation.

The roller brush cover 3 is detachably assembled on the floor brush housing 1, and the user can pinch the two clamps 35 with one hand and force the two clamps 35 in the direction close to each other, and then apply force upward to lift the clamps 35, so that the roller brush cover 3 can be detached from the floor brush housing 1; when the roller brush cover 3 is assembled, the user can easily complete the assembly only by placing the roller brush cover 3 at a corresponding position and pressing down the roller brush cover 3.

The roller brush cover 3 is configured to move relative to the brush housing 1 between the first position and the second position. When the roller brush cover 3 is in the first position, as shown in FIG. 1, the roller brush cover 3 is separated from the roller brush 2, at this time, the roller brush 2 can freely rotate in the roller brush cavity to clean the floor, and the roller brush cover 3 does not make any contact with the roller brush 2 to prevent resistance to rotation of the roller brush 2. When the roller brush 2 is in the cleaning process, dirt adhering to the surface of the roller brush may be thrown to the inner wall of the roller brush cover by the action of centrifugal force, so that the inner wall of the roller brush cover becomes dirty. When the cleaning device is in the self-cleaning process, as shown in FIG. 2, the roller brush cover 3 can move to the second position, and at this time, the inner wall of the roller brush cover 3 is in contact fit with the roller brush 2, so that when the roller brush 2 is self-cleaning, the inner wall of the roller brush cover 3 can be cleaned by the roller brush 2.

As shown in FIG. 4 and FIG. 14, the roller brush cover 3 is configured to swing relative to the floor brush housing 1 along an arc trajectory between a first position and a second position, and the circle center of the arc-shaped movement trajectory of the roller brush cover 3 is at a position of the extension portion corresponding to the liquid outlet 4. The liquid outlet 4 is enclosed by the extension portion 32 at the rear end of the roller brush cover 3 and the flow guide portion 112 on the liquid outlet assembly 11, and setting the circle center of the movement trajectory at the liquid outlet 4 can ensure that the size of the liquid outlet 4 can almost remain unchanged during the movement of the roller brush cover 3. As a result, the size of the liquid outlet 4 will not be too large, and dirt will not be thrown into the liquid outlet 4 by the roller brush 2 during rotation, and thus will not cause the blockage of the liquid outlet assembly 11. In addition, the size of the liquid outlet 4 remains unchanged, so that the liquid can uniformly and quantitatively wet the roller brush 2. Further, the rear end of the roller brush cover 3 can be almost kept stationary during rotation, thereby preventing the roller brush cover 3 from interfering with the liquid outlet assembly 11 during movement.

In the second aspect of the present disclosure, the self-cleaning ability of the cleaning device in the prior art is in general not good, and the root of the bristles of the roller brush is always still retained with dirt after self-cleaning. In view of the above problems, the present disclosure provides a self-cleaning method of a cleaning device and the cleaning device for solving the above problems or at least partially solving the above problems.

The first embodiment according to the second aspect of the present disclosure provides a self-cleaning method of a cleaning device. The method comprises:

in the self-cleaning process of the cleaning device, rotating the roller brush of the cleaning device in a first direction;

after stopping rotation of the roller brush in the first direction, rotating by a set acute angle in the second direction at least once;

The second and the first directions are different.

In the second embodiment according to the second aspect of the present disclosure, based on the first embodiment, the set acute angle is from 30 degrees to 90 degrees.

In the third embodiment according to the second aspect of the present disclosure, based on the first embodiment, the self-cleaning process of the cleaning device comprises a roller brush soaking stage, a drying and/or sterilizing stage;

the roller brush rotates in the first direction, and after stopping the rotation of the roller brush in the first direction, the roller brush rotates by the set acute angle in the second direction at least once, when the self-cleaning process is in the soaking stage, the rotation speed of the roller brush in the first direction is the same as the rotation speed of the roller brush in the second direction; the roller brush rotates in the first direction, and after stopping the rotation of the roller brush in the first direction, the roller brush rotates by the set acute angle in the second direction at least once, when the self-cleaning process is in the drying and/or sterilizing stage, the rotation speed of the roller brush in the first direction is greater than the rotation speed of the roller brush in the second direction.

In the fourth embodiment according to the second aspect of the present disclosure, based on the third embodiment, the roller brush has at least two rotation speed states in the self-cleaning process; the at least two rotation speed states are divided into a high-speed state and a low-speed state according to speed; in the roller brush soaking stage, the rotation speed of the roller brush in the first and second directions are both in the low-speed state; and in the drying and/or sterilizing stage, the rotation speed of the roller brush in the first direction is in the high-speed state, and the rotation speed of the roller brush in the second direction is in the low-speed state.

In the fifth embodiment according to the second aspect of the present disclosure, based on the third embodiment, the self-cleaning method of the cleaning device further comprises: in the roller brush soaking stage, during a time period in which the roller brush rotates by a set acute angle in the second direction at least once, the suction motor of the cleaning device is in a first-level power operation state, wherein, the suction motor has at least two-levels power operation states during self-cleaning of the cleaning device, the at least two-levels power operation states are set sequentially, and a power corresponding to a previous level is high, the first-level power operation state is the highest level state of the at least two-levels power operation states.

In the sixth embodiment according to the second aspect of the present disclosure, based on the fifth embodiment, the first-level power is 1-1.2 times the power of the suction motor in a water absorption mode.

In the seventh embodiment according to the second aspect of the present disclosure, based on the fifth embodiment, before the roller brush rotates by the set acute angle in the second direction, the method further comprises: turning off the roller brush motor of the cleaning device, stopping the rotation of the roller brush in the first direction; and starting the work of the suction motor in the first-level power operation state.

In the eighth embodiment according to the second aspect of the present disclosure, based on any one of the first to seventh embodiments, the roller brush rotates in the first direction, and after stopping the rotation of the roller brush in the first direction, the roller brush rotates by the set acute angle in the second direction at least once, when the roller brush soaking stage is completed, the method further comprises: rotating the roller brush in the first direction, wherein the suction motor is in the first-level power operation state; during a time period in which the roller brush rotates in the first direction, the roller brush cover of the cleaning device moves from a first position to a second position, so that the roller brush cover is in contact with the roller brush or the contact area between the roller brush cover and the roller brush is increased.

In the ninth embodiment according to the second aspect of the present disclosure, based on the sixth embodiment, the rotation speed of the roller brush rotating in the first direction after the roller brush soaking stage is higher than the rotation speed of the roller brush rotating in the first direction during the roller brush soaking stage.

In the tenth embodiment according to the second aspect of the present disclosure, based on the eighth embodiment, the self-cleaning method of the cleaning device further comprises: rotating the roller brush in the first direction, and when the suction motor is in the first-level power operation state, the liquid supply device of the cleaning device is in an off-state.

In the eleventh embodiment according to the second aspect of the present disclosure, based on the eighth embodiment, the self-cleaning method of the cleaning device further comprises: the roller brush cover moves reversely to reset to the first position; the roller brush rotates at a reduced speed in the first direction, the suction motor is turned off, and the liquid supply device of the cleaning device is in an on-state to prepare for subsequent cleaning.

In the twelfth embodiment according to the second aspect of the present disclosure, based on the eleventh embodiment, the subsequent cleaning process comprises: the roller brush and the suction motor operate synchronously and intermittently; in the synchronous intermittent operation, the roller brush rotates in the first direction, the rotation speed is in a high-speed state, and the suction motor is in a fourth-level power operation state; the suction motor has four-levels power operation states in the self-cleaning process of the cleaning device, the four-levels power operation states are set sequentially, and a power corresponding to a previous level is high; the fourth-level power operation state is the lowest level state of the four-levels power operation states.

In the thirteenth embodiment according to the second aspect of the present disclosure, based on the twelfth embodiment, the self-cleaning method of the cleaning device further comprises: in the synchronous intermittent operation, the roller brush and the suction motor are synchronously started for a preset time, and after the preset time of synchronous starting is completed, the roller brush continues to rotate in the first direction in a high-speed state, and the suction motor increases power to work.

In the fourteenth embodiment according to the second aspect of the present disclosure, based on the thirteenth embodiment, increasing the power of the suction motor comprises: increasing the power of the suction motor to work in a first-level power operation state.

In the fifteenth embodiment according to the second aspect of the present disclosure, based on the thirteenth embodiment, the self-cleaning method of the cleaning device further comprises: after stopping the rotation of the roller brush in the first direction in a high-speed state, the roller brush alternately rotates in the second direction and the first direction in the low-speed state; wherein in the process that the roller brush alternately rotates in the low-speed state, the suction motor is continuously in a first-level power operation state.

In the sixteenth embodiment according to the second aspect of the present disclosure, based on the fifteenth embodiment, the self-cleaning method of the cleaning device further comprises: rotating the roller brush in the second direction in a low-speed state is rotating the roller brush by an angle in the second direction in a low-speed state, wherein the angle is greater than 90° and less than 180°.

In the seventeenth embodiment according to the second aspect of the present disclosure, based on the fifteenth embodiment, the self-cleaning method of the cleaning device further comprises: after stopping the alternate rotation of the roller brush, the roller brush cover moves from a first position to a second position, so that the roller brush cover is in contact with the roller brush or a contact area between the roller brush cover and the roller brush is increased; and the roller brush rotates in the first direction in a high-speed state, the suction motor is in a first-level power operation state, and the liquid supply device is in an on-state.

In the eighteenth embodiment according to the second aspect of the present disclosure, based on the seventeenth embodiment, the self-cleaning method of the cleaning device further comprises: the roller brush cover moves reversely to reset to the first position; the sterilizing device of the cleaning device starts to operate, the liquid supply device is turned off, the roller brush rotates in the first direction in a high-speed state, and the suction motor operates.

In the nineteenth embodiment according to the second aspect of the present disclosure, based on the eighteenth embodiment, the self-cleaning method of the cleaning device further comprises: in the drying and/or sterilizing stage, during a time period in which the roller brush rotates by a set acute angle in the second direction at least once, the suction motor is in a dynamically changing operation state of gradually downshifting from the first-level power.

The twentieth embodiment according to the second aspect of the present disclosure provides a self-cleaning method of a cleaning device. The cleaning device comprises a roller brush, a roller brush cover and a suction motor; the method comprises: moving the roller brush cover from a first position to a second position, so that the roller brush cover is in contact with the roller brush or a contact area between the roller brush cover and the roller brush is increased; rotating the roller brush in the first direction, wherein the suction motor is in an operation state.

In the twenty-first embodiment according to the second aspect of the present disclosure, based on the twentieth embodiment, before the roller brush cover moves, the roller brush rotates in the first direction.

In the twenty-second embodiment according to the second aspect of the present disclosure, based on the twentieth embodiment, before the roller brush cover moves, the roller brush rotates in the first direction while the suction motor is in a operation state.

In the twenty-third embodiment according to the second aspect of the present disclosure, based on the twentieth embodiment, the cleaning device comprises a liquid supply device, the liquid supply device is configured to supply a cleaning solution used during the self-cleaning of the cleaning device; after changing an operation state or an operation parameter of at least one of the roller brush, the liquid supply device and the suction motor, the roller brush cover moves reversely to reset to the first position; wherein, changing an operation state or an operation parameter of at least one of the roller brush, the liquid supply device and the suction motor includes at least one of the following: stopping the rotation of the roller brush, changing a rotation speed of the roller brush, changing a rotating direction of the roller brush, starting the operation of the liquid supply device, stopping the operation of the liquid supply device, turning off the suction motor, and changing the working power of the suction motor.

In the twenty-fourth embodiment according to the second aspect of the present disclosure, based on any one of the twenty-first and twenty-third embodiments, the self-cleaning process of the cleaning device comprises a soaking stage, a cleaning stage, and a sterilizing and/or drying stage; the method further comprises: triggering the roller brush cover to move from a first position to a second position after the soaking stage ends or the cleaning stage starts; and/or, triggering the roller brush cover to move from the first position to the second position after the cleaning stage or before the sterilizing and/or drying stage.

The twenty-fifth embodiment according to the second aspect of the present disclosure provides a self-cleaning method of a cleaning device. The method comprises:

- during the sterilizing and/or drying stage of the cleaning device, the roller brush rotates by a set acute angle in the second direction at least once, and the cleaning solution for self-cleaning of the cleaning device is in an off-state;
- wherein, when the cleaning device operates, the roller brush rotates in the first direction; the first and second directions are different.

In the twenty-sixth embodiment according to the second aspect of the present disclosure, based on the twenty-fifth embodiment, the roller brush rotates by an acute angle in the second direction each time; and each rotating angle is the same, or the rotating angle is gradually increased or decreased.

In the twenty-seventh embodiment according to the second aspect of the present disclosure, based on the twenty-fifth embodiment, the roller brush has at least two rotation speed states in the self-cleaning process; the at least two rotation speed states are divided into a high-speed state and a low-speed state according to speed; the roller brush rotates in the second direction in the low-speed state.

In the twenty-eighth embodiment according to the second aspect of the present disclosure, based on the twenty-fifth embodiment, in the sterilizing and/or drying stage of the cleaning device, the roller brush of the cleaning device rotates intermittently by an acute angle for a preset number of times in the second direction, and meanwhile, the suction motor of the cleaning device is in an operation state.

In the twenty-ninth embodiment according to the second aspect of the present disclosure, based on the twenty-eighth embodiment, the suction motor has at least two-levels power operation states, the at least two-levels power operation states are set sequentially, and a power corresponding to a previous level is high; the first-level power operation state is the highest level state of the at least two-levels power operation states; in the sterilizing and/or drying stage of the cleaning device, the suction motor is in an operation state, comprises: the suction motor is in a dynamically changing operation state of gradually downshifting from the first-level power.

The thirtieth embodiment according to the second aspect of the present disclosure provides a self-cleaning method of a cleaning device. The method comprises:

- outputting a cleaning solution;
- rotating the roller brush of the cleaning device in the second direction for no more than one circle to apply the cleaning solution on the roller brush;
- wherein, when the cleaning device operates, the roller brush rotates in the first direction;
- the second and first directions are different.

The thirty-first embodiment according to the second aspect of the present disclosure provides a self-cleaning method of a cleaning device. The cleaning device comprises a roller brush and a roller brush cover, accordingly, the method comprises:

- moving the roller brush cover to contact the roller brush;
- rotating the roller brush in a first direction after the roller brush cover is in contact with the roller brush;
- moving reversely the roller brush cover after the roller brush rotates at a reduced speed or stops to have a gap with the roller brush;
- when the roller brush cover and the roller brush have the gap, the roller brush alternately rotates in the second direction and in the first direction;
- wherein, the second and the first directions are different.

The thirty-second embodiment according to the second aspect of the present disclosure provides a cleaning device, comprising:

- a floor brush provided with a roller brush and a roller brush cover;
- a liquid storage tank configured to store a cleaning solution;
- a control device configured to perform steps in the self-cleaning method provided in any one of the foregoing first and nineteenth embodiments; steps in the self-cleaning method provided in any one of the foregoing twentieth and twenty-fourth embodiments; steps in the self-cleaning method provided in any one of the foregoing twenty-fifth and twenty-ninth embodiments; or steps in the self-cleaning method provided in any one of the foregoing thirtieth and thirty-first embodiments.

In the technical scheme provided by one embodiment according to the second aspect of the present disclosure, in the self-cleaning process of the cleaning device, after the roller brush rotates in the first direction, the roller brush rotates by a set acute angle in the second direction at least once, so that the dirt in the roller brush can be loosened, and the cleaning effect of the roller brush can be improved; in addition, the rotating angle of the roller brush in the second direction is controlled at an acute angle, so that water can be prevented from splashing out.

In the technical solution provided by another embodiment according to the second aspect of the present disclosure, after the roller brush cover moves to be in contact with the roller brush, the roller brush rotates in the first direction, the suction motor is in an operation state, and the roller brush cover can be cleaned by means of the roller brush.

In the technical solution provided by another embodiment according to the second aspect of the present disclosure, in the stage of the sterilizing and/or drying the cleaning device, the roller brush of the cleaning device may rotate by the set acute angle in the second direction at least once; adding the action of the roller brush rotates by the set acute angle in the second direction at least once helps to loosen the bristles of the roller brush, and the sterilizing and/or drying effect of the roller brush will be better.

According to the technical solution provided by another embodiment according to the second aspect of the present disclosure, the roller brush rotates in the first direction when the cleaning device operates, and the roller brush rotates in the reverse direction (namely rotates in the second direction) during self-cleaning, so that the roller brush can be loosened, the bristles of the roller brush are reverse fluffed, the dirt at the root part is easily to loosened, a good condition is provided for subsequent self-cleaning, and the self-cleaning effect of the roller brush is improved. In addition, in this embodiment of the present disclosure, that the roller brush rotates in the second direction for no more than one circle is to avoid splashing of cleaning solution and dirt as much as possible; if the dirt and the like left in the roller brush splashes out, it may splash to a position that cannot be self-cleaned by the roller brush, resulting in unnecessary cleaning trouble.

According to the technical solution provided by another embodiment according to the second aspect of the present disclosure, after the roller brush cover moves to be in contact with the roller brush, the roller brush rotates in the first direction, so that the roller brush cover can be cleaned; and after the roller brush rotates at a decreased speed or stops rotating, the roller brush cover moves reversely to have a gap with the roller brush, so as to play a protective role. If the roller brush is still rotating at high speed when the roller brush is supposed to move, dirt left in the roller brush may be thrown out due to the high-speed rotation, such as dirt with large particles may cause damage to the moving roller brush cover. After the roller brush cover has moved in place and a gap existed between the roller brush cover and the roller brush, the roller brush rotates alternately in the second direction and the first direction, so that the self-cleaning cleanness of the roller brush can be improved, the roller brush rotates forwardly and rotates reversely in the two directions alternately, the bristles of the roller brush are shifted back and forth, and dirt left at the roots of the bristles can be easily cleaned.

As shown in FIG. 24*a* to FIG. 30, before describing the method provided in another embodiment of the present disclosure, a hardware device for implementing the method provided in the present disclosure is first briefly described.

A hardware device that needs to be combined with the method provided in the present disclosure is a hardware device that is specially set and that serves a specific field, for example the cleaning device described in the background. The cleaning device may be, but is not limited to, a hand-held scrubber, an intelligent mopping and sucking integrated robot, an intelligent floor washing system with a base station, and the like. The structures of the cleaning members on different types of cleaning devices may be different. For example, in some embodiments provided in the present disclosure, the cleaning device may be a hand-held scrubber shown in FIG. 24*a*, and the cleaning member is a roller brush. If the cleaning device is an intelligent mopping and sucking integrated robot, the cleaning member may be a cleaning wipe disposed at the bottom of the robot.

Figure 24A:
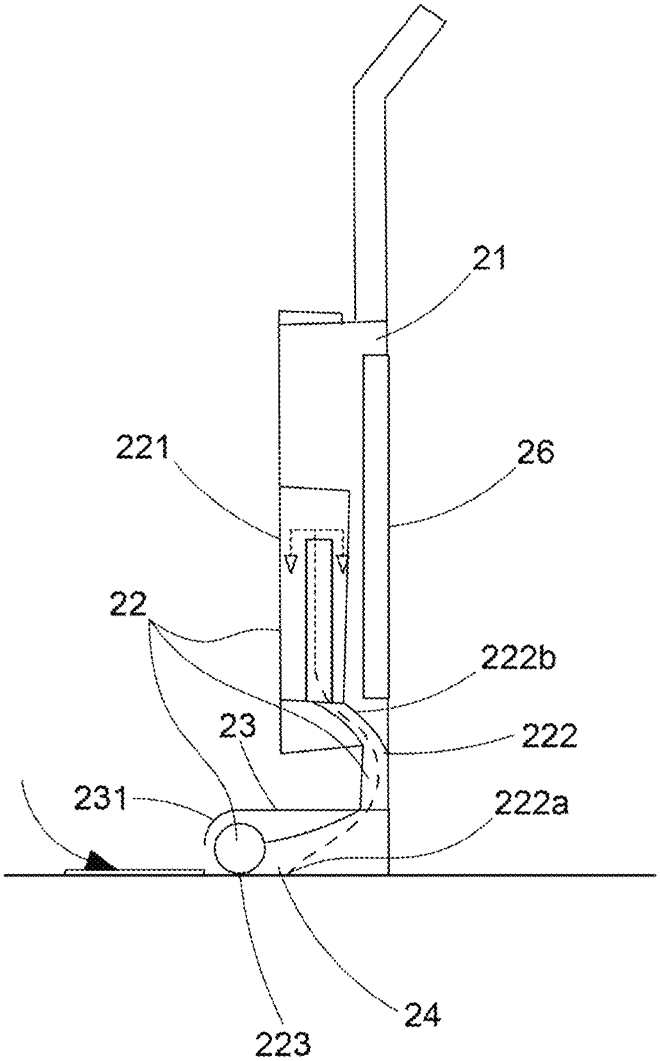
FIG. 24*a* is a schematic structural diagram of the cleaning device according to one embodiment of the present disclosure.

FIG. 24*a* is a schematic structural diagram of the cleaning device according to one embodiment of the present disclosure. As shown in FIG. 24*a*, the cleaning device 21 may include a cleaning assembly 22, a working assembly (not shown) and a control device (not shown). Here, the cleaning assembly 22 is configured to serve as an object to be self-cleaned when the cleaning device operates in the self-cleaning mode, and serve as a cleaning execution member when the cleaning device works in the normal cleaning mode. If the "normal cleaning mode" is understood as a mode of cleaning a floor, a tabletop, a wall, a window, or the like outside the cleaning device, the "self-cleaning mode" is a mode of cleaning a component (such as a roller brush or a pipe) inside the cleaning device.

For example, the cleaning assembly 22 may include, but is not limited to, a rag, a roller brush 223, a pipe 222, a recycling bucket 221, a roller brush cover 231, a roller brush cavity, and the like. The cleaning device comprises a floor brush 23, and the floor brush 23 is provided with a roller brush 223, a roller brush cover 231 and a suction opening 24. One end 222*a* of the pipe 222 communicates with the suction port 24, and the other end 222*b* communicates with the recycling bucket 221. The roller brush cover 231 is disposed above the roller brush 223. The roller brush cover 231 is movable relative to the roller brush 223. In a possible embodiment, a servo (not shown in FIG. 24*a*) is disposed on the floor brush 23. The servo outputs power to drive the roller brush cover 231 to move to be in contact with the roller brush 223; and the servo may also drive the roller brush cover 231 to move reversely to have a gap with the roller brush 223. When the cleaning device is in operation (i.e., in the normal cleaning mode), the roller brush cover 231 has a gap with the roller brush 223 and is not in contact with the roller brush cover 231.

The working assembly may include, but is not limited to, a roller brush driving device (also referred to as a roller brush motor, hereinafter referred to as a roller brush motor), a suction motor that generates a suction force, a fluid supply device (such as a water pump or a valve) that outputs a cleaning solution, and the like. The working assembly is used as a self-cleaning workload to clean the object to be self-cleaned when the cleaning device operates in the self-cleaning mode. When the cleaning device operates in the normal cleaning mode, the cleaning device and the cleaning execution member serve as a normal cleaning workload to clean the surface to be cleaned. The control device is connected with the working assembly and used for controlling at least components in the working assembly to work, so that the cleaning device operates in the self-cleaning mode or the normal cleaning mode.

Specifically, in the cleaning device with the structure shown in FIG. 24*a*, the cleaning device comprises a floor brush 23 and a body. The floor brush 23 is disposed on the body. The body may be provided with, but not limited to, a clean water bucket 26, a recycling bucket 221, a pipe 222, and the like. The first end 222*a* of the pipe 222 communicates with the suction port 24 on the floor brush 23, and the second end 222*b* communicates with the recycling bucket 221. The floor brush 23 is provided with a suction port 24, and the suction port 24 can suck dirt or dirty liquid on a surface to be cleaned (such as a floor surface, a tabletop, a carpet, etc.) and enter the recycling bucket 221 through the pipe 222. The pipe 222 may be a columnar pipe, and the cross section of the pipe 222 may be any shape such as circular, semicircular, elliptical, square, and multi-deformation, which is not limited herein. The roller brush 223 on the floor brush 23 may rotate to clean the surface to be cleaned. From the foregoing, in the cleaning device embodiment shown in FIG. 24*a*, the cleaning assembly may include: a roller brush 223, a pipe 222, a recycling bucket 221, and the like. Correspondingly, the working assembly may include one or more following elements not shown in the figure: a roller brush motor, a suction motor for generating a suction force, a fluid supply device (such as a water pump or a valve) for delivering cleaning solution from the cleaning bucket 26 to the roller brush 223 and/or the surface to be cleaned, and the like.

Further, the cleaning device provided in this embodiment may further include a preparation device (not shown in FIG. 24*a*), and the preparation device is configured to prepare a degerming solution. The prepared degerming solution can be contained in the clean water bucket 26. During specific implementation, the preparation device can prepare the degerming solution in various ways, in one specific embodiment, a degerming solution preparation agent is disposed in a preparation device, and the degerming solution preparation agent is continuously released into the cleaning solution through the degerming solution preparation device, so that the cleaning device can prepare the degerming agent; or the preparation device can be an electrolyte preparation device, an electrode is disposed in the cleaning solution, and then the degerming solution is generated by electrolyzing the cleaning solution. The degerming solution may be prepared before the self-cleaning process of the cleaning device starts, or may be prepared in some stages in the whole self-cleaning process, which is not limited herein.

Further, referring to FIG. 24*a*, the roller brush 223 is received in the roller brush cavity. When cleaning the surface to be cleaned, the roller brush 223 may be polluted with wastewater and impurities, and because of the rotation of the roller brush, there may be wastewater droplets or small impurities splashing to the cavity wall of the roller brush cavity. In the self-cleaning mode of the cleaning device, when the cleaning solution output by the fluid supply device reaches a certain amount to form accumulated liquid, a large amount of accumulated liquid can generate a relatively severe fluid flow effect under the action of dynamically changing suction force generated by the suction motor, and the cavity wall of the roller brush cavity can be cleaned while the roller brush and pipe are cleaned.

In addition, the degerming solution prepared by the preparation device in this embodiment can be used as a cleaning solution used in the self-cleaning process of the cleaning device, or can be used only on a self-cleaning object (such as a roller brush or a pipe) after self-cleaning, i.e. clean water in a clean water bucket is used in the self-cleaning process, and the degerming solution prepared by the preparation device after cleaning of the object to be self-cleaned is sprayed into the roller brush or the suction pipe for disinfection.

Further, the cleaning device may further include a sterilizing device, and the sterilizing device may be a UV lamp or the like. The sterilizing device may be disposed on a roller brush cover, a roller brush cavity wall, a pipe wall of a pipe, and the like, which is not limited in this embodiment. The cleaning device may further include a battery, the battery is a rechargeable battery, and the battery may be connected to a charger or connected to a base station fitted with the cleaning device for charging when the battery level is low.

Figure 24B:
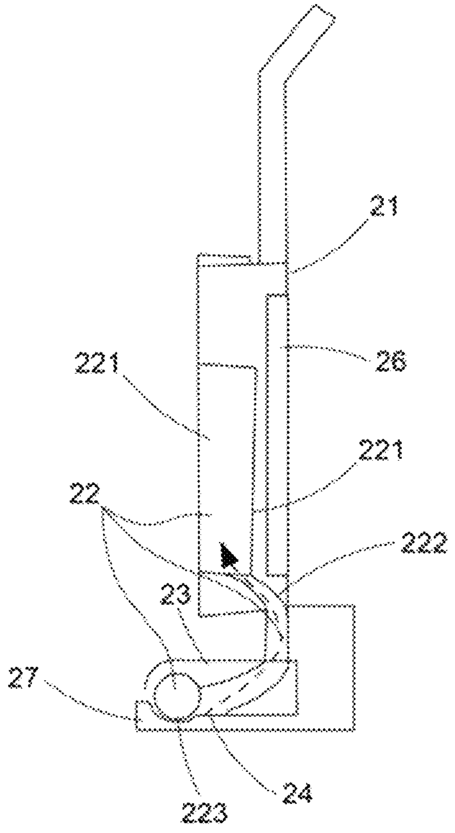
FIG. 24*b* is a schematic structural diagram of the cleaning device according to one embodiment of this application.

The fluid supply device may be configured to feed a cleaning solution (e.g., clean water or a degerming solution), for example, deliver the cleaning solution to the roller brush. The cleaning solution output by the fluid device may be clean water, or may be a cleaning solution mixed with a degerming agent, or may be a degerming solution obtained by electrolysis, which is not limited in this embodiment. If the liquid is to be formed, the amount of the liquid is controlled by the control device. Generally, the cleaning device is located in or placed on the base station during self-cleaning. For example, in a hand-held floor scrubber, a user places the floor scrubber on a base station (which may be referred to as a dock), a charging interface of the floor scrubber is electrically connected to an electrical connection end of the base station, and the base station may charge the floor scrubber, as shown in FIG. 24*b*. For another example, the cleaning robot autonomously travels to the base station and then is docked with the base station, and after the docking is completed, the electrical connection end on the base station is electrically connected to the charging interface on the cleaning robot.

FIG. 24*b* is a schematic structural diagram of the cleaning system according to another embodiment of the present disclosure. As shown in FIG. 24*b*, the cleaning system comprises a cleaning device 21 and a base station 27. The cleaning device 21 can be placed on the base station 27. For a specific description of the cleaning device 21, refer to the foregoing related content. A structural form of the base station can be a base shown in FIG. 24*b*, or can be a docking station having a docking compartment.

After the cleaning device 21 is placed on the base station 27, a charging interface of the cleaning device 21 is electrically connected to a power interface on the base station 27, and the base station 27 can charge a battery of the cleaning device. In the self-cleaning mode of the cleaning device, the battery may be in a discharging state to provide electric energy for the cleaning device; or in some periods or stages of self-cleaning, the battery is in a charging state; in some other periods or stages of self-cleaning, the battery is in a discharging state; or in the whole self-cleaning process, the battery is in a charging state, a power interface on the base station 27 provides some power to charge the battery, and the other power provides electric energy for the cleaning device to perform a self-cleaning task.

It should be additionally noted herein that: in a narrow sense, the pipe 222 described above does not include the pipe in the recycling bucket as shown in FIG. 1*c* (that is, the pipe shown by a dashed line segment); and in a broad sense, the pipe 222 may also include the pipe within the recycling bucket 221. As shown in FIG. 24*a*, the pipe in the recycling bucket 221 extends upward from the bottom of the recycling bucket 221, is sucked into the pipe in the recycling bucket

221, and then flows out from the top of the pipe in the recycling bucket 221 and enters the recycling bucket 221.

The self-cleaning method of the cleaning device will be described in detail below by referring to the method embodiments.

Figure 25:
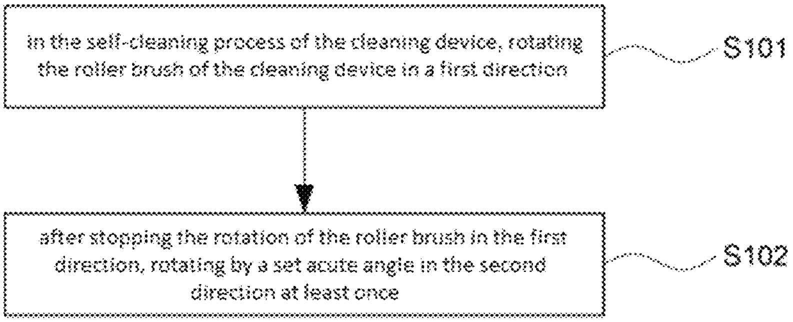
FIG. 25 is a schematic flowchart of the self-cleaning method according to the first embodiment of the present disclosure.

FIG. 25 is a schematic flowchart of a self-cleaning method of a cleaning device according to an embodiment of the present disclosure. The execution body of the method provided in this embodiment may be a cleaning device, and more specifically, may be a control device of the cleaning device. As shown in FIG. 25, the method comprises:

S101: in the self-cleaning process of the cleaning device, rotating the roller brush of the cleaning device in a first direction;

S102: after stopping the rotation of the roller brush in the first direction, rotating by a set acute angle in the second direction at least once;

wherein, the second and the first directions are different.

Figure 27A:
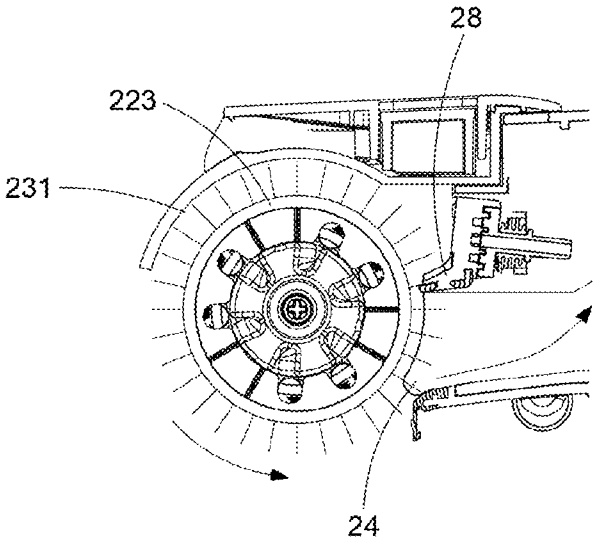
FIG. 27*a* is a schematic diagram of the roller brush of the cleaning device rotating in the first direction according to one embodiment of the present disclosure.

When the cleaning device operates (that is, performs a cleaning task), the roller brush rotates in the first direction, as shown in FIG. 27*a*, in a counterclockwise direction corresponding to the viewing angle. The second direction is a clockwise direction corresponding to the viewing angle shown in FIG. 27*b*.

The set acute angle may be any value of 30° to 90°, for example, the set acute angle may be 60° or 30°. According to the technical scheme provided by an embodiment of the present disclosure, in the self-cleaning process of the cleaning device, after the roller brush rotates in the first direction, the roller brush rotates by a set acute angle in the second direction, so that the dirt in the roller brush can be loosened, and the cleaning effect of the roller brush can be improved; in addition, the rotating angle of the roller brush in the second direction is an acute angle, so that water is prevented from splashing out.

In some embodiments, the roller brush may be rotated in the second direction by a set angle twice, three times, or the like. The time interval for each rotation of the roller brush in the second direction may be equal or unequal. For example, every interval of 1 s, 0.6 s or 0.3 s, the roller brush rotates by a set angle once in the second direction. Alternatively, after the roller brush rotates for the first time by the set angle, the roller brush rotates for the second time by the set angle in the second direction at the interval of 1 s, and the roller brush rotates for the third time by the set angle in the second direction at the interval of 0.6 s.

Here, the roller brush rotates for multiple times in the second direction, so that the problem of idle stroke caused by the transmission clearance of the transmission mechanism in the process of turning from the first direction to the second direction can be eliminated.

The self-cleaning process of the cleaning device may include, but is not limited to a roller brush soaking stage, a cleaning stage, a sterilizing and/or drying stage and the like. Here, the cleaning stage may include, but is not limited to a preliminary cleaning sub-stage, a roller brush soaking sub-stage, a pipe cleaning sub-stage, a deep cleaning sub-stage, and the like. The cleaning device may further have a sterilizing process, a drying process, or the like, or the sterilizing and drying are carried out simultaneously, that is, the self-cleaning process of the cleaning device may further include a sterilizing and/or drying stage.

The above steps S101 and S102 may be steps in the roller brush soaking stage or steps in the sterilizing and/or drying stage. The number of times A that the roller brush rotates by the set angle in the second direction in the roller brush soaking stage may be different from the number of times B that the roller brush rotates by the set angle in the second direction in the sterilizing and/or drying stage. In an example below, the number of times A is 2 in the roller brush soaking stage and the number of times B is 6 in the sterilizing and/or drying stage. In this embodiment, the values of the number of times A and B are not limited, and can be determined based on a specific situation.

If the foregoing steps S101 and S102 are steps in the roller brush soaking stage, at this stage the rotation speeds of the roller brush in the first direction and the second direction are the same. For example, in order to make the soaking of the roller brush more sufficiently, the rotation speeds of the roller brush in the first direction and the second direction may both be low speeds, such as any value between 100 to 200 rpm, such as 150 rpm.

Figure 27B:
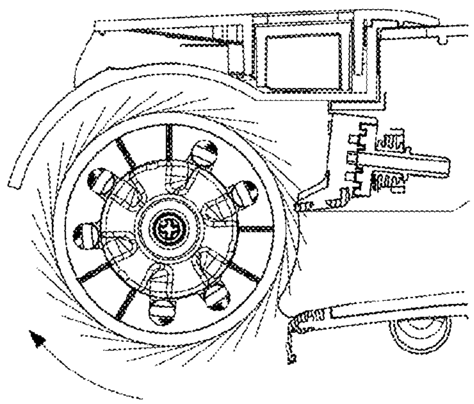
FIG. 27*b* is a schematic diagram of the roller brush of the cleaning device rotating in the second direction according to one embodiment of the present disclosure.

If the foregoing steps S101 and S102 are steps in the sterilizing and/or drying stage, in this stage, the roller brush rotates in the first direction at a first rotation speed, and the roller brush rotates in the second direction at a second rotation speed; the first rotation speed is higher than the second rotation speed. For example, the first rotation speed may be any value between 400 to 500 rpm. The second rotation speed may be any value between 100 to 200 rpm. In a specific embodiment, the first rotation speed may be 450 rpm, and the second rotation speed may be 150 rpm. The roller brush rotates at a high speed in the first direction, and can clean the roller brush itself under the combined action of the cleaning solution; in addition, the roller brush can also rotate at a high speed in the first direction to clean other components (such as the pipe, suction port, roller brush cavity and the like) of the cleaning device. The roller brush rotates at a low-speed in the second direction to prevent splashing of the liquid. Because the roller brush rotates in the first direction when the cleaning device operates, referring to FIG. 27*a*, the dirt moves toward the suction port 24 under the action of the roller brush 223, and the high-speed rotation of the roller brush 223 in the first direction does not cause dirt to splash. Referring to FIG. 27*b*, when the roller brush rotates in the second direction, the rotation of the roller brush 223 has an acting force of throwing the dirt outward (that is, in the direction away from the suction port), and if the rotation speed of the roller brush 223 is high, splashing will be caused.

Of course, if the self-cleaning of the cleaning device is the case that the cleaning device needs to be cleaned due to dirt during the task, the roller brush of the cleaning device does not need to be too dry, and at this time, in the sterilizing and/or drying stage, the first rotation speed of the roller brush rotating in the first direction may be equal to the second rotation speed of the roller brush rotating in the second direction. For example, the first rotation speed and the second rotation speed are both 150 rpm.

As described above, the roller brush has at least two rotation speed states during the self-cleaning process, such as the 450 rpm rotation speed state and the 150 rpm rotation speed state described above. Of course, in addition to the two rotation speed states, one, two or more rotation speed states may also be included, such as a 300 rpm rotation speed state, a 250 rpm rotation speed state, and the like. The rotation speed states included in the at least two rotation speed states are distinguished according to a speed level, including at least a highest high-speed state and a lowest low-speed state. A state between the high-speed state and the low-speed state is referred to as an intermediate speed state, a first intermediate speed state, a second intermediate speed state, and the like.

Correspondingly, in the roller brush soaking stage, each of the rotation speeds of the roller brush in the first and the second directions is a low-speed state. In the drying and/or sterilizing stage, the rotation speed of the roller brush in the first direction is a high-speed state, and the rotation speed of the roller brush in the second direction is a low-speed state.

Each of the embodiments herein is described using the roller brush having two states (i.e., a high-speed state and a low-speed state) as an example, and examples corresponding to the intermediate speed state are not exemplified, but it is not limited that the roller brush only has the two speed states in the solution provided by the embodiments of the present disclosure.

Figure 26:
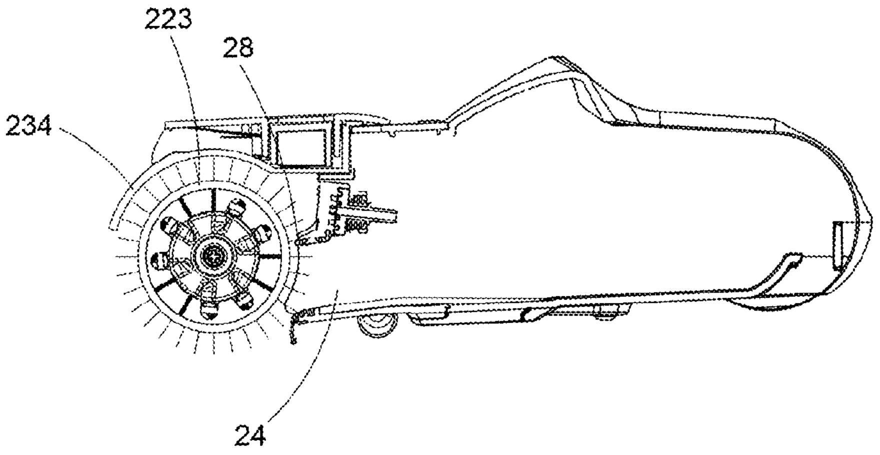
FIG. 26 is a schematic structural diagram of the floor brush of the cleaning device according to one embodiment of the present disclosure.

Referring to the floor brush example shown in FIG. 26, a scraper plate 28 is provided at the suction port. Ideally, the bristles of the roller brush 223 are in a fluffy state as shown in FIG. 26, rather than in a sideways state. FIG. 27*a* shows a state diagram of when the cleaning device operates (e.g., cleaning the floor). The roller brush rotates in a first direction (that is, in the counterclockwise direction indicated by an angle shown in FIG. 27*a*), and the bristles on the roller brush tilt toward one direction during rotation. When the cleaning device operates, liquid in a water tank on the cleaning device wets the roller brush, the roller brush rotates at a high speed in the first direction to clean dirt on the floor, the dirt adheres to bristles of the roller brush and is squeezed off by a scraper plate when passing through the scraper plate, and a suction motor sucks the squeezed dirt into a recycling bucket through a suction port and a pipe. Because the bristles of the roller brush tilt in one direction during operation (as shown in FIG. 27*a*), in this embodiment, an additional step is added, that is, the roller brush rotates in the second direction (that is, in the clockwise direction indicated by the angle shown in FIG. 27*b*), namely rotates in a direction opposite to the first direction. As shown in FIG. 27*b*, after the roller brush rotates in the second direction, the bristles tilting in one direction shown in FIG. 27*a* will stand up in the other direction. It can be seen that the rotation of the roller brush in the second direction can have the effect of making the bristles fluffy.

Further, the method provided in this embodiment may further include the following steps:

S103: in the roller brush soaking stage, when the roller brush rotates by a set acute angle in the second direction at least once, the suction motor of the cleaning device is in a first-level power operation state;

S104: in the drying and/or sterilizing stage, during a time period in which the roller brush rotates by a set acute angle in the second direction at least once, the suction motor is in a dynamically changing operation state of gradually downshifting from the first-level power;

wherein, the suction motor has at least two-levels power operation states during self-cleaning of the cleaning device, the at least two-levels power operation states are set sequentially, and a power corresponding to a previous level is high, the first-level power operation state is the highest level state of the at least two-levels power operation states.

It is assumed that the suction motor has four-levels power operation states, which are a first-level power operation state, a second level power operation state, a third level power operation state and a fourth-level power operation state. Here, the first-level power is 150 W; the second level power is 120 W; the third level power is 90 W; and the fourth-level power is 30 W. In step S104, "the suction motor is in a dynamically changing operation state of gradually downshifting from the first-level power" specifically means that:

from the first-level power to the fourth-level power, the suction motor is in a dynamically changing operation state, in which the suction motor is shifted down by one-level power at a time interval.

Here, the time interval can be 1 s, 2 s, 3 s or longer, which is not specifically limited in this embodiment.

It should be noted that the first-level power is less than the rated power of the suction motor. The first-level power may be equal to the operation power of the suction motor when the cleaning device performs a cleaning task, or may be slightly less than or slightly higher than the operation power of the suction motor. However, when the suction motor is in the first-level power operation state, dirt at the suction port of the cleaning device can be sucked into the recycling bucket of the cleaning device. The selection criterion of the first-level power is that: the maximum power of the main motor under normal use of the machine is not affected, wherein the larger the power, the better the wastewater suction effect; however, if the power is too large, under the existing solid-liquid separation level, the sucked wastewater may be sucked into the main motor due to too large suction force, resulting in damage to the main motor.

In an embodiment, the power of the suction motor of the cleaning device in the water absorption mode is greater than the power in the intelligent mode, and is generally the maximum power of the cleaning device when performing wet cleaning. Therefore, the first-level operation power of the suction motor may be set to the power in the water absorption mode. Alternatively, the first-level power is 1-1.2 times the power of the suction motor in a water absorption mode. In addition, depending on the type of the suction motor and the solid-liquid separation level of the cleaning device, the first-level power of the suction motor may be set within 120 W-200 W.

Further, the self-cleaning process of the cleaning device comprises a plurality of stages, and at least some of the plurality of stages include a forward/reverse rotation pause protection period. For example, a forward/reverse rotation pause protection period is included in the roller brush soaking stage. A forward/reverse rotation pause protection period is included in the cleaning stage. More specifically, for example, the deep cleaning sub-stage in the cleaning stage comprises a forward/reverse rotation pause protection period. The stage of drying and/or sterilizing the cleaning device may also include a forward/reverse rotation pause protection period. The method also comprises:

during the forward and reverse rotation pause protection period, the roller brush motor of the cleaning device stops, so that the roller brush stops the rotation in one direction to prepare to output power for rotating in another direction;

wherein during the forward and reverse rotation pause protection period, the fluid supply device of the cleaning device may be in an off-state to stop outputting the cleaning solution required for self-cleaning, and the suction motor may be continuously in an on-state without turning off.

Frequent start and stop of the suction motor is not good for the motor. Therefore, in the self-cleaning process, there is a short period of time in which the suction motor does not need to participate in operation, and the suction motor may be continuously in an on-state without turning off. During the self-cleaning process, such as the forward/reverse rotation pause protection period, the fluid supply device can be turned off, which saves water. Of course, if the problems of water consumption, accumulated water and the like are not considered, the fluid supply device may not be turned off and is continuously in an on-state.

It should be noted that when the cleaning device starts self-cleaning, it starts to output the cleaning solution. For example, the cleaning device may be provided with a water pump or a valve. After receiving the control instruction from the control device, the water pump or the valve is turned on to output the cleaning solution. In a more specific embodiment, the floor brush of the cleaning device is provided with a water spraying plate, the water spraying plate may be provided with one or more water spraying openings, and the output cleaning solution is sprayed to the roller brush through the water spraying openings on the water spraying plate. The water spraying plate can be disposed in the roller brush cavity, and the water spraying opening faces the roller brush; or the water spraying plate is disposed on the roller brush cover.

For example, when the cleaning device detects that the device stain level is greater than the set threshold during the task, the cleaning device returns to the base station to start the self-cleaning mode at the base station. Alternatively, after completing the cleaning task, the cleaning device is placed on the base station by the user, and the user triggers, through voice control or a control on the cleaning device, the cleaning device to start the self-cleaning mode. That is, the method provided in this embodiment of the present disclosure may further include the following step: outputting a cleaning solution.

Here, "outputting a cleaning solution" may include at least one of the following:

- outputting a cleaning solution after having monitored that the cleaning device is docked with the base station;
- outputting a cleaning solution in response to a user instruction;

The cleaning device outputs the cleaning solution when its self-cleaning process enters a setting stage, a setting sub-stage or a setting period of the setting sub-stage.

What needs to be supplemented here is: in relation to a plurality of stages involved in the self-cleaning process of the cleaning device, the operation states of the roller brush, the suction motor, the cleaning solution, the servo, the sterilizing device, the battery and the like in each stage, as well as the setting stage, the setting sub-stage and the setting period (such as the forward and reverse rotation pause protection period) mentioned above, which will be described below through a more specific embodiment in conjunction with a table.

The following describes, by using an example in which the foregoing steps S101 and S102 are steps in the roller brush soaking stage, steps further included in the method provided in this embodiment of the present disclosure. That is, the roller brush rotates in the first direction, after stopping the rotation of the roller brush in the first direction, the roller brush rotates in the second direction by a set acute angle, and after the roller brush soaking stage is completed, the method further comprises:

- S105: rotating the roller brush in the first direction while the suction motor is in a first-level power operation state;
- S106: moving the roller brush cover of the cleaning device from the first position to the second position at a moment during the rotation of the roller brush in the first direction to increase a contact area with the roller brush.

After the roller brush soaking stage is completed, a preliminary cleaning sub-stage as mentioned above may be entered.

During specific implementation, when step S102 is performed, the roller brush motor outputs a power for rotating in the second direction, a forward and reverse rotation pause protection period can be added before step S105. That is, the step corresponding to the forward and reverse pause protection period is added between step S102 and step S105.

In the above step S106, the control device may send a contact instruction to the servo, so that the servo drives the roller brush cover to move to contact the roller brush. A moment during which the roller brush rotates in the first direction can be a moment in the total duration, or a period of time which is equal to ⅕ of the total duration. It is assumed that the preliminary cleaning sub-stage is 10 s, that is, the total duration of the roller brush rotating in the first direction is 10 s. Correspondingly, at time 5 s or 2 s after the start of the preliminary cleaning sub-stage, the servo drives the roller brush cover to move to increase the contact area with the roller brush. When the roller brush cover moves, the roller brush cover is attached to the roller brush, and the contact area between the roller brush cover and the roller brush exceeds a certain range, for example, 90% or more.

The roller brush cover moves at a moment when the roller brush rotates in the first direction, because it is found in a test that when the roller brush is in static state, the roller brush cover is in contact with the roller brush and presses some dirt against the inner surface of the roller brush cover, so that before the roller brush cover is in contact with the roller brush, the roller brush keeps rotating for a period of time, and the dirt can be effectively prevented from being pressed; and meanwhile, the suction motor works at a high power (namely, a first-level power operation state), so that the dirt can be sucked away, and the dirt can also be prevented from being pressed. Most of the dirt is sucked away, the roller brush cover is in contact with the roller brush, the roller brush rotates to achieve the effect of cleaning the roller brush cover, and the cleaning effect is good.

Further, in step S105, the roller brush may rotate in the first direction at a high speed, for example, the roller brush rotates in the first direction at a speed of 450 rpm.

The rotation speed of the roller brush rotating in the first direction when the roller brush cover is in contact with the roller brush is higher than the rotation speed of the roller brush rotating in the first direction when the roller brush is soaked. For example, when the roller brush cover is in contact with the roller brush, the rotation speed of the roller brush in the first direction may be any value between 400 rpm and 500 rpm. For uniform soaking during the roller brush soaking stage, the rotation speed of the roller brush in the first direction may be any value between 100 rpm and 200 rpm.

When the roller brush cover is in contact with the roller brush, the roller brush rotates to clean the roller brush cover. In addition to cleaning the roller brush cover, the rotation of the roller brush and the suction of the suction motor enable the cleaning solution to flow, so as to clean the suction port, the pipe, the roller brush cavity, the roller brush and the like of the cleaning device. The stage of cleaning the roller brush cover, the suction port, the pipe, the roller brush cavity, the roller brush and the like may correspond to the preliminary cleaning sub-stage in the cleaning stage mentioned above.

That is, the preliminary cleaning sub-stage in this embodiment may include the above steps S105 and S106. During the preliminary cleaning sub-stage, the water supply device can always be in an off-state, and the output of the cleaning solution is stopped here, because some cleaning solution is output in the roller brush soaking stage, such cleaning solution forms accumulated water, and the cleaning solution does not need to be continuously output after being used enough in the preliminary cleaning stage. Of course, if the amount of accumulated water that can be accommodated by the base station is enough large, the output of the cleaning solution need not to be stopped during the movement of the roller brush cover.

The method provided in the embodiment also comprises:

S107: moving the roller brush cover reversely to reset to the first position;

S108: rotating the roller brush at a reduced speed in the first direction, turning the suction motor off, and switching the liquid supply device of the cleaning device to an on-state to prepare for subsequent cleaning.

Before step S108, that is, in the above step S105, the roller brush rotates in the first direction at a high speed. Here, the roller brush rotates in the first direction at a reduced speed, and the reduced speed may be a speed in the low-speed state, such as 150 rpm.

In S107, the control device may send a separation instruction to the servo, so that the servo drives the roller brush cover to move reversely to have a gap with the roller brush. Or the control device sends an end instruction to the servo, after the servo is turned off, the roller brush cover is provided with an automatic reset mechanism, and the roller brush cover is automatically reset to a position with a gap with the roller brush. Since there is almost no water accumulated in the preliminary cleaning sub-stage, the water content on the roller brush is also reduced. At this time, cleaning solution needs to be output to soak the roller brush. In order to soak more uniformly, the roller brush rotates in the first direction at a reduced speed. The above steps S107 and S108 may correspond to the roller brush soaking sub-stage in the cleaning stage mentioned above.

Further, the subsequent cleaning process mentioned above may be the following step:

S109: in a state where there is a gap between the roller brush cover and the roller brush, operating synchronously and intermittently the roller brush and the suction motor;

wherein, in the synchronous and intermittent operation, the roller brush rotates in the first direction and in the high-speed state, while the suction motor is in a fourth-level power operation state. The suction motor has four-levels power operation states in the self-cleaning process of the cleaning device, the four-levels power operation states are set sequentially, and a power corresponding to a previous level is high; the fourth-level power operation state is the lowest level state of the four-levels power operation states.

As mentioned above, the first-level power is the highest level power, when the suction motor is in the first-level power operation state, dirt at the suction port of the cleaning device can be sucked into the recycling bucket. Here, the fourth-level power is in the lowest level power state, the suction motor is in the fourth-level power operation state, and the cleaning solution can enter the second end of the pipe through the suction port. The first end of the pipe is communicated with the suction port, and the second end of the pipe can be communicated with the recycling bucket. The cleaning solution rises to the second end from the suction port, after the suction motor is turned off, the cleaning solution falls to the suction port or the first end of the pipe and the like, the output of the cleaning solution is started and stopped intermittently, and thus the cleaning solution goes up and down in the pipe, and the function of flushing the pipe is achieved, so that the dirt on the pipe wall is cleaned off.

In synchronous and intermittent operation, the rotation speed of the roller brush in the first direction may be any value between 400 rpm and 500 rpm, such as 450 rpm. When the roller brush is soaked, the rotation speed of the roller brush in the first direction may be any value between 100 rpm and 200 rpm, such as 150 rpm.

The above step S109 may be performed after the roller brush soaking sub-stage. In a specific implementable solution, the duration corresponding to the roller brush soaking sub-stage may be any time between 10 s and 25 s, such as 15 s.

The synchronous and intermittent operation is that the roller brush and the suction motor are started and stopped synchronously. For example, the roller brush and the suction motor are synchronously started to operate for a first duration (such as 1 s or 2 s), and synchronously stopped for a third duration (such as 1 s or 2 s), and synchronously started to operate for a first duration, and synchronously stopped for a third duration, and so on. Here, the first duration and the third duration may be equal or unequal. The values of the first duration and the third duration are not specifically limited in this embodiment, and may be determined with reference to actual product design requirements. During specific implementation, a numerical value, such as 4, 5, or 6 and the like, may be preset as a stop determining condition for the synchronous and intermittent operation. The value is a preset number of times in the following steps. That is, the method provided in this embodiment may further include the following steps:

S110: in the synchronous and intermittent operation, starting the roller brush and the suction motor synchronously for a preset time, and after the preset time of synchronous starting is completed, continuing to rotate the roller brush in the first direction in a high-speed state for a second duration, and increasing the operation power of the suction motor.

During specific implementation, the step of recording the number of synchronous starting times may also be increased. That is, the method provided in this embodiment may further include: recording the number of synchronous starting times of the roller brush and the suction motor during the synchronous and intermittent operation.

It is assumed that the preset number is 4. The roller brush and the suction motor are synchronously started and recorded once for the first time, and the roller brush and the suction motor are stopped for 1 s after being started for 1 s; synchronously started and recorded for the second time, and the roller brush and the suction motor are stopped for 1 s after being started for 1 s; synchronously started and recorded for the third time, and the roller brush and the suction motor are stopped for 1 s after being started for 1 s; synchronously started and recorded for the fourth time, at the moment, it is determined that the roller brush and the suction motor are started for a preset time (that is, the fourth time) and synchronously started, and after the roller brush and the suction motor are started for a first duration, the roller brush and the suction motor are not turned off, but rotate in the first direction for a second duration, and the suction motor increases the operation power for the second duration.

Here, increasing the power of the suction motor comprises increasing the power of the suction motor to operate in a first-level power operation state. The duration for which the suction motor continues to operate in the first-level power operation state may be any value between 3 s and 15 s, for example 5s. When the roller brush cover is in contact with the roller brush, the suction motor operates in a first-level power operation state. After the roller brush and the suction motor operates in a synchronous and intermittent mode, the state of the suction motor is switched to the first-level power operation state, and the dirt in the pipe, which is cleaned synchronously and intermittently, can be sucked into the recycling bucket.

Further, the method provided in this embodiment may further include:

in the roller brush soaking stage, the battery of the cleaning device is in a charging state; and/or in the roller brush soaking stage, before the roller brush cover is in contact with the roller brush, the battery is in a charging state; and/or during contact between the roller brush cover and the roller brush, the battery is in a discharging state; and/or during the synchronous and intermittent operation of the roller brush and the suction motor, the battery is in a charging state.

Further, the method provided in this embodiment may further include the following steps:

S111: after stopping the rotation of the roller brush in the first direction in a high-speed state, rotating the roller brush alternately in the second direction and the first direction in the low-speed state;

wherein in the process that the roller brush alternately rotates in the low-speed state, the suction motor is continuously in a first-level power operation state; during the stop period of the roller brush, the water supply device of the cleaning device is in an off-state; and during the rotation period of the roller brush in the low-speed state, the water supply device is in an on-state.

The above steps S109 and S110 may correspond to the pipe cleaning sub-stage in the cleaning stage. After the pipe cleaning sub-stage, the above step S111 may be performed, so as to perform the deep cleaning sub-stage of the cleaning stage. In the deep cleaning sub-stage, the roller brush may be cleaned by performing the above steps. The roller brush alternately rotates forwardly and reversely, so that the dirt left at the root of the bristles can be easily cleaned off. When cleaning the roller brush, the rotation speed of the roller brush may not be too high, for example 150 rpm.

In an embodiment, in a process in which the roller brush alternately rotates in the second direction and the first direction, rotating the roller brush in the second direction (that is, reversing) means that stopping the roller brush after rotating in the second direction by a certain angle, for example, stopping after rotating in the second direction by 130°. The purpose of reverse rotation is to loosen the dirt stuck on the scraper plate or the dirt stuck on the dirt suction port in a reverse rotation manner, and the dirt is sucked away by the large suction force of the suction motor as it is loosened. A rotation angle in the second direction is not specifically limited in this embodiment of the present disclosure, and the angle may not be a fixed value. Preferably, the rotation angle in the second direction is greater than 90° and less than 180°, when the rotation angle is less than 90°, the dirt loosening effect is poor, and when the rotation angle is greater than 180°, and the dirt may be thrown out of the base.

Figure 27C:
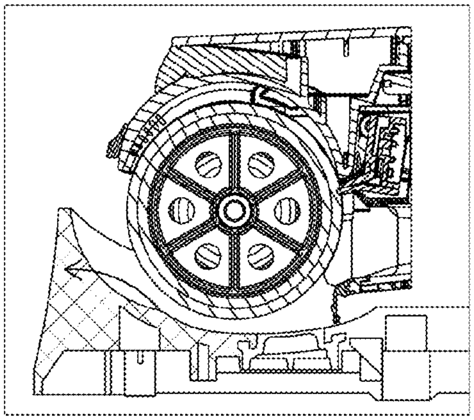
FIG. 27*c* is a schematic structural diagram of the base and the roller brush disposed on the base in the cleaning system according to one embodiment of the present disclosure.
Figure 27D:
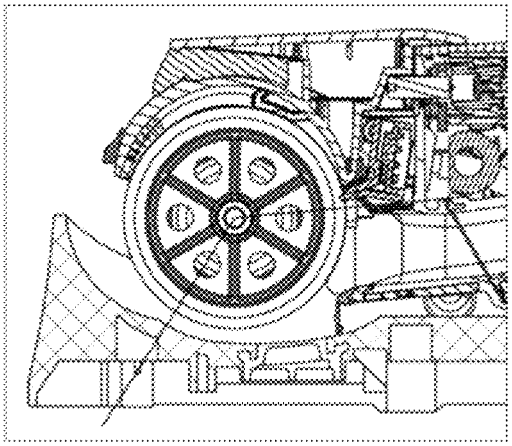
FIG. 27*d* is a schematic diagram of the angle range between the scraper plate on a base and the intersection point of two curved surfaces of the base according to one embodiment of the present disclosure.

For example, in the base example shown in FIG. 27*c*, in this example, the front curved surface of the base has two sections: when the dirt is left on the base or the dirt is left on the dirt suction port, when the roller brush rotates reversely (that is, rotates in the second direction), the dirt is stuck between the roller brush and the base, and the dirt is thrown out through friction. By adopting the two-section type design, the dirt loses support when passing through the critical point and performs parabolic motion in the direction of the tangent line (as shown by the arrow in FIG. 27*c*), and the intersection point of the tangent line at the critical point and the side wall of the front-end of the base is not higher than the highest point of the side wall of the front-end of the base, so that the dirt is prevented from being thrown out of the base. If the curved surface of the base and the roller brush are concentric circles, the dirt can be directly thrown out by the roller brush along the curved surface during the reverse rotation. As shown in FIG. 27*d*, the range of 130° is at the intersection point of the two curved surfaces from the position of the scrubber plate to the base, which not only ensures that dirt can be loosened to the greatest extent, but also prevents the loosened dirt from being thrown out of the base.

After rotating the roller brush alternately for cleaning, the roller brush cover and the water spraying plate can be cleaned. If the water spraying plate is disposed on the roller brush cover, the water spraying plate is cleaned when the roller brush cover is cleaned. That is, the method provided in this embodiment comprises one or more of the following steps:

S112: after stopping the alternate rotation of the roller brush, moving the roller brush cover from a first position to a second position to increase a contact area with the roller brush;

S113: rotating the roller brush in the first direction in a high-speed state, switching the suction motor to a first-level power operation state, and switching the water supply device to an on-state.

During specific implementation, the above steps S112 and S113 can be performed synchronously, that is, the roller brush rotates in the first direction at a high speed during the movement of the roller brush cover, the suction motor is in a first-level power operation state, and the water supply device is in an on-state.

Further, the method provided in this embodiment may further include the following steps:

S114: moving the roller brush cover reversely to reset to the first position;

S115: starting the sterilizing device of the cleaning device to operate, stopping the liquid supply device, rotating the roller brush in the first direction in a high-speed state, and operating the suction motor.

The above steps S112 and S113 may be the last steps of a deep cleaning sub-stage. That is, the deep cleaning sub-stage is completed after S112 and S113 are performed. After the deep cleaning sub-stage, the sterilizing and drying stage can be entered, i.e., the above steps S114 and S115. In the sterilizing and drying stage, the roller brush cover can be reset, namely, a gap is formed between the roller brush cover and the roller brush, the sterilizing device is started to operate, and the water supply device is stopped; meanwhile, the roller brush rotates in the first direction at a high-speed state, and the suction motor is in a first-level power operation state.

Steps S101 and S103 in this embodiment may be steps in the sterilizing and drying stage. That is, after step S115, steps S101 and S103 are performed.

Further, the method provided in this embodiment of the present disclosure may further include:

the battery of the cleaning device is in the charging state during alternating rotation of the roller brush; and/or the roller brush cover is in contact with the roller brush, which rotates in the first direction in a high-speed state, the suction motor is in a first-level power operation state, and the battery is in a discharging state during a period that the water supply device is in an on-state; and/or the battery is in a discharging state at an early stage of the operation of the sterilizing device; and/or the battery is in a charging state at a later stage of the operation of the sterilizing device.

The method provided in this embodiment will be described below with reference to two specific embodiments. Table 1 below is general process information for the self-cleaning method of the cleaning device.

TABLE 1 process information corresponding to the self-cleaning method of the cleaning device

| Duration | Stage | Preparation Device | Water Pump or Valve (58 s) | Roller Brush | Suction Motor | Servo | Sterilizing Device | Battery | Note | |
|---|---|---|---|---|---|---|---|---|---|---|
| 30 | Degerming Solution Preparation | on | off | off | off | off | off | Charging | Electrolytic Preparation of Degerming Solution | |
| 11 | (0-11 s) | on | on | 150 rpm Forward Rotation | off | off | | | Uniform Water Spreading | Roller Brush Soaking Stage |
| 1 | (11-12 s) | on | off | off | 150 W (First-Level Power) on | off | | | Forward and Reverse Rotation Pause Protection | |
| 1 | (12-13 s) | on | on | 150 rpm Reverse Rotation by 60° | 150 W (First Level Power) on | off | | | Loosing Dirt | |
| 1 | (13-14 s) | on | on | 150 rpm Reverse Rotation by 60° | 150 W (First Level Power) on | off | | | | |
| 1 | (14-15 s) | on | off | off | 150 W (First-Level Power) on | off | | | Forward and Reverse Rotation Pause Protection | |
| 2 | (15-17 s) | on | off | 450 rpm Forward Rotation | 150 W (First-Level Power) on | off | | | | Preliminary Cleaning Sub-Stage |
| 8 | (17-25 s) | on | off | 450 rpm Forward Rotation | 150 W (First-Level Power) on | on | | Discharging | Suction Port, Pipe, Cavity and Roller Brush Large Suction Flushing | |
| 15 | (25-40 s) | on | on | 150 rpm Forward Rotation | off | off | | Charging | Uniform Water Spreading | Roller Brush Soaking Sub-Stage |
| 1 | (40-41 s) | on | on | 450 rpm Forward Rotation | 30 w (Fourth-Level Power) on | off | | | Flushing Pipe | Pipe Cleaning Sub-Stage |
| 1 | (41-42 s) | on | on | off | off | off | | | | |
| 1 | (42-43 s) | on | on | 450 rpm Forward Rotation | 30 w (Fourth Level Power) on | off | | | | |
| 1 | (43-44 s) | on | on | off | off | off | | | | |
| 1 | (44-45 s) | on | on | 450 rpm Forward Rotation | 30 w (Fourth Level Power) on | off | | | | |
| 1 | (45-46 s) | on | on | off | off | off | | | | |
| 1 | (46-47 s) | on | on | 450 rpm Forward Rotation | 30 w (Fourth-Level Power) on | off | | | | |
| 5 | (47-52 s) | on | off | 450 rpm Forward Rotation | 150 w (First-Level Power) on | off | | | Large Suction Flushing | |
| 20 | (52-72 s) Repeat 5 times | on | off | off | 150 W (First-Level Power) on | off | | | Forward and Reverse Rotation Pause Protection | Deep Cleaning Sub-Stage |

TABLE 1-continued process information corresponding to the self-cleaning method of the cleaning device

| Duration | Stage | Preparation Device | Water Pump or Valve (58 s) | Roller Brush | Suction Motor | Servo | Sterilizing Device | Battery | Note | |
|---|---|---|---|---|---|---|---|---|---|---|
| | | on | on | 150 rpm Reverse Rotation | 150 W (First-Level Power) on | off | | | Reverse Rotation Cleaning the Roller Brush | |
| | | on | off | off | 150 W (First-Level Power) on | off | | | Forward and Reverse Rotation Pause Protection | |
| | | on | on | 150 rpm Forward Rotation | 150 W (First-Level Power) on | off | | | Forward Flushing the Water Spraying Plate | |
| 1 | (72-73 s) | on | off | off | 150 W (First-Level Power) on | on | | | Servo On Protection (this step can be omitted) | |
| 10 | (73-83 s) | on | on | 450 rpm Forward Rotation | 150 W (First-Level Power) on | on | | Discharging | Forward Flushing the Water Spraying Plate | |
| 60 | (83-143 s) | off | off | 450 rpm Forward Rotation | 150 W (First-Level Power) on | off | on | | Sterilizing Air Drying (1 min) | Sterilizing Drying Sub-Stage |
| 1 | (143-144 s) | off | off | off | 150 W (First-Level Power) on | off | | Charging | Forward and Reverse Rotation Pause Protection | |
| 1 | (144-145 s) | off | off | 150 rpm Reverse Rotation by 60° | 150 W (First-Level Power) on | off | | | Bristle Reverse Fluffing | |
| 1 | (145-146 s) | off | off | 150 rpm Reverse Rotation by 60° | 150 W (First-Level Power) on | off | | | | |
| 1 | (146-147 s) | off | off | 150 rpm Reverse Rotation by 60° | 120 W (Second Level Power) on | off | | | | |
| 1 | (147-148 s) | off | off | 150 rpm Reverse Rotation by 60° | 120 W (Second Level Power) on | off | | | | |
| 1 | (148-149 s) | off | off | 150 rpm Reverse Rotation by 60° | 90 W (Third Level Power) on | off | | | | |
| 1 | (149-150 s) | off | off | 150 rpm Reverse Rotation by 60° | 90W (Third Level Power) on | off | | | | |
| | Self-Cleaning Completion | off | off | off | off | off | | | | |

0-11 s correspond to the roller brush forward rotation; 11-12 s correspond to the forward rotation pause protection periods; the process of roller brush reverse rotation during 12-14 s may correspond to steps S101 and S102 in the foregoing embodiment. During above 14-15 s may also be a forward and reverse pause protection period. Actually, if the roller brush rotates reversely at a rotation speed of 150 rpm by 60° for a duration less than 1 s, that is, the roller brush rotates at 150 rpm by 60° in 1 s, and there is still enough time for the forward and reverse rotation pause protection requirement of the roller brush motor, and thus it does not need a forward and reverse rotation pause protection period corresponding to 14-15 s, and directly enters the forward rotation of 15-17 s. This also saves 1 s time. 15-25 s correspond to steps S105 and S106 in the foregoing embodiment. 20-40 s correspond to steps S107 and S108 in the foregoing embodiment. 40-47 s correspond to step S109 in the foregoing embodiment. 47-52 s correspond to step S110 in the foregoing embodiment. 52-72 s correspond to step S111 in the foregoing embodiment. 72-73 s can be omitted corresponding to the period of the servo on protection. Servo on protection: when the servo is started to drive the roller brush cover to move, the roller brush stops rotating because the rotation of the roller brush may affect the roller brush cover (such as dirty impact). 73-83 s correspond to steps S112 and S113 in the foregoing embodiment. 83-143 s correspond to steps S114 and S115 in the above embodiment, the sterilizing device is started to operate, and the water supply device is stopped; meanwhile, the roller brush rotates in the first direction at a high-speed state, and the suction motor is in a first-level power operation state. During 143-144 s may be a forward and reverse pause protection period. The above 144-150 s may correspond to steps S101 and S102 in the above embodiment, and after the roller brush rotates forwardly, the roller brush rotates by 60° for six times.

In another implementable technical solution, as shown in the examples of FIG. 27*c* and FIG. 4*d*, in the foregoing Table 1, "150 rpm Reverse Rotation" in the reverse rotation cleaning roller brush stage and in the stage of (52-72 s) repeat five times may be "150 rpm Reverse Rotation by 130°".

Here, it should be supplemented that, in each stage in the process shown in Table 1, the total self-cleaning duration of the cleaning device may be changed by: increasing the duration of each stage or of the each period within these stages, increasing and decreasing the number of times of forward and reverse rotation of the roller brush, increasing and decreasing the number of times of synchronous and intermittent start and stop of the roller brush and the suction motor, increasing and decreasing the number of times of reverse rotation of the roller brush by 60°, and the like.

TABLE 2a second implementation process information of the self-cleaning method of the cleaning device.

| Duration (s) | Stage | Preparation Device | Water Pump or Valve (58 s) | Roller Brush | Suction Motor | Servo | Sterilizing Device | Battery | Note | |
|---|---|---|---|---|---|---|---|---|---|---|
| 30 | Degerming Solution Preparation | on | off | off | off | off | off | Charging | Degerming Solution Preparation | |
| 12 | (0-12 s) | on | on | 150 rpm Forward Rotation | off | off | | | Uniform Water Spreading | Roller Brush Soaking Stage |
| 1 | (12-13 s) | on | off | off | off | off | | | Forward and Reverse Rotation Pause Protection Period | |
| 1 | (13-14 s) | on | on | 150 rpm Reverse Rotation by 60° | off | off | | | Loosing Dirt | |
| 1 | (14-15 s) | on | off | off | off | on | | | Servo On Protection | |
| 10 | (15-25 s) | on | off | 450 rpm Forward Rotation | 150 W on | on | | Discharging | Suction Port, Pipe, Cavity and Roller Brush Large Suction Flushing | Preliminary Cleaning Sub-Stage |
| 15 | (25-40 s) | on | on | 150 rpm Forward Rotation | off | off | | Charging | Uniform Water Spreading | Roller Brush Soaking Sub-Stage |
| 1 | (40-41 s) | on | on | 450 rpm Forward Rotation | 30 W on | off | | | Flushing Pipe | Pipe Cleaning Sub-Stage |
| 1 | (41-42 s) | on | on | off | off | off | | | | |
| 1 | (42-43 s) | on | on | 450 rpm Forward Rotation | 30 W on | off | | | | |
| 1 | (43-44 s) | on | on | off | off | off | | | | |
| 1 | (44-45 s) | on | on | 450 rpm Forward Rotation | 30 W on | off | | | | |
| 1 | (45-46 s) | on | on | off | off | off | | | | |
| 1 | (46-47 s) | on | on | 450 rpm Forward Rotation | 30 W on | off | | | | |
| 5 | (47-52 s) | on | off | 450 rpm Forward Rotation | 150 W on | off | | | Large Suction Flushing | |

TABLE 2a-continued second implementation process information of the self-cleaning method of the cleaning device.

| Duration (s) | Stage | Preparation Device | Water Pump or Valve (58 s) | Roller Brush | Suction Motor | Servo | Sterilizing Device | Battery | Note | |
|---|---|---|---|---|---|---|---|---|---|---|
| 20 | (52-72 s) Repeat 5 times | on | off | off | off | off | | | Forward and Reverse Rotation Pause Protection | Deep Cleaning Sub-Stage |
| | | on | on | 150 rpm Reverse Rotation by 60° | off | off | | | Reverse Rotation Cleaning the Roller Brush | |
| | | on | off | off | off | off | | | Forward and Reverse Rotation Pause Protection | |
| | | on | on | 450 rpm Forward Rotation 1 s | 150 W on | off | | | Forward Flushing the Water Spraying Plate | |
| 1 | (72-73 s) | on | off | off | off | on | | | Servo On Protection | |
| 10 | (73-83 s) | on | on | 450 rpm Forward Rotation | 150 W on | on | | Discharging | Forward Flushing the Water Spraying Plate | |
| 60 | (83-143 s) | off | off | 450 rpm Forward Rotation | 90 W on | off | on | | Sterilizing Air Drying (1min) | Sterilizing Drying Stage |
| 1 | (143-144 s) | off | off | off | off | off | | Charging | Forward and Reverse Rotation Pause Protection | |
| 1 | (144-145 s) | off | off | 150 rpm Reverse Rotation by 60° | off | off | | | Bristle Reverse Fluffing | |
| 1 | (145-146 s) | off | off | 150 rpm Reverse Rotation by 60° | off | off | | | | |
| 1 | (146-147 s) | off | off | 150 rpm Reverse Rotation by 60° | off | off | | | | |
| 1 | (147-148 s) | off | off | 150 rpm Reverse Rotation by 60° | off | off | | | | |
| 1 | (148-149 s) | off | off | 150 rpm Reverse Rotation by 60° | off | off | | | | |
| 1 | (149-150 s) | off | off | 150 rpm Reverse Rotation by 60° | off | off | | | | |
| 1 | (150-151 s) | off | off | 15 0rpm Reverse Rotation by 60° | off | off | | | | |
| 1 | (151-152 s) | off | off | 150 rpm Reverse Rotation by 60° | off | off | | | | |
| 1 | (152-153 s) | off | off | 150 rpm Reverse Rotation by 60° | off | off | | | | |
| 1 | (153-154 s) | off | off | 150 rpm Reverse Rotation by 60° | off | off | | | | |
| 1 | (154-155 s) | off | off | 150 rpm Reverse Rotation by 60° | off | off | | | | |

TABLE 2a-continued second implementation process information of the self-cleaning method of the cleaning device.

| Duration (s) | Stage | Preparation Device | Water Pump or Valve (58 s) | Roller Brush | Suction Motor | Servo | Sterilizing Device | Battery | Note |
|---|---|---|---|---|---|---|---|---|---|
| 1 | (155-156 s) | off | off | 150 rpm Reverse Rotation by 60° | off | off | | | |
| | Self-Cleaning Completion | off | off | off | off | off | | | |

In the above tables, the flow rate after opening the water pump or valve may be 200 g/s.

The self-cleaning process of the cleaning device may include: a degerming solution preparation stage (duration 30 s), a roller brush soaking stage (duration 15 s, from 0 s to 15 s), a cleaning stage (duration 68 s, from 15 s to 83 s), and a sterilizing and drying stage (duration 73 s, from 83 s to 156 s). For example, the cleaning stage may include: a preliminary cleaning sub-stage (duration 10 s, from 15 s to 25 s), a roller brush soaking sub-stage (duration 15 s, from 25 s to 40 s), a pipe cleaning sub-stage (duration 12 s, from 40 s to 52 s), and a deep cleaning sub-stage (duration 31 s, from 52 s to 83 s).

As shown in Table 2a above, the roller brush soaking stage may include: a uniform water spreading period (duration 12 s, from 0 s to 12 s), a forward and reverse rotation pause protection period (duration 1 s, from 12 s to 13 s), a loosening dirty period (duration 1 s, from 13 s to 14 s), and a servo on protection period (duration 1 s, from 14 s to 15 s). Steps S101 and S102 in the foregoing embodiment may correspond to a uniform water spreading period, a forward and reverse rotation pause protection period, and a loose dirt period in the roller brush soaking stage in Table 1.

As can be seen from the above tables, the deep cleaning sub-stage may include: a period of the forward and reverse circulation of the roller brush, a period of the servo on protection, and a period of forward flushing of the water spraying plate. The forward and reverse circulation periods of the roller brush comprise: a forward and reverse rotation pause protection period, a reverse rotation cleaning roller brush period, a forward and reverse rotation pause protection period and a forward flushing water spraying plate period which are repeatedly circulated.

The sterilizing and drying stage may include a sterilizing air drying stage, a forward and reverse rotation pause protection stage, and a reverse fluffing stage. In the reverse fluffing period, the roller brush rotates by a set acute angle once in the second direction at equal interval. In the embodiment shown in Table 2a, the roller brush rotates by 60° every second in the second direction for 12 times.

Compared with Table 1, Table 2a shows the following differences:

1. The roller brush reverses only once during the roller brush soaking stage.
2. Before the preliminary cleaning sub-stage, a servo on protection period is added. During the servo on protection period, a water pump or a valve is in an off-state, a roller brush stops rotating and a suction motor stops, and the purpose of the suction motor is to protect components such as a roller brush cover.
3. When the suction motor is not needed, the suction motor is in an off-state. In Table 1, to avoid frequent starting and stopping, when the suction motor is not required in a short time, if the suction motor is in an on-state, the suction motor is not stopped. According to the scheme of Table 2a, power can be saved after being stopped without considering the influence of frequent starting and stopping on the suction motor.
4. The roller brush repeats the forward and reverse rotation (52-72 s) period in the deep cleaning sub-stage. The roller brush rotates forwardly at a high speed, rotates reversely at a low speed and only by 60°. The forward and reverse rotation speeds of the roller brush are the same in Table 1, and the angle of the reverse rotation is not limited. The solution corresponding to Table 1 improves the cleaning effect of the roller brush through forward and reverse rotation. In the solution corresponding to Table 2a, the purpose of low-speed reverse rotation by 60° is to loosen the dirt left at the root of the bristles of the roller brush. The solutions in Table 1 and 2a are related to the working environment of the cleaning device, the material of the roller brush, and the like. Therefore, for an actual product, which solution to be used can be determined based on an actual working scenario of the product, a selection of the roller brush material, and the like.
5. In the solution in Table 2a, specifically, in reverse fluffing period, and the suction motor is in an off-state.

Table 2b shows the third implementation process information of the self-cleaning method of the cleaning device. If the process information shown in Table 2a above is referred to as ultra-strong self-cleaning, or fine self-cleaning, etc., the process shown in Table 2b may be referred to as fast self-cleaning. That is, compared with the process in Table 2a, the process time in Table 2b is shorter.

TABLE 2b process information corresponding to the fast self-cleaning of the cleaning device

| Duration (s) | Stage | Preparation Device | Water Pump or Valve (58 s) | Roller Brush | Suction Motor | Servo | Sterilizing Device | Battery | Note |
|---|---|---|---|---|---|---|---|---|---|
| 30 | Degerming Solution Preparation | on | off | off | off | off | | | Degerming Solution Preparation |

TABLE 2b-continued process information corresponding to the fast self-cleaning of the cleaning device

| Duration (s) | Stage | Preparation Device | Water Pump or Valve (58 s) | Roller Brush | Suction Motor | Servo | Sterilizing Device | Battery | Note | |
|---|---|---|---|---|---|---|---|---|---|---|
| 11 | (0-11 s) | on | on | 150 rpm Forward Rotation | off | off | off | Charging | Uniform Water Spreading | Roller Brush Soaking Stage |
| 4 | (11-15 s) | on | off | off | off | off | | | | |
| | | on | on | 150 rpm Reverse Rotation by 60° | off | off | | | Loosing Dirt | |
| | | on | off | off | off | on | | | Servo On Protection | |
| | | on | on | 150 rpm Forward Rotation 1 s | 150 W on | on | | | | |
| 10 | (15-25 s) | on | off | Forward Rotation | 150 W on | on | | | Suction Port, Pipe, Cavity and Roller Brush Large Suction Flushing | Preliminary Cleaning Sub-Stage |
| 15 | (25-40 s) | on | on | 150 rpm Forward Rotation | off | off | | | Uniform Water Spreading | Roller Brush Soaking Sub-Stage |
| 1 | (40-41 s) | on | on | Forward Rotation | 30 W on | off | | | Flushing Pipe | Pipe Cleaning Sub-Stage |
| 1 | (41-42 s) | on | on | off | off | off | | | | |
| 1 | (42-43 s) | on | on | Forward Rotation | 30 W on | off | | | | |
| 1 | (43-44 s) | on | on | off | off | off | | | | |
| 1 | (44-45 s) | on | on | Forward Rotation | 30 W on | off | | | | |
| 1 | (45-46 s) | on | on | off | off | off | | | | |
| 1 | (46-47 s) | on | on | Forward Rotation | 30 W on | off | | | | |
| 5 | (47-52 s) | on | off | Forward Rotation | 150 W on | off | | | Large Suction Flushing | |
| 20 | (52-72 s) Repeat 5 times | on | off | off | off | off | | | Forward and Reverse Rotation Pause Protection | Deep Cleaning Sub-Stage |
| | | on | on | 150 rpm Reverse Rotation by 60° | off | off | | | Reverse Rotation Cleaning the Roller Brush | |
| | | on | off | off | off | off | | | Forward and Reverse Rotation Pause Protection | |
| | | on | on | 150 rpm Forward Rotation 1 s | 150 W on | off | | | Forward Flushing the Water Spraying Plate | |
| 1 | (72-73 s) | on | off | off | off | on | | | Servo On Protection | |
| 10 | (73-83 s) | on | on | Forward Rotation | 150 W on | on | | | Forward Flushing the Water Spraying Plate | |
| 60 | (83-143 s) | off | off | Forward Rotation | 90 W on | off | on | | Sterilizing Air Drying (1 min) | Roller Brush Centrifugal Air Drying |
| 1 | (143-144 s) | off | off | off | off | off | | | Forward and Reverse Rotation Pause Protection | |
| 1 | (144-145 s) | off | off | 150 rpm Reverse Rotation | off | off | | | Bristle Reverse Fluffing | |
| | Self-Cleaning Completion | off | off | off | off | off | | | | |

Compared with Table 2a, the differences are that:

I. The differences between the roller brush soaking stage include: the uniform water spreading period is the duration of 12 s in the solution of Table 1 and the duration of 11 s in the solution of Table 2. In the solution shown in Table 1, after the forward and reverse rotation pause protection period (1 s), the loosening dirt period (1 s), and the servo on protection period (1 s), the cleaning stage is entered. In the solution shown in Table 2, after the forward and reverse rotation pause protection period (1 s), the loosening dirt period (1 s), and the servo on protection period (1 s), a roller brush forward rotation period of 1 s is added. As shown in Table 2, in the roller brush forward rotation period, when the roller brush cover is in contact with the roller brush, the cleaning solution is in an output state (that is, the water pump or the valve is turned on), and the rotation speed of the roller brush in the first direction is any value between 100 and 200 rpm, such as 150 rpm; the suction motor is started to operate at a first-level power (such as 150 W).

That is, in the self-cleaning method of the cleaning device provided in this embodiment of the present disclosure, in a state in which the roller brush cover is in contact with the roller brush, the roller brush rotates in the first direction, and staring the suction motor can include:

A. when the roller brush cover is in contact with the roller brush, rotating the roller brush in the first direction, and starting the suction motor;

B. after the roller brush has rotated in the first direction for a fourth duration, continuing to rotate the roller brush at an increased speed in the first direction.

As shown in Table 2b, the roller brush first rotates in the first direction at a speed of 150 rpm. The power of the suction motor may be 150 W. After the roller brush rotates in the first direction for a fourth duration (that is, 1 s) at a speed of 150 rpm, the roller brush rotates at an increased speed of 450 rpm in the first direction. The roller brush rotates at an increased speed of 450 rpm in the first direction, and the suction motor is in an on-state, that is, corresponding to the preliminary cleaning sub-stage in the cleaning stage in Table 2a and Table 2b.

II. In the forward and reverse circulation period of the roller brush, the rotation speed of the roller brush when rotating in the first direction in Table 2a is higher than the rotation speed of the roller brush when rotating in the second direction. Specifically, referring to Table 1, the rotation speed of the roller brush in the first direction is 450 rpm; and the rotation speed of the roller brush in the second direction is 150 rpm. In Table 2b, the rotation speed when the roller brush rotates in the first direction is equal to the rotation speed when the roller brush rotates in the second direction, and both are 150 rpm.

III. In the reverse fluffing period, the duration in Table 2a is 12 s, the duration in Table 2b is 1 s, that is, the roller brush is reversed 12 times in Table 1 and only once in Table 2.

It should be additionally noted herein that, in Table 2a and Table 2b, the forward rotation corresponds to the first direction in this specification, and reverse rotation corresponds to the second direction in this specification. The servo "on" can be understood as: the servo is activated to drive the roller brush cover to move to contact the roller brush. The servo "off" can be understood as: the servo is deactivated, and the roller brush moves reversely to have a gap with the roller brush; or the servo is started to drive reversely the roller brush cover to move reversely to have a gap with the roller brush. In addition, during 52-72 s in the deep cleaning sub-stage in Table 1, when the forward rotation and the reverse rotation of the roller brush alternate, the rotation speed of the forward rotation (that is, in the first direction) of the roller brush may be higher, such as 480 rpm, 500 rpm, etc., which is not limited in this embodiment.

For the ultra-strong self-cleaning mode corresponding to Table 2a and the fast self-cleaning mode corresponding to Table 2b, the two modes may be entered in the following manner: a self-cleaning button is provided on the cleaning device, a user can press this self-cleaning button for a short time, the selection page is entered on the display screen of the cleaning device, and the fast self-cleaning is entered after 3 s; the user can press the self-cleaning button again within 3 s to switch to the ultra-strong self-cleaning mode, and the ultra-strong self-cleaning mode is started after 3 s is displayed on the display screen.

Of course, other operation modes are possible, such as a short press to enter fast self-cleaning mode and a long press to enter ultra-strong self-cleaning mode; or the system may also automatically select to enter fast self-cleaning or ultra-clean self-cleaning according to the cleaning time of the floor scrubber.

Figure 28:
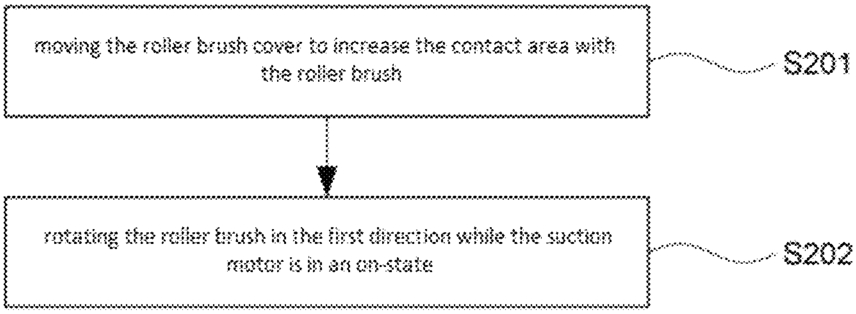
FIG. 28 is a schematic flowchart of the self-cleaning method according to the second embodiment.

FIG. 28 is a schematic flowchart of a self-cleaning method of a cleaning device according to another embodiment of the present disclosure. Similarly, the execution body of the method provided in this embodiment may be a cleaning device, and specifically, may be a control device of the cleaning device. Specifically, the method comprises:

S201: moving the roller brush cover from the first position to the second position to increase the contact area with the roller brush;

S202: rotating the roller brush in the first direction while the suction motor is in an on-state.

For example, at the end of the soaking stage or at the beginning of the cleaning stage, the roller brush cover is triggered to move from the first position to the second position; and/or the roller brush cover is triggered to move from the first position to the second position at the later stage of the cleaning stage or before the sterilizing and/or drying stage.

Further, before moving the roller brush cover, the roller brush rotates in the first direction.

Further, before moving the roller brush cover, the roller brush rotates in the first direction while the suction motor is in an on-state.

The cleaning device comprises a water supply device, and the water supply device is configured to convey a cleaning solution used during self-cleaning of the cleaning device.

After the operation state or operation parameter of at least one of the roller brush, the water supply device and the suction motor changes, the roller brush cover moves reversely to reset to the first position;

"The operation state or operation parameter of at least one of the roller brush, the water supply device and the suction motor changes" includes at least one of the following:

stopping the rotation of the roller brush, changing the rotation speed of the roller brush; changing the rotation direction of the roller brush; starting the operation of the water supply device; stopping the operation of the water supply device; stopping the suction motor; and changing the operation power of the suction motor.

According to the technical scheme provided by the embodiment of the present disclosure, after moving the roller brush cover to be in contact with the roller brush, the roller brush rotates in the first direction, the suction motor is started to operate at the first power, and the roller brush cover can be cleaned by means of the roller brush; and after changing the operation state or the operation parameter of at least one of the roller brush, the water supply device and the suction motor, the roller brush cover moves reversely to have a gap with the roller brush so as to enter other stages in the self-cleaning process, and the part, except the roller brush cover, of the cleaning device is cleaned.

Referring to Table 1, Table 2a and Table 2b, in the preliminary cleaning sub-stage of the cleaning stage, when the suction motor changes from the operation state of 150 W to the off-state, the servo is "off", and the roller brush cover moves reversely; or when the rotation speed of the roller brush is reduced, the servo is "off", and the roller brush cover moves reversely; or when the water supply device starts to work, the servo is "off", and the roller brush cover moves reversely. As shown in Table 1, in the deep cleaning sub-stage of the cleaning stage, when the water supply device stops working, the servo is "off", and the roller brush cover moves reversely; and so on.

It should be noted herein that this embodiment refers to steps in the embodiments shown in FIG. 25, Table 1, Table 2a, and Table 2b. In addition to the foregoing steps S201 to S202, this embodiment may further include other steps in the embodiments shown in FIG. 25, Table 1, Table 2a, and Table 2b, and details are not described herein again.

Another embodiment of the present disclosure provides a self-cleaning method of a cleaning device. The execution body of the method provided in this embodiment can be a cleaning device, in particular a control device. Specifically, the method comprises:

S303: during the sterilizing and/or drying stage of the cleaning device, rotating the roller brush of the cleaning device in the second direction at least once, and switching the output of the cleaning solution for self-cleaning of the cleaning device to an off-state;

wherein, when the cleaning device operates, the roller brush rotates in the first direction; the first and second directions are different.

The roller brush rotates by an acute angle in the second direction each time; and each rotating angle is the same, or the rotating angle is gradually increased or decreased.

For example, the roller brush rotates by 60° each time, or roller brush rotates by 90° for the first time, by 60° for the second time, and by 30° for the third time.

Specifically, the roller brush rotates in the second direction at a low-speed.

In an implementable embodiments, in the sterilizing and/or drying stage of the cleaning device, the roller brush of the cleaning device rotates intermittently by an acute angles for a preset number of times in the second direction, and meanwhile, the suction motor of the cleaning device is in an on-state.

For example, in Table 1, the roller brush intermittently rotates in the second direction by a preset acute angle for six times, further, the suction motor has at least two-levels power operation states, the at least two-levels power operation states are set sequentially, and a power corresponding to a previous level is high, the first-level power operation state is the highest level state of the at least two-levels power operation states;

in the above step S303, "the suction motor is in an on-state during the sterilizing and/or drying stage of the cleaning device" comprises:

the suction motor is in a dynamically changing operation state of gradually downshifting from the first-level power.

As in the example shown in Table 1 above, the suction motor operates first at 150 W for 2 s, then operates at 120 W for 2 s, and then operates at 90 W for 2 s.

Alternatively, before the roller brush rotates by the set acute angle in the second direction at least once, the method further comprises:

S301: during the sterilizing and drying process of the cleaning device, starting the sterilizing device of the cleaning device to operate, rotating the roller brush in the first direction, and operating the suction motor at a third power;

S302: stopping the rotation of the roller brush in the first direction, and after turning the suction motor off, triggering the roller brush to rotate in the second direction by a set acute angle at least once.

The above step S301 corresponds to the reverse fluffy period in the sterilizing and drying stage.

It should be noted herein that this embodiment refers to steps in the embodiments shown in FIG. 25, Table 1, Table 2a, and Table 2b. In addition to the foregoing steps S301 to S303, this embodiment may further include other steps in the embodiments shown in FIG. 25, Table 1, Table 2a, and Table 2b, and details are not described herein again.

Figure 29:
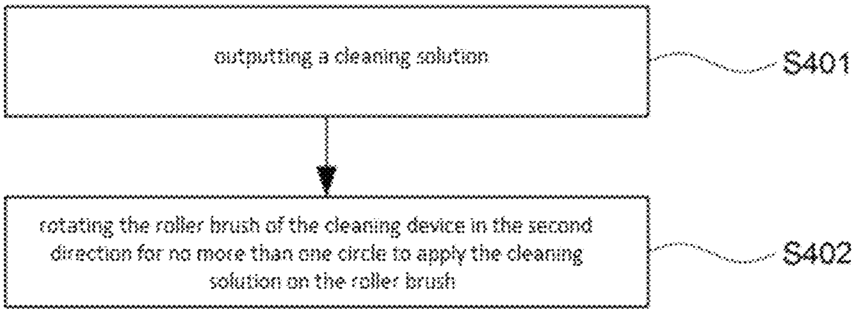
FIG. 29 is a schematic flowchart of the self-cleaning method according to the third embodiment.

FIG. 29 is a schematic flowchart of a self-cleaning method of a cleaning device according to an embodiment of the present disclosure. The execution body of the method provided in this embodiment may be a cleaning device, and specifically, may be a control device of the cleaning device. As shown in FIG. 29, the method comprises:

S401: outputting a cleaning solution;

S402: rotating the roller brush of the cleaning device in the second direction for no more than one circle to apply the cleaning solution on the roller brush;

wherein, when the cleaning device operates, the roller brush rotates in the first direction; the second and first directions are different.

In the above step S401, the cleaning device may be provided with a water pump or a valve. After receiving the control instruction from the control device, the water pump or the valve is turned on to output the cleaning solution. In a more specific embodiment, the floor brush of the cleaning device is provided with a water spraying plate, the water spraying plate may be provided with one or more water spraying openings, and the output cleaning solution is sprayed to the roller brush through the water spraying openings on the water spraying plate. The water spraying plate can be disposed in the roller brush cavity, and the water spraying opening faces the roller brush; or the water spraying plate is disposed on the roller brush cover.

For example, when the cleaning device detects that the device stain level is greater than the set threshold during the task, the cleaning device returns to the base station to start the self-cleaning mode at the base station. Alternatively, after completing the cleaning task, the cleaning device is placed on the base station by the user, and the user triggers, through voice control or a control on the cleaning device, the cleaning device to start the self-cleaning mode.

In some implementable technical solutions, and in the above step S101, "outputting cleaning solution" may include at least one of the following:

outputting a cleaning solution after having monitored that the cleaning device is docked with the base station;

outputting a cleaning solution in response to a user instruction;

when the cleaning device enters a set stage in the self-cleaning mode or a specific sub-stage in the set stage, the cleaning solution is output.

For example, the self-cleaning process of the cleaning device includes a plurality of stages, which include but are not limited to a roller brush soaking stage, a cleaning stage, a sterilizing and/or drying stage and the like. Here, the cleaning stage may include but is not limited to a preliminary cleaning sub-stage, a roller brush soaking sub-stage, a pipe cleaning sub-stage, a deep cleaning sub-stage, and the like. The description is the same as the corresponding description above.

A roller brush soaking sub-stage is added in the cleaning stage, because the liquid content on the roller brush is low after the roller brush is washed in the preliminary cleaning sub-stage. In order to clean the roller brush cover by means of the roller brush, the water content on the roller brush needs to be increased, so that a roller brush soaking sub-stage is added before the pipe cleaning sub-stage. Here, it needs to be supplemented that: when the roller brush cover needs to be cleaned, the control device may send a contact instruction to the servo, so that the servo drives the roller brush cover to move to contact the roller brush. When the roller brush is cleaned, the control device can send a remote instruction to the servo, so that the servo drives the roller brush cover to move away from the roller brush, and a gap exists between the roller brush cover and the roller brush. The state of the roller brush cover and the roller brush having the gap between them can be a state of the roller brush cover and the roller brush during the cleaning device operates.

In the above step S402, in the foregoing embodiment, no more than one circle may be 30° to 90° (including the upper and lower limit values) or may be a larger angle, e.g., 30° to 360° (excluding 360°), as long as no more than one circle occurs.

According to the technical solution provided by an embodiment of the present disclosure, the roller brush rotates in the first direction when the cleaning device operates, and the roller brush rotates in the reverse direction (namely rotates in the second direction) during self-cleaning, so that the roller brush can be loosened, the bristles of the roller brush are reverse fluffed, the dirt at the root part is easily to loosened, a good condition is provided for subsequent self-cleaning, and the self-cleaning effect of the roller brush is improved. In addition, in this embodiment of the present disclosure, that the roller brush rotates in the second direction for no more than one circle is to avoid the splashing of cleaning solution and dirt as much as possible; if the dirt and the like left in the roller brush splashes out, it may splash to a position that cannot be self-cleaned by the roller brush, resulting in unnecessary cleaning trouble.

In the above step S402, "rotating the roller brush of the cleaning device in the second direction for no more than one circle" can include:

- S4021: after outputting the cleaning solution for a fifth duration, starting the roller brush motor to drive the roller brush to rotate in the second direction;
- S4022: after operating the roller brush motor for a sixth duration, turning off the roller brush motor, so that the roller brush rotates in the second direction for no more than one circle.

Here, the fifth duration is related to the flow rate of the water supply device, the number of water spray ports, the roller brush material, and the like. In a specific embodiment, the fifth duration may be any value from 1 s to 10 s. For example, the fifth duration may be 7 s. The sixth duration is related to the output power rotation speed of the roller brush motor, sizes of the roller brush, and the like. In this embodiment, under the condition that the roller brush motor outputs power and the sizes of the roller brush are fixed, the roller brush can be controlled to rotate for no more than one circle by controlling the duration. For example, the sixth duration may be 0.1-0.5 s, and specifically, the sixth duration may be 0.3 s.

Referring to the floor brush example shown in FIG. 26, a scraper plate 28 is provided at the suction port. Ideally, the bristles of the roller brush 223 are in a fluffy state as shown in FIG. 26, rather than in a sideways state. FIG. 27*a* shows a state diagram of the operation of the cleaning device (e.g., cleaning the floor). The roller brush rotates in a first direction (that is, in the counterclockwise direction indicated by an angle shown in FIG. 27*a*), and the bristles on the roller brush tilt toward one direction during rotation. When the cleaning device operates, liquid in a water tank on the cleaning device wets the roller brush, the roller brush rotates at a high speed in the first direction to clean dirt on the floor, the dirt adheres to bristles of the roller brush and is squeezed down by a scraper plate when passing through the scraper plate, and a suction motor sucks the squeezed dirt into a recycling bucket through a suction port and a pipe. Because the bristles of the roller brush tilt in one direction during operation (as shown in FIG. 27*a*), in this embodiment, an additional step is added, that is, the roller brush rotates in the second direction (that is, in the clockwise direction indicated by the angle shown in FIG. 27*b*), namely rotates in a direction opposite to the first direction. As shown in FIG. 27*b*, after the roller brush rotates in the second direction, the bristles tilting in one direction shown in FIG. 27*a* will stand up in the other direction. It can be seen that the rotation of the roller brush in the second direction can have the effect of making the bristles fluffy.

In addition, in this embodiment, the roller brush rotates in the second direction in order to uniformly apply the cleaning solution on the roller brush, and less water is accumulated. If the roller brush is not fixed, the water spraying plate outputs cleaning solution to the same position of the roller brush, and water can be accumulated due to the fact that water can no longer be absorbed at the position. In the present embodiment, since the roller brush rotates, the water spraying plate outputs cleaning solution to different positions of the roller brush, which can reduce water accumulation. The roller brush rotates in the second direction for no more than one circle is to avoid splashing of cleaning solution and dirt as much as possible; if the dirt and the like left in the roller brush splashes out, it may splash to a position that cannot be self-cleaned by the roller brush, resulting in unnecessary cleaning troubles.

The cleaning device has, during the self-cleaning, a roller brush soaking stage and a roller brush soaking sub-stage in the cleaning stage. The roller brush soaking stage or the roller brush soaking sub-stage may include an initial soaking stage, an intermediate soaking stage and a final soaking stage.

Specifically, the initial soaking stage lasts for a fifth duration, the cleaning solution is in an output state, and the roller brush motor is in an off-state; the intermediate soaking stage lasts for a sixth duration, the cleaning solution is in an output state, and the roller brush motor is in an on-state; the final soaking stage lasts for a seventh duration, the cleaning solution is in an output state, and the roller brush motor is in an off-state; wherein the start moment of intermediate soaking stage is an intermediate moment of the total duration, and the total duration is a sum of the fifth duration, the sixth duration, and the seventh duration.

Assuming that the roller brush soaking stage starts from 0 s, the fifth duration lasts 7 s, the sixth duration lasts 0.3 s, and the seventh duration lasts 6.7 s; and the corresponding total duration lasts 14 s, the start time of the intermediate soaking stage is 7 s.

As shown in FIG. 27*a*, the bristles are tilt in one direction after the roller brush operates, only part of the dirt can be removed by the scraper plate by pressing, and the dirt adhering to the roots of the bristles of the roller brush is difficult to clean. Therefore, the present disclosure provides a roller brush cleaning scheme, in which forward rotation and reverse rotation of the roller brush are alternately carried out in the self-cleaning process, dirt adhering to the root of the roller brush bristles can be cleaned by repeated scraping and washing, and the problems of bacterial growth, odor and the like caused by dirt left are avoided as much as possible. Through alternate forward and reverse rotation cleaning, roller brush bristles are easier to keep good fluffy, it is guaranteed that the roller brush is always in a better size, and then the cleaning effect of the roller brush is improved. In addition, good fluffy also facilitates rapid drying of the roll brush. That is, the method provided in this embodiment may further include the following steps:

S403: when there is a gap between the roller brush cover and the roller brush, rotating the roller brush alternately in the second direction and the first direction, and starting the suction motor to suction and clean dirt generated by the roller brush.

In an implementable technical solution, the above step S403 "rotating the roller brush alternately the second direction and the first direction, and starting the suction motor" may include:

- S4031: starting the suction motor to operate, and starting reversely the roller brush motor to drive the roller brush to rotate in the second direction;
- S4032: turning the suction motor off and turning the roller brush motor off;
- S4033: starting the suction motor to operate, and starting the roller brush motor in a forward direction to drive the roller brush to rotate in the first direction.

When the roller brush motor is turned off, the cleaning solution can be stopped from being output; and when the roller brush motor is started reversely or forwardly, the cleaning solution can be output. The cleaning solution output is stopped when the roller brush motor is turned off, so that water can be saved. Of course, the cleaning solution can be continuously output without considering the water consumption.

The above step S403 may correspond to the later stages in the preliminary cleaning sub-stage, such as the reverse rotation cleaning roller brush stage, the forward and reverse rotation pause protection stage, and the forward flushing water spraying plate stage, or the deep cleaning sub-stage.

For example, S4031 corresponds to the reverse cleaning period of the roller brush, and in this reverse cleaning period of the roller brush, the suction motor is started to operate, and the roller brush motor is started reversely. S4032 corresponds to the forward and reverse pause protection period. As the roller brush motor switches from reverse starting to forward starting, there must be a pause in between. When the roller brush motor is stopped, the motor can also be stopped in order to save power. Of course, in specific implementation, in the forward and reverse rotation pause protection period, the suction motor may not be stopped and is in an on-state. S4033 corresponds to the forward flushing water spraying plate stage, in which the roller brush rotates in the first direction, and in the cleaning process by the cleaning solution, the roller brush rotating in the first direction can also flush the water spraying plate.

Further, if S403 corresponds to later stages in the preliminary cleaning sub-stage, before S403, the method may further include the following steps:

- S404: moving the roller brush cover to contact the roller brush;
- S405: rotating the roller brush in a first direction after the roller brush cover is in contact with the roller brush, starting the suction motor;
- S406: after rotating the roller brush at a reduced speed or stopping the roller brush, moving reversely the roller brush cover to have a gap with the roller brush.

In S404, the roller brush cover is driven to move by the servo as described above. The above S404 corresponds to the "servo on protection period" in the preliminary cleaning sub-stage. The above S405 may be the "flushing period" in the preliminary cleaning sub-stage; and the above S406 may be the "forward and reverse rotation pause protection stage" in the preliminary cleaning sub-stage. After the step S406, the step S403 is performed, and the roller brush motor is reversely started corresponding to the step S4031. In S405, the roller brush motor is started forwardly to drive the roller brush to rotate in the first direction, so that the step S406 may be referred to as a "forward and reverse rotation pause protection period", and plays a role in protecting the roller brush cover moving in the forward and reverse rotation pause protection period.

In summary, in this embodiment, after moving the roller brush cover to contact the roller brush, the roller brush rotates in the first direction, so that the roller brush cover can be cleaned; and after the roller brush rotates at a reduced speed or stops rotating, the roller brush cover moves reversely to have a gap with the roller brush, so as to play a protective role. If the roller brush is still rotating at high speed when the roller brush is supposed to move, dirt left in the roller brush may be thrown out due to the high-speed rotation, such as dirt with large particles may cause damage to the moving roller brush cover. After the roller brush cover has moved in place and a gap existed between the roller brush cover and the roller brush, the roller brush rotates alternately in the second direction and the first direction, so that the self-cleaning cleanness of the roller brush can be improved, the roller brush rotates alternately forward and reverse in the two directions, the bristles of the roller brush are shifted back and forth, and dirt left at the roots of the bristles can be easily cleaned.

In an implementable technical solution, after the roller brush cover is in contact with the roller brush, the suction motor starts to operate at the first power. During the reverse movement of the roller brush cover, the suction motor is turned off. After the roller brush cover and the roller brush have the gap, the roller brush alternately rotates in the second direction and the first direction, and the suction motor starts to operate at a third power. The first power is greater than the third power. For example, the first power may be 150 W; the third power may be 90 W. It should be noted that specific values of the first power and the third power depend on models of the suction motor. For example, a cleaning device has a relatively high configuration, and a suction motor of the cleaning device is a high-power motor. Another cleaning device has a low configuration, and the power of the suction motor may be low. Therefore, during specific implementation, the first power and the third power may be determined according to the hardware parameters of a suction motor selected on an actual product.

Further, the method provided in this embodiment of the present disclosure may further include the following steps:

S407: during at least one of the following periods, switching a battery of the cleaning device to a charging state:

a period of applying the cleaning solution to the roller brush, a period of moving the roller brush cover to contact the roller brush, a period of rotating the roller brush in the first direction after the roller brush cover is in contact with the roller brush, a period of rotating the roller brush cover reversely to have a gap with the roller brush, a period of rotating the roller brush alternately in the second and first directions after there is a gap between the roller brush cover and the roller brush.

The above periods are illustrated below, and reference may be made to the following.

Further, the method provided in this embodiment may further include the following steps:

S408: moving the roller brush cover to contact the roller brush;

S409: in a state where the roller brush cover is in contact with the roller brush, operating the roller brush and the suction motor synchronously and intermittently;

wherein, in the synchronous and intermittent operation, the roller brush rotates in the first direction.

Specifically, the roller brush and the suction motor operate synchronously and intermittently, that is, the roller brush and the suction motor start and stop synchronously, and have a plurality of synchronous starting and stopping periods;

in the plurality of synchronous starting and stopping periods, some synchronous starting and stopping periods are first-type periods, and the other synchronous starting and stopping periods are second-type periods;

in the first-type periods, the suction motor operates at a first power to suck the cleaning solution into a recycling bucket of the cleaning device;

in the second-type periods, the suction motor operates at a second power to suck cleaning solution into the pipe, and the cleaning solution in the pipe flows back to flush the pipe when the suction motor is turned off;

wherein, the second power is less than the first power; one end of the pipe is communicated with the suction port of the cleaning device, and the other end is communicated with the recycling bucket. The second power may be 30 W.

In a specific embodiment, in the plurality of synchronous starting and stopping periods, an intermediate synchronous starting and stopping period and/or a last synchronous starting and stopping period are/is the first-type period. Specific embodiments provided in Table 3 are described below, and reference may be made to the following content.

Further, in the first-type periods, the output of the cleaning solution is stopped; and in the second-type periods, the cleaning solution is output. When the roller brush and the suction motor operate synchronously and intermittently, the battery of the cleaning device is in the discharging state.

Further, the method provided in this embodiment may further include the following steps:

S410: stopping the output of the cleaning solution when the cleaning device meets a drying condition, rotating the roller brush in the first direction, and starting the suction motor to dry the roller brush;

S411: stopping the roller brush, and after the suction motor is stopped, rotating the roller brush in the second direction to loosen the roller brush.

When the roller brush is dried, the battery of the cleaning device is in a charging state.

Further, the method provided in this embodiment may further include the following steps:

S412: when the cleaning device meets the sterilizing condition, starting the sterilizing device to operate;

S413: loosening the roller brush at least once during the operation of the sterilizing device;

the roller brush is loosened once, that is, the roller brush stops after rotating in the second direction for a set duration, the set duration may be 1 s, 2 s or longer, which is not limited in this embodiment.

The step S412 "when the cleaning device meets the sterilizing condition, starting the sterilizing device to operate" includes:

S4131: when the cleaning device meets the sterilizing condition, stopping the output of the cleaning solution, rotating the roller brush in the first direction, starting the suction motor, starting and the sterilizing device to perform the sterilizing and drying;

S4132: after sterilizing and drying for an eighth duration, stopping the rotation of the roller brush, stopping the suction motor, and operating the sterilizing device continuously for a ninth duration;

wherein, the battery of the cleaning device is in a discharging state within the eighth duration, and the battery is in a charging state within the ninth duration. Values of the eighth duration and the ninth duration are not specifically limited in this embodiment.

Figure 30:
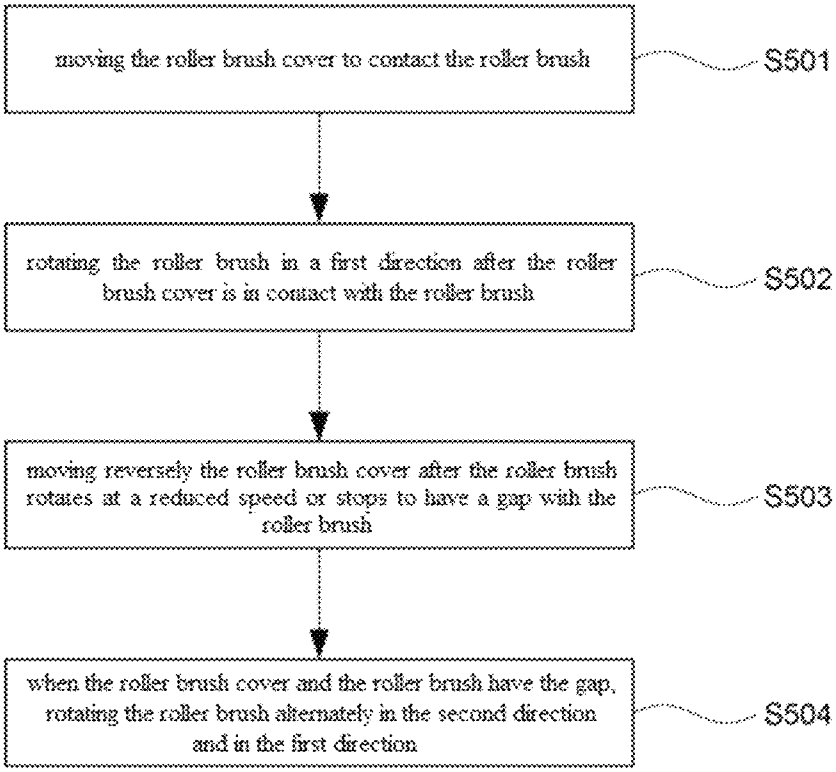
FIG. 30 is a schematic flowchart of the self-cleaning method according to the fourth embodiment.
Figure 31:
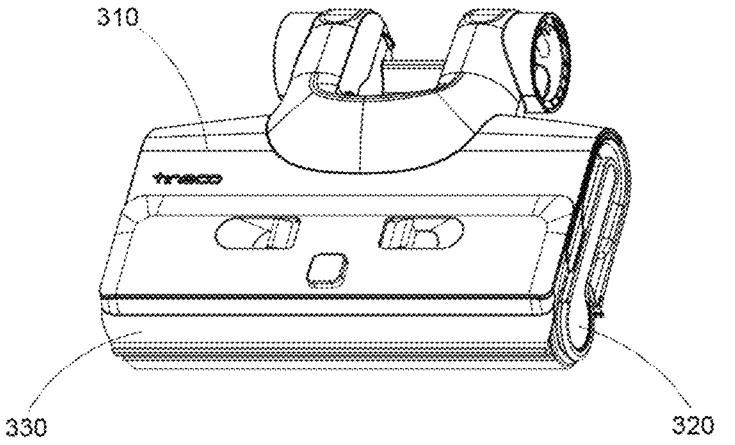
FIG. 31 schematically shows an structural diagram of the cleaning device according to an embodiment of the present disclosure.
Figure 32:
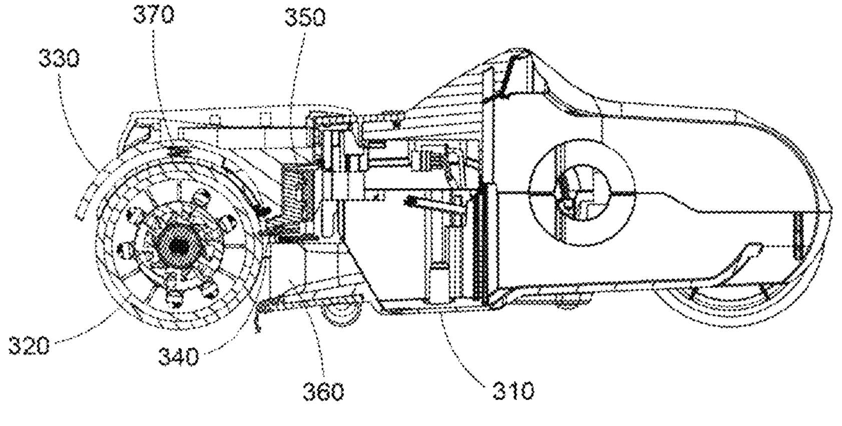
FIG. 32 schematically shows a cross-sectional view of the first cleaning device according to an embodiment of the present disclosure.

FIG. 30 is a schematic flowchart of a self-cleaning method of a cleaning device according to another embodiment of the present disclosure. As shown in this figure, the method comprises:

S501: moving the roller brush cover to contact the roller brush;

S502: rotating the roller brush in a first direction after the roller brush cover is in contact with the roller brush;

S503: moving reversely the roller brush cover after the roller brush rotates at a reduced speed or stops to have a gap with the roller brush;

S504: when the roller brush cover and the roller brush have the gap, rotating the roller brush alternately in the second direction and in the first direction;

wherein, when the cleaning device operates, the roller brush rotates in the first direction; the second and first directions are different.

According to the technical solution provided by the present disclosure, after moving the roller brush cover to contact the roller brush, rotating the roller brush in the first direction, so that the roller brush cover can be cleaned; and after rotating the roller brush at a decreased speed or stopping the roller brush, moving the roller brush cover reversely to have a gap with the roller brush, so as to play a protective role. If the roller brush is still rotating at high speed when the roller brush is supposed to move, dirt left in the roller brush may be thrown out due to the high-speed rotation, such as dirt with large particles may cause damage to the moving roller brush cover. After the roller brush cover has moved in place and a gap existed between the roller brush cover and the roller brush, the roller brush rotates alternately in the second direction and the first direction, so that the self-cleaning cleanness of the roller brush can be improved, the roller brush rotates alternately forward and reverse in the two directions, the bristles of the roller brush are shifted back and forth, and dirt left at the roots of the bristles can be easily cleaned.

The method of the embodiment shown in FIG. 29 is described below with reference to Table 3.

TABLE 3

| process information corresponding to the self-cleaning of the cleaning device | | | | | | | | | |
|---|---|---|---|---|---|---|---|---|---|
| Stage | Preparation Device | Water Pump or Valve | Roller Brush | Suction Motor | Servo | Sterilizing Device | Battery | Note | |
| Degerming Solution Preparation 30 s | on | off | off | off | off | | Charging | Electrolytic Preparation of Degerming Solution | |
| (0-7 s) | on | on | off | off | off | | | | Roller Brush Soaking |
| (7-7.3 s) | on | on | Reverse Rotation | off | off | | | Uniform Water Spreading | |
| (7.3-14 s) | on | on | off | off | off | | | | |
| (14-15 s) | on | off | off | off | on | off | | Servo On Protection | Preliminary Cleaning Sub Stage |
| (15-25 s) | on | on | Forward Rotation | 150 W on | on | | | Flushing Period (Suction Port, Pipe, Cavity and Roller Brush Large Suction Flushing) | |
| (25-26 s) | on | off | off | off | off | | | Forward and Reverse Rotation Pause Protection | |
| (26-34 s) | on | on | Reverse Rotation | 90 W on | off | | | Reverse Rotation Cleaning the Roller Brush | |
| (34-35 s) | on | off | off | off | off | | | Forward and Reverse Rotation Pause Protection | |
| (35-40 s) | on | on | Forward Rotation | 90 W on | off | | | Forward Flushing the Water Spraying Plate | |
| (40-47 s) | on | on | off | off | off | | Charging | | Roller Brush Soaking Sub-Stage |
| (47-47.3 s) | on | on | Reverse Rotation | off | off | | | Uniform Water Spreading | |
| (47.3-54 s) | on | on | off | off | off | | | | |
| (54-55 s) | on | off | off | off | on | | | Servo On Protection | |
| (55-56 s) | on | on | Forward Rotation | 30 W on | on | | Discharging | Flushing Pipe | Pipe Cleaning Sub-Stage |
| (56-57 s) | on | on | off | off | on | | | | |
| (57-58 s) | on | on | Forward Rotation | 30 W on | on | | | | |
| (58-59 s) | on | on | off | off | on | | | | |
| (59-60 s) | on | off | Forward Rotation | 150 W on | on | | | Large Suction Flushing | |
| (60-61 s) | on | off | off | off | on | | | | |
| (61-62 s) | on | on | Forward Rotation | 30 W on | on | | | Flushing Pipe | |
| (62-63 s) | on | on | off | off | on | | | | |
| (63-64 s) | on | on | Forward Rotation | 30 W on | on | | | | |
| (64-65 s) | on | on | off | off | on | | | | |
| (65-66 s) | on | off | Forward Rota tion | 150 W on | on | | | Large Suction Flushing | |
| (66-67 s) | on | off | off | off | off | | | | |
| (67-75 s) | on | on | Reverse Rotation | 90 W on | off | | | Reverse Rotation Cleaning the Roller Brush | Deep Cleaning Sub-Stage |

TABLE 3-continued process information corresponding to the self-cleaning of the cleaning device

| Stage | Preparation Device | Water Pump or Valve | Roller Brush | Suction Motor | Servo | Sterilizing Device | Battery | Note | |
|---|---|---|---|---|---|---|---|---|---|
| (75-76 s) | on | off | off | off | off | | | Forward and Reverse Rotation Pause Protection | |
| (76-81 s) | on | on | Forward Rotation | 90 W on | off | | | Forward Flushing the Water Spraying Plate | |
| (81-141 s) | off | off | Forward Rotation | 90 W on | off | on | | Sterilizing Air Drying (1 min) | Sterilizing Air Drying Stage |
| (141-142 s) | off | off | off | off | off | | | Forward and Reverse Rotation Pause Protection | |
| (142-143 s) | off | off | Reverse Rotation | off | off | | | Bristle Reverse Fluffing | |
| (143-742 s) | off | off | off | off | off | | Charging | Sterilizing | Sterilizing 30 min |
| (742-743 s) | off | off | Reverse Rotation | off | off | | | Bristle Reverse Fluffing | |
| (743-1342 s) | off | off | off | off | off | | | Sterilizing | |
| (1342-1343 s) | off | off | Reverse Rotation | off | off | | | Bristle Reverse Fluffing | |
| (1343-1942 s) | off | off | off | off | off | | | Sterilizing | |
| (1942-1943 s) | off | off | Reverse Rotation | off | off | | | Bristle Reverse Fluffing | |
| Self-Cleaning Completion | off | off | off | off | off | off | Charging | | |

Referring to the embodiment shown in Table 3, corresponding to the above step S409, there are six synchronous starting and stopping periods when the roller brush and the suction motor operate synchronously and intermittently; starting and stopping the roller brush and the suction motor once corresponds to one synchronous starting and stopping period. The intermediate synchronous starting and stopping period (i.e., the third synchronous starting and stopping period) and the last synchronous starting and stopping period (i.e., the sixth synchronous starting and stopping period) are the first-type period, and in the first-type period, the suction motor operates at the first power (such as 150 W); the first and second synchronous starting and stopping periods are the second-type period; and the fourth and fifth synchronous starting and stopping periods are also the second-type period. During the second-type period, the suction motor operates at the second power (for example, 30 W).

In the pipe cleaning sub-stage, the suction motor operates in a low-power state, can suck in the cleaning solution through the suction port and suck at least part of the cleaning solution from the first end of the pipe to the second end of the pipe. The second end of the pipe can extend to the outlet of the water inlet pipe in the recycling bucket. The suction motor is controlled to operate at low power for a certain duration, so that the cleaning solution just reaches the second end of the pipe, and then the suction motor is turned off, so that the cleaning solution in the pipe flows from the second end back to the first end, and the cleaning solution can wash the pipe back and forth in the pipe repeatedly. As shown in the embodiment of Table 3, after the suction motor 30 W operates for 1 s, the suction motor 30 W is stopped for 1 s; then the suction motor 30 W is started to operate for 1 s and then stopped for 1 s.

Here, a large suction flushing is added in the intermediate or the last stages to reduce liquid accumulation.

In addition, the rotation speeds of forward rotation and reverse rotation of the roller brush are not limited in the embodiment shown in Table 3. In the embodiment shown in Table 3, the rotation speed of the roller brush forward rotation (i.e., in the first direction) may be higher than the rotation speed of the roller brush reverse rotation (i.e., in the second direction). Of course, the forward rotation speed of the roller brush may also be equal to the reverse rotation speed of the roller brush, which is not specifically limited in this embodiment.

In summary, the present disclosure provides a new self-cleaning solution of a cleaning device, which adds a step of reversing the rotation of the roller brush (that is, rotating in the second direction) in the self-cleaning process, so that the dirt adhering to the root of the bristles of the roller brush can be easily cleaned off, and the phenomena of bacterial growth, odor and the like are avoided. The roller brush rotates reversely, and the roller bristles can be easier to keep good fluffy, it is ensured that the diameter of the roller brush is always at the optimal cleaning position, and the good fluffy is also beneficial to rapid drying of the roller brush.

To facilitate understanding of the technical solutions of the present disclosure, a specific application scenario is provided below to describe in detail the self-cleaning method for the cleaning device provided in the present disclosure.

Application Scenario I:

After the cleaning device operates for a period of time, the user considers that the cleaning device is dirty, and at this time, the user can manually trigger the self-cleaning control member on the cleaning device. The cleaning device is started, the degerming solution is prepared first, and the preparation amount of the degerming solution meets the requirement and then enters the next stage or is used along with preparation. After entering the next stage, the water supply device outputs a degerming solution, and the cleaning device operates according to the process shown in Table 1, Table 2 or Table 3, so as to clean, sterilize and dry the roller brush, suction port, pipe, roller brush cover and the like. A roller brush reverse rotation step is added in the soaking stage, the cleaning stage, the sterilizing and drying stage.

After cleaning, the bristles of the roller brush are in a fluffy state and clean. When a user uses the cleaning device next time, the roller brush is fluffy instead of tilted in one direction, and when the roller brush cleans the floor, the floor cleaning effect will be better.

Application Scenario II:

When the user cleans the floor with the cleaning device, the cleaning device prompts the user that the self-cleaning needs to be performed. The user places the cleaning device on the base station, and starts a rapid self-cleaning mode, that is, a self-cleaning process corresponding to Table 2. By adding a reverse rotation step to the self-cleaning process of the roller brush, dirt at the root of the roller brush bristles can be easier to clean off; in addition, during sterilizing and drying, the roller brush also has a reverse rotation step, so that internal parts of the roller brush can be dried and sterilized. After rapid self-cleaning, the user holds the cleaning device to clean the floor, and the floor cleaning effect will be better.

Through the above description of the embodiments, those skilled in the art will clearly understand that the embodiments can be implemented by means of software in combination with a necessary universal hardware platform, or can also be implemented by hardware. Based on such understanding, the above technical solution essentially or the part contributing to the prior art may be embodied in the form of a software product, and the computer software product may be stored in a computer-readable storage medium, such as a ROM/RAM, a magnetic disk, an optical disk, and the like, and comprises a plurality of instructions for causing a computer device (which may be a personal computer, a server, or a network device, etc.) to perform the methods described in the embodiments or some parts of the embodiments.

In the third aspect of the present disclosure, with the development of technologies and the iteration of products, the significant progress has been made in floor scrubber products.

When the floor scrubber operates, a roller brush rotates at a high speed, most of the water droplets and dirt particles adhering to the fluff of the roller brush can be intercepted by a scraper plate, then the water droplets and the dirt particles enter a wastewater bucket through a dirt suction pipe, a small part of the water droplets and the dirt particles enter the next cycle with the roller brush, the small part of the water droplets and the dirt particles may be thrown out of the roller brush in the tangential direction of the roller brush due to the high-speed rotation of the roller brush, the roller brush cover acts to intercept the thrown water droplets and the dirt particles, and meanwhile, the thrown water droplets and the dirt particles cannot be cleaned by self-cleaning. In the related arts, self-cleaning is started after the work of the cleaning device is completed, in the self-cleaning process, the steps of soaking the roller brush, washing the roller brush by large-flow water and using a scraper plate to scrape off the water are carried out, so that cleaning of the roller brush is achieved. However, a large amount of dirt left on a roller brush cover is ignored, if the roller brush cover is not removed for cleaning for a long time, the dirt will dry on the inner surface of the roller brush cover, making it more difficult to clean. If a user has to manually clean the roller brush cover each time after the self-cleaning process is completed, the user experience will be greatly reduced.

In order to solve the above problems, the third aspect of the present disclosure provides a cleaning device and a cleaning assembly.

In a first embodiment according to the third aspect of the present disclosure, a cleaning device is provided, the cleaning device comprises a housing, a roller brush, a roller brush cover assembly and a driver assembly, wherein the roller brush is rotatably disposed on the housing; the roller brush cover assembly includes a movable cover plate; the driver assembly is configured to apply, to the movable cover plate, a force that causes the movable cover plate to move toward the roller brush, to drive the movable cover plate to move relative to the base body; and the movable cover plate has a first position and a second position, where in the first position, the movable cover plate contacts the roller brush under an action of the driver assembly, and in the second position, the movable cover plate is separated from the roller brush.

In the second embodiment according to the third aspect of the present disclosure, based on the first embodiment, the driver assembly comprises a first elastic member connected to the movable cover plate, and an elastic return force of the first clastic member always has a tendency of pressing the movable cover plate against the roller brush.

In the third embodiment according to the third aspect of the present disclosure, based on the second embodiment, the roller brush cover assembly further comprises a base body and a fixed cover plate connected to the base body, the movable cover plate is disposed on the base body, the fixed cover plate is disposed on a side of the movable cover plate away from the roller brush, a gap is formed between the fixed cover plate and the movable cover plate, the first elastic member is disposed in the gap, and two ends of the first elastic member are connected to the fixed cover plate and the movable cover plate respectively.

In the fourth embodiment according to the third aspect of the present disclosure, based on the second embodiment, the cleaning device further comprises a stop member configured to overcome an elastic return force of the first elastic member to stop the movable cover plate at the second position.

In the fifth embodiment according to the third aspect of the present disclosure, based on the first embodiment, the cleaning device further comprises a second elastic member connected to the movable cover plate, the second elastic member has a tendency of making the movable cover plate to move away from the roller brush, so as to stop the roller brush to the second position; and the driver assembly is configured to drive the movable cover plate to overcome an elastic return force of the second elastic member, and move from the second position to the first position.

In the sixth embodiment according to the third aspect of the present disclosure, based on the fifth embodiment, the driver assembly comprises a servo, a transmission assembly and a pushing member connected in sequence, the transmission assembly is configured to convert a rotating motion of the servo into a linear motion to drive the pushing member, and the pushing member is configured to drive the movable cover plate to overcome an elastic return force of the second elastic member and move from the second position to the first position.

In the seventh embodiment according to the third aspect of the present disclosure, based on the sixth embodiment, a buffer member is disposed between the pushing member and the movable cover plate.

In the eighth embodiment according to the third aspect of the present disclosure, based on the sixth embodiment, the roller brush cover assembly further comprises a fixed cover plate connected to the base body, the fixed cover plate is disposed on a side of the movable cover plate away from the roller brush, a gap is formed between the fixed cover plate and the movable cover plate, the second elastic member is disposed in the gap, and two ends of the second elastic member are connected to the fixed cover plate and the movable cover plate respectively.

In the ninth embodiment according to the third aspect of the present disclosure, based on the third embodiment, the movable cover plate and the base body are integrally connected, hinged or connected by a flexible member.

In the tenth embodiment according to the third aspect of the present disclosure, based on any one of the first to eighth embodiments, the cleaning device further comprises: a dirt suction port close to and facing the surface of the roller brush; a scraper plate located above the dirt suction port and below the base body, the scraper plate is in contact with the roller brush and used to scrape off the dirt left in the roller brush; and a liquid spraying assembly located above the scraper plate, the liquid spraying assembly is configured to release a cleaning medium for cleaning the roller brush, and a barrier member is disposed on a linear path between the liquid spraying assembly and the roller brush.

In the eleventh embodiment according to the third aspect of the present disclosure, based on the tenth embodiment, a flow channel is formed in the liquid spraying assembly, a liquid outlet is formed on the liquid spraying assembly, and the liquid outlet faces the roller brush or faces the scraper plate.

In the twelfth embodiment according to the third aspect of the present disclosure, based on the eleventh embodiment, a flow guiding inclined surface is formed on the scraper plate, and the flow guiding inclined surface is configured to guide the cleaning medium released by the liquid outlet to the roller brush.

In the thirteenth embodiment according to the third aspect of the present disclosure, based on the tenth embodiment, the roller brush cover assembly further comprises a base body located between the roller brush and the liquid spraying assembly, the barrier member comprises the base body, the roller brush cover assembly is detachably fitted with the housing, a cleaning member is disposed on a lower edge of a surface of the base body facing the liquid spraying assembly, and the cleaning member is configured to clean the surface of the liquid spraying assembly facing the base body during the process of assembling the roller brush cover assembly to the housing.

In the fourteenth embodiment according to the third aspect of the present disclosure, based on the eleventh embodiment, an extension portion is formed on the liquid spraying assembly, a flow guiding inclined surface is formed on the extension portion, and the flow guiding inclined surface is configured to guide the cleaning medium released by the liquid outlet to the roller brush.

In the fifteenth embodiment according to the third aspect of the present disclosure, based on the twelfth or fourteenth embodiment, there is a gap between the barrier member and the flow guiding inclined surface, and the gap forms a channel for the cleaning medium to flow to the roller brush.

In the sixteenth embodiment according to the third aspect of the present disclosure, based on the fifteenth embodiment, a plurality of flow dividing ribs are disposed at a distance on the flow guiding inclined surface.

In the seventeenth embodiment according to the third aspect of the present disclosure, based on the sixteenth embodiment, a plurality of liquid outlets are disposed at a distance, and a water diving rib is disposed between the every two adjacent liquid outlets.

In the eighteenth embodiment according to the third aspect of the present disclosure, based on the sixteenth embodiment, a height of a gap between the barrier member and the flow guiding inclined surface is equal to the height of the flow dividing rib.

In the nineteenth embodiment according to the third aspect of the present disclosure, based on the tenth embodiment, the bottom of the barrier member is not lower than the axis of the roller brush.

In the twentieth embodiment according to the third aspect of the present disclosure, a cleaning assembly for a cleaning device is provided, the cleaning assembly comprises: a roller brush cover assembly including the base body and the movable cover plate disposed on the base body; and a driver assembly configured to apply, to the movable cover plate, a force that causes the movable cover plate to move toward the roller brush, to drive the movable cover plate to rotate relative to the base body; wherein the movable cover plate has a first position and a second position, in the first position, the movable cover plate presses against the roller brush under an action of the driver assembly, and in the second position, the movable cover plate is separated from the roller brush.

According to the cleaning device provided by the embodiments of the third aspect of the present disclosure, the movable cover plate is disposed in the roller brush cover assembly, the driver assembly applies a force to the movable cover plate to enable the movable cover plate to move toward the roller brush, so that the movable cover plate is driven to rotate relative to the base body, the movable cover plate has a first position and a second position, and in the first position, the movable cover plate presses against the roller brush under an action of the driver assembly, so that the automatic cleaning of the movable cover plate by the roller brush can be achieved, and the user experience is improved.

Referring to FIG. 31 to FIG. 49, the cleaning device provided by some embodiments of the present disclosure may have a housing 310, a roller brush 320, a roller brush cover assembly 330, a scraper plate 340, a liquid spraying assembly 350, a dirt suction port 350, and a dirt suction channel located inside the cleaning device and in communication with the dirt suction port 350. The cleaning device can clean the dirt on the floor by means of the roller brush 320 and suck up the dirt on the floor through the suction port 350, the sucked up dirt entering into the suction channel through the suction port 350.

The cleaning device provided by the embodiment of the present disclosure is used for cleaning solid and liquid on the floor, wherein the roller brush 320 can rotate around the first axis, the cleaning of the solid and liquid on the floor to be cleaned is completed through the roller brush 320, and separating the solids and the liquid is completed by the cooperation with the scraper plate 340. Specifically, the solid and liquid on the floor can be cleaned only when the roller brush 320 is in contact with the floor, and when the surface of the roller brush 320 is in contact friction with the floor, the roller brush 320 can adsorb the solid and liquid on the floor on the surface of the roller brush 320 and rotate with the roller brush 320, specifically, in the figure, the rotation direction of the roller brush 320 is an counterclockwise direction, during the rotation process, the solid and liquid on the surface of the roller brush 320 will first be separated from the surface of the roller brush 320 due to its own gravity, while the solid and liquid that are not freely separated will rotate with the roller brush 320, and the surface of the roller brush 320 adsorbed with the solid and liquid will pass through the area where the scraper plate 340 is located, so that under the cooperation of the scraper plate 340, the solid and liquid are scraped off and separated from the surface of the roller brush 320. It should be noted that the scraper plate 340 is located above the dirt suction port 350, and the solid or liquid freely detached from the surface of the roller brush 320 and the solid or liquid scraped off by the scraper plate 340 from the surface of the roller brush 320 will be sucked into the dirt suction channel through the dirt suction port 350.

The liquid spraying assembly 350 is used for applying liquid of the cleaning medium to the roller brush 320. In the process of cleaning the floor by the cleaning device, the used cleaning medium is mainly provided by the liquid spraying assembly 350 in the cleaning device, specifically, the liquid spraying assembly 350 is provided with a plurality of liquid outlets 3501, the liquid outlets 3501 are close to the surface of the roller brush 320, the plurality of liquid outlets 3501 are sequentially disposed along the axial direction of the roller brush 320, and the liquid outlets 3501 are connected to the water supply device through the flow channel 3502, so that the cleaning medium of the water supply device is drained to the surface of the roller brush 320 through the liquid outlets 3501. The liquid spraying assembly 350 may be disposed on the roller brush cover assembly 330, or the liquid spraying assembly 350 is located on the housing 310.

The roller brush cover assembly 330 is disposed above the roller brush 320, and is configured to protect the roller brush 320 and to intercept the solid and liquid being thrown out of the roller brush 320. Specifically, in the cleaning process of the cleaning device, the roller brush 320 rotates at a high speed, most of the water droplets and dirt particles adhering to the fluff of the roller brush 320 will be intercepted by the scraper plate 340, and then enter the dirt suction channel through the dirt suction port 350, and a small part of the water droplets and dirt particles will pass through the scraper plate 340 and be brought by the roller brush 320 to enter the next cycle, and the small part of the water droplets and dirt particles will be thrown out along the tangential direction of the roller brush 320 under the high-speed rotation of the roller brush 320, and the roller brush cover assembly 330 can intercept the thrown out water droplets and dirt particles.

In the related art, the water droplets and dirt particles having been thrown onto the inner surface of the roller brush cover assembly 330 cannot be cleaned by self-cleaning, the self-cleaning is performed after the cleaning device operates, in the self-cleaning process, the roller brush 320 is soaked and then is flushed by the water with a large flow, and the scraper plate 340 is suitable for scraping the roller brush 30 to clean it, but a large amount of dirt left on the roller brush cover assembly 330 is ignored. If the roller brush cover assembly 330 is not removed for cleaning for a long time, the dirt may dry on the inner surface of the roller brush cover assembly 330, and thus cleaning of the roller brush cover assembly 330 becomes more difficult. However, if a user has to manually clean it each time after self-cleaning is completed, the user experience will be greatly reduced.

Based on this, in Embodiments 1 and 2 of the present disclosure, a specific structure of the cleaning device is further improved to implement automatic cleaning of the roller brush cover assembly 330; and in Embodiments 3 and Embodiment 4, a liquid spraying manner of the cleaning device is improved to further reduce dirt accumulation at the roller brush cover assembly 330 and the liquid spraying assembly 350.

Embodiment 1

As shown in FIG. 31 to FIG. 34, the cleaning device provided by the present embodiment at least comprises a housing 310, a roller brush 320, a roller brush cover assembly 330 and a driver assembly 370, wherein the roller brush 320 is rotatably disposed on the housing 310; the roller brush cover assembly 330 comprises a base body 3301 disposed on the housing 310 and a movable cover plate 3302 disposed on the base body 3301; the driver assembly 370 is configured to apply a force to the movable cover plate 3302 to move the movable cover plate 3302 toward the roller brush 320, so as to drive the movable cover plate 3302 to move relative to the base body 3301, wherein a movement manner of the movable cover plate 3302 includes but is not limited to a rotation or a translation; and the movable cover plate 3302 has a first position and a second position, in the first position, the movable cover plate 3302 is in contact with the roller brush 320 under the action of the driver assembly 370, and in the second position, the movable cover plate 3302 is separated from the roller brush 320. Specifically, the driver assembly 370 comprises a first elastic member 3701 connected to the movable cover plate 3302, and an elastic return force of the first elastic member 3701 always has a tendency of pressing the movable cover plate 3302 against the roller brush 320.

In the above embodiment, the first elastic member 3701 is configured to provide an acting force that allows the movable cover plate 3302 to move relative to the roller brush 320, so that the movable cover plate 3302 can always press against and contact with the surface of the roller brush 320; during the operation of the cleaning device, the rotating roller brush 320 is always in contact with the inner side of the movable cover plate 3302, and cleaning of the movable cover plate 3302 is achieved by the friction effect of the roller brush 320.

The specific form of the first elastic member 3701 is not specifically limited in this embodiment of the present disclosure, and any elastic member capable of achieving the above functions can be used, for example, the specific form of the first elastic member 3701 includes but is not limited to a torsion spring, a compression spring, a tension spring, a leaf spring and the like. In view of the simplicity of the structure and the energy consumption, the first elastic member 3701 is preferably a coil spring. Here, one or more first elastic members 3701 may be disposed, for example, the first elastic members 3701 may be coil springs, and two coil springs are provided along the axial direction of the roller brush 320, and the elastic force of each coil spring is preferably from 10 N to 15 N, so as to avoid that the cleaning effect cannot meet the requirement due to the too low elastic force of the coil spring, and avoid the influence of the too large clastic force of the coil spring on the current of the drive motor, thereby affecting the endurance time of the whole machine.

In some embodiments, the roller brush cover assembly 330 further comprises a fixed cover plate 3303 connected to or integrally formed on the base body 3301, the fixed cover plate 3303 is disposed on a side of the movable cover plate 3302 away from the roller brush 320, a gap 3304 is formed between the fixed cover plate 3303 and the movable cover plate 3302, the first elastic member 3701 is disposed in the gap 3304, and two ends of the first elastic member 3701 are respectively connected to the fixed cover plate 3303 and the movable cover plate 3302. On the one hand, the fixed cover plate 3303 may be used to protect the movable cover plate 3302 which is movably disposed; on the other hand, the fixed cover plate 3303 may serve as a carrier to which the first elastic member 3701 is attached; in addition, the gap 3304 formed between the fixed cover plate 3303 and the movable cover plate 3302 provides space for the movement of the movable cover plate 3302 to the second position.

In some embodiments, in the state in which the roller brush 320 is uninstalled, the distance between the limit position that the movable cover plate 3302 can reach under the driving action of the first elastic member 3701 and the axial position of the roller brush 320 is not greater than the minimum diameter of the roller brush 320 throughout the service life cycle, so that the first position of the movable cover plate 3302 is not a uniquely fixed specific position throughout the service life cycle of the roller brush 320. In particular, as the diameter of the roller brush 320 becomes smaller, the first position of the movable cover plate 3302 will move accordingly, i.e., as the wear and tear diameter of the roller brush 320 becomes smaller, the movable cover plate 3302 can maintain the pressing against the roller brush 320, so that the movable cover plate 3302 still has a good pressing effect when the roller brush 320 is in use for a long period of time, thereby the user experience is optimized. For example, the distance between the downward limit position of the movable cover plate 3302 and the axial position of the roller brush 320 may be set to be 2-5 mm smaller than the diameter of the roller brush 320 when the roller brush 320 is worn down to its smallest diameter, which is adjusted by relying on the elastic force of the first clastic member 3701, which can ensure the full-cycle fit of the movable cover plate 3302 with the roller brush 320.

In some embodiments, the fitting length of the movable cover plate 3302 with the roller brush 320 in the circumferential direction in the first position is less than ½ of the circumference of the roller brush 320, and greater than ⅓ of the circumference of the roller brush 320, and the fitting length may be too large to increase the friction between the movable cover plate 3302 and the roller brush 320, thereby affecting the range of the whole machine.

In some embodiments, the movable cover plate 3302 extends in the axial direction of the roller brush 320, the extending length of the movable cover plate 3302 along the axial direction of the roller brush 320 substantially covers the axial length of the roller brush 320, and the shape of the movable cover plate 3302 matches the shape of the fixed cover plate 3303 or the roller brush 320.

A use scenario of the cleaning device provided in this embodiment of the present disclosure is as follows: throughout the entire period of the cleaning work, under an elastic action of the first elastic member 3701, the movable cover plate 3302 of the roller brush cover assembly 330 is located at the first position and is in contact with the roller brush 320, the roller brush 320 rotates at a high speed, and after the roller brush 320 is in contact with the floor, the fluff of the roller brush 320 is adhered with water droplets and dirty particles, and along with the rotation of the roller brush 320, most of the water droplets and the dirty particles are intercepted by the water scraper plate, and then enter the wastewater bucket through the dirt suction pipe. Here, a small part of the water droplets and the dirty particles are continuously rotated along with the roller brush 320. Since the movable cover plate 3302 is in contact with the roller brush 320, the small part of the water droplets and dirt particles will not be thrown out in the tangential direction of the roller brush 320, but enter the next cycle and will be scraped by the scrapper plate.

As the movable cover plate 3302 is in contact fit with the roller brush 320, the movable cover plate 3302 is always rubbed by the surface of the roller brush 320, so as to achieve the purpose of cleaning the inner surface of the movable cover plate 3302, that is, the movable cover plate 3302 can not only be used to intercept the thrown water drops and dirty particles, but also cannot accumulate the dirty particles on the movable cover plate 3302 after the cleaning work is completed; in addition, the movable cover plate 3302 is in contact with the roller brush 320, and the medium sprayed by the water spraying assembly can also uniformly wet the fluff of the roller brush 320.

In the above embodiment, without interference of other external forces, the clastic return force of the first elastic member 3701 always causes the movable cover plate 3302 to press against the roller brush 320 to be at the first position, and in order to limit the movable cover plate 3302 at the second position, the cleaning device further comprises a stop member (not shown in the figure) for overcoming the elastic return force of the first elastic member 3701 to limit the movable cover plate 3302 at the second position. Here, the specific form of the stop member is not specifically limited in this embodiment of the present disclosure, and any stop member capable of implementing the foregoing functions may be used, for example, the stop member may be a buckle member, and when the movable cover plate 3302 moves to the second position, a buckle connection may be implemented between the buckle member and the upper cover plate, thereby implementing the limitation on the movable cover plate 3302. By the arrangement of the stop member, the movable cover plate 3302 is limited at the second position when the cleaning device performs the cleaning work, thereby avoiding unnecessary energy consumption caused by friction between the roller brush 320 and the movable cover plate 3302.

Another use scenario of the cleaning device provided by the embodiment of the present disclosure is as follows: during the entire cycle of the cleaning work performed by the cleaning device, the movable cover plate 3302 is limited at the second position through the stop member, the movable cover plate 3302 is not in contact with the roller brush 320, the roller brush 320 rotates at a high-speed in the cleaning process, after the roller brush 320 is in contact with the floor, the fluff of the roller brush 320 is adhered with water droplets and dirty particles, and with the rotation of the roller brush 320, most of the water droplets and dirty particles are intercepted by the scraper plate, and then enter the wastewater bucket through the dirt suction pipe, and a small part of the water droplets and dirty particles continue to rotate along with the roller brush 320, and the small part of the water droplets and dirty particles are thrown out in the tangential direction of the roller brush 320 and blocked by the movable cover plate 3302; after the cleaning work is completed, the cleaning device is placed on the base station to start self-cleaning, the stop member releases the limitation on the movable cover plate 3302, the movable cover plate 3302 of the roller brush cover assembly 330 is in the first position and is in contact with the roller brush 320 under the elastic force of the first elastic member 3701, and the movable cover plate 3302 is rubbed by the surface of the roller brush 320 through the high-speed rotation of the roller brush 320, so that the purpose of cleaning of the inner surface of the movable cover plate 3302 can be achieved, and in this process, liquid medium can be sprayed through the water spraying assembly to wet the fluff of the roller brush 320, and improving the cleaning effect on the movable cover 3302. Of course, this process can also be carried out in other work processes other than the self-cleaning.

Figure 33:
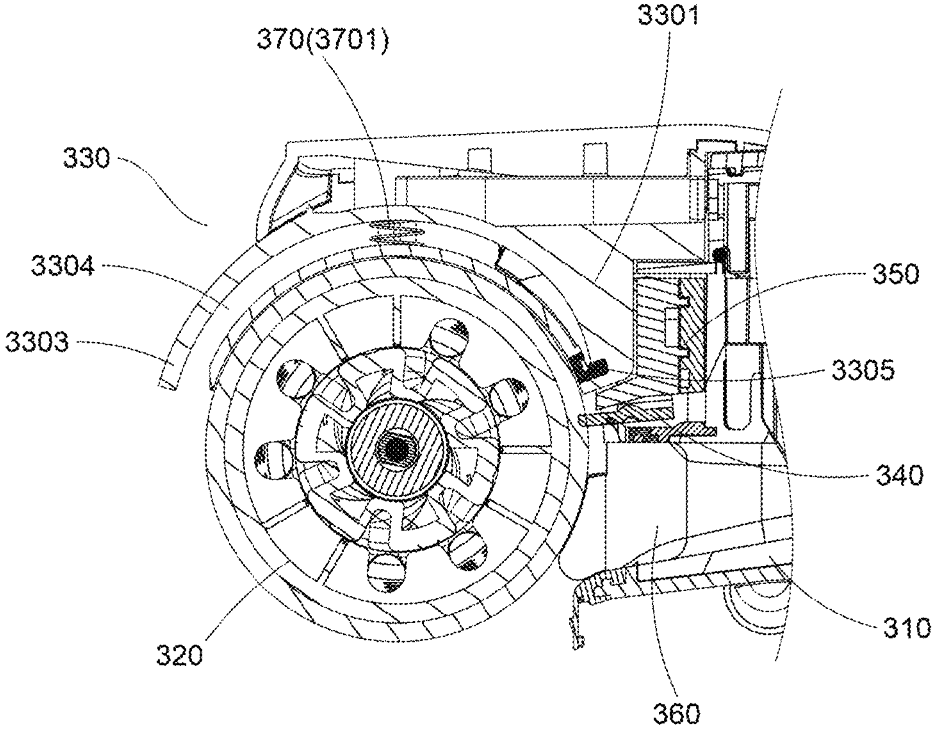
FIG. 33 is a partial enlarged view of FIG. 32.
Figure 34:
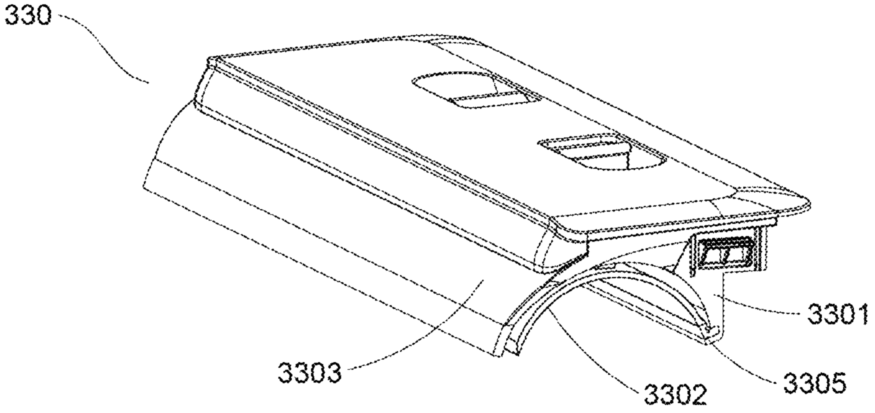
FIG. 34 schematically shows a perspective structural diagram of the roller brush cover assembly according to an embodiment of the present disclosure.
Figure 35:
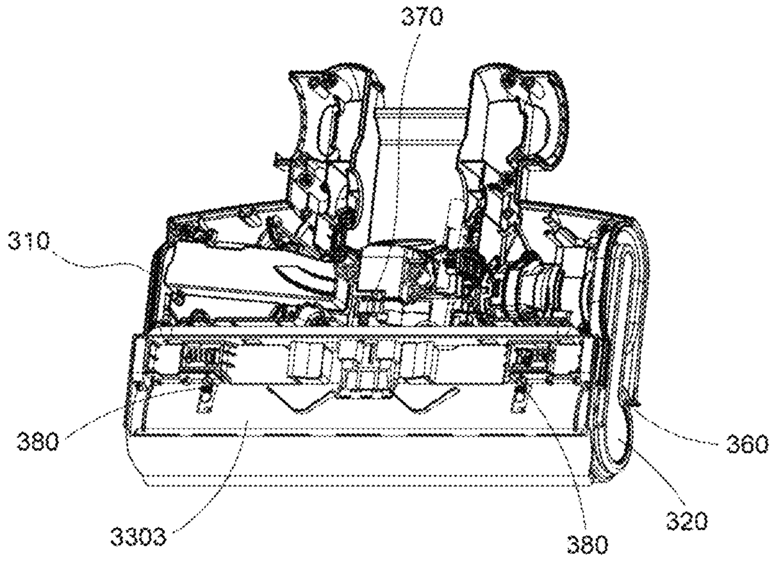
FIG. 35 schematically shows an internal structural diagram of the second cleaning device according to an embodiment of the present disclosure.
Figure 36:
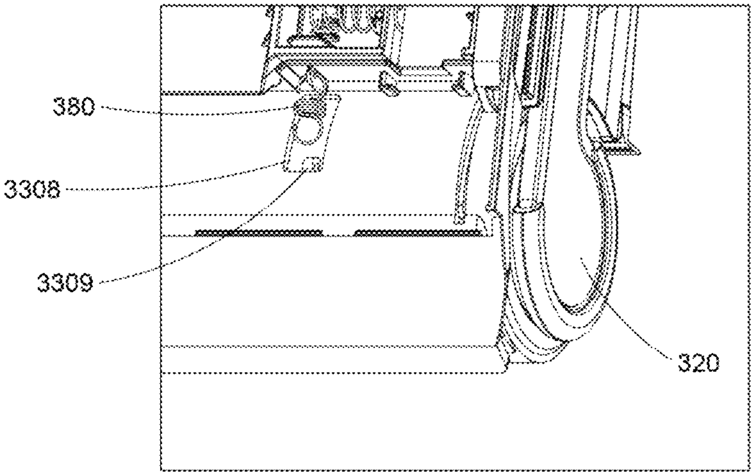
FIG. 36 is a partial enlarged view of FIG. 35.
Figure 43:
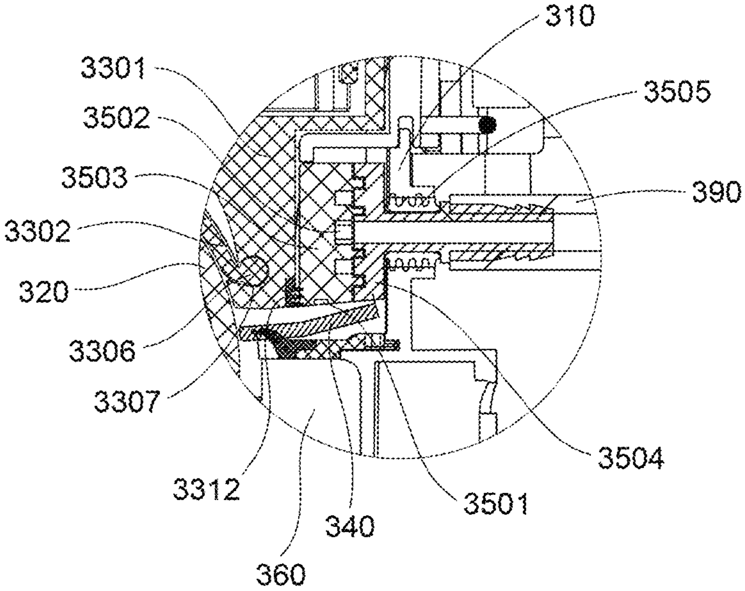
FIG. 43 is a partial enlarged view of the region B in FIG. 42.

In some embodiments, a connection manner between the movable cover plate 3302 and the base body 3301 includes, but is not limited to, being integrally formed, hinged, or connected through a flexible member 3305. For example, the movable cover plate 3302 and the base body 3301 are connected in an integral connection manner, the movable cover plate 3302 is a curved plate structure, which is connected to the base body 3301 in a cantilever manner, and has a certain clastic deformation range, so that the movable cover plate 3302 can be switched between the first position and the second position, however, the integral connection manner has relatively high requirements on the material performance of the movable cover plate 3302, so as to avoid aging of the material caused by excessive use times; for another example, as shown in FIG. 43, the movable cover plate 3302 is hinged to the base body 3301, a hinge shaft 3306 is formed at one end of the movable cover plate 3302, a hinge groove 3307 is formed in the base body 3301, the hinge shaft 3306 is embedded in the hinge groove 3307, and the extension directions of the hinge shaft 3306 and the hinge groove 3307 are both parallel to the axis direction of the roller brush 320; for another example, as shown in FIGS. 33 and 34, the sliding cover plate and the base body 3301 are connected through a flexible member 3305, the flexible member 3305 may be selected from rubber, silica gel, latex, flexible plastic, etc., and the flexible member 3305 may enable the movement direction of the sliding cover plate to have more degrees of freedom without being limited to the rotation around the axis. In addition, the setting of the flexible member 3305 eliminates the need for direct contact between the movable cover plate 3302 and the base body 301, avoiding bending or friction loss caused by rigid contact.

Embodiment II

As shown in FIG. 35 to FIG. 41, the cleaning device provided by the present embodiment at least comprises a housing 310, a roller brush 320, a roller brush cover assembly 330, a driver assembly 370 and a second elastic member 380, wherein the roller brush 320 is rotatably disposed on the housing 310; the roller brush cover assembly 330 comprises a base body 3301 disposed on the housing 310 and a movable cover plate 3302 disposed on the base body 3301; the movable cover plate 3302 has a first position and a second position, in the first position, the movable cover plate 3302 presses against the roller brush 320 under the action of the driver assembly 370, and in the second position, the movable cover plate 3302 is separated from the roller brush 320. The second elastic member 380 is connected to the movable cover plate 3302, and the second elastic member 380 has a tendency of making the movable cover plate 3302 to move away from the roller brush 320, so as to limit the roller brush 320 at the second position; the driver assembly 370 is configured to apply a force to the movable cover plate 3302 to enable the movable cover plate 3302 to move toward the roller brush 320, so as to drive the movable cover plate 3302 to rotate relative to the base body 3301; specifically, the driver assembly 370 is configured to drive the movable cover plate 3302 to overcome an elastic return force of the second clastic member 380, and move from the second position to the first position.

In the above embodiment, the second elastic member 380 is configured to provide an acting force that enables the movable cover plate 3302 to move in a direction away from the roller brush 320, so that the movable cover plate 3302 can always have a tendency of moving away from the roller brush 320; in a working process of the cleaning device, the rotating roller brush 320 is not in contact with the movable cover plate 3302; and the driver assembly 370 is configured to drive the movable cover plate 3302 to a first position in contact with the roller brush 320 when needed, so that the movable cover plate 3302 can be cleaned through the friction effect of the roller brush 320.

The specific form of the second elastic member 380 is not specifically limited in this embodiment of the present disclosure, and any clastic member capable of achieving the above functions can be used, for example, the specific form of the second elastic member 380 includes but is not limited to a torsion spring, a compression spring, a tension spring, a leaf spring, and the like. In view of the simplicity of the structure and the energy consumption, the second elastic member 380 is preferably a coil spring.

In some embodiments, the roller brush cover assembly 330 further comprises a fixed cover plate 3303 connected to the base body 3301, the fixed cover plate 3303 is disposed on a side of the movable cover plate 3302 away from the roller brush 320, and a gap 3304 is formed between the fixed cover plate 3303 and the movable cover plate 3302. The second elastic member 380 may be selected to be completely disposed in the gap 3304, and two ends of the second elastic member 380 are connected to the fixed cover plate 3303 and the movable cover plate 3302 respectively; the second elastic member 380 may also be selected to penetrate through the fixed cover plate 3303, for example, a first through hole 3308 is formed in the fixed cover plate 3303, the second elastic member 380 passes through the fixed cover plate 3303 through the first through hole 3308, a hanging lug 3309 is formed on a side of the movable cover plate 3302 facing the fixed cover plate 3303, one end of the second elastic member 380 is connected to the hanging lug 3309, and the other end of the second elastic member 380 passes through the first through hole 3308 and is fixed to other fixed structures, so that the arrangement of the second clastic member 380 is not limited to the size of the gap 3304, and more optional spaces are provided for selecting and installing of the second elastic member 380. On the one hand, the fixed cover plate 3303 may be used to protect the movable cover plate 3302 which is movably disposed or may serve as a carrier to which the second elastic member 380 is attached; on the other hand, the gap 3304 formed between the fixed cover plate 3303 and the movable cover plate 3302 provides a space for movement of the movable cover plate 3302 between the first position and the second position.

A use scenario of the cleaning device provided by the embodiment of the present disclosure is as follows: during the entire cycle of cleaning work performed by the cleaning device, the driver assembly 370 does not apply an acting force to the movable cover plate 3302, the movable cover plate 3302 is in the second position under the action of the second elastic member 380, the movable cover plate 3302 is not in contact with the roller brush 320, the roller brush 320 rotates at a high-speed in the cleaning process, and after the roller brush 320 is in contact with the floor, water droplets and dirty particles adhere to the fluff of the roller brush 320, and with the rotation of the roller brush 320, most of the water droplets and dirty particles are intercepted by the water scraper plate, and then enter the wastewater bucket through the dirt suction pipe, and a small part of the water droplets and dirt particles continue to rotate along with the roller brush 320, and the small part of the water droplets and dirty particles are thrown out in the tangential direction of the roller brush 320 and are blocked by the movable cover plate 3302; after the cleaning work is completed, the cleaning device is placed on the base station to start self-cleaning, and the driver assembly 370 drives the movable cover plate 3302 to overcome the elastic return force of the second elastic member 380, and moves to the first position from the second position, so that the movable cover plate 3302 of the roller brush cover assembly 330 is in the first position and in contact with the roller brush 320, and the movable cover plate 3302 is rubbed by the surface of the roller brush 320 through the high-speed rotation of the roller brush 320, so that the purpose of cleaning of the inner surface of the movable cover plate 3302 can be achieved, and in this process, liquid medium can be sprayed through the water spraying assembly to wet the fluff of the roller brush 320, and improving the cleaning effect on the movable cover 3302. Of course, this process can also be carried out in other work processes other than the self-cleaning.

In this embodiment, the connection manner between the movable cover plate 3302 and the base body 3301 includes, but is not limited to, integral connection, hinge connection or connection through the flexible member 3305, and for a specific setting form, reference may be made to the corresponding description in Embodiment 1, and details are not described herein again.

In some embodiments, as shown in FIGS. 35-39, the driver assembly 370 comprises a servo 3704, a transmission assembly and a pushing member 3705 connected in sequence, the transmission assembly is configured to convert a rotating motion of the servo 3704 into a linear motion to drive the pushing member 3705, and the pushing member 3705 is configured to drive the movable cover plate 3302 to overcome an elastic return force of the second elastic member 380 and move from the second position to the first position. Specifically, the pushing member 3705 is in sliding fit with the base 3301, and the first end of the pushing member 3705 can drive the sliding cover plate to move between the first position and the second position during the sliding process of the pushing member 3705 relative to the base 3301, so that the pushing member 3705 can slide relative to the base 3301 under the driving action of the servo 3704. In a case where the fixed cover plate 3303 is provided, the fixed cover plate 3303 is provided with a third through hole 3311 through which the pushing member 3705 passes.

Specifically, the servo 3704 drives the pushing member 3705 to move along a linear line through the transmission assembly, in this embodiment, the movable cover plate 3302 and the driver assembly 370 are disposed in sequence, the servo 3704 is disposed right above the housing 310, the pushing member 3705 can move back and forth in the front-rear direction or substantially in the front-rear direction, meanwhile, the extending direction of the pushing member 3705 is also or substantially in the front-rear direction, the extending length of the pushing member 3705 can be fully utilized, the servo 3704 is installed above the housing 310, the pushing member 3705 extends and moves in the front-rear direction, the space occupation of the product in the up-down direction can be reduced, and the housing 310 is fully utilized as a carrier of the driver assembly 370. Specifically, the servo 3704 includes, but is not limited to, a linear motor, a pushing rod motor, a stepper motor, an electromagnet, a hydraulic device and the like, and is preferably a linear stepper motor, and may of course be other mechanisms capable of providing power.

Figure 37:
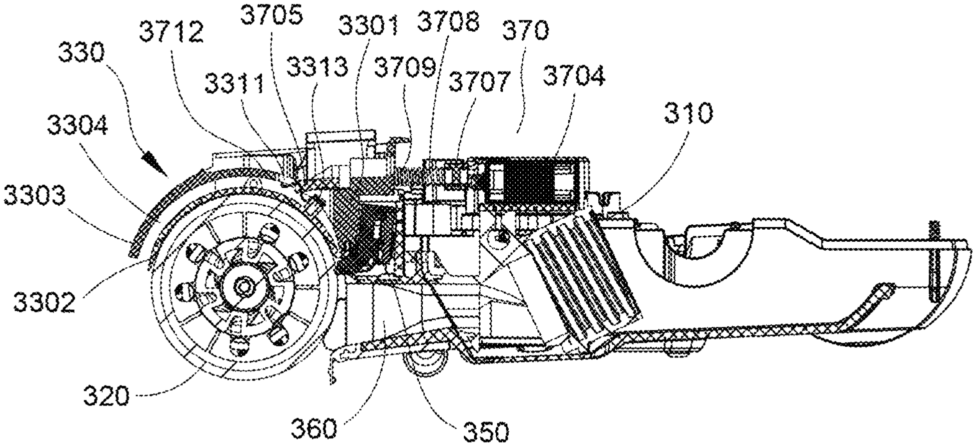
FIG. 37 schematically shows a cross-sectional view of the second cleaning device according to an embodiment of the present disclosure.
Figure 38:
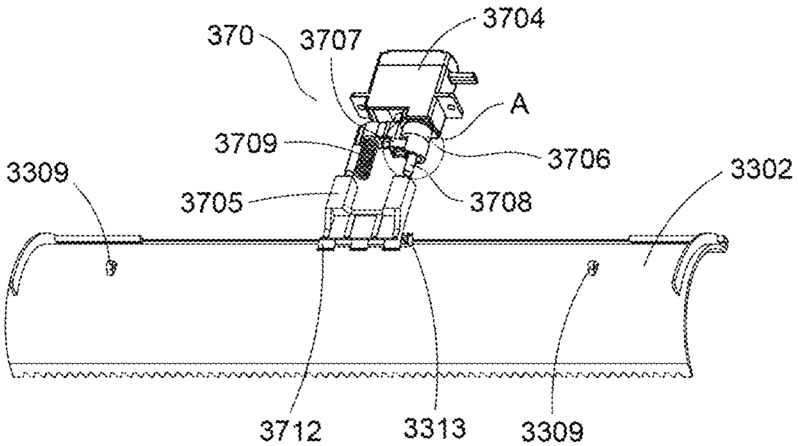
FIG. 38 schematically shows an structural diagram of the driver assembly and the movable cover plate in the second cleaning device according to an embodiment of the present disclosure.
Figure 39:
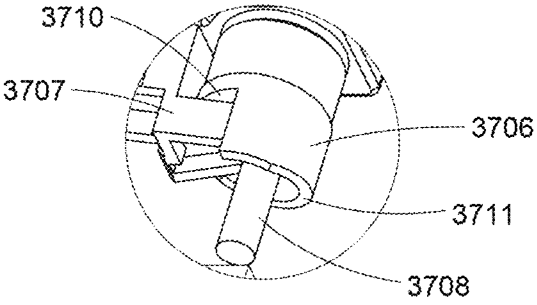
FIG. 39 is a partial enlarged view of the region A in FIG. 38.

In the above embodiments, the transmission assembly includes but is not limited to a gear set and a cam structure, and may of course be other structures capable of converting rotation motion into linear motion. This embodiment is described in detail using the transmission assembly as a cam structure as an example. As shown in FIG. 37 to FIG. 39, the transmission assembly comprises a cam 3706, a sliding block 3707, a pushing rod 3708, and a reset member 3709, a first end of the cam 3706 is connected to an output shaft of the servo 3704, a second end of the cam 3706 forms a spiral abutting surface, the abutting surface comprises at least an initial section 3710 and a spiral section 3711, along a direction of a rotation axis of the cam 3706, the initial section 3710 is closer to the first end of the cam 3706 than the spiral section 3711, the sliding block 3707 is configured to slide back and forth along the direction of the rotation axis of the cam 3706, the sliding block 3707 always abuts against the abutting surface of the cam 3706 under the action of the reset member 3709, the pushing rod 3708 is fixedly connected to the sliding block 3707, when the sliding block 3707 abuts against the initial section 3710, the sliding block 3707 and the pushing rod 3708 are in an initial position, at this time, a distance from the first section of the cam 3706 is a minimum, and when the cam 3706 rotates, the sliding block 3707 abuts against the spiral section 3711 and moves back and forth in the direction of the rotation axis of the cam 3706 under the action of the spiral section 3711, so that the pushing rod 3708 implements linear back and forth movement, and then the pushing rod 3708 drives the push member 3705 to act. The reset member 3709 is preferably a coil spring, and the sliding block 3707 always abuts against the abutting surface of the cam 3706 through the elastic reset force of the coil spring.

The direction of the rotation axis of the output shaft of the servo 3704, the direction of the rotation axis of the cam 3706, the sliding direction of the sliding block 3707, the sliding and extending directions of the pushing rod 3708 are in the front-rear direction or substantially in the front-rear direction, the extending length of the pushing rod 3708 can be fully utilized, the servo 3704 and the transmission assembly are installed above the housing 310, the space occupation of the product in the up-down direction can be reduced, and the housing 310 is fully utilized as a carrier of the driver assembly 370.

In some embodiments, a buffer member 3712 is disposed between the pushing rod 3708 and the movable cover plate 3302.

The buffer member 3712 is preferably a buffer spring. On the one hand, the buffer member 3712 can convert the translational motion of the pushing member 3705 in the front-rear direction into the oblique downward motion of the movable cover plate 3302 to complete the change of the motion direction, so that the driver assembly 370 can be disposed on the top of the housing 310 in the front-rear direction; on the other hand, when the movable cover plate 3302 is in the first position, the buffer member 3712 can allow the movable cover plate 3302 to have a certain movable buffer when being impacted, for example, when larger particles enter between the movable cover plate 3302 and the roller brush 320, the movable cover plate 3302 can enable the buffer member 3712 to deform and then move in a direction away from the roller brush 320, so that the structure damage caused by the rigid connection between the pushing member 3705 and the movable cover plate 3302 is avoided. The buffer member 3712 may be fixed on the movable cover plate 3302, for example, a fixed column 3313 is provided on a side of the movable cover plate 3302 away from the roller brush 320, and one end of the buffer member 3712 is fixed on the fixed column 3313.

An embodiment of the present disclosure provides a use scenario of the cleaning device as follows: during the entire cycle of the cleaning work performed by the cleaning device, the servo 3704 does not work, the sliding block 3707 abuts against the initial section 3710 under the action of the reset member 3709, at this time, the pushing rod 3708 moves away from the pushing member 3705, the pushing member 3705 does not apply a force on the movable cover 3302, the movable cover 3302 is in the second position under the action of the second elastic member 380, the movable cover plate 3302 is not in contact with the roller brush 320, and the roller brush 320 rotates at a high-speed during the cleaning process, after the roller brush 320 comes into contact with the floor, the water droplets and dirt particles adhere to the fluff of the roller brush, and as the roller brush 320 rotates, most of the water droplets and dirty particles will be intercepted by the scraper plate, and then enter into the wastewater bucket through the suction pipe, and a small part of the water droplets and dirt particles will continue to rotate with the roller brush 320.

The small part of water droplets and dirt particles will be thrown out in the tangential direction of the roller brush 320 and blocked by the movable cover plate 3302; after the cleaning work is completed, the cleaning device can be selected to be placed on the tray for self-cleaning, when the user triggers the self-cleaning button, the servo 3704 is started, and the cam 3706 is driven to rotate through the output shaft of the servo 3704, and the sliding block 3707 abuts against the spiral section 3711, a rotation motion of the cam 3706 is converted into a linear motion in the front-rear direction of the sliding block 3707 and the pushing rod 3708, the pushing rod 3708 acts on the pushing member 3705, the buffer member 3712 can convert the translational motion of the pushing member 3705 in the front-rear direction into the oblique downward motion of the movable cover plate 3302, and drive the movable cover plate 3302 to overcome the elastic return force of the second elastic member 380 to move from the second position to the first position, so that the movable cover plate 3302 of the brush cover assembly 330 is in the first position and is in contact with the roller brush 320, and through the high-speed rotation of the roller brush 320, the movable cover plate 3302 is rubbed by the surface of the roller brush 320, so as to realize the purpose of cleaning of the inner surface of the movable cover plate 3302, and in the process, liquid medium can be sprayed out through the water spray assembly to wet the fluff of the movable cover plate 3302. Of course, this process can also be carried out in other work processes other than self-cleaning.

Figure 40:
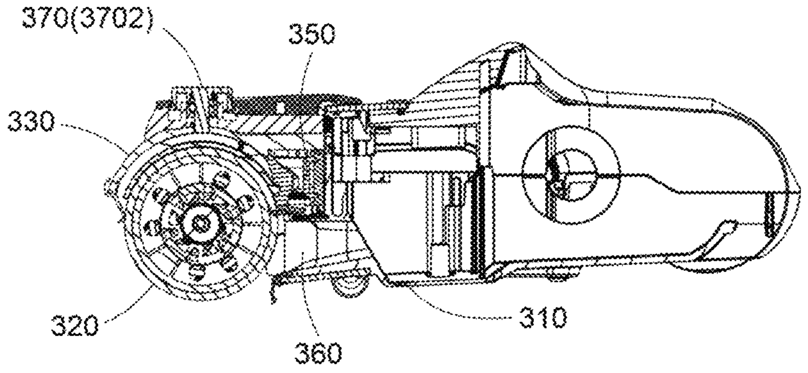
FIG. 40 schematically shows a cross-sectional view of the third cleaning device according to an embodiment of the present disclosure.
Figure 41:
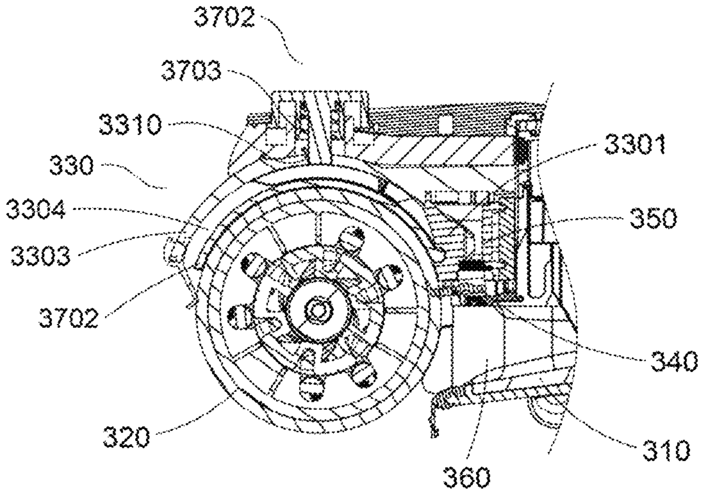
FIG. 41 is a partial enlarged view of FIG. 40.

In some embodiments, as shown in FIG. 40 and FIG. 41, the driver assembly 370 comprises a pressing member 3702 and a third elastic member 3703, the pressing member 3702 passes through the fixed cover plate 3303 and is in sliding fit with the fixed cover plate 3303, the pressing member 3702 is configured to drive the movable cover plate 3302 to overcome the elastic return force of the second elastic member 380 and move from the second position to the first position, and the third elastic member 3703 is disposed between the pressing member 3702 and the fixed cover plate 3303. Specifically, the pressing member 3702 has an abutting end facing the movable cover plate 3302 and a pressing end away from the movable cover plate 3302, the pressing member 3702 is in sliding fit with the fixed cover plate 3303, the pressing end of the pressing member 3702 is pressed by an external force, the pressing member 3702 slides relative to the fixed cover plate 3303, and the abutting end approaches to abut against the movable cover plate 3302, so that the sliding cover plate can be driven to move, so that the movable cover plate 3302 moves to the first position, after the external force applied to the pressing end is removed, the pressing member 3702 resets under the action of the third elastic member 3703, and the movable cover plate 3302 can return to the second position under the action of the second elastic member 380. The fixed cover plate 3303 defines a second through hole 3310 through which the pressing member 3702 passes. Optionally, the pressing member 3702 may also be designed in the form of a self-locking switch, the pressing end of the pressing member 3702 is pressed once by an external force, the pressing member 3702 is in a locked state, at this time, the pressing end of the pressing member 3702 limits the movable cover plate 3302 at the first position, and then the pressing end of the pressing member 3702 is pressed once by an external force, the pressing member 3702 jumps up, and the movable cover plate 3302 may return to the second position under the action of the second elastic member 380.

A use scenario of the cleaning device provided in this embodiment of the present disclosure is as follows: during the entire cycle of cleaning work performed by the cleaning device, the pressing member 3702 is in a reset state under the action of the third elastic member 3703, and at this time, the abutting end of the pressing member 3702 does not apply an acting force to the movable cover plate 3302, the movable cover plate 3302 is in the second position under the action of the second elastic member 380, the movable cover plate 3302 is not in contact with the roller brush 320, the roller brush 320 rotates at a high speed in the cleaning process, and after the roller brush 320 is in contact with the floor, the fluff of the roller brush 320 is adhered with water droplets and dirty particles, and with the rotation of the roller brush 320, most of the water droplets and dirt particles will be intercepted by the water scraper plate, and then enter the wastewater bucket through the dirt suction pipe, and a small part of the water droplets and dirt particles will continue to rotate along with the roller brush 320, and the small part of water droplets and dirt particles will be thrown out in the tangential direction of the roller brush 320 and blocked by the movable cover plate 3302; after the cleaning work is completed, the self-cleaning of the cleaning device may be performed, the user may press the pressing member 3702 by stepping on his foot or in other manners, the pressing member 3702 slides relative to the fixed cover plate 3303, and the pressing member 3702 drives the movable cover plate 3302 to overcome the elastic return force of the second elastic member 380, and moves from the second position to the first position, so that the movable cover plate 3302 of the roller brush cover assembly 300 is in the first position and in contact with the roller brush 320, and the movable cover plate 3302 is rubbed by the surface of the roller brush 320 through the high-speed rotation of the roller brush 320, so that the purpose of cleaning of the inner surface of the movable cover plate 3302 can be achieved. After the cleaning is completed, the pressing member 3702 is released or pressed again, and the movable cover plate 3302 moves to the second position under the action of the second elastic member 380. In the self-cleaning process, the fluff of the roller brush 320 may also be wetted by the liquid medium sprayed by the liquid spraying assembly 350, thereby improving the cleaning effect on the movable cover plate 3302.

According to the cleaning device provided by the embodiments 1 and 2 of the present disclosure, the movable cover plate 3302 is disposed in the roller brush cover assembly 330, the driver assembly 370 applies a force to the movable cover plate 3302 to enable the movable cover plate 3302 to move toward the roller brush 320, so that the movable cover plate 3302 is driven to rotate relative to the base body 3301, the movable cover plate 3302 has a first position and a second position, and in the first position, the movable cover plate 3302 presses against the roller brush 320 under an action of the driver assembly 370, so that the automatic cleaning of the movable cover plate 3302 by the roller brush 320 can be achieved, and the user experience is improved.

No matter in a cleaning process or in a self-cleaning process, the liquid of the cleaning medium can be applied to the roller brush 320 through the liquid spraying assembly 350, but in the cleaning device in the related art, the liquid outlet 3501 of the liquid spraying assembly 350 is often in close proximity to the roller brush 320, and some are even is in contact with the roller brush 320, in this case, dirt can easily enter the liquid spraying assembly 350 through the liquid outlet 3501 of the liquid spraying assembly 350, and block the liquid spraying assembly 350. In the cleaning devices of Embodiments 1 and 2, this problem will be more serious, when the movable cover plate 3302 is in the first position, the movable cover plate 3302 is in tight contact fit with the roller brush 320, and at this time, the cover plate assembly also catches a part of the dirt particles between the cover plate assembly and the scraper plate 340, so that the dirt is accumulated in the vicinity of the liquid outlet 3501, the possibility of blocking the liquid spraying assembly 350 is increased, based on this, in order to improve the specific structure of the cleaning device, the technical solutions of Embodiments 3 and 4 are provided.

Embodiment III

Figure 42:
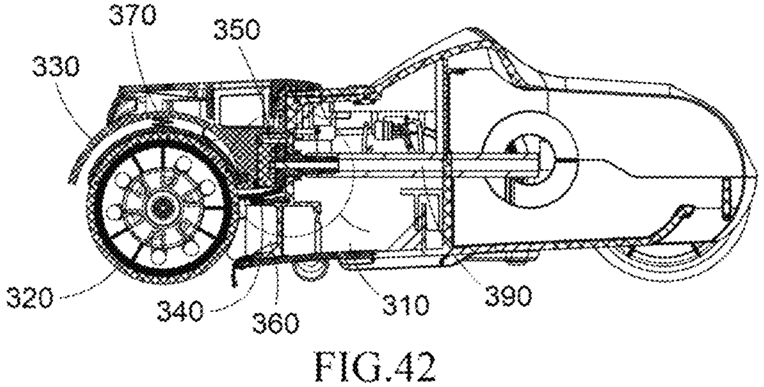
FIG. 42 schematically shows a cross-sectional view of the fourth cleaning device according to an embodiment of the present disclosure.

As shown in FIG. 42 and FIG. 43, the cleaning device provided in this embodiment at least comprises a housing 310, a roller brush 320, a roller brush cover assembly 330, a scraper plate 340, a liquid spraying assembly 350, a dirt suction port 350, and a dirt suction channel located inside the cleaning device and communicating with the dirt suction port 350, and the cleaning device can clean the dirt on the floor through the roller brush 320 and suck the dirt on the floor through the dirt suction port 350, and the sucked dirt enters the dirt suction channel through the dirt suction port 350. The dirt suction port 350 is located close to and facing the surface of the roller brush 320; the scraper plate 340 is located above the dirt suction port 350 and below the base 3301 of the roller brush cover assembly 330, the scraper plate 340 is in contact with the roller brush 320, and the scraper plate 340 is configured to scrape off the dirt adhering to the roller brush 320; the liquid spraying assembly 350 is located above the scraper plate 340, the liquid spraying assembly 350 is configured to release a cleaning medium for cleaning the roller brush 320, a flow channel 3502 is formed in the liquid spraying assembly 350, and the flow channel 3502 forms a liquid outlet 3501 on the liquid spraying assembly 350. A barrier member is provided on a linear path between the liquid spraying assembly 350 and the roller brush 320, in this embodiment, the barrier member is a base body 3301 of the roller brush cover assembly 330, and of course, in other embodiments, the barrier member may also be another structure of the roller brush cover assembly 330, a partial structure of the liquid spraying assembly 350, or another structure provided separately.

In the embodiments of the present disclosure, "a barrier member is provided on a linear path between the liquid spraying assembly 350 and the roller brush 320" should be understood as follows: in the horizontal direction where the liquid spraying assembly 350 is located, a barrier member is provided between the liquid spraying assembly 350 and the roller brush 320; or, in the direction facing the liquid spraying port of the liquid spraying assembly 350, a barrier member is provided between the liquid spraying assembly 350 and the roller brush 320. The cleaning device has a forward direction, and the roller brush 320 may be located in front of or behind the liquid spraying assembly 350.

Figure 48:
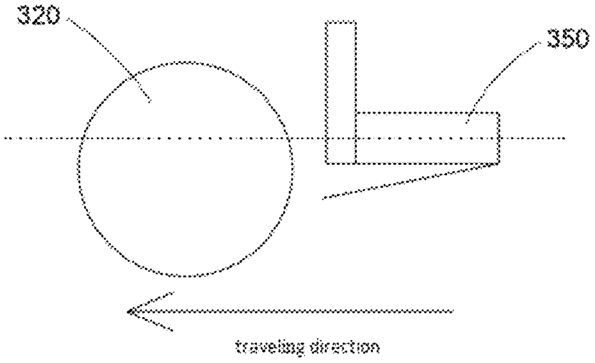
FIG. 48 schematically shows a positional relationship diagram of the liquid spraying assembly, the barrier member and the roller brush in an embodiment of the present disclosure.

Specifically, as shown in FIG. 48, in some use scenarios, the cleaning device has only one roller brush 320 to which the liquid spraying assembly 350 applies a cleaning medium for cleaning; the roller brush 320 is disposed in front of the liquid spraying assembly 350, and in the horizontal direction, a barrier member is provided between the liquid spraying assembly 350 and the roller brush; when the liquid outlet 3501 faces the roller brush, it may be considered that a barrier member is provided between the liquid outlet 3501 and the roller brush 320, and when the liquid outlet 3501 faces downward, a barrier member is provided between the liquid spraying assembly 350 and the roller brush, and the barrier member blocks dirt thrown by the roller brush 320 to the liquid spraying assembly.

Figure 49:
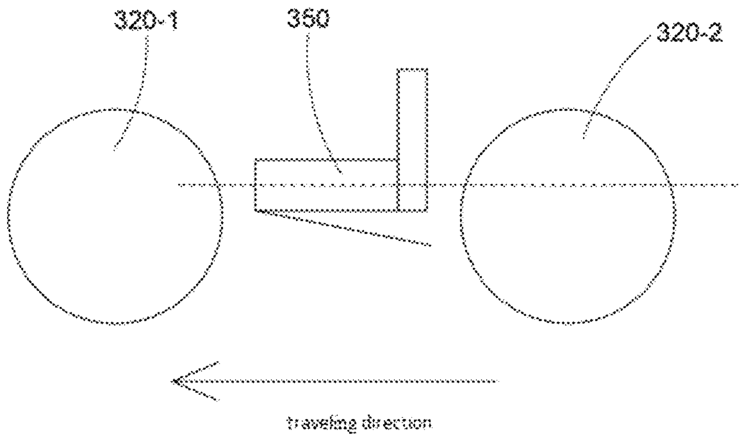
FIG. 49 schematically shows a positional relationship diagram of the liquid spraying assembly, the barrier member and the roller brush in another embodiment of the present disclosure.

As shown in FIG. 49, in another use scenario, the cleaning device is provided with two roller brushes, namely a first roller brush 320-1 located in front and a second roller brush 320-2 located in rear, and the types of the first roller brush 320-1 and the second roller brush 320-2 may be the same or different, and when the types of the first roller brush 320-1 and the second roller brush 320-2 are the same, they are similar to those in the embodiment shown in FIG. 48, and the corresponding details are not described herein again. When the types of the first roller brush 320-1 and the second roller brush 320-2 are different, for example, one of the two roller brushes is used for cleaning dry garbage, and the other one is used for cleaning wet garbage, the liquid spraying assembly 350 may apply a cleaning medium to at least one roller brush, for example, the dry garbage may be cleaned through the first roller brush 320-1, the wet garbage may be cleaned through the second roller brush 320-2, and the liquid spraying assembly 350 may apply a cleaning medium to the second roller brush 320-2. At this time, the liquid spraying assembly 350 may be located behind the second roller brush 320-2, or may be located in front of the second roller brush 320-2, here, an example in which the liquid spraying assembly 350 is located in front of the second roller brush 320-2 is used for description, in a horizontal direction, a barrier member is provided between the liquid spraying assembly 350 and the second roller brush 320-2, and when the liquid outlet 3501 faces the roller brush, it can be considered that a barrier member is provided between the liquid outlet 3501 and the second roller brush 320-2, and when the liquid outlet 3501 faces downward, a barrier member is provided between the liquid spraying assembly 350 and the second roller brush 320-2, and the barrier member blocks dirt which is thrown by the rotating second roller brush 320-2 to the liquid spraying assembly.

In some embodiments, as shown in FIG. 48 and FIG. 49, a flow guiding inclined surface is provided below the barrier member, the flow guiding inclined surface may be provided on the scraper plate, or may be provided on other structural members, the flow guiding inclined surface is configured to guide the cleaning medium released by the liquid outlet to the roller brush, and a gap is provided between the bottom of the barrier member and the flow guiding inclined surface to form a channel for the cleaning solution to flow to the roller brush. Preferably, the bottom of the barrier member is not lower than the axis of the roller brush 320, so that the liquid medium released by the liquid spraying assembly may not be drained to a position where the roller brush 320 is too low, thereby reducing the wetting effect of the roller brush 320.

In the solution of the above embodiment, as shown in FIG. 43, the liquid outlet 3501 of the liquid spraying assembly 350 is disposed to face the scraper plate 340, the liquid outlet direction of the liquid outlet 3501 is downward, and the liquid will flow onto the scraper plate 340 after being released from the liquid outlet 3501 of the liquid spraying assembly 350 along the flow channel 3502; and the liquid outlet direction of the liquid outlet 3501 may also be made to face the roller brush 320, and the liquid will flow onto the scraper plate 340 after being released from the liquid outlet 3501 of the liquid spraying assembly 350 along the flow channel 3502 and being blocked by the barrier member. A flow guiding inclined surface is formed on the scraper plate 340, the height of the flow guiding inclined surface gradually decreasing along a direction gradually approaching the roller brush 320, that is, the liquid medium can flow toward the roller brush 320 by gravity along an inclined direction of the flow guiding inclined surface, the flow guiding inclined surface is configured to guide the cleaning medium released from the liquid outlet 3501 to the roller brush 320, after the liquid flows toward the roller brush 320 along the flow guiding inclined surface of the scraper plate 340, the liquid is sucked into the recycling bucket through the dirt suction port 350 after one cycle, and the remaining liquid enters the next cycle. In this way, the upper surface of the scraper plate 340 is used to achieve the flow guiding effect, so that the liquid outlet 3501 of the liquid spraying assembly 350 is far away from the roller brush 320, and the liquid outlet 3501 cannot be blocked by dirt left on the roller brush 320, and a barrier member is disposed on a linear path between the liquid outlet 3501 and the roller brush; based on the blocking effect of the barrier member, the liquid outlet 3501 cannot be deposited and blocked by small-particle dust and dirt for a long time, and even if some dirt enters a gap between the roller brush cover assembly 330 and the scraper plate 340, the dirt can be flushed away by large-flow flowing liquid.

In some embodiments, an example in which the barrier member is the base body 3301 of the roller brush cover assembly 330 shown in FIG. 43 is used for description, the base body 3301 of the roller brush cover assembly 330 is located between the roller brush 320 and the liquid spraying assembly 350, wherein the roller brush cover assembly 330 is detachably fitted with the housing 310 in the up-down direction or the front-rear direction, a cleaning member 3312 is provided on a lower edge of a surface of the base body 3301 facing the liquid spraying assembly 350, and the cleaning member 3312 is configured to clean the surface of the liquid spraying assembly 350 facing the base body 3301 during the process of assembling the roller brush cover assembly 330 to the housing 310. That is, during each assembly of the roller brush cover assembly 330, the cleaning member 3312 scrapes the surface of the liquid spraying assembly 350, and dust on the surface of the liquid spraying assembly 350 is loosened and scraped onto a scraper plate 340 below it, so that the dust is washed away by the flowing liquid released by the liquid spraying assembly 350. Here, the cleaning member 3312 includes, but is not limited to, a brush.

In some embodiments, for case of assembly, the water spraying assembly comprises a front cover 3503 and a rear cover 3504 that are connected to each other, the front cover 3503 is provided between the roller brush cover assembly 330 and the rear cover 3504, the liquid outlet 3501 is disposed on the front cover 3503, the front cover 3503 and the rear cover 3504 together define a flow channel 3502, a pipe 390 for conveying a cleaning medium is disposed in the housing 310, and the rear cover 3504 is connected to the housing 310 and is inserted and fitted with the pipe 390, to implement communication between the flow channel 3502 and the pipe 390. A scaling ring 3505 is provided at a joint between the rear cover 3504 and the housing 310 to prevent dirt from entering the interior of the housing 310 through the joint. In addition, a sealing bowl 3506 may be provided between the liquid spraying assembly 350 and the surface of the housing 310 to prevent dirt from entering the gap between the liquid spraying assembly and the housing 310.

It should be noted that the foregoing technical solution of this embodiment can be implemented separately, or can be implemented after being combined with the technical solution of Embodiment 1 or Embodiment 2, and details are not described herein again.

Embodiment 4

Figure 44:
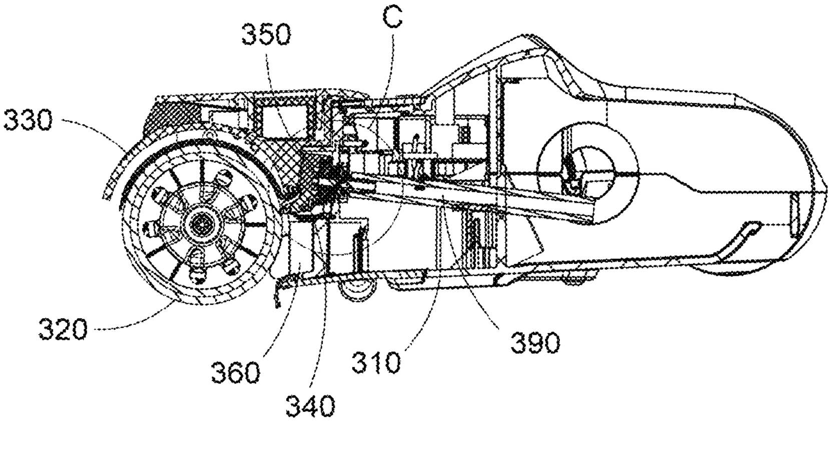
FIG. 44 schematically shows a cross-sectional view of the fifth cleaning device according to an embodiment of the present disclosure.
Figure 45:
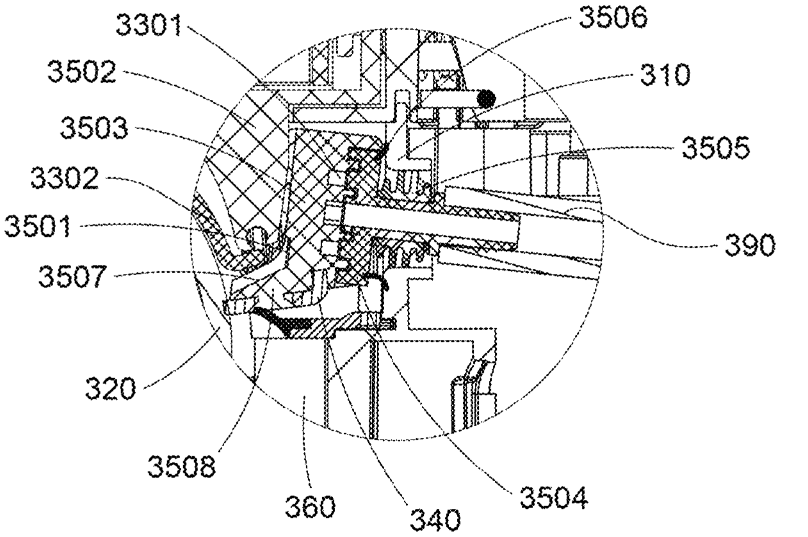
FIG. 45 is a partial enlarged view of the region C in FIG. 44.
Figure 46:
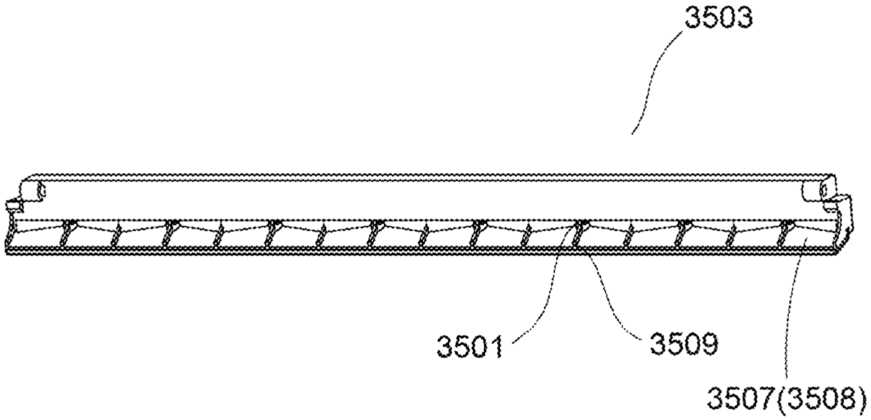
FIG. 46 schematically shows an structural diagram of the front cover of the liquid spraying assembly in the fifth cleaning device according to an embodiment of the present disclosure.
Figure 47:
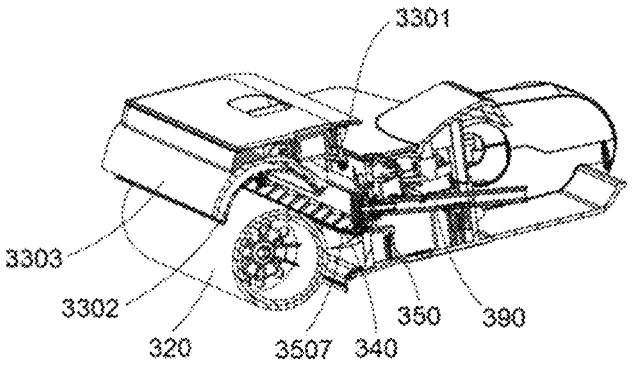
FIG. 47 schematically shows an exploded structural diagram of the fifth cleaning device according to an embodiment of the present disclosure.

As shown in FIG. 44 and FIG. 47, the cleaning device provided in this embodiment at least comprises a housing 310, a roller brush 320, a roller brush cover assembly 330, a scraper plate 340, a liquid spraying assembly 350, a dirt suction port 350, and a dirt suction channel located inside the cleaning device and communicating with the dirt suction port 350, and the cleaning device can clean the dirt on the floor through the roller brush 320 and suck the dirt on the floor through the dirt suction port 350, and the sucked dirt enters the dirt suction channel through the dirt suction port 350. The dirt suction port 350 is located close to and facing the surface of the roller brush 320; the liquid spraying assembly 350 is located above the liquid suction port 350, the liquid spraying assembly 350 is configured to release a cleaning medium for cleaning the roller brush 320, a flow channel 3502 is formed in the liquid spraying assembly 350, the flow channel 3502 has a liquid outlet 3501, a barrier member is disposed on a linear path between the liquid spraying assembly 350 and the roller brush 320, and the barrier member may be a base body 3301 of the roller brush cover assembly 330, or may be another structure of the roller brush cover assembly 330, a partial structure of the liquid spraying assembly 350, or another structure separately provided. The barrier member and the liquid outlet 3501 in this embodiment may be the same as those in Embodiment 3, and details are not described herein again. In this embodiment, an extension portion 3508 is formed on the liquid spraying assembly 350, a flow guiding inclined surface 3507 is formed on the extension portion 3508, and the flow guiding inclined surface 3507 is configured to guide the cleaning medium released by the liquid outlet 3501 to the roller brush 320.

In the above embodiment, after the liquid is released from the liquid outlet 3501 of the liquid spraying assembly 350 along the flow channel 3502, the liquid can flow to the roller brush 320 via the flow guiding inclined surface 3507, and after one cycle, the liquid is sucked into the recycling bucket through the dirt suction port 350, and the remaining liquid enters the next cycle. In this way, the flow guiding function is realized by the flow guiding inclined surface 3507, so that the liquid outlet 3501 of the liquid spraying assembly 350 is away from the roller brush 320, the liquid outlet 3501 cannot be blocked by dirt left on the roller brush 320, and even if a part of the dirt enters the gap between the roller brush cover assembly 330 and the flow guiding inclined surface 3507, the dirt can be flushed away by the flowing liquid.

Specifically, in order to form the flow guiding inclined surface 3507 between the roller brush cover assembly 330 and the scraper plate 340, the liquid spraying assembly 350 has an extension portion 3508 extending below the base body 3301 of the roller brush cover assembly 330, the flow guiding inclined surface 3507 is formed at the top of the extension portion 3508, the bottom surface of the extension portion 3508 is in contact with the scraper plate 340, and the extension portion 3508 is fixedly connected to the scraper plate 340 to improve the connection stability of the liquid spraying assembly 350.

In some embodiments, the flow guiding inclined surface 3507 is provided with a plurality of flow dividing ribs 3509 spaced apart to improve the uniformity of the liquid output, so that the cleaning medium can flow uniformly to the roller brush 320. Optionally, the gap between the barrier member and the flow guiding inclined surface 3507 may correspond to the height of the flow dividing rib 3509, that is, the bottom of the barrier member is in contact with the flow dividing rib 3509.

Specifically, a plurality of liquid outlets 3501 are spaced apart from each other, and the plurality of liquid outlets 3501 are disposed in sequence along the axial direction of the roller brush 320, so that the water passages with the same number as the liquid outlets 3501 or the water passages with integer multiples of the number of the water outlets can be obtained through the flow dividing ribs 3509, for example, the number of the liquid outlets 3501 is eight, and sixteen water passages can be separated on the flow guiding inclined surface 3507 by the flow dividing ribs 3509, that is, the flow dividing ribs 3509 are disposed at the liquid outlets 3501 and between two adjacent liquid outlets 3501, so that each liquid outlet 3501 corresponds to two water passages, and the uniformity of the liquid outlet is greatly improved.

In some embodiments, for ease of assembly, the water spraying assembly comprises a front cover 3503 and a rear cover 3504 connected to each other, the front cover 3503 is disposed between the roller brush cover assembly 330 and the rear cover 3504, the liquid outlet 3501, the extension portion 3508, and the flow guiding inclined surface 3507 are all disposed on the front cover 3503, the front cover 3503 and the rear cover 3504 together define a flow channel 3502, a pipe 390 for conveying a cleaning medium is disposed in the housing 310, and the rear cover 3504 is connected to the housing 310 and is inserted and fitted with the pipe 390, so as to implement communication between the flow channel 3502 and the pipe 390. A scaling ring 3505 is provided at a joint between the rear cover 3504 and the housing 310 to prevent dirt from entering the interior of the housing 310 through the joint. It should be noted that the foregoing technical solution of this embodiment can be implemented separately, or can be implemented after being combined with the technical solution of Embodiment 1 or Embodiment 2, and details are not described herein again.

Embodiment 5

The embodiment of the present disclosure further independently protects a cleaning assembly for cleaning device correspondingly, the cleaning assembly comprises a roller brush cover assembly 330 and a driver assembly 370, wherein the roller brush cover assembly 330 comprises a base body 3301 and a movable cover plate 3302 disposed on the base body 3301; the driver assembly 370 is configured to apply a force to the movable cover plate 3302 to move the movable cover plate 3302 towards a roller brush 320, so as to drive the movable cover plate 3302 to rotate relative to the base body 3301; the movable cover plate 3302 has a first position and a second position, in the first position, the movable cover plate 3302 presses against the roller brush 320 under the action of the driver assembly 370, and in the second position, the movable cover plate 3302 is separated from the roller brush 320. In this embodiment, the movable cover plate 3302 has a first position and a second position, and in the first position, the movable cover plate 3302 presses against the roller brush 320 under the action of the driver assembly 370, so that the automatic cleaning of the movable cover plate 3302 can be achieved by the roller brush 320, and the user experience is optimized. It should be noted that, for a specific structure and working mode of the cleaning assembly, reference may be made to the cleaning device embodiments provided in Embodiments 1 to 4 of the present disclosure, and details will not be described herein again.

In the fourth aspect of the present disclosure, the cleaning capability of the existing cleaning device is continuously improved, not only dust and the like on the cleaning surface can be sucked away, but also the cleaning surface can be mopped and washed through a cleaning execution member. After cleaning the floor with the cleaning device, it can also be docked in a base for self-cleaning.

After self-cleaning, the cleaning execution member (such as a roller brush) is relatively wet, if the cleaning execution member is not dried in time, the cleaning execution member is extremely prone to bacterial growth and odor, which not only reduces the service life of the cleaning execution member, but also affects the cleaning efficiency of the cleaning device.

In view of the above problems, the fourth aspect of the present disclosure provides a drying method, a cleaning device and a system for a cleaning device to solve the above problems.

The first embodiment according to the fourth aspect of the present disclosure provides a drying method for a cleaning device, this method is applicable to the cleaning device and comprises:

- sending a drying start signal to the base to instruct the base to start the operation of a drying assembly;
- entering a first drying stage, wherein in the first drying stage, the suction device is activated to control the cleaning execution member to rotate;

entering a second drying stage when the end condition of the first drying stage is met, wherein in the second drying stage, the suction device is intermittently started and stopped, and the cleaning execution member rotates at a reduced speed;

entering a third drying stage when the end condition of the second drying stage is met, wherein in the third drying stage, the suction device is started, and the cleaning execution member rotates at an increased speed.

In the second embodiment according to the fourth aspect of the present disclosure, based on the first embodiment, in the first drying stage, rotating the cleaning execution member at a first rotation speed, and operating the suction device at a first power; and in the second drying stage, starting and stopping the suction device intermittently, and rotating the cleaning execution member at a reduced speed, comprises: in the second drying stage, controlling the cleaning execution member to rotate at a second rotation speed, wherein, the second rotation speed is less than the first rotation speed; in the second drying stage, turning the suction device off; when the start condition is met, starting the suction device to operate at the second power; when the end condition is met, turning the suction device off; and starting and stopping cyclically until the end condition of the second drying stage is met; wherein, the second power is less than the first power.

In the third embodiment according to the fourth aspect of the present disclosure, based on the second embodiment, the drying method for the cleaning device further comprises: when it is detected that the humidity of the space corresponding to the cleaning execution member is greater than a first threshold, the start condition is met; or when the stop duration of the suction device reaches a first duration, the start condition is met;

when it is detected that the humidity of the space corresponding to the cleaning execution member is less than or equal to the first threshold, the end condition is met; or when the start duration of the suction device reaches a second duration, the end condition is met; wherein, the second duration is less than the first duration.

In the fourth embodiment according to the fourth aspect of the present disclosure, based on the second embodiment, wherein in third drying stage starting the suction device, and rotating the cleaning execution member at an increased speed, comprises:

in the third drying stage, starting the suction device to operate at the third power;

wherein, the third power is less than or equal to the first power and greater than the second power;

in the third drying stage, controlling the cleaning execution member to rotate at a third rotation speed, wherein, the third rotation speed is less than or equal to the first rotation speed and greater than the second rotation speed.

In the fifth embodiment according to the fourth aspect of the present disclosure, based on the any one of the first to fourth embodiments, the end condition of the first drying stage comprises at least one of the following:

the first drying stage lasts for a third duration; the heating temperature of the drying component of the base reaches a preset temperature; and the humidity of the cleaning execution member is detected to be lower than a second threshold.

In the sixth embodiment according to the fourth aspect of the present disclosure, based on the fifth embodiment, wherein the end condition of the second drying stage comprises at least one of the following:

the second drying stage lasts for a fourth duration; and it is detected that the humidity of the cleaning execution member is lower than a third threshold;

wherein the third duration is shorter than the fourth duration, and the second threshold is greater than the third threshold.

In the seventh embodiment according to the fourth aspect of the present disclosure, based on the sixth embodiment, the drying method for the cleaning device further comprises:

when the third drying stage lasts for a fifth duration; and it is detected that dryness of the cleaning execution member reaches at least one condition of the preset drying conditions, stopping the drying process, entering a charging mode and sending a drying end signal to the base to instruct the base to turn the drying assembly off.

The eighth embodiment according to the fourth aspect of the present disclosure provides a cleaning device, comprising:

a device body provided with an electrical connection port for electrically connecting with a base;

a suction device arranged on the device body;

a cleaning execution member arranged on the device body;

a controller arranged on the device body and configured to send a drying start signal to the base via the electrical connection port to instruct the base to: start the operation of a drying assembly; enter a first drying stage, wherein in the first drying stage, the suction device is activated to control the cleaning execution member to rotate; enter a second drying stage when the end condition of the first drying stage is met, wherein in the second drying stage, the suction device is intermittently started and stopped, and the cleaning execution member rotates at a reduced speed; enter a third drying stage when the end condition of the second drying stage is met, wherein in the third drying stage, the suction device is started, and the cleaning execution member rotates at an increased speed.

The ninth embodiment according to the fourth aspect of the present disclosure provides a drying method for a cleaning device, wherein the drying method is applicable to the cleaning device and comprises:

sending a drying start signal to the base after completing the self-cleaning process to instruct the base to start the operation of the drying assembly;

controlling the cleaning execution member of the cleaning device to rotate at a second rotation speed;

when it is monitored that the humidity of the space corresponding to the cleaning execution member is greater than a first threshold, starting the operation of the suction device for a second duration and then stopping the operation of the suction device;

when the drying end condition is met, controlling the cleaning execution member to stop rotating, entering a charging mode and sending a drying stop signal to the base to instruct the base to turn the drying assembly off.

In the tenth embodiment according to the fourth aspect of the present disclosure, based on the ninth embodiment, wherein sending a drying start signal to the base after completing the self-cleaning process comprises: sending the drying start signal to the base after completing an air drying stage of self-cleaning process; wherein in the air drying stage of the self-cleaning process, starting the operation of the suction device, and controlling the cleaning execution member to rotate at a first rotation speed; the first rotation speed is higher than the second rotation speed.

The eleventh embodiment according to the fourth aspect of the present disclosure provides a cleaning device, the cleaning device comprises:

a device body having an electrical connection port for electrical connection with a base;

a suction device disposed on the device body;

a cleaning execution member disposed on the device body;

a controller disposed on the device body and configured to send a drying start signal to the base after completing the self-cleaning of the cleaning device to instruct the base to start the work of a drying assembly; control the cleaning execution member of the cleaning device to rotate at a second rotation speed; when it is monitored that the humidity of the space corresponding to the cleaning execution member is greater than a first threshold, start the work of the suction device for a second duration and then stop the work of the suction device; when the drying end condition is met, control the cleaning execution member to stop rotating, enter a charging mode and send a drying stop signal to the base to instruct the base to turn off the drying assembly.

The twelfth embodiment according to the fourth aspect of the present disclosure provides a cleaning system. The cleaning system comprises a base on which a drying assembly is disposed; and the cleaning device provided in the foregoing eighth or eleventh embodiment.

According to the technical solution provided by the embodiment of the fourth aspect of the present disclosure, the cleaning device is controlled to follow different drying strategies in different drying stages. The drying assembly and the suction device work cooperatively, and in the drying process, the suction device is cycled to start and stop intermittently for many times, and water vapor or condensed water is sucked away in time, so that the drying efficiency and effect of the drying assembly are greatly improved, and the drying time of the cleaning assembly is also shortened.

Figure 50A:
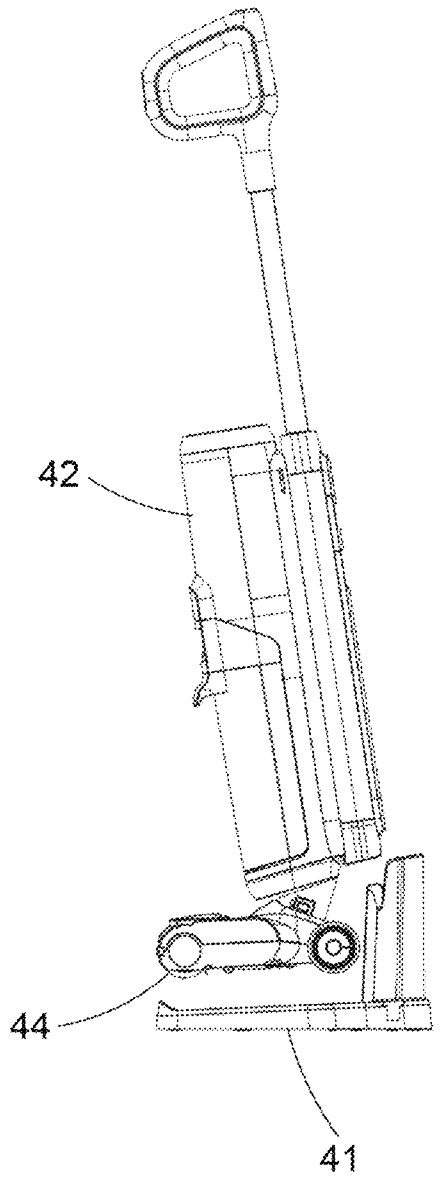
FIG. 50*a* is a front view of the cleaning system according to an embodiment of the present disclosure.
Figure 50B:
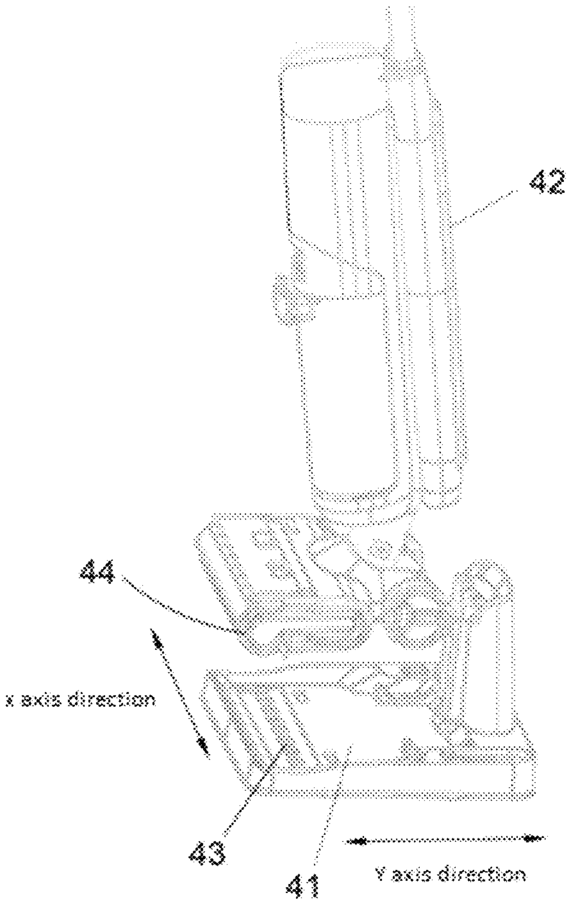
FIG. 50*b* is a partial perspective structural diagram of the cleaning system according to an embodiment of the present disclosure.
Figure 51:
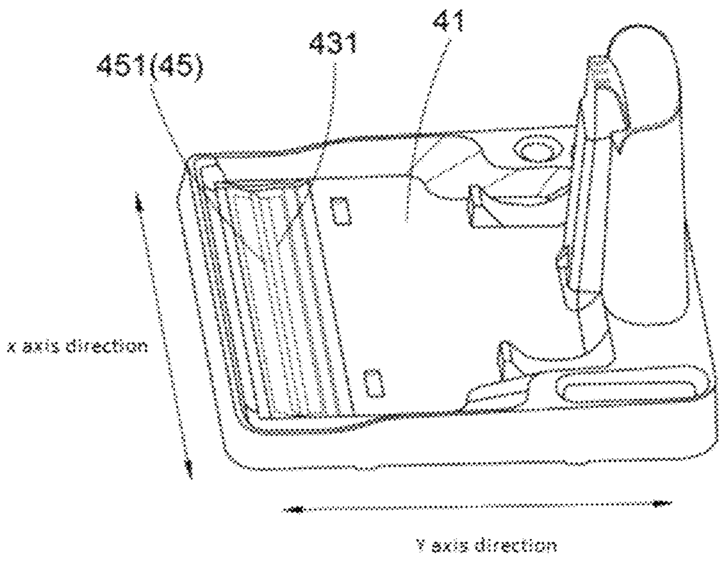
FIG. 51 is a perspective structural diagram of the first base according to an embodiment of the present disclosure.

As shown in FIG. 50*a* to FIG. 58, before the method embodiments of some exemplary embodiments of the present disclosure are described, structures of hardware devices for implementing the method embodiments of the present disclosure are first described. FIG. 50*a* is a front view of a cleaning system according to an embodiment of the present disclosure, FIG. 50*b* is a partial perspective structural diagram of a cleaning system according to an embodiment of the present disclosure, and FIG. 51 is a perspective structural diagram of a first base according to an embodiment of the present disclosure. Referring to FIG. 50*a* and FIG. 50*b*, an embodiment of the present disclosure provides a cleaning system. The cleaning system comprises a base and a cleaning device 42. As shown in FIGS. 51 to 55, in an embodiment of the present disclosure, a base is provided, and the base comprises a base 41 and a drying assembly 43. The base 41 is configured to accommodate the cleaning device 42 and to assist the cleaning device 42 in performing a maintenance operation. Specifically, the cleaning device 42 comprises a device body and a cleaning execution member 44 rotatably connected to the device body, the device body is further provided with a motor, and the motor can drive the cleaning execution member 44 to rotate. The cleaning execution member 44 is configured to clean the working surface, and the cleaning execution member 44 not only has a function of cleaning the working surface, but can also mop the working surface. A suction device (not shown in the figure) is also provided on the device body. The suction device is used to generate a suction airflow to suck in the dirt cleaned by the cleaning execution member. The drying assembly 43 is disposed on the base 41 for drying the wet cleaning execution member 44 on the cleaning device 42. The cleaning device also comprises a controller. A controller is disposed on the device body and configured to send a drying start signal to the base via the electrical connection port to instruct the base to: start the work of a drying assembly; enter a first drying stage, wherein in the first drying stage, the suction device is activated to control the cleaning execution member to rotate; enter a second drying stage when the end condition of the first drying stage is met, wherein in the second drying stage, the suction device is intermittently started and stopped, and the cleaning execution member rotates at a reduced speed; enter a third drying stage when the end condition of the second drying stage is met, wherein in the third drying stage, the suction device is started, and the cleaning execution member rotates at an increased speed.

The cleaning device 42 may be a hand-held cleaning device, a hand-held dust collection device, a hand-held scrubber, a self-moving cleaning robot, or the like. The base 41 is configured to accommodate the cleaning device 42, which not only supports or houses the cleaning device 42, but also assists the cleaning device 42 in performing maintenance operations. The maintenance operations include but are not limited to self-cleaning of the cleaning execution member, drying of the cleaning execution member, charging, replenishing of the clean water, emptying of the wastewater, flushing and the like.

For example, if the cleaning device 42 is a floor scrubber, after the user uses the floor scrubber to complete the cleaning task, the floor scrubber is placed on the base 41, and the base 41 will support the floor scrubber and keep the floor scrubber always in an upright state. In addition, the cleaning execution member 44 on the floor scrubber may be a roller brush, and when the roller brush requires self-cleaning or drying, the base 41 assists the floor scrubber in performing the maintenance operations such as self-cleaning or drying. When the cleaning device 42 is a self-moving cleaning robot, after the cleaning robot has completed the autonomous cleaning task, it moves autonomously to the base 41, which at this time is equivalent to a storage device for storing the autonomous moving cleaning robot. The cleaning execution member 44 on the autonomous moving cleaning robot is a rag turntable. When the rag turntable requires self-cleaning or drying, the base 41 will assist in completing the self-cleaning or drying, and the base 41 can also assist the self-moving cleaning robot in completing other maintenance operations.

The device body is provided with an electrical connection port for electrically connecting with the base. In order to improve the drying efficiency of the drying assembly 43, the base 41 is provided with a protruding structure 45 corresponding to the cleaning execution member 44. When the cleaning execution member 44 rotates, the protruding structure 45 extends into the cleaning execution member 44, and the bristles of the cleaning execution member 44 are shifted during the rotation of the cleaning execution member 44, so that the interior of the cleaning execution member 44 can be dried by the drying assembly 43. Through the cooperation of the drying assembly 43 and the protruding structure 45, the drying efficiency of the drying assembly 43 is effectively improved, and the time for the drying assembly 43 to dry the wet cleaning execution member 44 is shortened. In the technical solution provided in the present disclosure, the protruding structure 45 may be disposed on the drying assembly 43, or may be disposed on the base 41 outside the area of the drying assembly 43, that is, on the main body structure of the base 41.

The drying assembly 43 can dry the cleaning execution member 44 by means of heat radiation or heat conduction. For example, when the cleaning execution member 44 is dried by means of heat radiation, the cleaning execution member 44 is directly irradiated by a high-heat light source, the cleaning execution member 44 is not in direct contact with the drying assembly 43 in a wet state, and the protruding structure 45 disposed on the drying assembly 43 may extend into the cleaning execution member 44. Part of the heat radiation dries the outer surface of the cleaning device 44 directly, and another part of the heat radiation dries the interior of the cleaning device 44 through the protruding structure 45.

For another example, when the cleaning execution member 44 is dried by means of heat conduction, the drying assembly 43 heats up, the cleaning execution member 44 directly contacts the drying component 43 in a wet state, and the protrusion structure 45 contacts the bristles deep inside the cleaning execution member 44. Heat is conducted to the bristles by direct contact, part of the heat dries the outer surface of the cleaning execution member 44, and another part of the heat dries the interior of the cleaning device 44 through the protruding structure 45.

Figure 52:
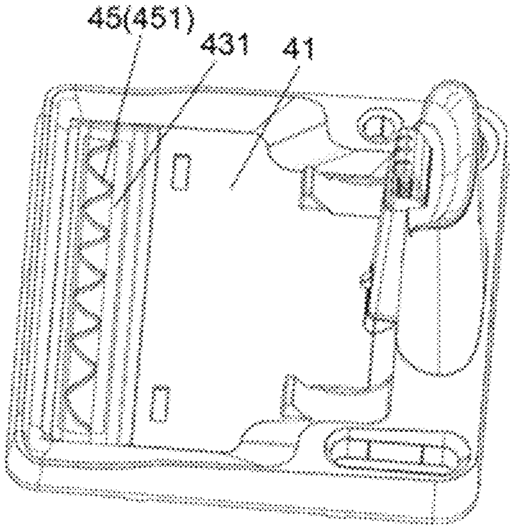
FIG. 52 is a perspective structural diagram of the second base according to an embodiment of the present disclosure.

Here, the protruding structure 45 may be an entire protruding rib as shown in FIG. 51 and FIG. 52. In the embodiment shown in FIG. 51, the protruding rib is a linear protruding rib extending along the X-axis direction. Alternatively, as shown in FIG. 52, the protruding rib is a wavy protruding rib extending along the X-axis direction.

Figure 53:
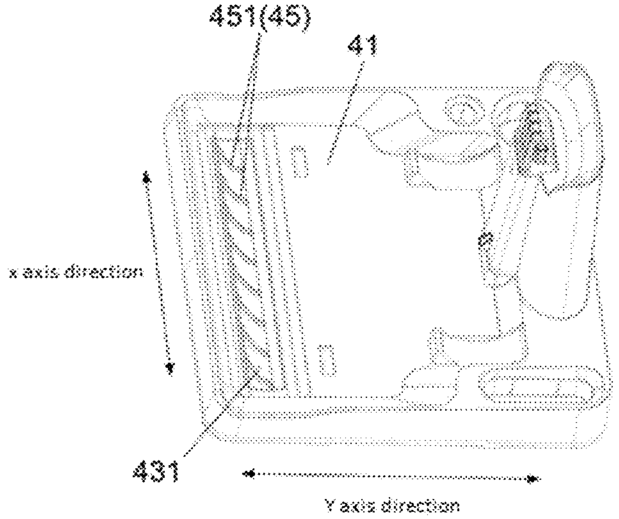
FIG. 53 is a perspective structural diagram of the third base according to an embodiment of the present disclosure.
Figure 54:
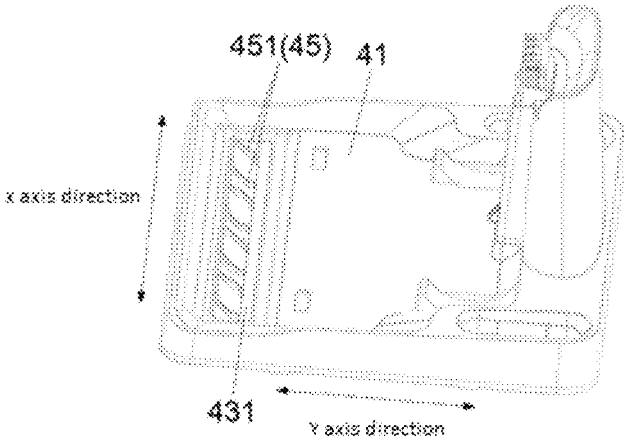
FIG. 54 is a perspective structural diagram of the fourth base according to an embodiment of the present disclosure.

The protruding structure 45 may be a plurality of protruding ribs as shown in FIGS. 53 and 54. In the embodiment shown in FIG. 53, the protruding ribs are bent in the same direction. Alternatively, as shown in FIG. 54, two adjacent protruding ribs are bent in two opposite directions.

Referring to FIGS. 51 to 54, in an embodiment provided in the present disclosure, the drying assembly 43 comprises a heating plate 431, the heating plate 431 is disposed at a position of the base 41 corresponding to the cleaning execution member 44, and the protruding structure 45 is disposed on the heating plate 431. Specifically, the heating plate 431 is disposed along a length direction of the cleaning execution member 44 and covers an area on the base 41 corresponding to the cleaning execution member 44. In a specific embodiment, the section of the heating plate 431 is arc-shaped, the arc surface of the heating plate 431 is matched to the surface of the cleaning execution member, and the arc-shaped heating plate 431 can be in fully contact with the roller brush.

Further, the drying assembly 43 further comprises a halogen lamp plate, the halogen lamp plate is disposed below the heating plate 431, and the heating plate 431 is a heat permeable green glass or a quartz cover plate. Specifically, the halogen lamp below the heating plate 431 can generate heat radiation, and the heat radiation can directly act on the cleaning execution member 44 through the heat permeable heating plate 431. In an embodiment provided in the present disclosure, the protruding structure 45 is also a heat permeable green glass or quartz cover plate, and regardless of whether the cleaning execution member 44 is in a wet state or a dry state, the bristles of the cleaning execution member 44 are always out of contact with the surface of the heating plate 431, and the protruding structure 45 extends into the bristles. When the halogen lamp emits high-heat light, a part of the high-heat light is radiated onto the surface of the cleaning execution member 44 through the heating plate 431 to dry the bristles on the surface of the cleaning execution member 44. Another part of the high-heat light is radiated to the interior of the cleaning execution member 44 through the protruding structure 45 to dry the bristles deep inside the cleaning execution member 44.

Figure 55:
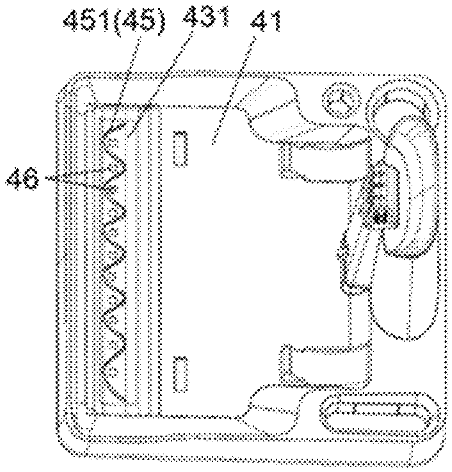
FIG. 55 is a perspective structural diagram of the fifth base according to an embodiment of the present disclosure.

Although the ultraviolet component contained in the light emitted by the halogen lamp has a certain sterilizing effect on the cleaning execution member 44, if the cleaning execution member 44 is too dirty, the drying assembly has a better sterilizing efficiency. In an embodiment provided by the present disclosure, as shown in FIG. 55, the heating plate 431 is further provided with a sterilizing light source 46, and the sterilizing light source 46 may be an ultraviolet sterilization lamp. If the protruding structure 45 comprises a plurality of protruding ribs 451, a sterilizing light source may be disposed between two adjacent protruding ribs 451. Alternatively, as shown in FIG. 55, the protruding structure 45 is an entire protruding rib 451, and a plurality of sterilizing light sources 46 are uniformly distributed on both sides of the entire protruding rib 451. A sterilizing light source is disposed between two adjacent wavy structures of the wavy protruding ribs 451, and the ultraviolet light generated by the sterilizing light source 46 can be radiated directly to the cleaning execution member through the heating plate 431.

The suction device is disposed on the device body and extends to the cleaning end of the cleaning device 42 through a pipe, the cleaning execution member 44 is disposed at the cleaning end of the device body, and when the cleaning execution member 44 is in operation, the suction device can assist the cleaning execution member 44 in completing a cleaning task. Specifically, dirt or wastewater is brought to the cleaning end by the cleaning execution member 44, the cleaning end is provided with a suction port, and the suction airflow generated by the suction device draws and collects the dirt or wastewater from the suction port into the collection device of the cleaning device 42.

The device body is provided with an electrical connection port, and when the device body is connected with the base, the device body is electrically connected with the base through the electric connection port. The electrical connection here can be used not only for various signal communications between the device body and the base, but also for the base to charge the device body. The controller is disposed on the device body and is used for sending a drying start signal to the base through the electrical connection port so as to instruct the base to start the drying assembly 43 to operate; and the controller is also used for controlling at least one component (such as a suction device, a motor driving the cleaning execution member to rotate and the like) on the cleaning device to work so as to dry the cleaning execution member.

The operating principles of the controller relate to the following method embodiments.

The present disclosure further provides a cleaning device which comprises a device body, a suction device, a cleaning execution member and a controller. Here, the device body is provided with an electrical connection port for electrically connecting with the base. A suction device is provided on the device body; a cleaning execution member is provided on the device body; and a controller is provided on the device body. The controller is configured to instruct the base to start the drying assembly after the cleaning execution member has completed the self-cleaning (specifically, the controller sends a drying start signal to the base to instruct the base to start the drying assembly). A controller is used to control the cleaning execution member of the cleaning device to rotate at a second rotation speed; when it is monitored that the humidity of the space corresponding to the cleaning execution member is greater than a first threshold, start the work of the suction device for a second duration and then stop the work of the suction device; when the drying end condition is met, control the cleaning execution member to stop rotating, enter a charging mode and send a drying stop signal to the base to instruct the base to turn off the drying assembly.

Further, the controller is further configured to:

instruct the base to start the drying assembly to operate after completing the self-cleaning air drying stage;

wherein in the self-cleaning air drying stage, the suction device is started to operate, and the cleaning execution member is controlled to rotate at a first rotation speed;

the first rotation speed is higher than the second rotation speed.

Based on the above two embodiments, the present disclosure further provides a cleaning system. The cleaning system comprises a base and the cleaning device provided in the foregoing embodiments.

Figure 56:
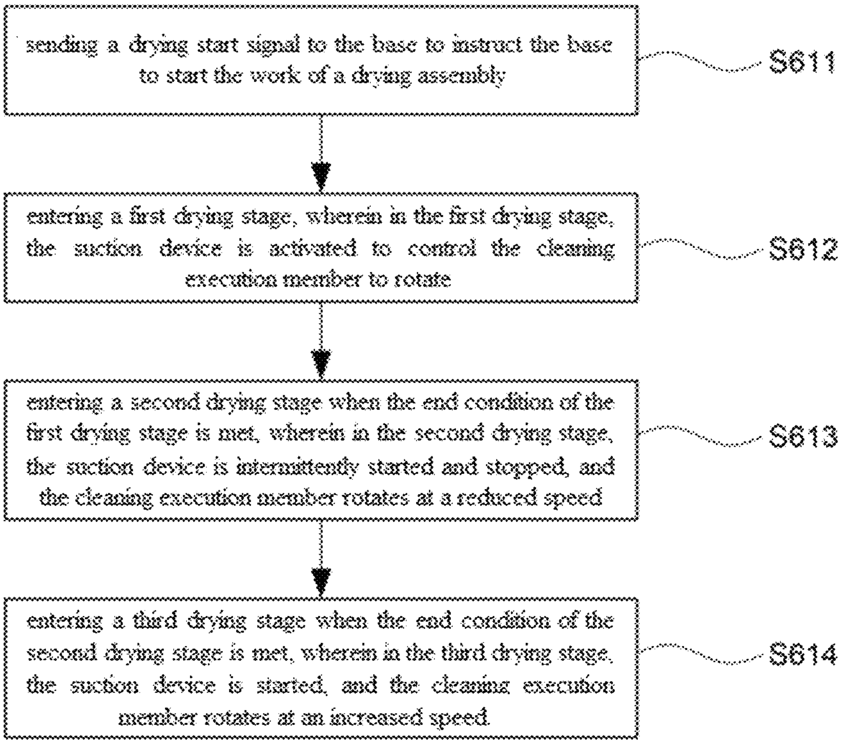
FIG. 56 is a schematic flowchart of a drying method for the cleaning device according to an embodiment of the present disclosure.

Referring to FIG. 56, an embodiment of the present disclosure provides a drying method of a cleaning device, and the drying method is applicable to the cleaning device. More specifically, it is applicable to a controller of the cleaning device. The method comprises:

S611: sending a drying start signal to the base to instruct the base to start the work of a drying assembly.

S612: entering a first drying stage, wherein in the first drying stage, the suction device is activated to control the cleaning execution member to rotate.

S613: entering a second drying stage when the end condition of the first drying stage is met, wherein in the second drying stage, the suction device is intermittently started and stopped, and the cleaning execution member rotates at a reduced speed.

S614: entering a third drying stage when the end condition of the second drying stage is met, wherein in the third drying stage, the suction device is started, and the cleaning execution member rotates at an increased speed.

In the above step S611, the user may instruct the cleaning device to send the drying start signal to the base by touching a control (such as a drying control) on the cleaning device; or, the cleaning device sends the drying start signal to the base after carrying out the self-cleaning process; or the cleaning device sends the drying start signal to the base when it is detected that the humidity of the cleaning execution member is high (for example, the humidity exceeds a preset humidity threshold) so as to instruct the base to start the drying assembly to operate.

In the first drying stage, the drying assembly may be in an operation state, a non-operation state, or an intermittent operation state. In a specific embodiment, it is assumed that the drying assembly achieves drying by means of heating, and that the temperature of the drying assembly must be raised for a period of time after the drying assembly is started, so that when entering the first drying stage or before entering the first drying stage, the drying assembly of the base starts to operate so as to raise the temperature to a target temperature during the first drying stage. In the first drying stage, most of the water droplets remaining on the bristles are thrown out by the high-speed rotation of the roller brush, and the thrown water droplets are sucked away in time with the suction airflow generated by the suction device.

In the first drying stage, the drying assembly is in an on-state, and the suction airflow will take away the heat on the drying assembly to a certain extent; however, as the heating continues, the drying assembly still gradually heats up, and reaches a preset target temperature before the end of the first drying stage, the drying time of the second drying stage can be effectively shortened.

Although most of the water droplets can be thrown out by the high-speed rotation of the cleaning execution member, the cleaning execution member cannot be completely dried in this way. Therefore, when the end condition of the first drying stage is met, the cleaning device enters the second drying stage. In the second drying stage, the rotation speed of the cleaning execution member is reduced, the suction device is intermittently started and stopped, and the drying assembly operates continuously. The main purpose of the intermittent starting and stopping of the suction device is to timely suck water vapor or condensed water generated when the drying assembly is heated and cleaned, and the suction process can also dry the suction channel; and the non-continuous operation of the suction device is to prevent the suction airflow from drawing away the heat of the drying assembly, thereby ensuring that the drying assembly always has a high drying efficiency. Through the mutual cooperation of the drying assembly and the intermittently started and stopped suction device, the drying effect and efficiency of the drying assembly are greatly improved, and the drying time of the cleaning execution member is effectively shortened.

Further, in step S613, in the entire second drying stage, the intermittent starting and stopping manner of the suction device can be that: the suction device is started and stopped at equal interval. For example, the second drying stage lasts 12 minutes, the suction device is activated for 1 minute every 3 minutes, and the cycle is repeated three times. In addition, the intermittent starting and stopping manner of the suction device can also be that: the suction device is started and stopped at different intervals according to the evaporation rate of the water vapor. For example, during the initial time period of the second drying stage, the moisture content of the cleaning execution member is relatively high, and as the drying assembly is heated, the moisture evaporation amount is relatively high. The suction device is intermittently started and stopped at a short interval, and the start working duration may be a fixed duration or a little longer. During the end time period of the second drying stage, the moisture content of the cleaning execution member is relatively low, and the moisture evaporation amount is also low, the suction device is intermittently started and stopped at a longer interval, and the start working duration may be a fixed duration or a short duration. For example, the second drying stage lasts 12 minutes, the suction device is repeatedly cycled to start and stop for three times, the interval time between the intermittent starts and stops is 1 minute, 3 minutes and 5 minutes in sequence, and the suction device operates for 1 minute each time after starting. For another example, the second drying stage lasts 12 minutes, and the suction device is stopped for 1 minute first, started for 1 minute and 30 seconds, stopped for 3 minutes, started for 1 minute, stopped for 5 minutes, and started for 30 seconds.

Further, in step S613, throughout the second drying stage, after the rotation speed of the cleaning execution member is reduced, the cleaning execution member rotates at the reduced speed all the time, or the rotation speed of the cleaning execution member is gradually reduced according to the rule that the moisture content of the cleaning execution member decreases from large.

In addition, in step S613, throughout the second drying stage, the drying power of the drying assembly may be maintained at full power state, and the drying power of the drying assembly may be gradually reduced as the moisture content of the cleaning execution member decreases.

In step S614, throughout the third drying stage, the drying assembly may be in an operation state or a non-operation state, the suction device continuously operates to suck away the accumulated water vapor and condensed water, and the cleaning execution member rotates at an increased speed to improve the overall drying uniformity of the cleaning execution member. That is, in the third drying stage, the method provided in this embodiment may further include:

upon or after entering the third drying stage, sending a drying stop signal to the base to instruct the base to stop the drying assembly.

For example, if the drying assembly is drying in a heating mode, the drying assembly will have some waste heat after the base turns off the drying assembly, and the drying assembly may still play a drying role during the cooling process, so that it indicates that the drying process will end upon or after entering the third drying stage, and the purpose of drying can be achieved by using the waste heat from the drying assembly.

In another embodiment provided in the present disclosure, a drying method of the cleaning device comprises the foregoing steps S611, S613, and S614, and step S612 may be considered as a last step of the cleaning device in a self-cleaning task. At the end of the self-cleaning process of the cleaning execution member, step S612 is carried out to achieve preliminary drying, which can be referred to as an air drying stage. After the air drying stage ends, the self-cleaning task is completed. After receiving the self-cleaning task completion signal, the cleaning device carries out the steps S611, S613 and S614 in sequence.

Figure 57:
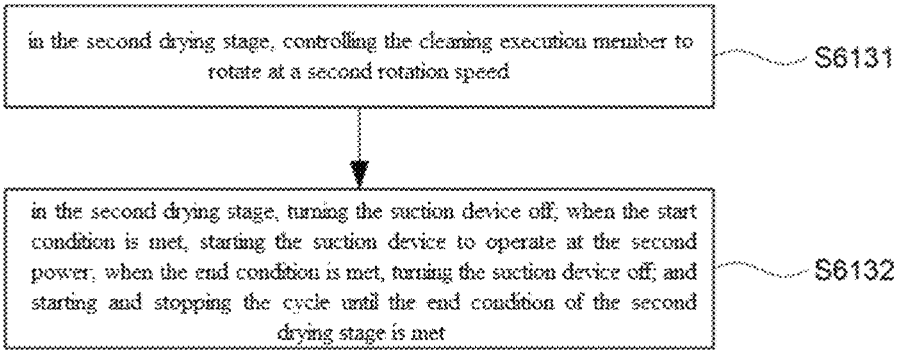
FIG. 57 is a schematic diagram of some steps included in the drying method for the cleaning device according to an embodiment of the present disclosure.

Referring to FIG. 57, in an embodiment provided by the present disclosure, in the first drying stage, the cleaning execution member rotates at a first rotation speed, and the suction device operates at a first power. Correspondingly, in step S613 of the above embodiment, “in the second drying stage, the suction device is intermittently started and stopped, and the cleaning execution member rotates at a reduced speed” may include the following steps:

S6131: in the second drying stage, controlling the cleaning execution member to rotate at a second rotation speed;

S6132: in the second drying stage, turning the suction device off; when the start condition is met, starting the suction device to operate at the second power; when the end condition is met, turning the suction device off; and starting and stopping the cycle until the end condition of the second drying stage is met.

In the above steps, the second rotation speed is less than the first rotation speed, and the second power is less than the first power. By controlling the cleaning execution member to rotate at different rotation speeds in different drying stages, the suction device is controlled to operate at different powers in different drying stages to generate suction airflows at different flow rates, so that the drying efficiency of the cleaning execution member in different drying stages is maximized.

For example, in the first drying stage, the cleaning execution member rotates at the highest rotation speed, so as to throw out the water droplets on the cleaning execution member as much as possible. In the second drying stage, the rotation speed of the cleaning execution member is reduced, so that the bristles of the cleaning execution member are heated more uniformly, thereby increasing the heating efficiency per unit area. The suction device operates at different powers in different drying stages, and the suction device can operate together with the cleaning execution member to dry. For example, in the first drying stage, the suction device operates at the highest power and generates a maximum flow of suction airflow, and the suction airflow can timely suck away the thrown water droplets. In the second drying stage, the suction airflow is mainly used to take away water vapor and condensed water, and in this process, a large flow of suction airflow is not required, instead, a large flow of suction airflow will take away more heat from the drying assembly, and the heating efficiency of the drying assembly will be reduced. Therefore, by reducing the suction power of the suction device, under the condition that the water vapor and the condensed water are taken away in time, the heat loss of the drying assembly is reduced as much as possible, so that the drying effect and the efficiency of the drying assembly on the cleaning execution member are effectively improved.

In the technical solution provided by the present disclosure, the first rotation speed, the second rotation speed, the first power, the second power, and the number of times of cyclically starting and stopping the suction device are not specifically limited, and may be set according to actual conditions.

In specific implementation, the judgment factors for starting and stopping the suction device may include, but is not limited to, humidity, time and the like. For example, in an implementable technical solution, the drying method of the cleaning device may further include the following steps:

S615: when it is detected that the humidity of the space corresponding to the cleaning execution member is greater than a first threshold, the start condition is met; or when the stop duration of the suction device reaches a first duration, the start condition is met.

S616: when it is detected that the humidity of the space corresponding to the cleaning execution member is less than or equal to the first threshold, the end condition is met; or when the start duration of the suction device reaches a second duration, the end condition is met.

In the above steps, in order to allow the cleaning execution member to be sufficiently heated by the drying assembly and to evaporate a sufficient amount of water stain, the second duration is shorter than the first duration. It can be understood that, throughout the second drying stage, the total duration of stopping the suction device is longer than the total duration of starting the suction device. In a specific embodiment, in the second drying stage of the cleaning device, it is determined whether the suction device is started or stopped by recording the stop duration and the start duration of the suction device.

For example, in the second drying stage, the cleaning device is initially set to start operation for 1 minute after the suction device is stopped for 3 minutes. Upon entering the second drying stage, timing is started, at which time the suction device is in an off-state. When the timing duration reaches 3 minutes, the controller controls the suction device to start and continuously timing, and after the suction device operates for 1 minute, the controller controls the suction device to stop. The suction device is cyclically started and stopped until the entire second drying stage ends. Here, the end condition of the second drying stage may also be that: the humidity of the cleaning execution member of the cleaning device and the space where the cleaning execution member is located is less than a preset humidity threshold;

or the total duration of the second drying stage reaches a preset duration (for example, 6 minutes, 12 minutes, etc.).

In another specific embodiment, in the second drying stage of the cleaning device, a humidity sensor detects the humidity of the cleaning execution member and the space corresponding to the cleaning execution member to determine whether the suction device is started or stopped. When the suction device is stopped, the humidity of the space corresponding to the cleaning execution member will also increase as the water stain on the cleaning execution member is continuously evaporated. For example, the cleaning execution member is a roller brush, the roller brush is installed in the roller brush cavity, and the water vapor evaporated by the drying device of the roller brush is partially attached to the wall of the roller brush cavity; after the suction device is started, the generated suction airflow will take away the water vapor, so that the humidity of the space corresponding to the cleaning execution member is reduced. The humidity sensor can be disposed in the roller brush cavity of the cleaning device, and if the humidity value is greater than the first threshold, it indicates that the amount of water vapor in the corresponding space is excessive. At this time, the controller controls the suction device to start, and the suction airflow takes away water vapor. When the humidity value is less than or equal to the first humidity value, the stop condition of suction device is met, and the controller controls the suction device to be stopped.

The humidity sensor may be, but is not limited to, a humidity sensitive element, such as a humidity sensitive resistor or a humidity sensitive capacitor.

In an embodiment provided by the present disclosure, "in the third drying stage, the suction device is started, and the cleaning execution member is rotated at an increased speed" further comprises the following steps:

S6141: in the third drying stage, starting the suction device to operate at a third power;

S6142, in the third drying stage, controlling the cleaning execution member to rotate at a third rotation speed.

In the above steps, the third power is less than or equal to the first power and greater than the second power. The third rotation speed is less than or equal to the first rotation speed and greater than the second rotation speed. After the cleaning device changes from the second drying stage to the third drying stage, the power of the suction device will increase, and the rotation speed of the cleaning execution member will also increase.

In the third drying stage, the cleaning execution member rotates at an increased speed, so that the drying uniformity of the entire cleaning execution member can be improved. At the same time, the suction device with increased power can effectively remove residual water vapor, condensed water and dust.

In an embodiment provided in the present disclosure, the end condition of the first drying stage comprises at least one of the following: the first drying stage lasts for a third duration; the heating temperature of the drying component of the base reaches a preset temperature; and the humidity of the cleaning execution member is detected to be lower than a second threshold.

The third duration may be a preset value, for example, the set third duration of the first drying stage of the cleaning device is 4 minutes, and within the third duration of 4 minutes, the cleaning execution member continuously rotates at a high-speed to throw off the water droplets left on the cleaning execution member. The suction device operates at high power, and the generated large-flow suction airflow sucks away the thrown water stains.

In addition to setting a duration as the end condition of the first drying stage, it is also possible to determine whether the first drying stage is ended or not by detecting the humidity of the cleaning execution member. As the water droplets are thrown off by the rotation of the cleaning execution member, the humidity of the cleaning execution member will continue to decrease, and when the humidity value falls below the second threshold, it is determined that the first drying stage is ended. Alternatively, in another specific embodiment, it is possible to determine whether the first drying stage can be ended by detecting the heating temperature of the drying assembly. At the beginning of the first drying stage, the drying assembly is started and heated at the same time, and when the drying assembly is preheated to a preset temperature, it is determined that the first drying stage is ended.

Further, in an embodiment provided in the present disclosure, the end condition of the second drying stage comprises at least one of the following: the second drying stage lasts for a fourth duration; and it is detected that the humidity of the cleaning execution member is lower than a third threshold. Here, the third duration is shorter than the fourth duration, and the second threshold is greater than the third threshold.

It should be supplemented here that: the greater the humidity, the greater the moisture of the cleaning execution member; and the lower the humidity, the lower the moisture of the cleaning execution member. If the second threshold is greater than the third threshold, this indicates that the humidity of the cleaning execution member at the end of the first drying stage is greater than the humidity of the cleaning execution member at the end of the second drying stage.

In the second drying stage, the fourth duration can be set according to the number of times of cyclically starting and stopping the suction device. For example, when the suction device is started cyclically for four times, the duration of each start interval is 3 minutes, and the operation lasts for 1 minute after starting, then the entire second drying stage lasts for a fourth duration of 16 minutes.

Further, in an embodiment provided in the present disclosure, the drying method of the cleaning device further comprises:

S617: when third drying stage lasts a fifth duration and it is detected that dryness of the cleaning execution member reaches at least one condition of the preset drying conditions, stopping the drying process, entering a charging mode and sending a drying end signal to the base to instruct the base to turn off the drying assembly.

By recording the duration of the third drying phase, and when the fifth duration of the third drying phase reaches a preset value (for example 1 minute), the controller controls the cleaning execution member to stop rotating and controls the suction device to be turned off. In this case, it may be determined that the third drying stage will be ended directly, and then the cleaning device will sequentially enter the subsequent task steps. Or, if it is judged that the first half of the third drying stage is ended, the cleaning device sequentially carries out the subsequent steps, and when all subsequent steps are ended, it is judged that the third drying stage is completely ended. Subsequent steps include that: the cleaning device entering a charging mode; and, sending a drying end signal to the base to instruct the base to stop the drying assembly.

Figure 58:
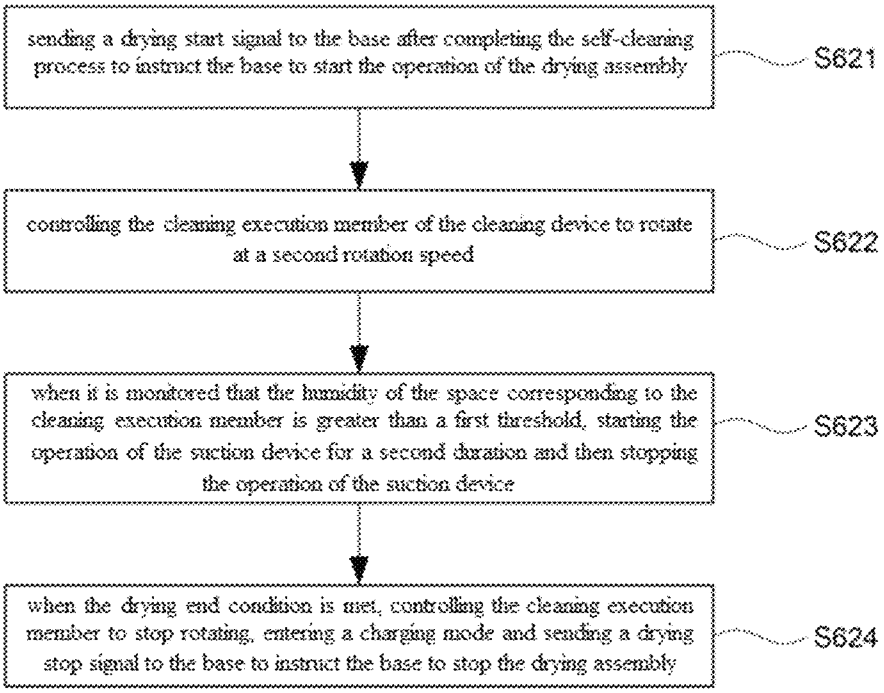
FIG. 58 is a schematic flowchart of the drying method for the cleaning device according to another embodiment of the present disclosure.

Referring to FIG. 58, in an embodiment provided in the present disclosure, another drying method of a cleaning device is further provided. The method is suitable for a controller in the cleaning device. The drying method comprises the following steps:

S621: sending a drying start signal to the base after completing the self-cleaning process to instruct the base to start the operation of the drying assembly.

S622: controlling the cleaning execution member of the cleaning device to rotate at a second rotation speed.

S623: when it is monitored that the humidity of the space corresponding to the cleaning execution member is greater than a first threshold, starting the operation of the suction device for a second duration and then stopping the operation of the suction device.

S624: when the drying end condition is met, controlling the cleaning execution member to stop rotating, entering a charging mode and sending a drying stop signal to the base to instruct the base to stop the drying assembly.

In the above step S623, when the drying assembly dries the cleaning execution member, the moisture on the cleaning execution member will condense and adhere to the inner wall of the space where the cleaning execution member is located (for example, the cleaning execution member is a roller brush, the roller brush is installed in the roller brush cavity, and the condensed water will adhere to the inner wall of the roller brush cavity), and the suction device operates for a second duration, which can effectively reduce the humidity value of the space corresponding to the cleaning execution member. After the second duration, the suction device is stopped in time to prevent it from unnecessarily taking away the heat from the drying assembly. After the suction device is stopped, the sensor still continuously detects the humidity value of the space corresponding to the cleaning execution member, and when the humidity value detected is greater than the first threshold, the suction device can be started again for a second duration and then stopped, and this step is repeated several times, until the humidity of the cleaning execution member meets the requirements. In step S624, meeting the end condition of the drying process may be the end condition of the second drying stage in the above method, and reference may be made to the above for a detailed description, which will not be repeated here.

Further, "sending a drying start signal to the base after completing the self-cleaning process" may include sending the drying start signal to the base after completing an air drying stage of self-cleaning process.

The air drying stage is similar to the first drying stage in the above method, and in the self-cleaning air drying stage, the cleaning device starts the suction device to operate, and controls the cleaning execution member to rotate at a first rotation speed, wherein the first rotation speed is higher than the second rotation speed. More detailed descriptions can be found in the foregoing description, and thus will not be described herein again.

In an embodiment provided by the present disclosure, the entire drying process of the cleaning execution member on the cleaning device may be divided into three stages, and in different stages, the operation states of the components of the cleaning system are also different. For more details, please refer to the following table.

| Drying Stage | Drying Assembly | Cleaning Execution Member | Suction device | Power Supply | Note |
|---|---|---|---|---|---|
| First Drying Stage | on (start) | on (First Rotation Speed) | on (First Power) | The suction device is powered by the battery pack of the floor scrubber, the drying assembly is powered by the base adapter, and the roller brush can be powered by the adapter or the battery pack; The cleaning device is not charged during drying process | The first rotation speed and the first power are maximum, at this time, the drying assembly starts to work and gradually heats up, and before entering the next stage, a preset temperature is reached. |
| Second Drying Stage | on | on (Second Rotation Speed) | off (turned off) | | These two steps are the core steps, and the suction device is intermittently started and stopped, which can not only adsorb water vapor and bacteria, but also reduce the temperature of the drying assembly. In these two steps, the duration of the stopping step of the suction device is longer than the duration of the opening step. |
| | on | on (Second Rotation Speed) | on (Second Power) | | |

-continued

| Drying Stage | Drying Assembly | Cleaning Execution Member | Suction device | Power Supply | Note |
|---|---|---|---|---|---|
| Third Drying Stage | on | on (Third Rotation Speed) | on (Third Power) | | The third rotation speed may be less than or equal to the first rotation speed but greater than the second rotation speed; the third power may be less than or equal to the first power but greater than the second power. |

In the above table, in the first drying stage, the drying assembly, the cleaning execution member and the suction device are simultaneously started. In this stage, the first rotation speed of the cleaning execution member and the first power of the suction device are the maximum rotation speed of the cleaning execution member and the maximum power of the suction device throughout the drying process. Although the suction airflow will take away a part of the heat from the drying assembly, with the continuous heating of the drying assembly, the temperature of the drying assembly will still gradually increase, and when the temperature increases to a preset temperature, the first drying stage will end.

The second drying stage is divided into a first step and a second step, in the first step, the drying assembly and the cleaning execution member are started simultaneously, and the suction device is stopped. The cleaning execution member rotates at a second rotation speed that is less than the first rotation speed. In a second step, the drying assembly, the suction device, and the cleaning execution member are activated simultaneously. The suction device operates at a second power such that the suction device absorbs the water vapor and bacteria, and does not reduce the temperature of the drying assembly. The cleaning execution member is dried by cyclically performing the first step and the second step several times. In the technical scheme provided by the present disclosure, throughout the second drying stage, the total duration of the first step is longer than the total duration of the second step, so that the drying effect and efficiency of the drying assembly can be effectively improved.

In the third drying stage, the drying assembly, the cleaning execution member, and the suction device are simultaneously activated. In this stage, the cleaning execution member rotates at a third rotation speed, and the suction device operates at a third power. The third rotation speed may be less than or equal to the first rotation speed but greater than the second rotation speed. The third power may be less than or equal to the first power but greater than the second power.

Furthermore, in a particular embodiment, the power required to operate different components in the drying stage may be provided by the same power supply, or may be provided by different power supplies. Referring to the above table, in the drying stage, the suction device is powered by the power supply assembly (battery pack) of the cleaning device, and the drying assembly is powered by the power adapter on the base. The motor that drives the roller brush to rotate can be powered by a power adapter or a power supply assembly. To ensure the safety of the cleaning device during the drying process, the cleaning device is not charged at each drying stage.

In conclusion, in the technical solutions provided in the present disclosure, different drying strategies are used in different drying stages by controlling the cleaning device. In the drying process, the drying assembly and the suction device are controlled to work cooperatively, the suction device is intermittently started and stopped for several times cyclically, and the suction device operated at low power can timely suck away water vapor or condensed water without reducing the temperature of the drying assembly, so that the drying efficiency and effect of the drying assembly are greatly improved, the drying time of the cleaning assembly is further shortened, and the energy utilization efficiency is further improved.

To facilitate understanding of the technical solutions of the present disclosure, a specific application scenario is provided below to describe in detail the self-cleaning method for the cleaning device provided in the present disclosure.

Application Scenario I

After a user has used the floor scrubber to complete a cleaning task, the floor scrubber is placed on a corresponding base, and an electrical connection port of the floor scrubber is docked to an interface of the base. The user presses a "self-cleaning" control on the floor scrubber, and the floor scrubber performs a self-cleaning process to self-clean the roller brush and the suction channel. After completing the self-cleaning process, the floor scrubber sends a drying start signal to the base via the electrical connection port to instruct the base to start the operation of the drying assembly. The drying assembly may heat the bristles of the roller brush to evaporate water stains on the bristles. In addition, the drying assembly is provided with a protruding structure, and during the drying process of the roller brush, the protruding structure protrudes into the roller brush. As the roller brush rotates, the protruding structure can rearrange or disarrange the bristles attached to the roller brush, and in addition, heat generated by the drying assembly can be conducted to the interior of the bristles of the roller brush. Therefore, the roller brush achieves a better drying effect in a shorter time. The protruding structure can also accelerate the dehydration speed of the roller brush in the spin-drying process, and in the high-speed rotation process of the roller brush, the bristles continuously impact the protruding structure, so that water stains on the bristles are scattered and atomized, and the dehydration speed of the roller brush is effectively improved. The controller further controls the cleaning device to enter a first drying stage, and in the first drying stage, the suction device is started, and the cleaning execution member is controlled to rotate; and when the end condition of the first drying stage is met, the cleaning device is controlled to enter the second drying stage, the suction device is intermittently started and stopped in the second drying stage, and the cleaning execution member rotates at a reduced speed. When the end condition of the second drying stage is met, the cleaning device is controlled to enter a third drying stage, in the third drying stage, the suction device is started, and the cleaning execution member rotates at an increased speed. When the end condition of the third drying stage is met, the drying process is ended, and the cleaning device enters the charging mode and sends a drying stop signal to the base to instruct the base to turn off the drying assembly. In this way, the cleaning execution member and the suction pipe are both in a dry state, and thus the problem of bacterial growth is avoided.

Application Scenario II:

After the clean water stains on the floor have been removed by using the floor scrubber, the floor scrubber is placed on the corresponding base, and at this time, the roller brush does not need to be self-cleaned as the dirt degree of the roller brush is low. At this time, the floor scrubber will directly enter the drying stage, and the floor scrubber sends a drying start signal to the base to instruct the base to start the operation of the drying assembly. The suction device of the floor scrubber is intermittently started and stopped, and is circulated several times. Subsequently, the suction device increases the suction power, and the roller brush speeds up to achieve a more uniform dryness of the roller brush.

The device embodiments described above are merely illustrative, where the units described as separate components may or may not be physically separate, and the components represented as units may or may not be physical units, that is, they may be located in one place, or may be distributed on multiple network units. Some or all of the modules may be selected according to actual needs to achieve the objective of the solution of this embodiment. Those skilled in the art can understand and implement the solutions recorded in the present disclosure without paying any creative labor.

Through the above description of the embodiments, those skilled in the art can clearly understand that the embodiments can be implemented by means of software plus a necessary universal hardware platform, and certainly can also be implemented by hardware. Based on such understanding, the above technical solution essentially or the part contributing to the prior art may be embodied in the form of a software product, and the computer software product may be stored in a computer-readable storage medium, such as a ROM/RAM, a magnetic disk, an optical disk, and the like, and comprises a plurality of instructions for causing a computer device (which may be a personal computer, a server, or a network device, etc.) to perform the methods described in the embodiments or some parts of the embodiments.

In the fifth aspect of the present disclosure, in the field of electrical equipment, batteries are widely used as energy source of various electrical devices (such as robots, mobile phones, automobiles and the like). However, during the charging or discharging process of a battery, the temperature of the battery inevitably increases due to heat generated by internal chemical reactions of the battery. If the battery overheats, a chemical reaction inside the battery can get out of control, problems such as liquid leakage and heat generation occur, and even more serious consequences such as explosion and fire may be caused. To avoid these problems, many batteries are designed with over-temperature protection. When the temperature of the battery rises to a certain level, the protection circuit immediately cuts off the connection between the battery and the external circuit to prevent the battery from continuing to heat up, and the battery is not reconnected until the temperature of the battery has dropped to a safe level.

In the related arts, when the electric equipment is for example a floor scrubber, a user generally places the floor scrubber in a balcony or a storage room after purchasing the floor scrubber, and in summer, if a floor scrubber is placed in a room such as a balcony or a storage room after use, the battery cannot immediately enter a charging state due to the overheating protection, and thus need to wait for a long time, so that the charging efficiency is low, and the user experience is poor.

The fifth aspect of the present disclosure provide a cleaning method of a cleaning device and the cleaning device, the cleaning device can directly enter a charging state after completing the cleaning work without waiting, and thus high charging efficiency and good user experience can be achieved.

The first embodiment according to the fifth aspect of the present disclosure provides a method of a cleaning device, the method comprises:

determining an initial operation power corresponding to a suction motor of a cleaning device in a target operation mode, wherein the cleaning device is powered by a battery;

determining, at the initial operation power, whether an operation parameter of the battery or the cleaning device reaches a preset threshold;

if the operation parameter of the battery or the cleaning device reaches the preset threshold, reducing the operation power of the cleaning device.

In the second embodiment according to the fifth aspect of the present disclosure, based on the first embodiment, determining whether an operation parameter of the battery or the cleaning device reaches a preset threshold comprises:

determining whether the voltage value of the battery reaches the preset threshold; or determining whether the remaining power value of the battery reaches the preset threshold; or determining whether the working duration of the cleaning device reaches the preset threshold.

In the third embodiment according to the fifth aspect of the present disclosure, based on the first or second embodiment, the method also comprises:

determining the preset threshold according to a temperature rise curve of the battery in the discharging process, the temperature rise curve at least reflects changes in voltage, power, and temperature of the battery.

In the fourth embodiment according to the fifth aspect of the present disclosure, based on the first embodiment, reducing the operation power of the cleaning device comprises:

reducing the operation power of the cleaning device step by step from an initial operation power.

In the fifth embodiment according to the fifth aspect of the present disclosure, based on the fourth embodiment, reducing the operation power of the cleaning device step by step from an initial operation power comprises:

reducing the operation power of the cleaning device by a preset step size at an interval of a preset duration from an initial operation power.

In the sixth embodiment according to the fifth aspect of the present disclosure, based on the fifth embodiment, reducing the operation power of the cleaning device by a preset step size at an interval of a preset duration from an initial operation power comprises:

determining a second operation power after the first operation power is reduced by a preset step size;

determining whether an actual voltage value of the battery, which operates at the second operation power within a time range less than or equal to the preset duration, can reach a preset reference voltage value, wherein the reference voltage value is a predicted voltage value that can be reached by the battery after the battery operates at the second operation power for the preset duration; and if the actual voltage value does not reach the reference voltage value, after the battery operates at the second operation power for the preset duration, determining a third operation power after the second operation power is reduced by a preset step size.

In the seventh embodiment according to the fifth aspect of the present disclosure, based on the fourth embodiment, reducing the operation power of the cleaning device step by step from an initial operation power comprises:

according to a preset power reduction condition, reducing the operation power of the cleaning device step by step from an initial operation power, wherein the preset power reduction condition is used to determine a step size and a duration of each reduction of the operation power.

In the eighth embodiment according to the fifth aspect of the present disclosure, based on the first embodiment, in the target operation mode, the temperature of the battery can reach the temperature protection threshold under a preset ambient temperature condition.

In the ninth embodiment according to the fifth aspect of the present disclosure, based on the first embodiment, the method also comprises:

in response to a switching instruction for switching from the target operation mode to another operation mode, if an operation power of a suction motor in another operation mode is less than the initial operation power in the target operation mode, controlling the cleaning device to operate at a corresponding preset operation power in another operation mode.

The tenth embodiment according to the fifth aspect of the present disclosure further provides a cleaning device, the cleaning device comprises a device body provided with a memory, a processor, a battery, and a suction motor;

the memory is used to store a computer program;

the processor is coupled to the memory, and is configured to execute the computer program to perform the cleaning method of the cleaning device according to any one of the first to ninth embodiments of the fifth aspect of the present disclosure.

In the embodiments according to the fifth aspect of the present disclosure, the corresponding initial operation power of the suction motor of the cleaning device in the target operation mode is determined, whether the operation parameter of the battery or the cleaning device reaches the preset threshold value or not is determined under the initial operation power, and if the operation parameter of the battery or the cleaning device reaches the preset threshold value, the operation power of the cleaning device is reduced, so that the temperature value of the battery is reduced, and the temperature value is prevented from exceeding the temperature protection threshold value. Based on the above, in the present disclosure, the cleaning device can directly enter a charging state after completing the cleaning work without waiting, and thus high charging efficiency and good user experience can be achieved.

Figure 59:
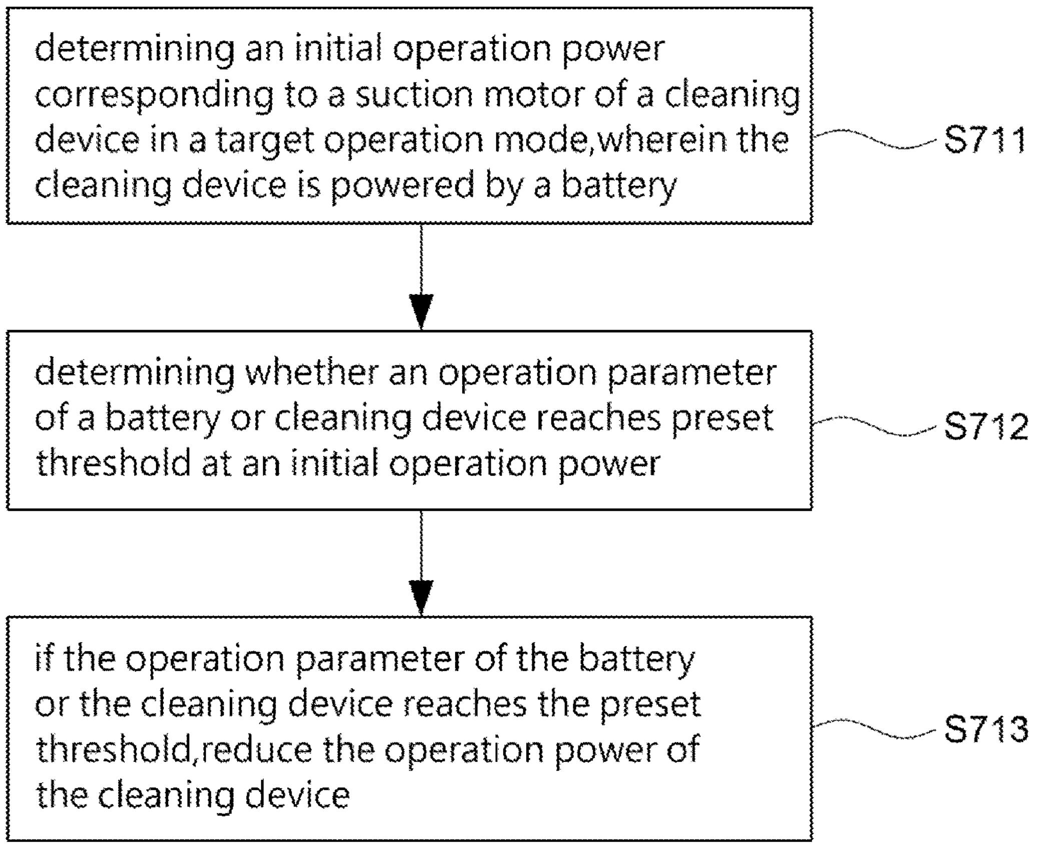
FIG. 59 is a flowchart of the cleaning method for the cleaning device according to an embodiment of the present disclosure.

FIG. 59 is a flowchart of a cleaning method of a cleaning device according to an exemplary embodiment of the present disclosure, as shown in FIG. 59, the method comprises:

Step S711: determining an initial operation power corresponding to a suction motor of a cleaning device in a target operation mode, wherein the cleaning device is powered by a battery.

Here, the cleaning device may be a floor scrubber, a sweeping robot, or the like, as long as the cleaning device is powered by using a battery, which is not enumerated herein. The suction motor can generate a negative pressure during operation, and suck dirt from the target area into the recycling bucket of the cleaning device, thereby completing the cleaning of the target area.

Step S712: determining whether an operation parameter of a battery or cleaning device reaches a preset threshold at an initial operation power.

Step S713: if the operation parameter of the battery or the cleaning device reaches the preset threshold, reduce the operation power of the cleaning device.

The present disclosure is described below using an example where the cleaning device is a floor scrubber.

It should be understood that in actual operation of the floor scrubber, there may be a plurality of working modes, for example, an intelligent-grade mode in which the motor power is low (90 W-120 W, such as 90 W, 105 W, and 120 W), and a high-grade mode in which the motor power is high (such as 150 W). However, in the intelligent-grade mode, it is assumed that the ambient temperature is 35° C., the battery is a soft package battery, and the temperature after the battery is discharged is up to 54.7° C., it cannot reach the temperature protection threshold of the battery of 57° C. In the high-grade mode, it is assumed that the ambient temperature is 35° C., the battery is a soft package battery, the temperature after the battery is discharged is up to 60.7° C., it has exceeded the temperature protection threshold of the battery of 57° C., and thus it is necessary to reduce the generated heat of the battery and reduce the temperature rise. Therefore, in the present disclosure, the motor power is mainly processed in a high-grade mode (the high-grade mode may also be understood as a water absorption mode of the floor scrubber, and in this mode, the main motor of the floor scrubber operates, the water pump does not spray water, and the roller brush rotates).

In the specific implementation, it is necessary to first determine the corresponding initial operation power of the floor scrubber in the target operation mode, and under the condition of the target operation mode and the preset ambient temperature, the temperature of the battery can reach the temperature protection threshold, that is, the subsequent steps are performed only when the target operation mode is the high-grade mode. In the following, an initial operation power corresponding to 150 W in the high-grade mode, which is the maximum power of the cleaning device for surface cleaning operation tasks, is used as an example for subsequent illustration.

At the initial operation power of 150 W, it is determined whether an operation parameter of the battery or the cleaning device reaches a preset threshold, where when the preset threshold is reached, the temperature value of the battery is close to a temperature protection threshold for starting the over-temperature protection function.

It should be noted that determining whether an operation parameter of the battery or the cleaning device reaches a preset threshold comprises determining whether the voltage value of the battery reaches a preset threshold (for example, 23.9V); or determining whether the remaining power value of the battery reaches a preset threshold (for example, 21%); or determining whether the operation duration of the cleaning device reaches a preset threshold (for example, 30 min).

Figure 60:
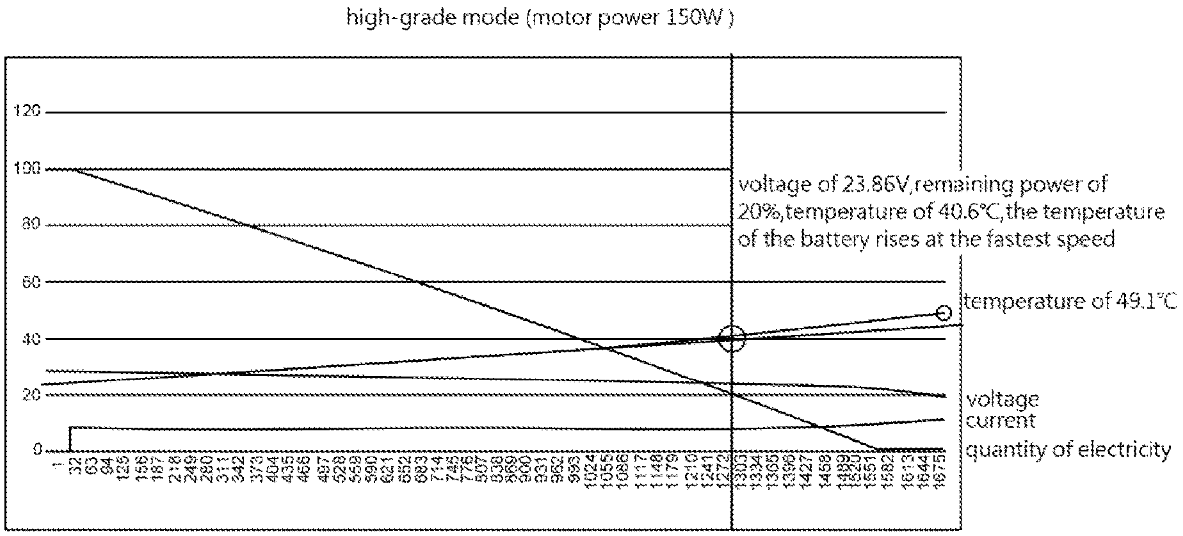
FIG. 60 is a specific example diagram of the temperature rise curve according to an exemplary embodiment of the present disclosure.

The preset threshold can be determined according to a temperature rise curve corresponding to the battery in the discharging process, and the temperature rise curve at least reflects the changes in voltage, power, and temperature of the battery, further details can be found in FIG. 60. As shown in FIG. 60, the motor power of the floor scrubber is 150 W, in the initial stage of the test, the ambient temperature is 23.4° C., the difference between the actual ambient temperature and the preset standard summer ambient temperature 35° C. is 11.6° C. (that is, 35° C.–23.4° C.=11.6° C., with the continuous use of the battery, the temperature of the battery will rise rapidly, the temperature of the temperature rising inflection point 40.6° C. corresponding to 35° C. is 52.2° C. (40.6° C.+11.6° C.=52.2° C.), the temperature of the stop discharge 49.1° C. corresponding to 35° C. is 60.7° C. (49.1° C.+11.6° C.=60.7° C.), and this temperature of 60.7° C. has exceeded the protection point of the charging over-temperature protection of the soft package battery of 57° C., it is necessary to reduce the motor power, thereby reducing the heat generated by the battery and reducing the temperature rise.

Specifically, it can be seen in FIG. 60 that when the voltage of the battery is 23.86V, the remaining power is 20%, and the temperature is 40.6° C., the temperature of the battery rises at the fastest speed, so that the motor power can be reduced at this point (that is, the point corresponding to the preset threshold).

After determining the preset threshold, it can be determined whether the operation parameter of the battery or the cleaning device reaches the preset threshold, and if the operation parameter of the battery or the cleaning device reaches the preset threshold, the operation power of the cleaning device is reduced to the target operation power. In particular, the power of the cleaning device is reduced, so that the temperature value of the battery is lower than the temperature protection threshold. How to reduce the operating power of the cleaning device can be seen in the following embodiments, which are not described here.

In the cleaning method for the cleaning device provided by the present disclosure, the corresponding initial operation power of the suction motor of the cleaning device in the target operation mode is determined, whether the operation parameter of the battery or the cleaning device reaches the preset threshold value or not is determined under the initial operation power, and if the operation parameter of the battery or the cleaning device reaches the preset threshold value, the operation power of the cleaning device is reduced, so that the temperature value of the battery is reduced, and the temperature value is prevented from exceeding the temperature protection threshold value. Based on the above, in the present disclosure, the cleaning device can directly enter a charging state after completing the cleaning work without waiting, and thus high charging efficiency and good user experience can be achieved.

The following describes how to reduce the operation power of the cleaning device to the target operating power.

In this embodiment of the present disclosure, reducing the operation power of the cleaning device comprises reducing the operation power of the cleaning device step by step from an initial operating power.

In the specific implementation, in the process of reducing the operation power of the cleaning device step by step, the step size and the use duration of the operation power reduced each time may be the same or different.

In particular as an implementation, according to a preset power reduction condition, reducing the operation power of the cleaning device step by step from an initial operation power, wherein the preset power reduction condition is used to determine a step size and a use duration of the operation power reduced each time. The preset power reduction condition here means that: the step size and the use duration of the operation power reduced each time cooperate with each other, so that an even and stable change in the amount of reduction in the battery voltage value can be maintained.

For example, in the process of stepped reduction of the operation power of the cleaning device:

Illustrative scenario I: the step size and the duration may be set slightly smaller (for example, the step size is set to 10 W, and the duration is set to 2 s) within an initial period of time (for example, within 6 s), and the step size and the duration are continuously increased in the subsequent period of time, for example, at 30 s, the step size is adjusted to 20 W, and the duration is adjusted to 6 s.

Illustrative scenario II: the step size may be set to a fixed value, for example, the step size may be set to 15 W, and the duration may be lengthened, for example, the duration may be set to 2 s in the early stage, and may be set to 5 s in the later stage.

Illustrative scenario III: the duration may be set to a fixed value, for example, it can be set to 5 s, and the step size is shortened, for example, the step may be set to 25 W in the early stage, and may be set to 15 W in the later stage.

It should be noted that the illustrative scenarios II and III may be considered as preferentially ensuring the temperature of the battery, because the user may switch modes in the middle of reducing the operation power of the cleaning device. In addition, the above data are only exemplary data, and are not limited thereto, in the actual applications, as long as the value of the above data can be taken so that an even and stable change in the amount of reduction in the battery voltage value can be maintained.

Figure 61:
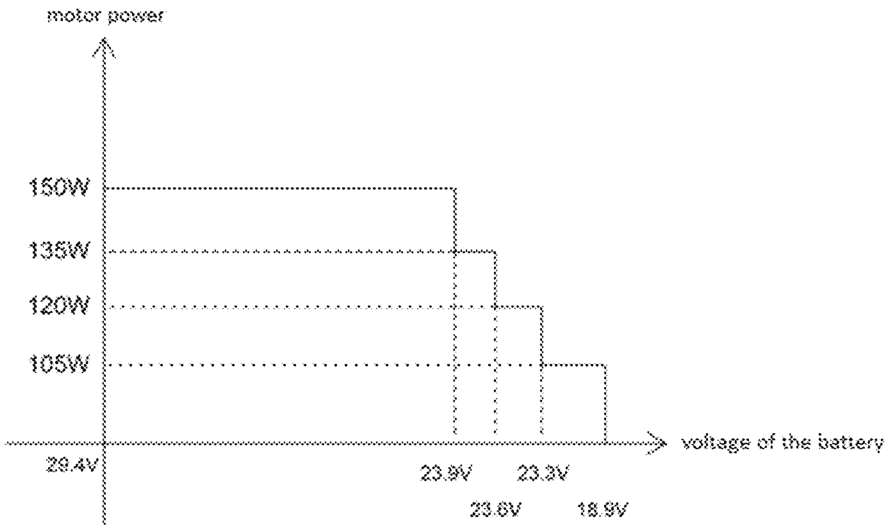
FIG. 61 is a schematic diagram of the operation power change of the cleaning device according to an exemplary embodiment of the present disclosure.

As an alternative implementation, the operation power of the cleaning device may be reduced to a target operation power step by step from the initial operation power at a preset step size every set duration. For example, as shown in FIG. 61, the voltage of the battery is 23.9V and the duration is 5 s, the motor power is reduced from 150 W to 135 W, and after the duration of 5 s, the motor power is reduced from 135 W to 120 W, after the duration of 5 s, the motor power is reduced from 120 W to 105 W (i.e., the target operation power). It should be noted that the remaining power of the battery corresponding to the target operation power is 0%.

The operation power of the cleaning device is reduced to the target operation power by the preset step size at an interval according to the initial operation power, so that the cleaning device operates smoothly and the reduction in the operation power is not noticeable to the user. Here, 15 W is selected to be reduced each time (that is, the preset step size), if the reduction amplitude is too small, the effect of slowing down the temperature rise cannot be achieved, and if the reduction amplitude is too large, the sound change may be noticed by the user, and thus the user may think that there is some problem with the cleaning device, which will affect the user experience. Of course, the preset step size of 15 W is only a specific example, and is not limited thereto, and the preset step size is preferably in a range from 10 W to 25 W.

The battery voltage range, the motor power, and the correspondence between the battery voltage and the remaining power can be found in Table below:

| Battery Voltage Range | Motor Power | Correspondence between battery voltage and remaining power |
|---|---|---|
| (—, 23.9 V) | 150 W | At 23.9 V, the remaining power corresponds to 21% |
| (23.9 V, 23.6 V) | 135 W | At 23.6 V, the remaining power corresponds to 16% |
| (23.6 V, 23.3 V) | 120 W | At 23.3 V, the remaining power corresponds to 13% |
| (23.3 V, —) | 105 W | the remaining power corresponds to 0% |

Figure 62:
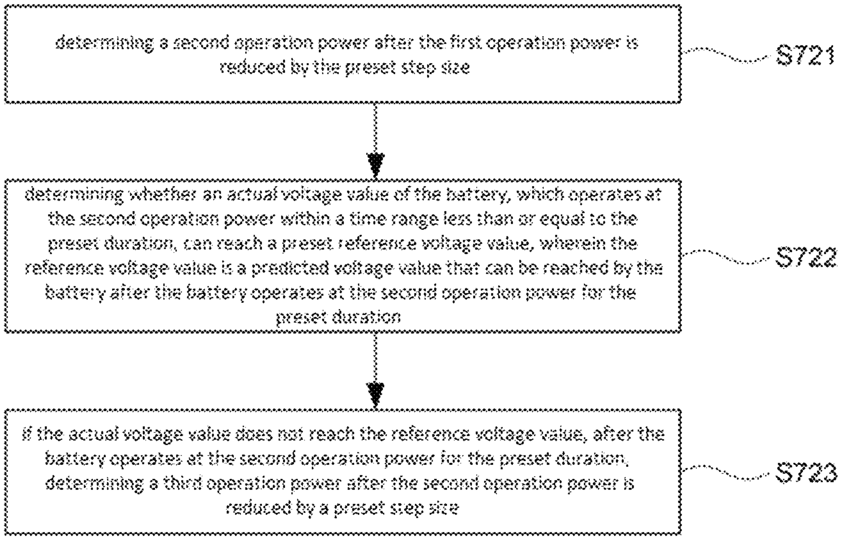
FIG. 62 is a flowchart of reducing operation power of the cleaning device according to an exemplary embodiment of the present disclosure.

Further, as shown in FIG. 62, the step of reducing the operation power of the cleaning device at a preset step size every preset duration from the initial operating power comprises:

Step S721: determining a second operation power after the first operation power is reduced by the preset step size.

Step S722: determining whether an actual voltage value of the battery, which operates at the second operation power within a time range less than or equal to the preset duration, can reach a preset reference voltage value, wherein the reference voltage value is a predicted voltage value that can be reached by the battery after the battery operates at the second operation power for the preset duration.

Step S723: if the actual voltage value does not reach the reference voltage value, after the battery operates at the second operation power for the preset duration, determining a third operation power after the second operation power is reduced by a preset step size.

In a specific implementation, it is assumed that the first operation power is 150 W, and after the first operation power has been reduced by the preset step size (assuming that the preset step size is 15 W), the second operation power can be determined to be 135 W. The cleaning device can operate at the second operation power of 135 W for the preset duration (assuming 5 s). In this case, the actual voltage value of the battery does not reach a preset reference voltage value, for example, in the case of normal operation, after the main motor is reduced from the first operation power 150 W to the second operation power 135 W, the voltage of the battery should be reduced to 23.6V (that is, the preset reference voltage value), and the actual voltage value of the battery is 24V, and is not reduced to 23.6V. At this time, in accordance with the principle of time priority, there is no need to pay attention to the voltage value of the battery, and after a preset time length, it is sufficient to continue to reduce the power of the main motor to the third operation power of 120 W.

In addition, in practice, there is another situation: after the motor power has been reduced, the voltage value of the battery rebounds for some reason, and at this time, the voltage value of the battery does not need to be concerned (that is, the motor power does not increase with the rebound of the voltage value of the battery at this time), and the operation power of the cleaning device continues to be reduced in a stepped manner.

Based on the above, by determining the second operation power after the first operation power has been reduced by a preset step size, and determining whether the actual voltage value of the battery can reach the preset reference voltage value while operating at the second operation power in a range less than or equal to the preset duration, it can be further determined whether the actual voltage value of the battery has reached the expected voltage value. If the actual voltage value does not reach the reference voltage value, this indicates that the actual voltage value of the battery does not reach the expected voltage value, and at this time, after operating at the second operation power for the preset duration, the third operation power obtained after the second operation power is reduced by the preset step size is determined, thereby avoiding an influence on adjustment of the motor power because the actual voltage value of the battery is not efficiently reduced or rebounds, and ensuring the process of reducing the operation power of the cleaning device proceeds smoothly.

In the embodiment of the present disclosure, the method comprises: in response to a switching instruction for switching from the target operation mode to another operation mode, if an operation power of a suction motor in another operation mode is less than the initial operation power in the target operation mode, controlling the cleaning device to operate at a corresponding preset operation power in another operation mode.

It should be understood that there may be a plurality of working modes of the floor scrubber, for example, an intelligent-grade mode in which the motor power is low, and a high-grade mode in which the motor power is high.

In actual application, if a user switches the working mode of the floor scrubber, the floor scrubber responds to the switching instruction triggered by the user to switch from the target working mode to another working mode, and determines whether the temperature of the battery can reach the temperature protection threshold under the preset temperature condition in another working mode. If the temperature protection threshold can be reached, this indicates that said another working mode is a high-grade working mode in which the motor power is higher than that in the target working mode, and said another working mode selected as the target working mode will performs the steps shown in FIG. 59.

If the temperature of the battery cannot reach the temperature protection threshold in another working mode and under the set temperature condition, this indicates that said another working mode is an intelligent gear mode in which the motor power is lower than that in the target working mode, and at this time, the floor scrubber is controlled to operate at the corresponding preset operation power in said another working mode. Therefore, the floor scrubber can select the corresponding operation power adjustment method according to the switching of high and low grades, the accuracy of motor power adjustment is improved, and it is ensured that the temperature value of the battery can be always lower than the temperature protection threshold after the motor power is adjusted.

In the following, embodiments of the present disclosure are described in detail below with reference to application scenarios.

Application Scenario Example 1

It is assumed that the cleaning device is a floor scrubber, the target working mode is a high-grade mode, and its corresponding initial operation power is 150 W. In the specific implementation:

determining an initial operation power of 150 W corresponding to the floor scrubber in the high-grade mode. In case of the initial operation power is 150 W and the duration is 5 s, it is detected whether the voltage value of the battery can reach a preset threshold (23.9V), if so, the motor power of the floor scrubber is reduced from 150 W to 135 W, after the duration of 5 s, the motor power is further reduced from 135 W to 120 W, and after the duration of 5 s, the motor power is reduced from 120 W to 105 W (i.e., the target operation power), so that the temperature value of the battery is lower than the temperature protection threshold.

Application Scenario Example 2

It is assumed that the cleaning device is a cleaning robot, the target working mode is a high-grade mode, and its corresponding initial operation power is 150 W. In the specific implementation:

determining an initial operation power of 150 W corresponding to the cleaning robot in the high-grade mode. In case of the initial operating power is 150 W, it is detected whether the remaining power of the battery reaches a preset threshold (21%), and if so, the motor power of the floor scrubber is reduced from 150 W to 135 W, here the duration is 5 s.

At this time, if the actual voltage value of 24V of the battery is not reduced to the preset reference voltage value of 23.6V, in accordance with the principle of time priority, after the duration of 5 s, the motor power is further reduced from 135 W to 120 W, and after the duration of 5 s, the motor power is further reduced from 120 W to 105 W (i.e., the target operation power), so that the temperature value of the battery is lower than the temperature protection threshold. In this process, if the actual voltage value of the battery is not reduced to the set reference voltage value again, the motor power of the scrubber will continue to be reduced in accordance with the principle of time priority.

Application Scenario Example 3

It is assumed that the cleaning device is a cleaning robot, the target working mode is a high-grade mode, and its corresponding initial operation power is 150 W. In the specific implementation:

determining an initial operation power of 150 W corresponding to the cleaning robot in the high-grade mode. In the case of the initial operating power is 150 W, it is detected whether the voltage value of the battery reaches a preset threshold (23.9V), and if so, the motor power of the floor scrubber is reduced from 150 W to 135 W, here the duration is 5 s.

At this time, if the actual voltage value of 24V of the battery rebounds, the motor power of the cleaning robot does not need to be adjusted, and after the duration of 5 s, the motor power of the cleaning robot is directly reduced from 135 W to 120 W, and after the duration of 5 s, the motor power is further reduced from 120 W to 105 W (i.e., the target operation power), so that the temperature value of the battery is lower than the temperature protection threshold. In this process, if the actual voltage value of the battery rebounds, the motor power of the cleaning robot continues to be reduced.

Application Scenario Example 4

It is assumed that the cleaning device is a floor scrubber, the target working mode is a high-grade mode, and its corresponding initial operation power is 150 W. In the specific implementation:

determining an initial operation power of 150 W corresponding to the floor scrubber in the high-grade mode. In case of the initial operation power is 150 W and the duration is 5 s, it is detected whether the working duration of the floor scrubber can reach a preset threshold (30 min), if so, the motor power of the floor scrubber is reduced from 150 W to 135 W, after the duration of 5 s, the motor power is further reduced from 135 W to 120 W, and after the duration of 5 s, the motor power is reduced from 120 W to 105 W (i.e., the target operation power), so that the temperature value of the battery is lower than the temperature protection threshold.

In this process, if the actual voltage value of the battery is not reduced to the preset reference voltage value, as described for the application scenario example 2, the motor power of the floor scrubber will continue to be reduced in accordance with the principle of time priority. If the actual voltage value of the battery rebounds, as described for the application scenario example 3, the motor power of the floor scrubber will continue to be reduced.

In summary, in the present disclosure, the corresponding initial operation power of the suction motor of the cleaning device in the target operation mode is determined, whether the operation parameter of the battery or the cleaning device reaches the preset threshold value or not is determined under the initial operation power, and if the operation parameter of the battery or the cleaning device reaches the preset threshold value, the operation power of the cleaning device is reduced, so that the temperature value of the battery is reduced, and the temperature value is prevented from exceeding the temperature protection threshold value. Based on the above, in the present disclosure, the cleaning device can directly enter a charging state after completing the cleaning work without waiting, and thus high charging efficiency and good user experience can be achieved.

By determining the second operation power after the first operation power has been reduced by a preset step size, and determining whether the actual voltage value of the battery can reach the preset reference voltage value while operating at the second operation power in a range less than or equal to the preset duration, it can be further determined whether the actual voltage value of the battery has reached the expected voltage value. If the actual voltage value does not reach the reference voltage value, this indicates that the actual voltage value of the battery does not reach the expected voltage value, and at this time, after operating at the second operation power for the preset duration, the third operation power obtained after the second operation power is reduced by the preset step size is determined, thereby avoiding an influence on adjustment of the motor power because the actual voltage value of the battery is not efficiently reduced or rebounds, and ensuring the process of reducing the operation power of the cleaning device proceeds smoothly.

Correspondingly, an embodiment of the present disclosure further provides a cleaning device, the cleaning device comprises a device body provided with a memory, a processor, a battery, and a suction motor; wherein, the memory stores a computer program, the processor is coupled to the memory for determining an initial operation power corresponding to a cleaning device in a target operating mode, and wherein, the cleaning device is powered by a battery. At the initial operation power, it is detected whether an operation parameter of the battery or the cleaning device reaches a preset threshold, where when the preset threshold is reached, the temperature value of the battery is close to a temperature protection threshold for starting the over-temperature protection function. If the operation parameter of the battery or the cleaning device reaches a preset threshold, the operation power of the cleaning device is reduced to the target operation power, so that the temperature value of the battery is lower than the temperature protection threshold.

In some embodiments, the processor is specifically configured to: determine whether the voltage value of the battery reaches the preset threshold; or determine whether the remaining power value of the battery reaches the preset threshold; or determine whether the working duration of the cleaning device reaches the preset threshold.

In some embodiments, the processor is further configured to determine the preset threshold according to a temperature rise curve of the battery in the discharging process, the temperature rise curve at least reflects changes in voltage, power, and temperature of the battery.

In some embodiments, the processor is specifically configured to step down the operation power of the cleaning device from an initial operation power.

In some embodiments, the processor is specifically configured to step down the operation power of the cleaning device by a preset step size at an interval of a preset duration from an initial operation power.

In some embodiments, the processor is specifically configured to: determine the second operation power after the first operation power has been reduced by a preset step size; determine whether an actual voltage value of the battery, which operates at the second operation power within a time range less than or equal to the preset duration, can reach a preset reference voltage value, wherein the reference voltage value is a predicted voltage value that can be reached by the battery after the battery operates at the second operation power for the preset duration; if the actual voltage value does not reach the reference voltage value, after operating at the second operation power in the preset duration, a third operation power is determined after the second operation power has been reduced by the preset step size.

In some embodiments, the processor is specifically configured to: according to a preset power reduction condition, step down the operation power of the cleaning device from an initial operation power, wherein the preset power reduction condition is used to determine a step size and a duration of each reduction of the operation power.

In some embodiments, in the target operation mode, the temperature of the battery can reach the temperature protection threshold under a preset ambient temperature condition.

In some embodiments, the processor is also configured to: in response to a switching instruction for switching from the target operation mode to another operation mode, if an operation power of a suction motor in another operation mode is less than the initial operation power in the target operation mode, controlling the cleaning device to operate at a corresponding preset operation power in another operation mode.

Those skilled in the art should understand that the embodiments of the present disclosure may be provided as a method, a system, or a computer program product. Thus, embodiments of the present disclosure may include an entirely hardware embodiment, an entirely software embodiment, or an embodiment combining software and hardware. Moreover, the present disclosure may take the form of a computer program product implemented on one or more computer readable storage media (including but not limited to magnetic disk storage, CD-ROM, optical storage, etc.) containing computer executable program code.

The present disclosure is described with reference to flowcharts and/or block diagrams of methods, devices (systems), and computer program products according to embodiments of the present disclosure. It should be understood that each process and/or block in the flowchart and/or block diagram, and a combination of processes and/or blocks in the flowchart and/or block diagram may be implemented by using computer program instructions. These computer program instructions may be provided to a processor of a general-purpose computer, a special-purpose computer, an embedded processor, or another programmable data processing apparatus to generate a program, so that the instructions executed by the processor of the computer or another programmable data processing apparatus implement a device for achieving functions specified in one or more processes in the flowchart and/or one or more blocks in the block diagram.

These computer program instructions may also be stored in a computer-readable memory capable of directing a computer or other programmable data processing apparatus to operate in a specific manner, so that the instructions stored in the computer-readable memory generate an article of manufacture including an instruction apparatus that implements functions specified in one or more processes in the flowchart and/or one or more blocks in the block diagram.

These computer program instructions may also be loaded by a computer or other programmable data processing apparatus, so that a series of operation steps are performed on the computer or other programmable apparatus to generate a computer-implemented process, so that the instructions executed on the computer or other programmable apparatus provide steps for implementing functions specified in one or more processes in the flowchart and/or one or more blocks in the block diagram.

In one typical configuration, a computing device comprises one or more processors (CPUs), input/output interfaces, network interfaces, and memories.

The memory may include a non-transitory memory, a random-access memory (RAM), and/or a non-volatile memory in a computer-readable medium, for example, a read-only memory (ROM) or a flash RAM. Memory is an example of a computer-readable medium.

Computer-readable media, including both permanent and non-permanent, removable and non-removable media, may be implemented in information storage by any method or technology. The information may be computer-readable instructions, data structures, modules of a program, or other data. Examples of storage media for a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape magnetic disk storage or other magnetic storage devices, or any other non-transmission medium that can be used to store information that can be accessed by a computing device. As defined herein, computer-readable media does not include transitory media, such as modulated data signals and carrier waves.

In the sixth aspect of the present disclosure, with the rapid development of battery technology, current manufacturers of related battery-powered products have applied rechargeable batteries to their products, and as rechargeable batteries increasingly use soft-package cells, the requirements for charging protection of such rechargeable batteries are becoming more stringent. A conventional over-voltage charging protection method usually comprises setting a primary charging protection in a charging loop, but when the primary charging protection fails, safe charging of a rechargeable battery cannot be guaranteed. Therefore, there is a need for a safe and reliable charging protection method to avoid the situation that safe charging of the rechargeable battery cannot be guaranteed when the primary charging protection fails.

In view of this, embodiments according to the sixth aspect of the present disclosure provide a charging protection method. The present disclosure also relates to a charging protection circuit, a cleaning device, a cleaning tool, a computing equipment and a computer readable storage medium, so as to solve the problems in the prior art.

According to the first embodiment according to the sixth aspect of the present disclosure, a charging protection method is provided, wherein the charging protection method is applied to a charging protection system, and the charging protection system comprises a battery control unit deployed in a battery management circuit, a host control unit deployed in a host control circuit, and a target battery, wherein the battery control unit monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit when the action of disconnecting the first charging protection element is executed and the second charging parameter of the target battery is monitored; and the host control unit generates a second charging end instruction according to the second charging parameter, and executes an action of disconnecting a second charging protection element in the host control circuit in response to the second charging end instruction.

According to the second embodiment according to the sixth aspect of the present disclosure, based on the first embodiment, the charging protection system further comprises a parameter collection unit deployed in a battery management circuit, the parameter collection unit is connected with the battery control unit; the monitoring, by the battery control unit, the first charging parameter of the target battery comprises: collecting, by the battery control unit, the first charging parameter of the target battery through the parameter collection unit.

According to the third embodiment according to the sixth aspect of the present disclosure, based on the first embodiment, wherein generating, by the battery control unit, the first charging end instruction based on the first charging parameter comprises: determining, by the battery control unit, a first preset charging parameter threshold of the target battery, and generating a first charging end instruction when the first charging parameter is greater than or equal to the first preset charging parameter threshold.

According to the fourth embodiment according to the sixth aspect of the present disclosure, based on the first embodiment, after having performed, by the battery control unit, the action of disconnecting the first charging protection element in the charging management circuit in response to the first charging end instruction, the method further comprises: monitoring, by the battery control unit, the parameter of the target battery during a preset sleep time, if the second charging parameter of the target battery is not monitored, the battery control unit will sleep; monitoring, by the battery control unit, the parameter of the target battery during a preset sleep time, if the second charging parameter of the target battery has been monitored, the battery control unit will send the second charging parameter to the host control unit.

According to the fifth embodiment according to the sixth aspect of the present disclosure, based on the first embodiment, generating, by the battery control unit, the first charging end instruction based on the first charging parameter comprises: determining, by the battery control unit, a second preset charging parameter threshold of the target battery, and generating a second charging end instruction when the second charging parameter is greater than or equal to the second preset charging parameter threshold.

According to the sixth embodiment according to the sixth aspect of the present disclosure, based on any one of the first to fifth embodiments, the first charging parameter comprises at least one of a first charging current, a first cell voltage, a first charging time, and a first charging temperature of the target battery, and the second charging parameter comprises at least one of a second charging current, a second cell voltage, and a second charging temperature of the target battery.

According to the seventh embodiment according to the sixth aspect of the present disclosure, based on any one of the first to fifth embodiments, wherein both the first charging protection element and the second charging protection element are field effect transistors.

According to the eighth embodiment according to the sixth aspect of the present disclosure, based on the first embodiment, wherein the charging protection system further comprises overcharge detection unit deployed in the battery management circuit, the method further comprises: monitoring, by the overcharge detection unit, a third charging parameter of the target battery, and controlling a third charging protection element in the battery management circuit based on the third charging parameter.

According to the ninth embodiment according to the sixth aspect of the present disclosure, based on the eighth embodiment, the third charging parameter comprises a third cell voltage of the target battery, and the third charging protection element is a fuse.

According to the tenth embodiment of the sixth aspect of the present disclosure, a charging protection circuit is provided, the charging protection circuit comprises a battery control unit deployed in a battery management circuit, a host control unit deployed in a host control circuit, and a target battery, wherein, the battery control unit monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit when the action of disconnecting the first charging protection element is executed and the second charging parameter of the target battery is monitored; and the host control unit generates a second charging end instruction according to the second charging parameter, and executes an action of disconnecting a second charging protection element in the host control circuit in response to the second charging end instruction.

According to the eleventh embodiment according to the sixth aspect of the present disclosure, a cleaning device is provided, the cleaning device comprises the charging protection circuit according to the tenth embodiment.

According to the twelfth embodiment according to the sixth aspect of the present disclosure, a cleaning tool is provided, the cleaning tool comprises:

a cleaning device configured to carry out a cleaning task, wherein, the cleaning device comprises the charging protection circuit according to the above tenth embodiment; and a cleaning base station configured to receive the cleaning device and to charge the cleaning device.

According to an embodiment according to the sixth aspect of the present disclosure, a computing equipment is provided, the computing equipment comprises a memory, a processor, and computer instructions stored in the memory and executable on the processor, when the processor executes the computer instructions, the steps of the charging protection method are implemented.

According to an embodiment according to the sixth aspect of the present disclosure, a computer readable storage medium is provided, the computer readable storage medium stores computer instructions, when the computer instructions are executed by a processor, the steps of the charging protection method are implemented.

The charging protection method provided by the present disclosure can be applied to a charging protection system, the charging protection system comprises a battery control unit deployed in a battery management circuit, a host control unit deployed in a host control circuit and a target battery, wherein, the battery control unit monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit when the action of disconnecting the first charging protection element is executed and the second charging parameter of the target battery is monitored; and the host control unit generates a second charging end instruction according to the second charging parameter, and executes an action of disconnecting a second charging protection element in the host control circuit in response to the second charging end instruction.

According to an embodiment of the present disclosure, the first charging parameter of the target battery in the charging process is monitored by the battery control unit deployed in the battery management circuit, the first charging end instruction is generated according to the first charging parameter under the condition that the charging end condition is met, and the action of disconnecting the first charging protection element is executed in response to the first charging end instruction, so that a primary charging protection of the target battery is realized. After the action of disconnecting the first charging protection element is executed and the second charging parameter of the target battery is monitored, the second charging parameter is sent to the host control unit, the host control unit deployed in the host control circuit generates a second charging end instruction according to the second charging parameter when the charging end condition is met, and the action of disconnecting the second charging protection element in the host control circuit is executed in response to the second charging end instruction, so that secondary charging protection of the target battery is achieved, and the purpose of charging protection of the target battery through secondary charging protection is achieved when primary charging protection fails to function.

Please refer to FIG. 63 to FIG. 67. First, the terms involved in one or more embodiments of the present disclosure related to the charging protection method are explained.

Hardware charging protection: a hardware charging protection belongs to charging protection that does not need software control, and such a charging protection is implemented by using a hardware action in a charging circuit.

Software charging protection: a software charging protection belongs to charging protection of switching devices such as field effect transistors that need to be controlled by a software program.

At present, with the development of battery technology, soft package cells have the advantages of light and thin design, high energy density, bendable design and the like, and thus are increasingly widely used. However, the soft package cell also has defects compared with the traditional cylindrical cell. For example, the battery housing of the soft package battery cell is relatively weak, and is easily damaged by external force, so that the battery may be short-circuited or exploded; meanwhile, due to structural space limitation of the soft package battery cell, a safety valve cannot be installed, so that the soft package battery cell has more strict charging limitation requirements for over-temperature, over-current, over-voltage and the like.

Based on this, the present disclosure provides a charging protection method, and the present disclosure also relates to a charging protection circuit, a cleaning device, a cleaning tool, a computing device, and a computer-readable storage medium, each of these will be described in detail in the following embodiments.

Figure 63:
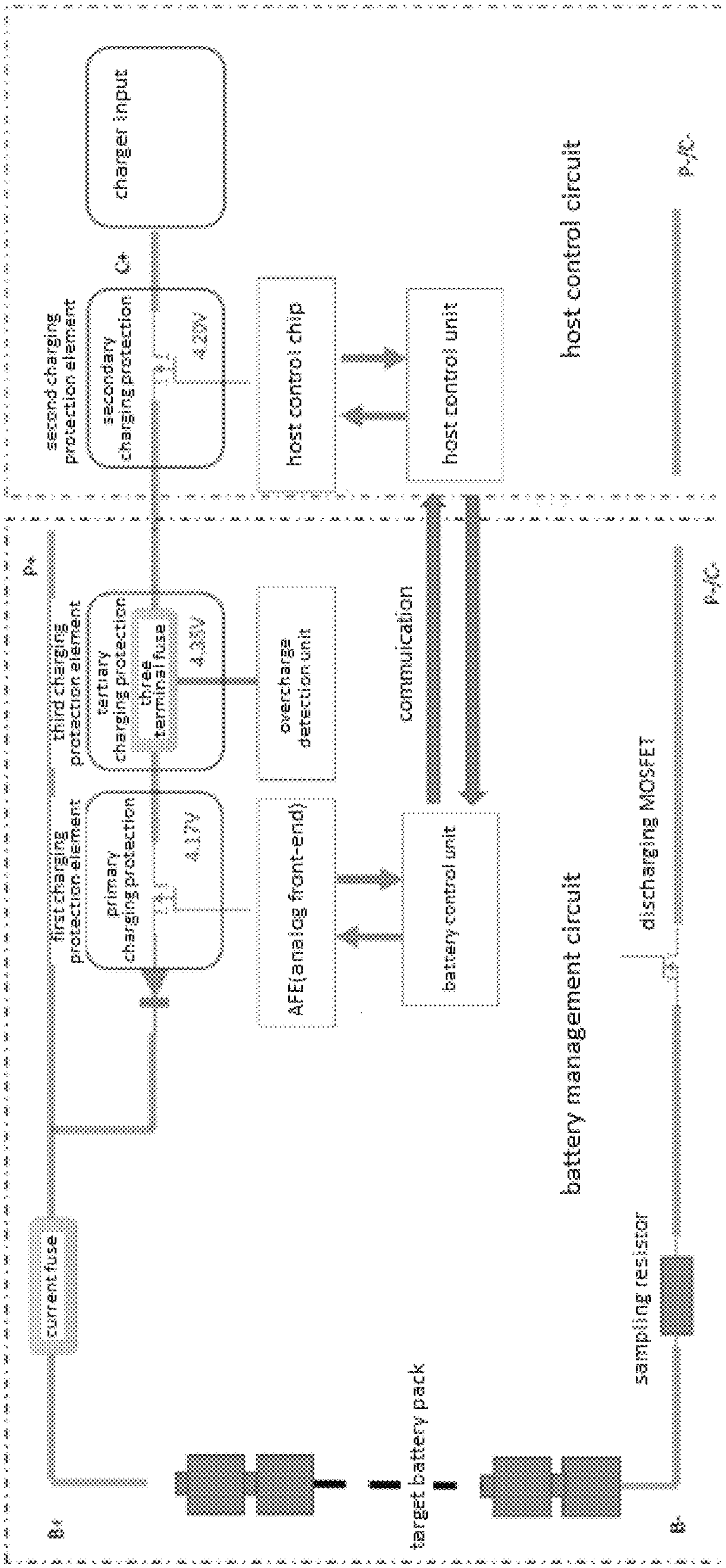
FIG. 63 is a system block diagram of the charging protection method according to an embodiment of the present disclosure.

FIG. 63 shows a system block diagram of a charging protection method provided according to an embodiment of the present disclosure, specifically including a battery management circuit and a host control circuit, wherein a battery control unit is deployed in the battery management circuit, and when a target battery pack is charged, the battery management circuit can manage the battery charging, so as to avoid damage to the battery caused by overcharging of the battery, and the specific battery control unit can monitor, by using an analog front-end, a first charging parameter of the target battery pack, such as a cell voltage and a charging current, and after the first charging parameter reaches a preset parameter threshold, this indicates that charging of the target battery pack is completed, and charging should be ended at this time, and the battery control unit performs, in response to a first charging end instruction, an action of disconnecting a first charging protection element, so as to stop charging the target battery pack and complete primary charging protection. The above action of disconnecting the first charging protection element refers to the battery control unit sending an instruction of disconnecting the first charging protection element. When the first charging protection element fails or is out of control (in this case, the battery control unit sends an instruction to disconnect the first charging protection element, but the first charging protection element is not normally disconnected due to breakdown or other faults), the battery control unit may further monitor the second charging parameter, in this case, the second charging protection element may be selected to be enabled, the battery control unit may send the second charging parameter to the host control unit, and the host control unit performs an action of disconnecting the second charging protection element in response to the second charging end instruction, to implement secondary charging protection on the target battery pack. The host control performs an action for disconnecting the second charging protection element in response to the second charging end instruction, that is, the host control unit issues an instruction to disconnect the second charging protection element in response to the second charging end instruction. In addition, a third charging protection element can be used to ensure that the tertiary charging protection is implemented in a hardware protection manner in a case that the secondary charging protection fails (in this case, the host control unit sends an instruction to disconnect the second charging protection element, but the second charging protection element fails to be normally disconnected). Based on this, reliability and safety of charging of the target battery pack are ensured through three different types of charging protection.

Compared to the charging protection method in the prior art, which provides the protection at the battery control unit side, in the present embodiment, in order to improve the charging safety, an additional safety protection measure is added at the host control unit side by disconnecting the second charging protection element from the host control unit side.

Figure 64:
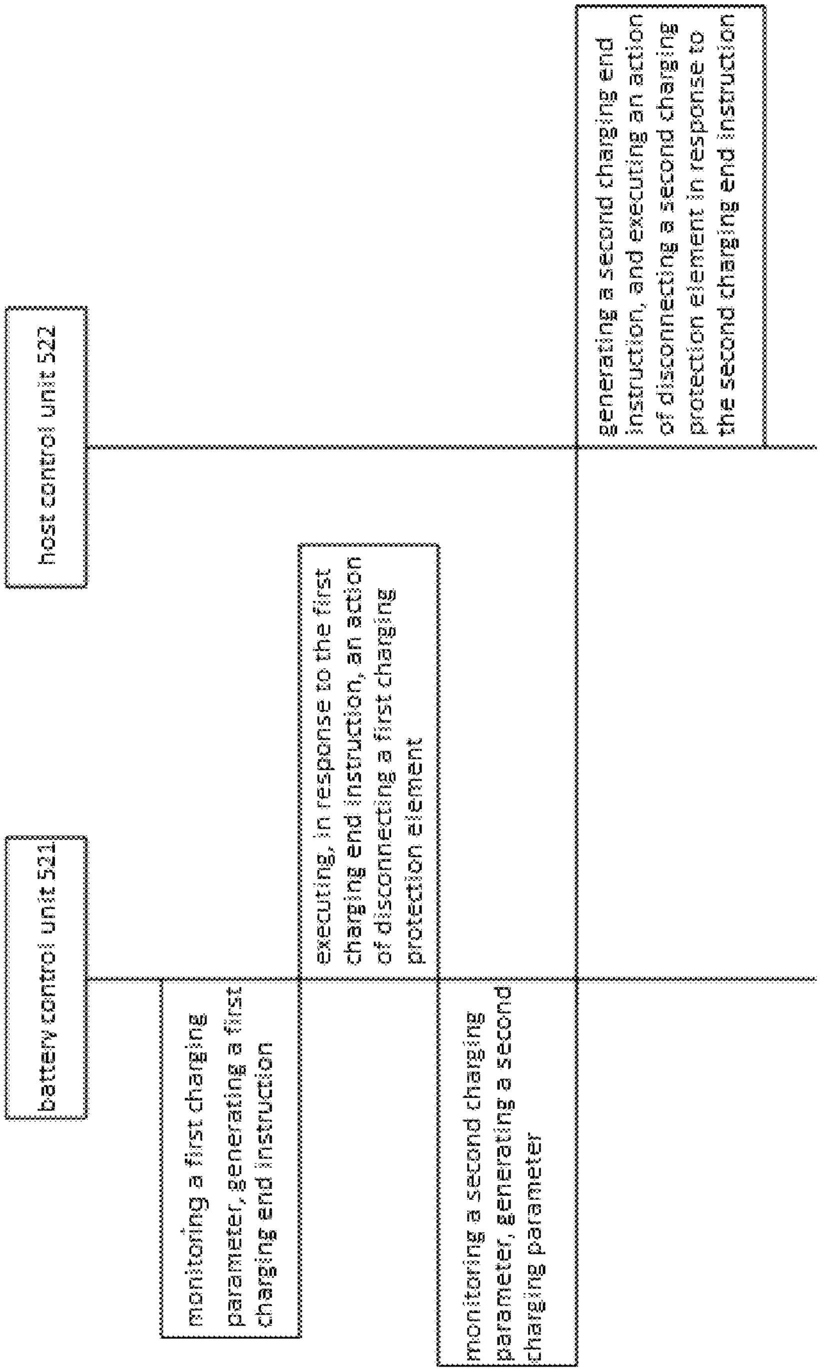
FIG. 64 is a flowchart of the charging protection method according to an embodiment of the present disclosure.

FIG. 64 shows a flowchart of a charging protection method according to an embodiment of the present disclosure, where the charging protection method is applied to a charging protection system 520, and the charging protection system 520 comprises a battery control unit 521 deployed in a battery management circuit, a host control unit 522 deployed in a host control circuit, and a target battery, wherein, the battery control unit 521 monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit 522 when the action of disconnecting the first charging protection element is executed and the second charging parameter of the target battery is monitored; and the host control unit 522 generates a second charging end instruction according to the second charging parameter, and executes an action of disconnecting a second charging protection element in the host control circuit in response to the second charging end instruction.

The battery management circuit may be understood as a circuit corresponding to a battery management system (BMS) board, the battery management circuit may intelligently manage and maintain each battery unit, prevent over-charging and over-discharging of a battery, prolong a service life of the battery, monitor a battery status, and the battery control unit may be understood as a micro controller unit (MCU) in the battery management circuit. The host control circuit may be understood as a main control circuit corresponding to a device or a machine, for example, a main control circuit of a cleaning device, and the host control unit is a control unit MCU in the host control circuit.

In the actual application, when a device needs to be charged, charging optimization is performed by using a battery management circuit, wherein a battery control unit in the battery management circuit monitors a first charging parameter of the target battery pack in a charging process by using an analog front-end AFE (Active Front End), and the first charging parameter can be understood as a related parameter of the target battery pack of the device in the charging process, for example, the first charging parameter can be a charging current, a core voltage, and the like. In order to ensure the safety and life of the battery, the battery management circuit can realize the primary charging protection of the battery by monitoring the first charging parameter.

In the specific implementation, the primary charging protection comprises charging current protection, cell voltage protection, charging time protection, and charging temperature protection. The charging current protection can be understood as setting an upper charging current threshold, and triggering the primary charging protection to turn off the charging circuit when the charging current exceeds the threshold, thereby protecting the battery from being damaged by overcharging; the cell voltage protection can be understood as setting an upper battery cell voltage threshold, and triggering the primary charging protection to turn off the charging circuit when the cell voltage of the battery reaches the upper threshold, thereby protecting the battery from being damaged by overcharging; and the charging time protection can be understood as setting a charging time threshold according to the capacity of the battery and the charging circuit, and triggering the primary charging protection to turn off the charging circuit when the charging time reaches the upper threshold, thereby protecting the battery from being damaged by overcharging.

In an actual application, after the battery control unit monitors and obtains the first charging parameter of the target battery, when the first charging parameter reaches the preset parameter threshold, the battery control unit generates a first charging end instruction, wherein the first charging end instruction can be understood as an instruction for ending battery charging that meets the primary charging protection condition, and the first charging end instruction can be used to turn off the charging circuit, thereby implementing primary charging protection on the target battery. The battery control unit may control the disconnection of the first charging protection element in response to the first charging end instruction, thereby turning off the charging circuit. The first charging protection element can be understood as a field effect transistor in the battery management circuit, such as a MOS transistor (MOSFET, metal-oxide semiconductor field effect transistor) for one-stage charging protection in the battery management circuit in FIG. 63, when the first charging protection element is disconnected, the charging circuit is also disconnected.

In a specific implementation, when a fault occurs in the first charging protection element, a primary charging protection cannot be normally implemented, and secondary charging protection may be selected. The secondary charging protection is mainly a supplement to the primary charging over-voltage protection, when the first charging protection element is broken down and short-circuited, or other reasons cause the primary charging protection to be protected in an out-of-control state, after the battery control unit performs an action of disconnecting the first charging protection element in response to the first charging end instruction, if it is still detected that the charging current exists in the battery management circuit, that is, the second charging parameter is monitored, it may be considered that the primary charging protection fails, at this time, the battery control unit continues to communicate with the host control unit, and sends the second charging parameter to the host control unit, so that the host control unit implements the secondary charging protection. The second charging parameter may include a charging current, a cell voltage, a charging temperature, and the like, the host control unit may monitor the second charging parameter after receiving the second charging parameter, and when the second charging parameter exceeds a preset second parameter threshold, generate a second charging end instruction and perform an action of disconnecting the second charging protection element in response to the second charging end instruction, wherein the second charging end instruction may be understood as an instruction used by the host control unit to disconnect the second charging protection element, and the second charging protection element may be understood as a charging protection element deployed in the host control circuit.

Specifically, the second charging protection element is a MOS transistor in the host control circuit in FIG. 63. In an embodiment provided in this specification, the host control circuit includes a MOS transistor, but the MOS transistor has other uses, and in this embodiment, the existing MOS transistor in the host control circuit is used to disconnect the MOS transistor when the primary charging protection fails to function as a secondary charging protection.

In another specific implementation provided in this specification, if the host control circuit does not include a MOS transistor, in order to implement the charging protection method of this disclosure, the MOS transistor needs to be added to the host control circuit, so as to perform a secondary charging protection function.

The host control circuit is used to provide charging current to the battery management circuit, and when the second charging protection element in the host control circuit is disconnected, the battery management circuit cannot receive the charging current, so that the charging loop is disconnected, and the purpose of the secondary charging protection is achieved.

Based on this, the battery control unit deployed in the battery management circuit monitors the first charging parameter of the target battery, and triggers the primary charging protection when the first charging parameter reaches the preset charging parameter threshold, at this time, the battery control unit generates and responds to the first charging end instruction to control the first charging protection element in the battery management circuit to be disconnected, to implement the primary charging protection on the target battery. After the first charging protection element is disconnected, the battery control unit detects that the second charging parameter exists in the battery management circuit, and sends the second charging parameter to the host control unit in the host control circuit, so that the host control unit further implements the secondary charging protection, and triggers the secondary charging protection when the second charging parameter reaches the preset charging parameter threshold, at this time, the host control unit generates and responds to the second charging end instruction, controls the second charging protection element in the host control circuit to be disconnected, to implement the secondary charging protection on the target battery. By means of two charging protection elements in different circuits, it is realized that in case of failure of the primary charging protection, the secondary charging protection can also be implemented by monitoring the second charging parameter, which ensures the safety and reliability of the target battery during the charging process.

Further, in order to facilitate the battery control unit to monitor the first charging parameter, so as to ensure subsequent implementation of the primary charging protection, the battery control unit can perform parameter monitoring by using the parameter collection unit, and in particular, the charging protection system further comprises a parameter collection unit deployed in the battery management circuit, wherein the parameter collection unit is connected to the battery control unit; and the monitoring, by the battery control unit, the first charging parameter of the target battery comprises: collecting, by the battery control unit, the first charging parameter of the target battery by using the parameter collection unit.

The parameter collection unit can be understood as a unit configured to collect a charging parameter of the target battery, and the parameter collection unit may be an analog front-end, and is configured to convert a collected analog quantity into a digital quantity and to transmit the digital quantity to the battery control unit, so that the battery control unit can monitor the first charging parameter of the target battery.

In practice, the parameter collection unit can collect charging parameters such as charging current, cell voltage, charging time, and charging temperature of the target battery during the charging process, and send these charging parameters to the battery control unit, so that the battery control unit can implement the primary charging protection based on the first charging parameter. In addition, in another case, the parameter collection unit may also be the battery control unit itself, for example, the analog quantity collected by the discrete device is transmitted to the MCU for processing, so that the battery control unit can monitor the first charging parameter of the target battery.

In a specific implementation of the present specification, the parameter collection unit collects a first charging parameter of the target battery, wherein the first charging parameter comprises a charging current, a cell voltage, a charging temperature, and the like, and sends the first charging parameter to the battery control unit.

Based on this, the battery control unit can accurately obtain the first charging parameter of the target battery in real time during the charging process through the parameter collection unit, thereby facilitating the subsequent primary charging protection of the target battery.

Further, to implement primary charging protection on the target battery, the battery control unit further needs to determine a first preset charging parameter threshold, and specifically, the generating, by the battery control unit, a first charging end instruction based on the first charging parameter comprises:

The battery control unit determines a first preset charging parameter threshold of the target battery, and generates a first charging end instruction when the first charging parameter is greater than or equal to the first preset charging parameter threshold.

The first preset charging parameter threshold may be understood as a preset parameter threshold of primary charging protection, and the first preset charging parameter threshold may include a first preset charging current threshold, a first preset cell voltage threshold, a first preset charging time threshold, and a first preset charging temperature threshold, when the first charging parameter is greater than or equal to the first preset charging parameter threshold, the primary charging protection is triggered, at this time, the battery control unit generates the first charging end instruction and in response to the first charging end instruction controls the first charging protection element to disconnect.

In a specific embodiment of the present specification, the battery control unit determines a first preset charging parameter threshold of the target battery, wherein the first preset charging parameter threshold comprises a first preset charging current threshold of 1 amperes (A) and a first preset cell voltage threshold of 4.17 volts (V), and when the charging current in the first charging parameter is greater than or equal to 1 A or the cell voltage is greater than or equal to 4.17V, the battery control unit generates the first charging end instruction and in response to the first charging end instruction controls the first charging protection element to disconnect.

Based on this, by determining the first preset charging parameter threshold, the battery control unit can implement the primary charging protection on the target battery within the safety range, thereby ensuring charging safety of the target battery.

Further, after implementing the primary charging protection on the target battery, if the primary charging protection operates normally, the battery control unit may sleep, and if the primary charging protection does not operate normally, the battery control unit may send the monitored second charging parameter to the host control unit, specifically, after the battery control unit performs, in response to the first charging end instruction, an action of disconnecting the first charging protection element in the battery management circuit, the method further comprises: monitoring, by the battery control unit, the parameter of the target battery within a preset sleep time, and if the second charging parameter of the target battery is not monitored, the battery control unit sleeps; and monitoring, by the battery control unit, the parameter of the target battery within a preset sleep time, and if the second charging parameter of the target battery is monitored, continuing to perform the step of sending the second charging parameter to the host control unit.

The preset sleep time can be understood as a charging parameter monitoring time after the battery control unit has responded to the first charging end instruction, and after the battery control unit has controlled the first charging protection element to disconnect, in order to avoid a situation where the primary charging protection fails due to a failure of the first charging protection element, the battery control unit also monitors the charging parameters for the target battery within a preset sleep time.

In practice, after the target battery has been charged, in order to reduce the power consumption of the battery, the battery control unit enters the sleep state, but in order to prevent the primary charging protection from failing, the target battery is still in the charging state, the battery control unit continues to monitor the charging parameter of the target battery within the preset sleep time after responding to the first charging end instruction, and when the second charging parameter is monitored, the battery control unit considers that the primary charging protection fails, at this time, the battery control unit does not enter the sleep state, but continuously monitors the second charging parameter and sends the second charging parameter to the host control unit, so that the host control unit can implement secondary charging protection.

In a specific embodiment of the present specification, the preset sleep time is set to 5 minutes (min), after the battery control unit performs the action of disconnecting the first charging protection element in response to the first charging end instruction, the battery control unit continues to monitor the charging parameter in the battery management circuit for 5 min, if the charging parameter is monitored within 5 min, the charging parameter is sent to the host control unit as the second charging parameter, and if the charging parameter is not monitored within 5 min, the battery control unit considers that the primary charging protection is effective, and enters the sleep state at this time, thereby reducing the power consumption of the battery.

Based on this, the battery control unit will continue to monitor the charging parameter within the preset sleep time after the primary charging protection has been implemented, thereby avoiding a charging damage to the target battery due to the failure of the primary charging protection, and meanwhile, under the condition that the primary charging protection is effective, will enter the sleep state to reduce the power consumption of the battery.

Further, after receiving the second charging parameter sent by the battery control unit, the host control unit may implement secondary charging protection based on the second charging parameter, and specifically, the generating, by the host control unit, a second charging end instruction based on the second charging parameter comprises: determining, by the host control unit, a second preset charging parameter threshold of the target battery; and, generating the second charging end instruction when the second charging parameter is greater than or equal to the second preset charging parameter threshold.

Here, the second preset charging parameter threshold may be understood as a preset parameter threshold of secondary charging protection, and the second preset charging parameter threshold may include a second preset charging current threshold, a second preset cell voltage threshold, and a second charging temperature threshold. The host control unit can implement the secondary charging protection according to the second preset charging parameter threshold and the second charging parameter. It should be noted that, in order to ensure that the charging protection of the target battery can operate normally, the selection value of the second preset charging parameter threshold should be greater than the first preset charging parameter threshold, so as to first perform primary charging protection and then perform secondary charging protection.

In practice, there are three cases for determining that the primary charging protection fails, the first case is that when the battery control unit disconnects the first charging protection element, if it is detected that the charging loop still has the charging current, it is considered that the primary charging protection fails, and at this time, the battery control unit continues to communicate with the host control unit and send the second charging parameter; the second case is that when the maximum voltage of the single cell does not reach the second preset cell voltage threshold, if it is detected that the cell temperature sent by the battery control unit exceeds the second preset cell temperature threshold and the charging current can still be monitored, it is considered that the primary charging protection fails; and the third case is that if the second charging current in the second charging parameter received by the host control unit has exceeded the maximum charging current value of the operation of the battery control unit, or the charging filter fault code sent by the battery control unit is received, it is considered that the primary charging protection fails, and then the secondary charging protection is executed.

In a specific embodiment of the present specification, the second preset charging parameter threshold may include that the second preset charging current threshold is 1.8 A, and the second preset cell voltage threshold is 4.2V, and when the charging current in the second charging parameter is greater than or equal to 1.8 A, or the cell voltage in the second charging parameter is greater than or equal to 4.2V, the host control unit generates a second charging end instruction, and may subsequently implement secondary charging protection in response to the second charging end instruction.

Based on this, the host control unit ensures the normal implementation of the secondary charging protection based on the second charging parameter and the second preset charging parameter threshold, and improves the charging safety of the target battery.

Further, the battery control unit may monitor one or more charging parameters of the target battery, wherein the first charging parameter comprises at least one of a first charging current, a first cell voltage, a first charging time, and a first charging temperature of the target battery, and the second charging parameter comprises at least one of a second charging current, a second cell voltage, and a second charging temperature of the target battery.

The first charging current may be understood as a charging current monitored by the target battery before primary charging protection, the first cell voltage may be understood as a cell voltage monitored by the target battery before primary charging protection, the first charging time may be understood as a charging time monitored by the target battery before primary charging protection, and the first charging temperature may be understood as a charging temperature monitored by the target battery before primary charging protection. The second charging current may be understood as a charging current detected by the target battery before the secondary charging protection and after the primary charging protection, the second cell voltage may be understood as a cell voltage detected by the target battery before the secondary charging protection and after the primary charging protection, and the second charging temperature may be understood as a charging temperature detected by the target battery before the secondary charging protection and after the primary charging protection.

In the actual application, the battery control unit may choose to monitor one or more charging parameters of the charging current, the cell voltage, the charging time, and the charging temperature, to implement charging protection on the target battery from different aspects.

In a specific embodiment of the present specification, the battery control unit monitors a first charging parameter of the target battery, wherein the first charging parameter comprises a first charging current, a first cell voltage, a first charging time, and a first charging temperature, and the battery control unit also monitors a second charging parameter of the target battery, wherein the second charging parameter comprises a second charging circuit, a second cell voltage, and a second charging temperature.

Based on this, the battery control unit may choose to monitor one or more charging parameters of the charging current, the cell voltage, the charging time, and the charging temperature, to implement charging protection on the target battery from different aspects.

Preferably, in order to ensure that the target battery can be protected normally, both the first charging protection element and the second charging protection element are field effect transistors.

Further, in order to prevent the secondary charging protection from failing and causing a problem of the target battery during charging, the charging protection system further comprises an overcharge detection unit deployed in the battery management circuit, and the method further comprises: monitoring, by the overcharge detection unit, a third charging parameter of the target battery, and controlling a third charging protection element in the battery management circuit based on the third charging parameter.

The overcharge detection unit can be understood as a unit that monitors a third charging parameter of the target battery, and the overcharge detection unit can always monitor the third charging parameter, and trigger tertiary charging protection after a charging end condition is met.

In practice, an overcharge detection chip is deployed in the battery management circuit, each cell voltage of the target battery is monitored in real time during the charging process of the target battery, and when a certain cell voltage reaches a third preset charging parameter threshold, tertiary charging protection can be triggered, and a third charging protection element in the battery management circuit is disconnected. In a specific implementation, after the overcharge detection unit has detected the third charging parameter of the target battery, the third charging parameter may also be compared with a third preset charging parameter threshold, and when the third charging parameter is greater than or equal to the third preset charging parameter threshold, the third charging protection element is controlled to be disconnected to turn off the charging loop. In a specific implementation, the third charging parameter comprises a third cell voltage of the target battery, and the third charging protection element is a fusc.

When the third cell voltage in the third charging parameter is greater than or equal to the third preset cell voltage threshold in the third preset charging parameter threshold, the tertiary charging protection is triggered. Since the primary charging protection and the secondary charging protection are both software protection, the tertiary charging protection can be set as hardware protection, so as to cooperate with the software charging protection for use, and avoid the problem of charging protection failure. When the charging end condition is met, the overcharge detection unit controls the third charging protection element to be disconnected, that is, the fuse is blown off, to implement the tertiary charging protection. It should be noted that the charging parameter threshold between the primary charging protection, the secondary charging protection, and the tertiary charging protection should be increased progressively to avoid an error in the execution sequence.

In a specific implementation provided in the present disclosure, the charging voltage threshold of the primary charging protection is less than the charging voltage threshold of the secondary charging protection, and the charging voltage threshold of the secondary charging protection is less than the charging voltage threshold of the tertiary charging protection. Further, a charging voltage threshold difference between the secondary charging protection and the primary charging protection is less than a charging voltage threshold difference between the tertiary charging protection and the secondary charging protection, thereby further ensuring the charging safety of the charging circuit.

The charging protection method provided by the present disclosure can be applied to a charging protection system, the charging protection system comprises a battery control unit deployed in a battery management circuit, a host control unit deployed in a host control circuit and a target battery, wherein, the battery control unit monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit when the action of disconnecting the first charging protection element is executed and the second charging parameter of the target battery is monitored; and the host control unit generates a second charging end instruction according to the second charging parameter, and executes an action of disconnecting a second charging protection element in the host control circuit in response to the second charging end instruction. The first charging parameter of the target battery in the charging process is monitored by the battery control unit deployed in the battery management circuit, the first charging end instruction is generated according to the first charging parameter under the condition that the charging end condition is met, and the action of disconnecting the first charging protection element is executed in response to the first charging end instruction, so that a primary charging protection of the target battery is realized. After the action of disconnecting the first charging protection element is executed and the second charging parameter of the target battery is monitored, the second charging parameter is sent to the host control unit, the host control unit deployed in the host control circuit generates a second charging end instruction according to the second charging parameter when the charging end condition is met, and the action of disconnecting the second charging protection element in the host control circuit is executed in response to the second charging end instruction, so that secondary charging protection of the target battery is achieved, and the purpose of charging protection of the target battery through secondary charging protection is achieved when primary charging protection fails to function.

Figure 65:
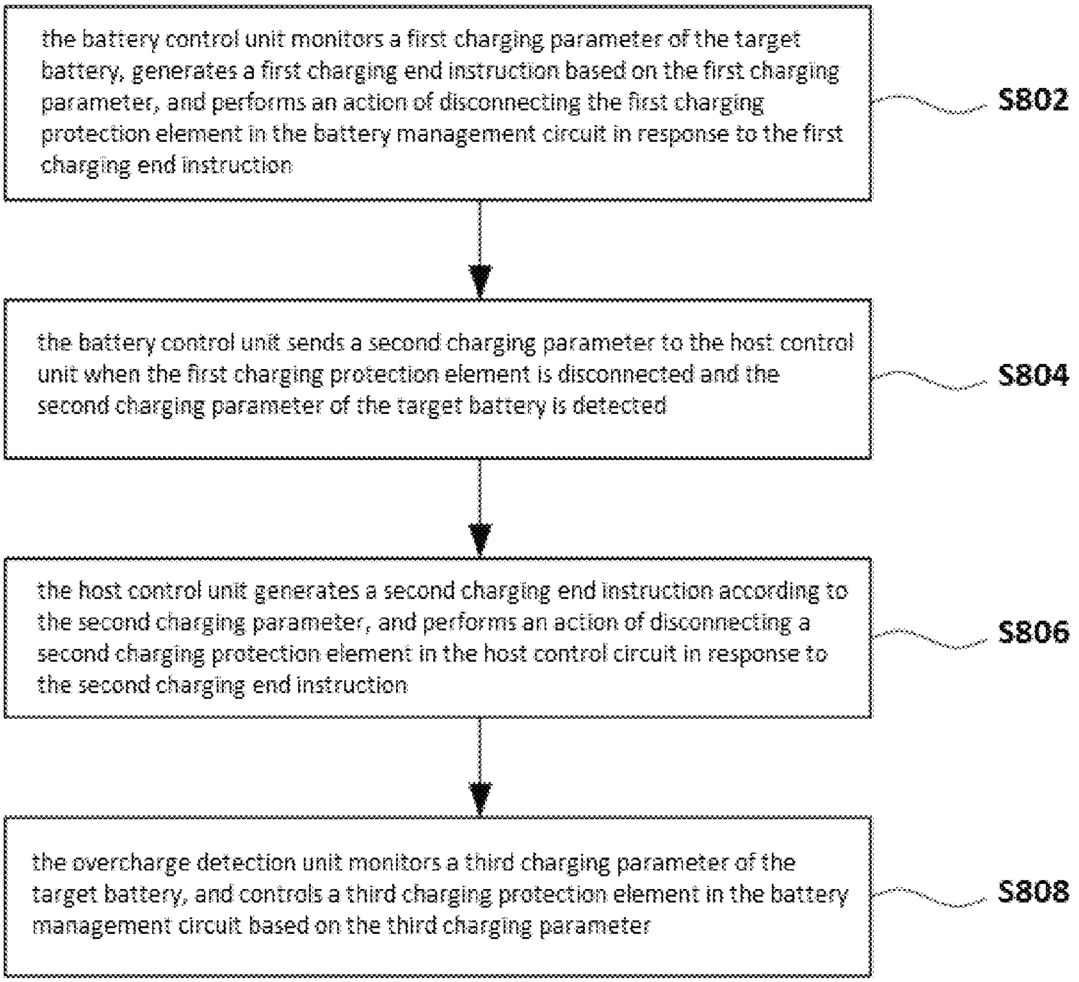
FIG. 65 is a processing flowchart of the charging protection method according to an embodiment of the present disclosure.

In the following, the charging protection method is further described with reference to FIG. 65, where an application of the charging protection method provided in the present disclosure for charging a cleaning device is used as an example. FIG. 65 shows a processing flowchart of a charging protection method applied to the charging of a cleaning device according to an embodiment of the present disclosure, wherein the method is applied to a charging protection system, and the charging protection system comprises a battery control unit deployed in a battery management circuit, a host control unit deployed in a host control circuit, and a target battery.

Step S802: the battery control unit monitors a first charging parameter of the target battery, generates a first charging end instruction based on the first charging parameter, and performs an action of disconnecting the first charging protection element in the battery management circuit in response to the first charging end instruction.

In an implementable manner, the battery management circuit is a battery BMS circuit of the cleaning device, the cleaning device may include a dust collector or a floor scrubber, the battery control unit is an MCU in the battery management circuit, the host control circuit is a main control circuit of the cleaning device, and the host control unit is an MCU in the host control unit.

In a specific embodiment of the present specification, the cleaning device is a floor scrubber, the cleaning device has a detachable device, the detachable device comprises a battery and a suction motor, and when it needs to be used, the detachable device is assembled with the floor scrubber body to switch to the floor scrubber mode, so that the floor scrubber can be used or the battery in the detachable device can be charged, and the detachable device can also be assembled with the dust collector module to switch to the hand-held suction mode. The battery management circuit is located in the detachable device, and the host control circuit is located in the floor scrubber body and/or in the dust collector module.

When the detachable device is assembled with the floor scrubber, the battery management circuit in the detachable device is electrically connected with the floor scrubber body and/or the host control circuit of the dust collector module, so that the host control circuit can provide charging current for the battery management circuit to charge the target battery pack of the detachable device. In the charging process, the battery control unit collects a first charging parameter of the target battery pack through the parameter collection unit, and the first charging parameter comprises a first charging current, a first cell voltage, a first charging time, and a first charging temperature. The battery control unit determines a first preset charging parameter threshold of the target battery pack, generates a first charging end instruction when the first charging parameter is greater than or equal to the first preset charging parameter threshold, and controls the first charging protection element to be disconnected in response to the first charging end instruction.

In another embodiment, when the battery of the cleaning device and the suction motor are not detachable, the battery of the cleaning device comprises a battery management circuit, the cleaning device further comprises a host control circuit, the battery management circuit is located on the battery control board, and the host control circuit is located on another main control board; or the battery management circuit and the host control circuit may be disposed on the same circuit board. The method of the present disclosure is also applicable to such cleaning devices.

Step S804: the battery control unit sends a second charging parameter to the host control unit when the first charging protection element is disconnected and the second charging parameter of the target battery is detected.

In an implementable manner, the battery control unit performs parameter monitoring of the target battery within a preset sleep time; if the second charging parameter of the target battery is not monitored, the battery control unit will sleep.

In an implementable manner, the battery control unit performs parameter monitoring of the target battery within a preset sleep time, if the second charging parameter of the target battery has been monitored, the battery control unit will send the second charging parameter to the host control unit.

S806: the host control unit generates a second charging end instruction according to the second charging parameter, and performs an action of disconnecting a second charging protection element in the host control circuit in response to the second charging end instruction.

In an implementable manner, the host control unit determines a second preset charging parameter threshold of the target battery, and generates a second charging end instruction when the second charging parameter is greater than or equal to the second preset charging parameter threshold, and implements secondary charging protection on the target battery in response to the second charging end instruction.

Step S808: the overcharge detection unit monitors a third charging parameter of the target battery, and controls a third charging protection element in the battery management circuit based on the third charging parameter.

In an implementable manner, the overcharge detection unit monitors the third charging parameter of the target battery, and manages the third charging protection element (that is, the fuse) in the short circuit based on the turning off of the battery.

According to an embodiment of the present disclosure, the first charging parameter of the target battery in the charging process is monitored by the battery control unit deployed in the battery management circuit, the first charging end instruction is generated according to the first charging parameter under the condition that the charging end condition is met, and the action of disconnecting the first charging protection element is performed in response to the first charging end instruction, so that a primary charging protection of the target battery is realized. After the action of disconnecting the first charging protection element is executed and the second charging parameter of the target battery is monitored, the second charging parameter is sent to the host control unit, the host control unit deployed in the host control circuit generates a second charging end instruction according to the second charging parameter when the charging end condition is met, and the action of disconnecting the second charging protection element in the host control circuit is executed in response to the second charging end instruction, so that secondary charging protection of the target battery is achieved, and the purpose of charging protection of the target battery through secondary charging protection is achieved when primary charging protection fails to function, and in the event of failure of the secondary charging protection, the tertiary charging protection of the target battery can be achieved by a third charging protection element.

Figure 66:
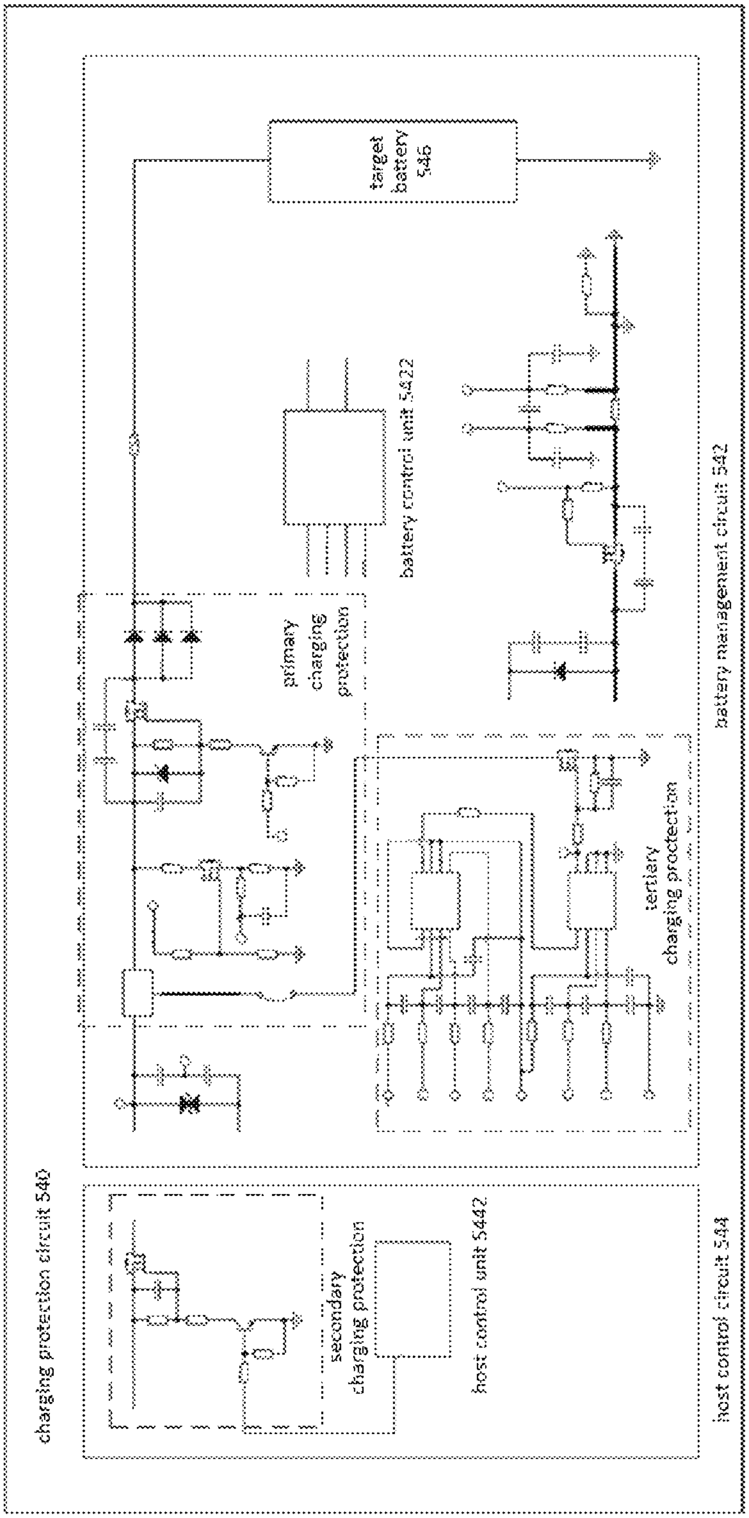
FIG. 66 is a schematic circuit diagram of the charging protection circuit according to an embodiment of the present disclosure.

FIG. 66 shows a schematic circuit diagram of a charging protection circuit according to an embodiment of the present disclosure, wherein the charging protection circuit 540 comprises a battery control unit 5422 deployed in a battery management circuit 542, a host control unit 5442 deployed in a host control circuit 544, and a target battery 546, wherein the battery control unit 5422 is configured to: monitor a first charging parameter of the target battery; generate a first charging end instruction based on the first charging parameter; perform, in response to the first charging end instruction, an action of disconnecting a first charging protection element in the battery management circuit; and send a second charging parameter to the host control unit when the action of disconnecting the first charging protection element is performed and the second charging parameter of the target battery is monitored;

the host control unit 5442 generates a second charging end instruction according to the second charging parameter, and performs an action of disconnecting a second charging protection element in the host control circuit in response to the second charging end instruction.

Optionally, the charging protection circuit further comprises a parameter collection unit deployed in the battery management circuit, wherein the parameter collection unit is connected to the battery control unit; and the monitoring, by the battery control unit, the first charging parameter of the target battery comprises: collecting, by the battery control unit, the first charging parameter of the target battery by using the parameter collection unit.

Optionally, the generating, by the battery control unit, a first charging end instruction based on the first charging parameter comprises: determining, by the battery control unit, a first preset charging parameter threshold of the target battery, and generating a first charging end instruction when the first charging parameter is greater than or equal to the first preset charging parameter threshold.

Optionally, after performing, by the battery control unit, in response to the first charging end instruction, an action of disconnecting the first charging protection element in the battery management circuit, the method further comprises: monitoring, by the battery control unit, the parameter of the target battery within a preset sleep time, and if the second charging parameter of the target battery is not monitored, the battery control unit sleeps; and monitoring, by the battery control unit, the parameter of the target battery within a preset sleep time, and if the second charging parameter of the target battery has been monitored, continuing to perform the step of sending the second charging parameter to the host control unit.

Optionally, the generating, by the host control unit, a second charging end instruction based on the second charging parameter comprises: determining, by the host control unit, a second preset charging parameter threshold of the target battery; and, generating the second charging end instruction when the second charging parameter is greater than or equal to the second preset charging parameter threshold.

Optionally, the first charging parameter comprises at least one of a first charging current, a first cell voltage, a first charging time, and a first charging temperature of the target battery, and the second charging parameter comprises at least one of a second charging current, a second cell voltage, and a second charging temperature of the target battery.

Optionally, both the first charging protection element and the second charging protection element are field effect transistors.

Optionally, the charging protection system further comprises an overcharge detection unit deployed in the battery management circuit, and the method further comprises monitoring, by the overcharge detection unit, a third charging parameter of the target battery, and controlling a third charging protection element in the battery management circuit based on the third charging parameter.

Optionally, the third charging parameter comprises a third cell voltage of the target battery, and the third charging protection element is a fuse.

A charging protection circuit is provided by the present disclosure, the charging protection system comprises a battery control unit deployed in a battery management circuit, a host control unit deployed in a host control circuit and a target battery, wherein, the battery control unit monitors a first charging parameter of the target battery, generates a first charging end instruction based on the first charging parameter, executes, in response to the first charging end instruction, an action of disconnecting a first charging protection element in the battery management circuit, and sends a second charging parameter to the host control unit when the action of disconnecting the first charging protection element is executed and the second charging parameter of the target battery is monitored; and the host control unit generates a second charging end instruction according to the second charging parameter, and executes an action of disconnecting a second charging protection element in the host control circuit in response to the second charging end instruction. The first charging parameter of the target battery in the charging process is monitored by the battery control unit deployed in the battery management circuit, the first charging end instruction is generated according to the first charging parameter under the condition that the charging end condition is met, and the action of disconnecting the first charging protection element is executed in response to the first charging end instruction, so that a primary charging protection of the target battery is realized. After the action of disconnecting the first charging protection element is executed and the second charging parameter of the target battery is monitored, the second charging parameter is sent to the host control unit, the host control unit deployed in the host control circuit generates a second charging end instruction according to the second charging parameter when the charging end condition is met, and the action of disconnecting the second charging protection element in the host control circuit is executed in response to the second charging end instruction, so that secondary charging protection of the target battery is achieved, and the purpose of charging protection of the target battery through secondary charging protection is achieved when primary charging protection fails to function.

Corresponding to the foregoing circuit embodiment, the present disclosure further provides a cleaning device, and the cleaning device comprises the charging protection circuit in the foregoing embodiment.

Corresponding to the foregoing circuit embodiment, the present disclosure further provides a cleaning tool, where the cleaning tool comprises cleaning device and a cleaning base station, the cleaning device is configured to perform a cleaning task, and the cleaning device comprises the charging protection circuit in the foregoing embodiment; and the cleaning base station is configured to accommodate the cleaning device and charge the cleaning device. For example, when the cleaning tool is a vacuum cleaner, the cleaning device is the vacuum cleaner itself, and the cleaning base station is a base station corresponding to the vacuum cleaner itself. For example, when the cleaning tool is a floor scrubber, the cleaning device is the floor scrubber itself, and the cleaning base station is a base station corresponding to the floor scrubber itself. In the embodiments provided in the present disclosure, a specific representation form of the cleaning tool is not limited, and is based on the actual application.

Figure 67:
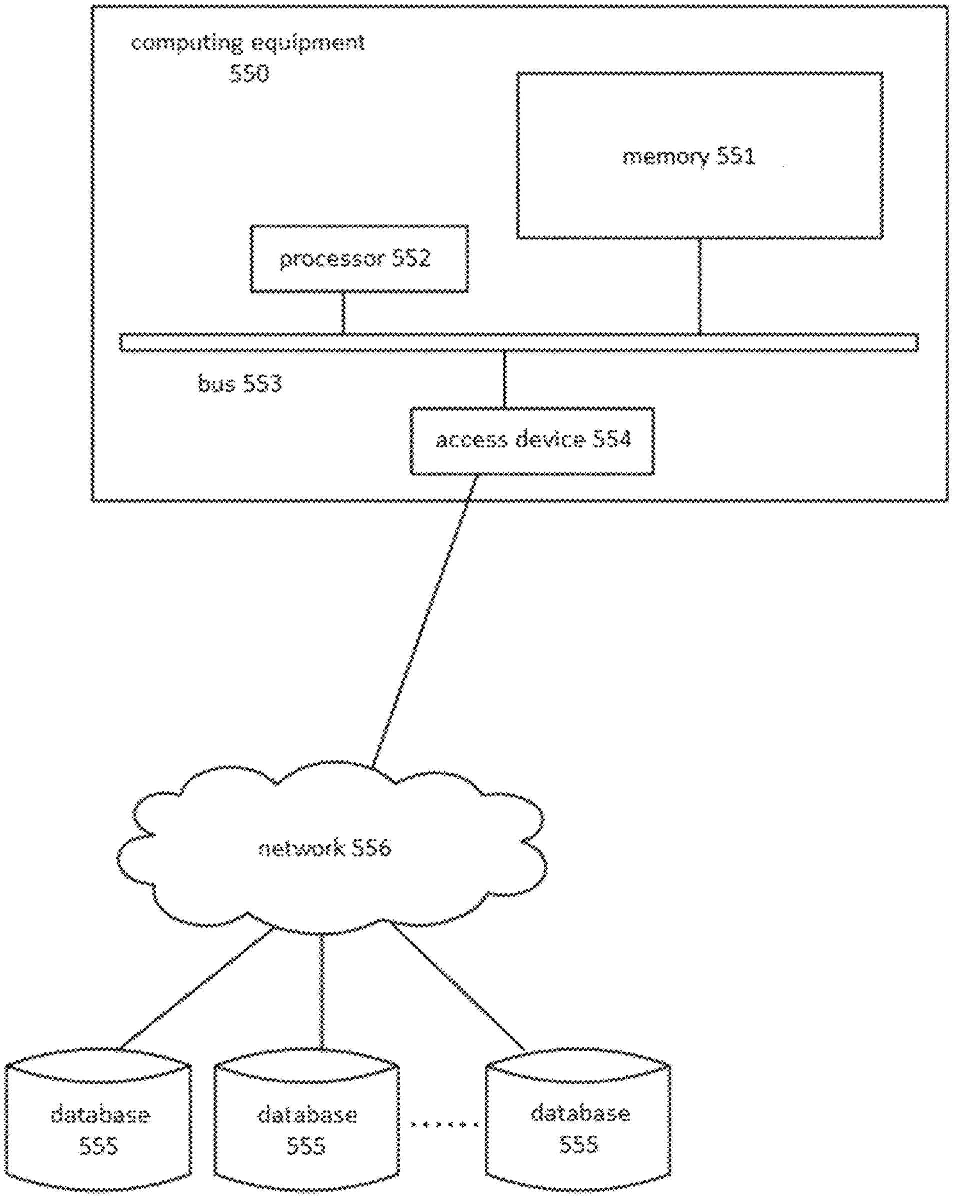
FIG. 67 is a structural block diagram of the computing device according to an embodiment of the present disclosure.

FIG. 67 is a structural block diagram of a computing device 550 according to an embodiment of the present disclosure. Components of the computing device 550 include, but are not limited to, a memory 551 and a processor 552. The processor 552 is connected to the memory 551 via the bus 553, and the database 555 is configured to store data.

The computing device 550 also comprises an access device 554 that enables the computing device 550 to communicate via one or more networks 556. Examples of these networks include Public Switched Telephone Network (PSTN), Local Area Network (LAN), Wide Area Network (WAN), Personal Area Network (PAN), or a combination of communication networks such as the Internet. The access device 554 may include one or more of any type of wired or wireless network interface (e.g., a network interface card (NIC, network interface controller)), such as a IEEE802.11 wireless local area network (WLAN) wireless interface, a worldwide interoperability for microwave access (Wi-Fi) interface, an Ethernet interface, a universal serial bus (USB) interface, a cellular network interface, a Bluetooth interface, a near field communication (NFC) interface, or the like.

In an embodiment of the present disclosure, the foregoing components of the computing device 550 and other components not shown in FIG. 67 may also be connected to each other, for example, via a bus. It should be understood that the structural block diagram of the computing device shown in FIG. 67 is merely for example, and is not intended to limit the scope of the present disclosure. Those skilled in the art may add or replace other components as needed.

The computing device 550 may be any type of stationary or mobile computing device, including a mobile computer or mobile computing device (e.g., tablet computer, personal digital assistant, laptop computer, notebook computer, netbook, etc.), a mobile phone (e.g., smartphone), a wearable computing device (e.g., smart watch, smart glasses, etc.), or other type of mobile device, or a stationary computing device such as a desktop computer or personal computer (PC). The computing device 550 may also be a mobile or stationary server.

When the processor 552 executes the computer instructions, the steps of the charging protection method are performed. The foregoing is a schematic solution of a computing device according to this embodiment. It should be noted that the technical solution of the computing device and the technical solution of the charging protection method belong to the same concept, and details that are not described in the technical solution of the computing device may refer to descriptions of the technical solution of the charging protection method.

According to an embodiment of the present disclosure, a computer readable storage medium is provided, the computer readable storage medium stores computer instructions, when the computer instructions are executed by a processor, the steps of the charging protection method are performed.

The foregoing is a schematic solution of a computer-readable storage medium according to this embodiment. It should be noted that the technical solution of the storage medium and the technical solution of the charging protection method belong to the same concept, and details that are not described in the technical solution of the storage medium may refer to descriptions of the technical solution of the charging protection method.

The foregoing describes specific embodiments of the present disclosure. Other embodiments also fall within the scope of the appended claims. In some cases, the acts or steps recited in the appended claims may be performed in a different order than in the embodiments and still achieve desired results. Additionally, the processes depicted in the figures do not necessarily require a particular order or sequential order shown to achieve a desired result. In certain embodiments, multitasking and parallel processing may also be possible or advantageous.

The computer instructions include computer program code, which may be in the form of source code, object code, executable files, some intermediate forms, or the like. The computer-readable medium may include any device capable of carrying the computer program code, a recording medium, a USB disk, a mobile hard disk, a magnetic disk, an optical disk, a computer memory, a read-only memory (ROM), a random-access memory (RAM), an electrical carrier signal, a telecommunication signal, a software distribution medium, and the like. It should be noted that meaning covered in the computer readable medium may be appropriately expanded or limited according to requirements of law and patent practice in a jurisdiction, for example, in some jurisdictions, according to law and patent practice, the computer readable medium excludes an electrical carrier signal and a telecommunication signal.

It should be noted that, for the foregoing method embodiments, for ease of description, all the method embodiments are described as a sequence of action combinations, but those skilled in the art should know that the present disclosure is not limited by the described action sequence, as according to the present disclosure, some steps may be performed in a different sequence or simultaneously. Secondly, those skilled in the art should also be aware that the embodiments described in the specification are all preferred embodiments, and the actions and modules involved are not necessarily required by the present disclosure.

In the above embodiments, the description of each embodiment has a focus, and for any part not described in detail in a particular embodiment, reference may be made to related descriptions of other embodiments.

Some embodiments of the present disclosure have been described above, and the above description is exemplary, not exhaustive, and is not limited to the disclosed embodiments. Many modifications and variations will be apparent to those skilled in the art without departing from the scope and spirit of the illustrated embodiments. The selection of terms as used herein is intended to best explain the principles of the embodiments, the practical application or technical modifications to the market, or to enable those skilled in the art to understand the embodiments disclosed herein. The scope of the present disclosure is defined by the appended claims.

What is claimed is:

1. A cleaning device having a floor brush assembly, wherein the floor brush assembly comprises:

a floor brush housing;

a roller brush rotatably connected to the floor brush housing and configured to clean a working surface; and a roller brush cover, wherein the roller brush cover and the floor brush housing enclose a roller brush cavity for fitting with the roller brush, and the roller brush cover is configured to be operable in a first position or a second position relative to the floor brush housing;

in the first position, there is a first contact area between the roller brush cover and the roller brush; in the second position, there is a second contact area between the roller brush cover and the roller brush; wherein, the first contact area is greater than or equal to zero, but less than the second contact area;

wherein a liquid outlet assembly is provided on the floor brush housing, the liquid outlet assembly comprises a flow guide portion extending in a direction of the roller brush, at least one flow dividing rib is provided on the flow guide portion, and the at least one flow dividing rib is configured to be distributed at a distance in the axial direction of the roller brush.

2. The cleaning device according to claim 1, wherein the roller brush cover is disposed on the floor brush housing by means of a guide mechanism formed in an arc-shape, so that the roller brush cover is configured to move between the first position and the second position along an arc-shaped movement trajectory.

3. The cleaning device according to claim 2, wherein the liquid outlet assembly further comprises a liquid outlet portion extending in a direction of the roller brush; an extension portion is provided on the roller brush cover, the extension portion is configured to extend downward to a position adjacent to the flow guide portion and enclose a liquid outlet with the flow guide portion; and the liquid flows to the roller brush through the liquid outlet.

4. The cleaning device according to claim 3, wherein the position where the extension portion and the flow guide portion enclose a liquid outlet is configured to be in a circle center position of the arc-shaped movement trajectory, and is configured to maintain a distance from the flow guide portion within a predetermined range during movement of the roller brush cover.

5. The cleaning device according to claim 4, wherein the roller brush cover comprises a roller brush surface corresponding to the roller brush; and the extension portion is configured to extend in a traveling direction of the cleaning device to a rear end of the roller brush and enclose a rear end portion of the roller brush surface.

6. The cleaning device according to claim 4, wherein the liquid outlet is configured to extend along the axial direction of the roller brush, and wherein the flow guide portion is configured to extend obliquely downward, and liquid exiting the liquid outlet portion flows obliquely downward to the roller brush through the flow guide portion.

7. The cleaning device according to claim 2, wherein the floor brush housing is provided with bearing brackets on two opposite sides; the guide mechanism comprises guide grooves provided on the bearing brackets and guide blocks disposed at the corresponding positions of the roller brush cover and matched with the guide grooves; and the guide blocks and the guide grooves are formed in an arc-shape.

8. The cleaning device according to claim 7, wherein the roller brush cover is configured to be detachably mounted on the floor brush housing, and the guide blocks are lock catches disposed on two opposite sides of the roller brush cover; the lock catches are configured to extend out of the roller brush cover through elastic members, and are configured to retract into the roller brush cover under an external force.

9. The cleaning device according to claim 8, wherein an outer side wall of each lock catch is configured as an inclined surface inclined outwardly from bottom to top; an end surface of the bearing bracket is provided with a guide surface corresponding to the first position of the roller brush cover, and the guide surface is configured to fit with the inclined surface of the outer side wall of the lock catch when the roller brush cover is in the first position, so as to push the lock catch to move into the roller brush cover when the roller brush cover is pressed down, until the lock catch extends into the guide groove under the action of the elastic member.

10. The cleaning device according to claim 7, wherein two opposite sides of the roller brush cover are configured to be supported on the first end surfaces of the top of the bearing brackets; each first end surface has a horizontal portion and a first arc-shaped portion, and two sides of the roller brush cover are formed in a shape matching the horizontal portion and the first arc-shaped portion; and the first arc-shaped portion is configured to always support a corresponding part of the roller brush cover during movement of the roller brush cover.

11. The cleaning device according to claim 10, wherein a second end surface is provided on the top of each bearing bracket, a second arc-shaped portion is provided on the second end surface at a position corresponding to the horizontal portion, an arc-shaped flange matching the second arc-shaped portion is formed downward at the position corresponding to the roller brush cover, and the arc-shaped flange is configured to support the second arc-shaped portion during movement of the roller brush cover.

12. The cleaning device according to claim 1, wherein a movement assembly is further provided, the movement assembly comprises a pushing part controlled by a driving mechanism; the roller brush cover is provided with a cooperation part in transmission connection with the pushing part; and the pushing part is configured to be controlled by the driving mechanism to drive the roller brush cover to move between the first position and the second position.

13. The cleaning device according to claim 12, wherein the pushing part is provided with an engaging groove, and the cooperation part is an engaging wall having a downward opening; the engaging wall is configured to be fitted into the engaging groove after the roller brush cover is mounted on the floor brush housing.

14. The cleaning device according to claim 1, wherein the roller brush cover comprises a fixed part and a movable part, and the movable part is configured to move between a first position and a second position; in the first position, there is the first contact area between the movable part and the roller brush; in the second position, there is the second contact area between the movable part and the roller brush; wherein, the first contact area is greater than or equal to zero, but less than the second contact area.

15. The cleaning device according to claim 1, wherein when the roller brush cover is in the second position, the cleaning device is in a self-cleaning operation.

16. A control method for the cleaning device according to claim 1, the method comprises the following steps:

controlling the roller brush cover to move from the first position to the second position in a self-cleaning mode, so that the inner wall of the roller brush cover is in contact fit with the roller brush;

controlling the roller brush to rotate during the self-cleaning to clean the inner wall of the roller brush cover; and controlling the roller brush cover to move from the second position to the first position after a predetermined time, so as to at least partially separate the inner wall of the roller brush cover from the roller brush;

wherein, the self-cleaning mode comprises a step of controlling a forward rotation self-cleaning of the roller brush;

before or during the step of controlling the forward rotation self-cleaning of the roller brush, the roller brush cover is controlled to move from the first position to the second position; and when the roller brush is controlled to rotate forwardly for the self-cleaning, the roller brush cover is held in the second position within a predetermined time.

17. The method according to claim 16, wherein in the first position the inner wall of the roller brush cover is partially separated from the roller brush, the cleaning device comprises a main motor which provides a suction force for the dirt suction port, and the self-cleaning mode comprises a step of controlling a reverse rotation self-cleaning of the roller brush, and the step of controlling the reverse rotation self-cleaning of the roller brush comprises: controlling the roller brush to rotate reversely by an angle, which is greater than 90° and less than 180°, and increasing the power of the main motor in the process of controlling the roller brush to rotate reversely.

18. A cleaning system, comprising:

a cleaning device, which comprises a floor brush assembly, a scraper plate in an interference fit with a roller brush, a dirt suction port located below the scraper plate, and a main motor for generating a suction force at the dirt suction port, the floor brush assembly comprises a floor brush housing, the roller brush and a roller brush cover, wherein the scraper plate is in contact fit with the roller brush, the roller brush is rotatably connected to the floor brush housing and configured to clean a working surface, the roller brush cover and the floor brush housing enclose a roller brush cavity for fitting with the roller brush, and the roller brush cover is configured to be operable in a first position or a second position relative to the floor brush housing, in the first position, there is a first contact area between the roller brush cover and the roller brush; in the second position, there is a second contact area between the roller brush cover and the roller brush, wherein, the first contact area is greater than or equal to zero, but less than the second contact area; and a tray configured for accommodating the cleaning device, the tray has a roller brush groove for receiving a roller brush, the roller brush is configured to be free to rotate relative to the roller brush groove during a self-cleaning operation;

wherein a liquid outlet assembly is provided on the floor brush housing, the liquid outlet assembly comprises a flow guide portion extending in a direction of the roller brush, at least one flow dividing rib is provided on the flow guide portion, and the at least one flow dividing rib is configured to be distributed at a distance in the axial direction of the roller brush.

19. The cleaning system according to claim 18, wherein the roller brush groove comprises a first arc surface located at a bottom of the roller brush groove and a second arc surface located at a front side of the roller brush groove; the second arc surface is formed to deviate from the first arc surface in a direction away from the roller brush, and to form an inflection point at a position where the first arc surface joins the second arc surface; and a front-end side wall of the roller brush groove is formed to be higher than a rotation tangent line of the roller brush at the inflection point.

20. The cleaning system according to claim 19, wherein when the cleaning device is placed on the tray, an included angle between a line connecting the scraper plate to the circle center of the roller brush and a line connecting the inflection point to the circle center of the roller brush is greater than 90° and less than 180°.

* * * * *